US011830149B2

(12) United States Patent
Zhao et al.

(10) Patent No.: US 11,830,149 B2
(45) Date of Patent: *Nov. 28, 2023

(54) CROSS REALITY SYSTEM WITH PRIORITIZATION OF GEOLOCATION INFORMATION FOR LOCALIZATION

(71) Applicant: Magic Leap, Inc., Plantation, FL (US)

(72) Inventors: Xuan Zhao, San Jose, CA (US); Christian Ivan Robert Moore, Cupertino, CA (US); Sen Lin, San Jose, CA (US); Ali Shahrokni, San Jose, CA (US); Ashwin Swaminathan, Dublin, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/174,146

(22) Filed: Feb. 11, 2021

(65) Prior Publication Data

US 2021/0256768 A1     Aug. 19, 2021

Related U.S. Application Data

(60) Provisional application No. 62/976,154, filed on Feb. 13, 2020.

(51) Int. Cl.
*G06T 19/00* (2011.01)
*G06F 16/29* (2019.01)
*G06F 9/54* (2006.01)
*G06F 16/907* (2019.01)

(52) U.S. Cl.
CPC ............ *G06T 19/006* (2013.01); *G06F 9/547* (2013.01); *G06F 16/29* (2019.01); *G06F 16/907* (2019.01)

(58) Field of Classification Search
CPC ....... G06T 19/006; G06F 16/40; G06F 16/29; G06F 9/547

(Continued)

(56) References Cited

U.S. PATENT DOCUMENTS 7,032,185 B1    4/2006 Yohanan
8,243,102 B1 *  8/2012 Cornell ................ G06T 17/05
                                                       345/428

(Continued)

FOREIGN PATENT DOCUMENTS

EP          2359333 A1    8/2011
EP          2808842 B1    8/2017

(Continued)

OTHER PUBLICATIONS

International Search Report and Written Opinion for International Application No. PCT/US2019/046240 dated Dec. 23, 2019.

(Continued)

*Primary Examiner* — Javid A Amini
(74) *Attorney, Agent, or Firm* — Wolf, Greenfield & Sacks, P.C.

(57) ABSTRACT

A cross reality system enables any of multiple devices to efficiently access previously stored maps. Both stored maps and tracking maps used by portable devices may have any of multiple types of location metadata associated with them. The location metadata may be used to select a set of candidate maps for operations, such as localization or map merge, that involve finding a match between a location defined by location information from a portable device and any of a number of previously stored maps. The types of location metadata may prioritized for use in selecting the subset. To aid in selection of candidate maps, a universe of stored maps may be indexed based on geo-location information. A cross reality platform may update that index as it interacts with devices that supply geo-location information in connection with location information and may propagate that geo-location information to devices that do not supply it.

20 Claims, 83 Drawing Sheets

(58) Field of Classification Search
USPC .................................................... 345/633
See application file for complete search history.

(56) References Cited

U.S. PATENT DOCUMENTS

| | | |
|---|---|---|
| 8,849,957 B1 | 9/2014 | Boodman et al. |
| 9,467,718 B1 | 10/2016 | Newell et al. |
| 10,373,366 B2 | 8/2019 | Forutanpour et al. |
| 10,565,731 B1 | 2/2020 | Reddy et al. |
| 10,748,302 B1 | 8/2020 | Dine et al. |
| 10,852,828 B1 | 12/2020 | Gatson et al. |
| 10,854,012 B1 | 12/2020 | Iyer et al. |
| 10,957,112 B2 | 3/2021 | Miranda et al. |
| 11,201,981 B1 | 12/2021 | Suiter et al. |
| 11,227,435 B2 | 1/2022 | Mohan et al. |
| 11,232,635 B2 | 1/2022 | Brodsky et al. |
| 11,257,294 B2 | 2/2022 | Zhao et al. |
| 11,386,627 B2 * | 7/2022 | Caswell ............... G06T 19/006 |
| 11,386,629 B2 | 7/2022 | Miranda et al. |
| 2004/0017372 A1 | 1/2004 | Park et al. |
| 2005/0228849 A1 | 10/2005 | Zhang |
| 2006/0078214 A1 | 4/2006 | Gallagher |
| 2007/0298866 A1 | 12/2007 | Gaudiano et al. |
| 2008/0090659 A1 | 4/2008 | Aguilar et al. |
| 2008/0284889 A1 | 11/2008 | Kinoshita |
| 2008/0303787 A1 * | 12/2008 | Zheng ................. A63F 13/2145 345/156 |
| 2009/0241037 A1 | 9/2009 | Hyndman |
| 2009/0256903 A1 | 10/2009 | Spooner et al. |
| 2010/0208033 A1 | 8/2010 | Edge et al. |
| 2010/0287485 A1 | 11/2010 | Bertolami et al. |
| 2011/0083101 A1 * | 4/2011 | Sharon ................. H04W 4/029 709/204 |
| 2011/0208817 A1 | 8/2011 | Toledano et al. |
| 2011/0254950 A1 | 10/2011 | Bibby et al. |
| 2011/0299736 A1 | 12/2011 | Choi et al. |
| 2012/0130632 A1 | 5/2012 | Bandyopadhyay et al. |
| 2012/0169887 A1 * | 7/2012 | Zhu ..................... G06V 40/20 348/207.1 |
| 2012/0188237 A1 | 7/2012 | Han et al. |
| 2012/0249741 A1 * | 10/2012 | Maciocci ............. G06T 19/006 348/51 |
| 2012/0294231 A1 | 11/2012 | Finlow-Bates et al. |
| 2013/0002815 A1 | 1/2013 | Smoot et al. |
| 2013/0044128 A1 | 2/2013 | Liu et al. |
| 2013/0141419 A1 | 6/2013 | Mount et al. |
| 2013/0162481 A1 | 6/2013 | Parvizi et al. |
| 2013/0176430 A1 | 7/2013 | Zhu et al. |
| 2013/0201185 A1 | 8/2013 | Kochi |
| 2013/0215264 A1 | 8/2013 | Soatto et al. |
| 2013/0222555 A1 | 8/2013 | Nagasaka et al. |
| 2013/0257858 A1 * | 10/2013 | Na ........................ A63F 13/45 345/419 |
| 2013/0257907 A1 | 10/2013 | Matsui |
| 2013/0293468 A1 * | 11/2013 | Perez ..................... G06F 3/033 345/158 |
| 2013/0321402 A1 * | 12/2013 | Moore ................. G06F 3/04845 345/173 |
| 2013/0342671 A1 * | 12/2013 | Hummel ............... G06V 40/107 348/77 |
| 2014/0002607 A1 | 1/2014 | Shotton et al. |
| 2014/0003762 A1 | 1/2014 | Macnamara |
| 2014/0097329 A1 | 4/2014 | Wadsworth |
| 2014/0254936 A1 | 9/2014 | Sun et al. |
| 2014/0254942 A1 | 9/2014 | Liu et al. |
| 2014/0267234 A1 | 9/2014 | Hook et al. |
| 2014/0282162 A1 | 9/2014 | Fein et al. |
| 2014/0306866 A1 | 10/2014 | Miller et al. |
| 2014/0315570 A1 * | 10/2014 | Yun ...................... G01S 5/0264 455/456.1 |
| 2014/0368645 A1 * | 12/2014 | Ahuja ................... G06T 7/246 382/103 |
| 2014/0372957 A1 | 12/2014 | Keane et al. |
| 2014/0375688 A1 | 12/2014 | Redmann et al. |
| 2015/0016777 A1 | 1/2015 | Abovitz et al. |
| 2015/0049004 A1 | 2/2015 | Deering et al. |
| 2015/0071524 A1 | 3/2015 | Lee |
| 2015/0161476 A1 | 6/2015 | Kurz et al. |
| 2015/0178939 A1 | 6/2015 | Bradski et al. |
| 2015/0186745 A1 | 7/2015 | Martini |
| 2015/0187133 A1 | 7/2015 | Martini |
| 2015/0205126 A1 * | 7/2015 | Schowengerdt ....... G09G 5/003 345/633 |
| 2015/0279081 A1 | 10/2015 | Monk et al. |
| 2015/0302642 A1 | 10/2015 | Miller |
| 2015/0302652 A1 * | 10/2015 | Miller ................. G06T 11/60 345/419 |
| 2015/0302656 A1 | 10/2015 | Miller et al. |
| 2015/0302664 A1 | 10/2015 | Miller |
| 2015/0302665 A1 | 10/2015 | Miller |
| 2015/0321103 A1 | 11/2015 | Barnett et al. |
| 2016/0005229 A1 | 1/2016 | Lee et al. |
| 2016/0012643 A1 | 1/2016 | Kezele et al. |
| 2016/0026253 A1 | 1/2016 | Bradski et al. |
| 2016/0071278 A1 | 3/2016 | Leonard et al. |
| 2016/0086381 A1 * | 3/2016 | Jung ..................... G06T 11/00 345/633 |
| 2016/0147408 A1 | 5/2016 | Bevis et al. |
| 2016/0148433 A1 | 5/2016 | Petrovskaya et al. |
| 2016/0180593 A1 | 6/2016 | Yang |
| 2016/0180602 A1 | 6/2016 | Fuchs |
| 2016/0196692 A1 | 7/2016 | Kjallstrom et al. |
| 2016/0217614 A1 | 7/2016 | Kraver et al. |
| 2016/0219408 A1 | 7/2016 | Yang et al. |
| 2016/0300389 A1 | 10/2016 | Glenn, III et al. |
| 2016/0335275 A1 | 11/2016 | Williams et al. |
| 2016/0343165 A1 | 11/2016 | Park et al. |
| 2016/0370971 A1 | 12/2016 | Hackett et al. |
| 2016/0381118 A1 | 12/2016 | Andrews et al. |
| 2017/0031160 A1 | 2/2017 | Popovich et al. |
| 2017/0061696 A1 | 3/2017 | Li et al. |
| 2017/0076408 A1 | 3/2017 | D'Souza et al. |
| 2017/0091996 A1 | 3/2017 | Wei et al. |
| 2017/0094227 A1 | 3/2017 | Williams et al. |
| 2017/0134909 A1 | 5/2017 | Gu et al. |
| 2017/0185823 A1 | 6/2017 | Gold et al. |
| 2017/0192515 A1 | 7/2017 | Menadeva et al. |
| 2017/0195564 A1 | 7/2017 | Appia et al. |
| 2017/0236037 A1 | 8/2017 | Rhoads et al. |
| 2017/0237789 A1 | 8/2017 | Harner et al. |
| 2017/0243352 A1 | 8/2017 | Kutliroff et al. |
| 2017/0270713 A1 | 9/2017 | Dooley et al. |
| 2017/0336511 A1 | 11/2017 | Nerurkar et al. |
| 2017/0345215 A1 * | 11/2017 | Khedkar ................ G06V 40/19 |
| 2017/0352192 A1 | 12/2017 | Petrovskaya et al. |
| 2017/0371024 A1 | 12/2017 | Ivanov et al. |
| 2018/0000547 A1 | 1/2018 | Kang et al. |
| 2018/0045963 A1 | 2/2018 | Hoover et al. |
| 2018/0053284 A1 | 2/2018 | Rodriguez et al. |
| 2018/0082156 A1 | 3/2018 | Jin et al. |
| 2018/0122143 A1 | 5/2018 | Ellwood, Jr. |
| 2018/0164877 A1 | 6/2018 | Miller et al. |
| 2018/0189556 A1 | 7/2018 | Shamir et al. |
| 2018/0213359 A1 | 7/2018 | Reinhardt et al. |
| 2018/0218222 A1 | 8/2018 | Alrabeiah et al. |
| 2018/0245927 A1 | 8/2018 | Frish et al. |
| 2018/0261012 A1 | 9/2018 | Mullins et al. |
| 2018/0268237 A1 | 9/2018 | Stanimirovic et al. |
| 2018/0268582 A1 | 9/2018 | Schneider et al. |
| 2018/0268611 A1 | 9/2018 | Nourai et al. |
| 2018/0284802 A1 * | 10/2018 | Tsai ....................... G06V 20/20 |
| 2018/0286116 A1 | 10/2018 | Babu J D |
| 2018/0293771 A1 | 10/2018 | Piemonte et al. |
| 2018/0304153 A1 | 10/2018 | Hohjoh et al. |
| 2018/0307303 A1 | 10/2018 | Powderly et al. |
| 2018/0308377 A1 | 10/2018 | Pena-Rios et al. |
| 2018/0315248 A1 | 11/2018 | Bastov et al. |
| 2019/0005725 A1 | 1/2019 | Oonishi |
| 2019/0027267 A1 | 1/2019 | Hayashi et al. |
| 2019/0065814 A1 | 2/2019 | Morein et al. |
| 2019/0080467 A1 | 3/2019 | Hirzer et al. |
| 2019/0114798 A1 | 4/2019 | Afrouzi et al. |
| 2019/0114802 A1 | 4/2019 | Lazarow |

(56) References Cited

U.S. PATENT DOCUMENTS

| | | | |
|---|---|---|---|
| 2019/0147341 A1 | 5/2019 | Rabinovich et al. | |
| 2019/0188474 A1 | 6/2019 | Zahnert et al. | |
| 2019/0197785 A1 | 6/2019 | Tate-Gans et al. | |
| 2019/0199882 A1 | 6/2019 | Han | |
| 2019/0236797 A1 | 8/2019 | Thyagharajan et al. | |
| 2019/0287311 A1 | 9/2019 | Bhatnagar et al. | |
| 2019/0301873 A1 | 10/2019 | Prasser et al. | |
| 2019/0310761 A1 | 10/2019 | Agarawala et al. | |
| 2019/0313059 A1 | 10/2019 | Agarawala et al. | |
| 2019/0340831 A1 | 11/2019 | Scarfone et al. | |
| 2019/0355169 A1 | 11/2019 | Sapienza et al. | |
| 2019/0384379 A1 | 12/2019 | Huh | |
| 2019/0385370 A1 | 12/2019 | Boyapalle et al. | |
| 2019/0388182 A1 | 12/2019 | Kumar et al. | |
| 2020/0033463 A1 | 1/2020 | Lee et al. | |
| 2020/0034624 A1 | 1/2020 | Sharma et al. | |
| 2020/0051328 A1 | 2/2020 | Mohan et al. | |
| 2020/0074739 A1 | 3/2020 | Stauber et al. | |
| 2020/0090407 A1 | 3/2020 | Miranda et al. | |
| 2020/0097770 A1 | 3/2020 | Sommer et al. | |
| 2020/0111255 A1 | 4/2020 | Brodsky et al. | |
| 2020/0126252 A1 | 4/2020 | Iyer et al. | |
| 2020/0126256 A1 | 4/2020 | Sinha et al. | |
| 2020/0134366 A1 | 4/2020 | Xu et al. | |
| 2020/0175766 A1* | 6/2020 | Gawrys | G06F 16/9027 |
| 2020/0211286 A1 | 7/2020 | Kelsey et al. | |
| 2020/0211290 A1 | 7/2020 | Choi et al. | |
| 2020/0252233 A1* | 8/2020 | O'Keeffe | H04L 12/2818 |
| 2020/0342670 A1 | 10/2020 | Nattinger et al. | |
| 2020/0364901 A1 | 11/2020 | Choudhuri et al. | |
| 2020/0364937 A1 | 11/2020 | Selbrede | |
| 2020/0372672 A1 | 11/2020 | Schonberger et al. | |
| 2020/0380263 A1 | 12/2020 | Yang et al. | |
| 2020/0380769 A1 | 12/2020 | Liu et al. | |
| 2020/0394012 A1 | 12/2020 | Wright, Jr. et al. | |
| 2020/0401617 A1 | 12/2020 | Spiegel et al. | |
| 2021/0049360 A1* | 2/2021 | Yildiz | G02B 27/017 |
| 2021/0065455 A1 | 3/2021 | Beith et al. | |
| 2021/0074072 A1* | 3/2021 | Desai | G06T 19/006 |
| 2021/0110614 A1* | 4/2021 | Shahrokni | G06T 19/006 |
| 2021/0110615 A1 | 4/2021 | Zhao et al. | |
| 2021/0112427 A1 | 4/2021 | Shveki et al. | |
| 2021/0134064 A1 | 5/2021 | Shahrokni et al. | |
| 2021/0142580 A1* | 5/2021 | Caswell | G06T 15/005 |
| 2021/0174596 A1 | 6/2021 | Zhang et al. | |
| 2021/0209859 A1 | 7/2021 | Miranda et al. | |
| 2021/0256755 A1 | 8/2021 | Joseph et al. | |
| 2021/0256766 A1* | 8/2021 | Muhlethaler | G06F 3/011 |
| 2021/0256767 A1 | 8/2021 | Velasquez et al. | |
| 2021/0264620 A1 | 8/2021 | Ramasamy et al. | |
| 2021/0264685 A1* | 8/2021 | Velasquez | G06T 7/73 |
| 2021/0315464 A1* | 10/2021 | Solà I Carós | A61B 5/14551 |
| 2021/0343087 A1* | 11/2021 | Gomez Gonzalez | G06F 3/011 |
| 2021/0358150 A1 | 11/2021 | Lin et al. | |
| 2022/0036648 A1 | 2/2022 | Wang | |
| 2022/0092852 A1 | 3/2022 | Mohan et al. | |
| 2022/0101607 A1 | 3/2022 | Brodsky et al. | |
| 2022/0130120 A1 | 4/2022 | Zhao et al. | |
| 2022/0292789 A1 | 9/2022 | Caswell et al. | |

FOREIGN PATENT DOCUMENTS

| | | |
|---|---|---|
| WO | WO 2012/126500 A1 | 9/2012 |
| WO | WO 2015/192117 A1 | 12/2015 |
| WO | WO 2016/077798 A1 | 5/2016 |
| WO | WO 2017/136833 A1 | 8/2017 |
| WO | WO 2019/046774 A1 | 3/2019 |

OTHER PUBLICATIONS

International Preliminary Report on Patentability for International Application No. PCT/US2019/046240, dated Feb. 25, 2021.
Invitation to Pay Additional Fees for International Application No. PCT/US2019/046240 dated Oct. 18, 2019.
Invitation to Pay Additional Fees for International Application No. PCT/US2019/054819 dated Dec. 4, 2019.
International Search Report and Written Opinion for International Application No. PCT/US2019/054819 dated Feb. 11, 2020.
International Preliminary Report on Patentability for International Application No. PCT/US2019/054819, dated Apr. 15, 2021.
International Search Report and Written Opinion for International Application No. PCT/US2019/054836 dated Dec. 31, 2019.
International Preliminary Report on Patentability for International Application No. PCT/US2019/054836, dated Apr. 15, 2021.
Invitation to Pay Additional Fees for International Application No. PCT/US2020/055773 dated Dec. 30, 2020.
International Search Report and Written Opinion for International Application No. PCT/US2020/055773, dated Mar. 11, 2021.
Invitation to Pay Additional Fees for International Application No. PCT/US2020/055780 dated Dec. 17, 2020.
International Search Report and Written Opinion for International Application No. PCT/US2020/055780, dated Feb. 24, 2021.
Invitation to Pay Additional Fees for International Application No. PCT/US2020/055784 dated Dec. 17, 2020.
International Search Report and Written Opinion for International Application No. PCT/US2020/055784, dated Mar. 10, 2021.
International Search Report and Written Opinion for International Application No. PCT/US2020/057887, dated Jan. 27, 2021.
International Search Report and Written Opinion for International Application No. PCT/US2020/059975, dated Feb. 4, 2021.
International Search Report and Written Opinion for International Application No. PCT/US2020/0637194, dated Mar. 2, 2021.
Invitation to Pay Additional Fees for International Application No. PCT/US2021/017607, dated Mar. 30, 2021.
International Search Report and Written Opinion for International Application No. PCT/US2021/017607, dated Jun. 14, 2021.
Invitation to Pay Additional Fees for International Application No. PCT/US2021/017616, dated Mar. 30, 2021.
International Search Report and Written Opinion for International Application No. PCT/US2021/017616, dated Jun. 24, 2021.
International Search Report and Written Opinion for International Application No. PCT/US2021/017624, dated Apr. 30, 2021.
International Search Report and Written Opinion for International Application No. PCT/US2021/017630, dated Apr. 28, 2021.
International Search Report and Written Opinion for International Application No. PCT/US2021/019575, dated May 6, 2021.
International Search Report and Written Opinion for International Application No. PCT/US2021/029585, dated Jul. 13, 2021.
[No Author Listed], Axis-angle representation—Wikipedia. 6 pages. Last edited on Feb. 2, 2022. URL:https://en.wikipedia.org/wiki/Axis%E2%80%93angle_representation [retrieved on Feb. 28, 2022].
[No Author Listed], Code release for "learning to find good correspondences" CVPR 2018. GitHub. Sep. 30, 2020. 4 pages. URL:https://github.com/vgc-uvic/learned-correspondence-release [retrieved on Feb. 22, 2022].
[No Author Listed], Combain Location API—API Reference. 14 pages. URL:https://combain.com/api/#combain-location-api [retrieved on Feb. 24, 2021].
[No Author Listed], Content Persistence Fundamentals. Magic Leap, Inc. Oct. 23, 2019. URL:https://developer.magicleap.com/en-us/learn/guides/content-persistence-fundamentals [retrieved on Dec. 31, 2020]. 5 pages.
[No Author Listed], Course (navigation)—Wikipedia. 3 pages. Last edited on Nov. 4, 2021. URL:https://en.wikipedia.org/wiki/Course_(navigation) [retrieved on Feb. 24, 2022].
[No Author Listed], Geohash a lng/at coordinate using hibert space filling curves. GitHub. Apr. 1, 2020. 9 pages. URL:https://github.com/tammoippen/geohash-hilbert [retrieved on Feb. 24, 2022].
[No Author Listed], GitHub—gmplot/gmplot: Plot data on Google Maps, the easy way. Oct. 14, 2021. 2 pages. URL:https://github.com/vgm64/gmplot [retrieved on Feb. 28, 2022].
[No Author Listed], Haversine formula—Wikipedia. 5 pages. Last edited on Jan. 11, 2022. URL:https://en.wikipedia.org/wiki/Haversine_formula [retrieved on Feb. 24, 2022].
[No Author Listed], Kismet (software). Wikipedia. Last edited on Jan. 27, 2021. 3 pages. URL:https://en.wikipedia.org/wiki/Kismet_(software) [retrieved on Feb. 24, 2021].

(56) References Cited

OTHER PUBLICATIONS

[No Author Listed], Points of the Compass—Wikipedia. Last edited on Dec. 4, 2021. 16 pages. URL:https://en.wikipedia.org/wiki/Points_of_the_compass [retrieved on Feb. 24, 2022].
[No Author Listed], Progressive Web Apps. Google Developers. 2022, 5 pages. URL:https://web.dev/progressive-web-apps [retrieved on Feb. 24, 2022].
[No Author Listed], S2 Geometry. 3 pages. URL:http://s2geometry.io/ [retrieved on Feb. 24, 2022].
[No Author Listed], Skid (aerodynamics)—Wikipedia. 2 pages. Last edited on Jun. 17, 2020. URL:https://en.wikipedia.org/wiki/Skid_(aerodynamic) [retrieved on Feb. 24, 2022].
[No Author Listed], sklearn.neighbors.BallTree. 2022. 4 pages. URL:https://scikit-learn.org/stable/modules/generated/sklearn.neighbors.BallTree.html [retrieved on Feb. 24, 2022].
[No Author Listed], Slip (aerodynamics)—Wikipedia. 5 pages. Last edited on Aug. 22, 2021. URL:https://en.wikipedia.org/wiki/Slip_(aerodynamic) [retrieved on Feb. 24, 2022].
[No Author Listed], The difference between virtual reality, Augmented Reality and Mixed Reality. Forbes. Feb. 2, 2018. 5 pages. URL:https://www.forbes.com/sites/quora/2018/02/02/the-difference-between-virtual-reality-augmented-reality-and-mixed-reality/#634116762d07 [retrieved on Dec. 5, 2019].
[No Author Listed], Wi-Fi Location-Based Services 4.1 Design Guide. Jan. 30, 2014. 11 pages. URL:https://www.cisco.com/c/en/us/td/docs/solutions/Enterprise/Mobility/WiFiLBS-DG/wifich2.html.
[No Author Listed], WiGLE: Wireless Network Mapping. 2021. 2 pages. URL:https://wigle.net [retrieved on Feb. 24, 2021].
[No Author Listed], Wind Triangle—Wikipedia. 2 pages. Last edited on Nov. 16, 2021. URL:https://en.wikipedia.org/wiki/Wind_triangle [retrieved on Feb. 24, 2022].
Balntas et al., HPatches: A benchmark and evaluation of handcrafted and learned local descriptors. Proceedings of the IEEE Conference on Computer Vision and Pattern Recognition 2017. pp. 5173-5182.
Brachmann et al., Neural-Guided RANSAC: Learning Where to Sample Model Hypotheses. arXiv: 1905.04132v2. Jul. 31, 2019. 17 pages.
Brief, Mobile Image Blur Detection with Machine Learning. May 17, 2019. 14 pages. URL:https://medium.com/snapaddy-tech-blog/mobile-image-blur-detection-with-machine-learning-c0b703eab7de.
Brodsky et al., Rendering Location Specific Virtual Content in Any Location, U.S. Appl. No. 17/547,773, filed Dec. 10, 2021.
Cadena et al., Past, Present, and Future of Simultaneous Localization and Mapping: Toward the Robust-Perception Age. IEEE Transactions on Robotics. Dec. 2016;32(6):1309-1332.
Chatterjee, How to Leverage Geolocation Capabilities to Deliver a Top Notch Mobile App. Jul. 19, 2017. 5 pages. URL:https://www.fingent.com/blog/how-to-leverage-geo-location-capabilities-to-deliver-a-top-notch-mobile-app.
Chen, Quicktime VR: An image-based approach to virtual environment navigation. Proceedings of the 22nd annual conference on Computer graphics and interactive techniques. Sep. 1995, pp. 29-38.
Dang et al., Eigendecomposition-free training of deep networks with zero eigenvalue-based losses. arXiv:1803.08071. Mar. 26, 2018. 25 pages.
Ferris et al., WiFi-SLAM Using Gaussian Process Latent Variable Models. IJCAI 2007. 6 pages.
Gidaris et al., Unsupervised representation learning by predicting image rotations. arXiv:1803.07728. Mar. 21, 2018. 16 pages.
Henniges, Current approaches of Wifi Positioning. Service-Centric Networking Seminar. WS2011/2012. 8 pages.
Henry et al., RGB-D mapping: Using Kinect-style depth cameras for dense 30 modeling of indoor environments. The International Journal of Robotics Research. Feb. 10, 2012. 26 pages. URL:http://citeseerx.ist.psu.edu/viewdoc/download?doi=10.1.1.480.160&rep=rep1&type=pdf [retrieved on Jan. 26, 2020].
Huang et al., Efficient, Generalized Indoor WiFi GraphSLAM. IEEE International Conference on Robotics and Automation. 2011. 3 pages. doi: 10.1109/ICRA.2011.5979643.
Ito et al., W-RGB-D: Floor-Plan-Based Indoor Global Localization Using a Depth Camera and WiFi. 2014 IEEE international conference on robotics and automation (ICRA). May 2014, pp. 417-422.
Kurz et al., Representative feature descriptor sets for robust handheld camera localization. 2012 IEEE International Symposium on Mixed and Augmented Reality (ISMAR). Nov. 5, 2012. pp. 65-70.
Larsson et al., Fine-grained segmentation networks: Self-supervised segmentation for improved long-term visual localization. arXiv:1908.06387v1. Aug. 18, 2019. 13 pages.
Lynen et al., Get Out of My Lab: Large-scale, Real-Time Visual-Inertial Localization. Robotics: Science and Systems. Jul. 2015. 10 pages.
Lynen et al., Large-scale, real-time visual-inertial localization revisited. arXiv preprint arXiv:1907.00338v1. Jun. 30, 2019. 21 pages.
Mirowski et al., Depth camera SLAM on a low-cost WiFi mapping robot. Apr. 2012. 7 pages. doi:10.1109/TePRA.2012.6215673.
Mohan et al., Cross Reality System, U.S. Appl. No. 17/542,306, filed Dec. 3, 2021.
Mohanna et al., Optimization of MUSIC algorithm for angle of arrival estimation in wireless communications. NRIAG Journal of Astronomy and Geophysics. 2013;2:116-124.
Mueller, Fast In-memory spatial radius queries with Python. Aug. 9, 2017. 8 pages. URL:https://medium.com/@alexander.mueller/experiments-with-in-memory-spatial-radius-queries-in-python-e40c9e66cf63 [retrieved on Feb. 24, 2022].
Newman et al., Pure range-only sub-sea SLAM. 2003 IEEE International Conference on Robotics and Automation (Cat. No. 03CH37422). Sep. 2003. 7 pages.
Panzarino, What exactly WiFiSLAM is, and why Apple acquired it. Mar. 25, 2013. URL:https://thenextweb.com/apple/2013/03/26/what-exactly-wifislam-is-and-why-apple-acquired-it [retrieved Feb. 24, 2021].
Pech-Pacheco et al., Diatom autofocusing in brightfield microscopy: a comparative study. Proceedings 15th International Conference on Pattern Recognition. ICPR-2000. Sep. 2000;3:314-317.
Pertuz et al., Analysis of focus measure operators for shape-from-focus. Pattern Recognition. May 2013;46:1415-32.
Qi et al., Pointnet: Deep learning on point sets for 3d classification and segmentation. arXiv:1612.00593. Apr. 10, 2017. 19 pages.
Rabinovich et al., Lumin OS & Lumin SDK: past, present and future. Magic Leap, Inc. Apr. 2, 2019. URL:https://www.magicleap.com/en-us/news/product-updates/lumin-os-and-lumin-sdk-update [retrieved on Dec. 31, 2020]. 9 pages.
Snavely et al., Skeletal graphs for efficient structure from motion. IEEE Conference on Computer Vision and Pattern Recognition. Jun. 23, 2008. 11 pages. URL:http://www.cs.cornell.edu/~snavely/projects/skeletalset.
Sturari et al., Robust and affordable retail customer profiling by vision and radio beacon sensor fusion. Pattern Recognition Letters. Oct. 1, 2016;81:30-40.
Sweeney et al., Efficient computation of absolute pose for gravity-aware augmented reality. 2015 IEEE International Symposium on Mixed and Augmented Reality (ISMAR). Sep. 29, 2015, pp. 19-24.
Taira et al., InLoc: Indoor visual localization with dense matching and view synthesis. Proceedings of the IEEE Conference on Computer Vision and Pattern Recognition. 2018. pp. 7199-7209.
Tang, Applying Deep Learning to Detect Blurry Images. Dec. 12, 2017. 6 pages. URL:https://tangming2008.github.io/neural network/tensor flow/classification/Applying-Deep-Learning-to-Detect-Blurry-Images/.
Tong et al., Blur detection for digital images using wavelet transform. 2004 IEEE international conference on multimedia and expo (ICME). Jun. 2004;1:17-20.
Vogt, Real-Time Augmented Reality for Image-Guided Interventions. Doctoral dissertation, Friedrich-Alexander-Universität Erlangen-Nürnberg (FAU). Feb. 18, 2009. 48 pages. URL:https://opus4.kobv.de/opus4-fau/files/1235/sebastianVogtDissertation.pdf.
Willaredt, WiFi and Cell-ID based positioning—Protocols, Standards and Solutions. SNET Project WT. Jan. 26, 2011. 10 pages.

(56) References Cited

OTHER PUBLICATIONS

Xiong et al., A Diversified Generative Latent Variable Model for WiFi-SLAM. Proceedings of the Thirty-First AAAI Conference on Artificial Intelligence (AAAI-17). Feb. 2017;31:3841-3847.
Yi et al., Learning to find good correspondences. arXiv:1711.05971. May 21, 2018. 13 pages.
Zhao et al., Cross Reality System Supporting Multiple Device Types, U.S. Appl. No. 17/571,172, filed Jan. 1, 2022.
Supplemental Partial European Search Report dated Aug. 23, 2022 in connection with European Application No. 19868457.3.
International Preliminary Report on Patentability dated Aug. 25, 2022 in connection with International Application No. PCT/US2021/017607.
International Preliminary Report on Patentability dated Aug. 25, 2022 in connection with International Application No. PCT/US2021/017616.
International Preliminary Report on Patentability dated Aug. 25, 2022 in connection with International Application No. PCT/US2021/017624.
International Preliminary Report on Patentability dated Aug. 25, 2022 in connection with International Application No. PCT/US2021/017630.
International Preliminary Report on Patentability dated Sep. 9, 2022 in connection with International Application No. PCT/US2021/019575.
Bleser et al., Cognitive learning, monitoring and assistance of industrial workflows using egocentric sensor networks. PloS one. Jun. 30, 2015;10(6):e0127769. 41 pages.
Stobing, How to Add Website Links to the Windows 10 Start Menu. Howtogeek.com. 2016. 9 pages. URL:https://www.howtogeek.com/237951/how-to-add-website-links-to-the-windows-10-start-menu [Last accessed Jul. 11, 2022].
Velasquez et al., Cross Reality System With Accurate Shared Maps, U.S. Appl. No. 17/856,903, filed Jul. 1, 2022.

\* cited by examiner

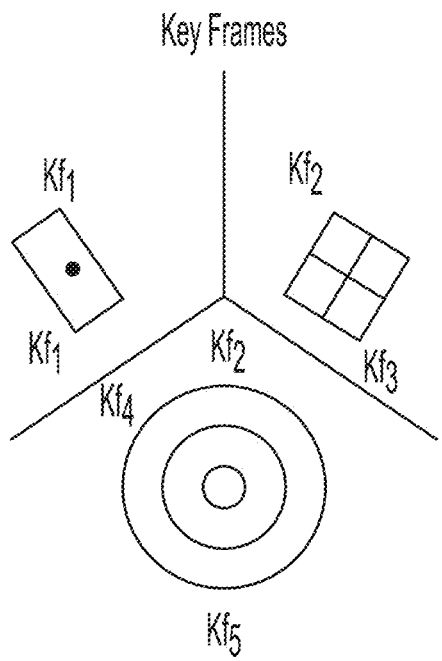
FIG. 17
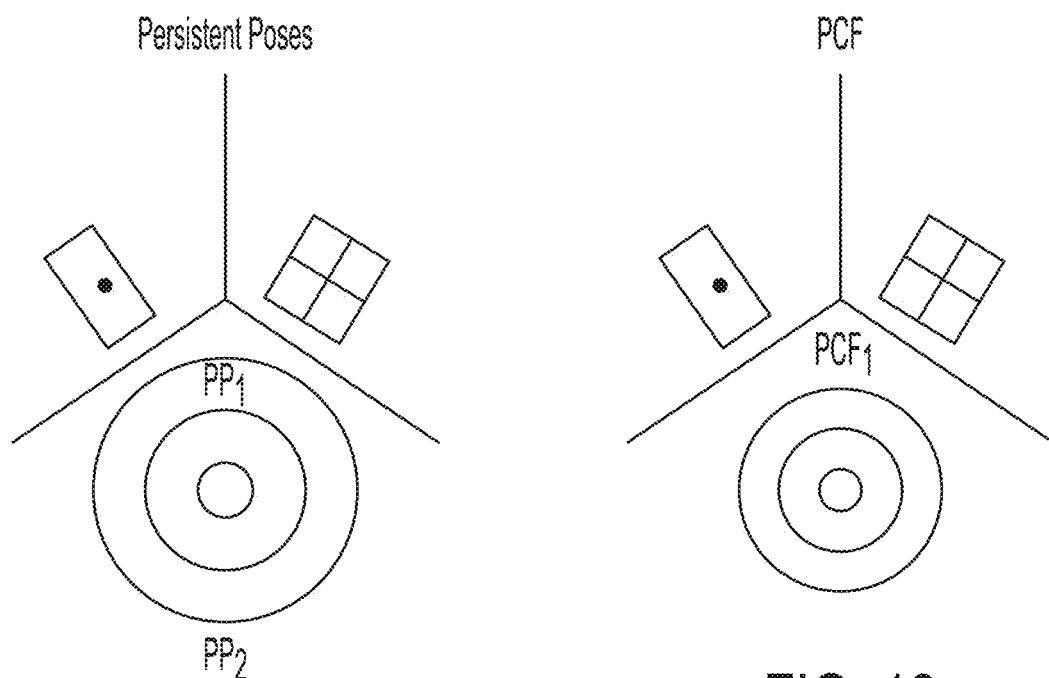
FIG. 18
FIG. 19

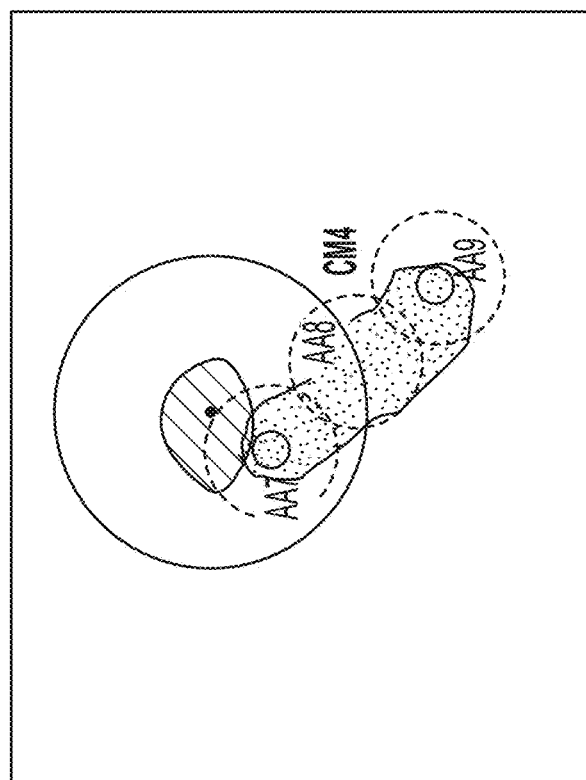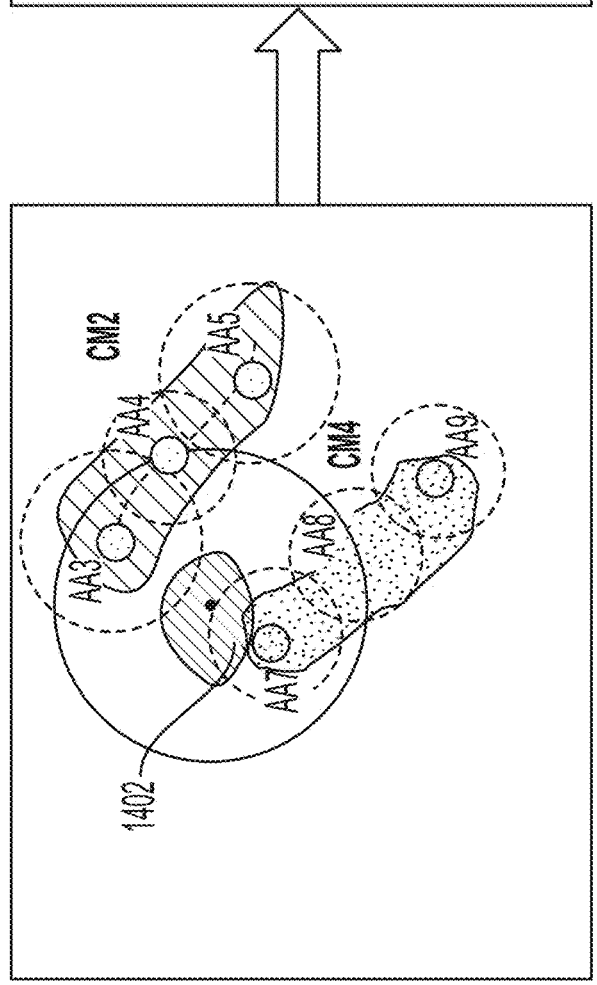
FIG. 34

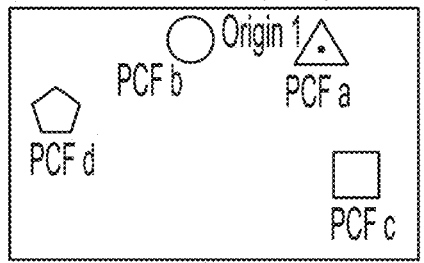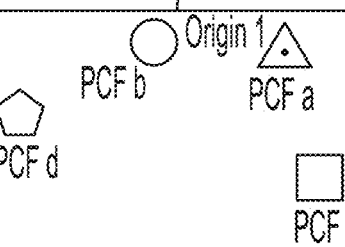
FIG. 41

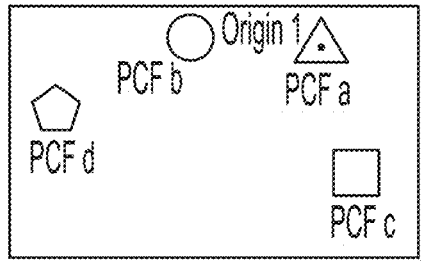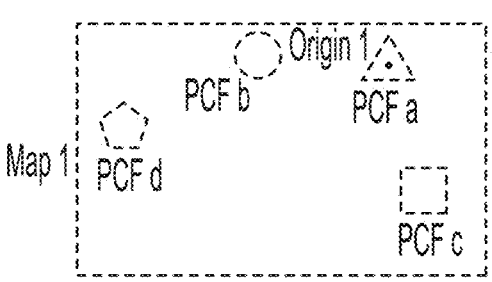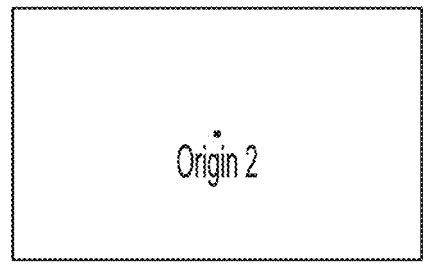
FIG. 43A

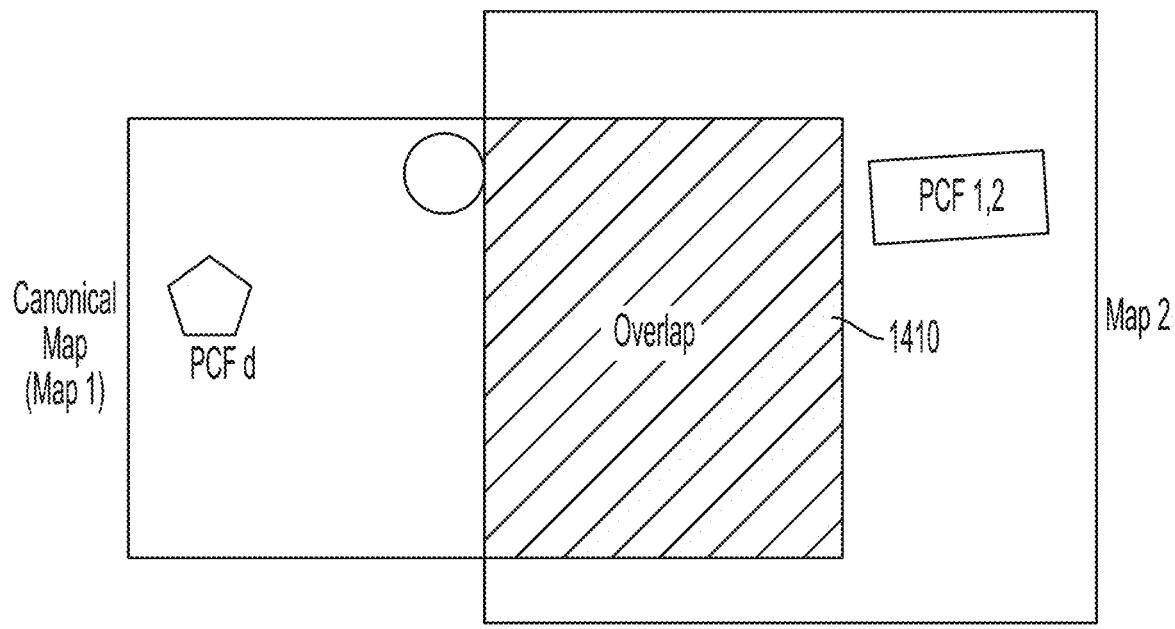
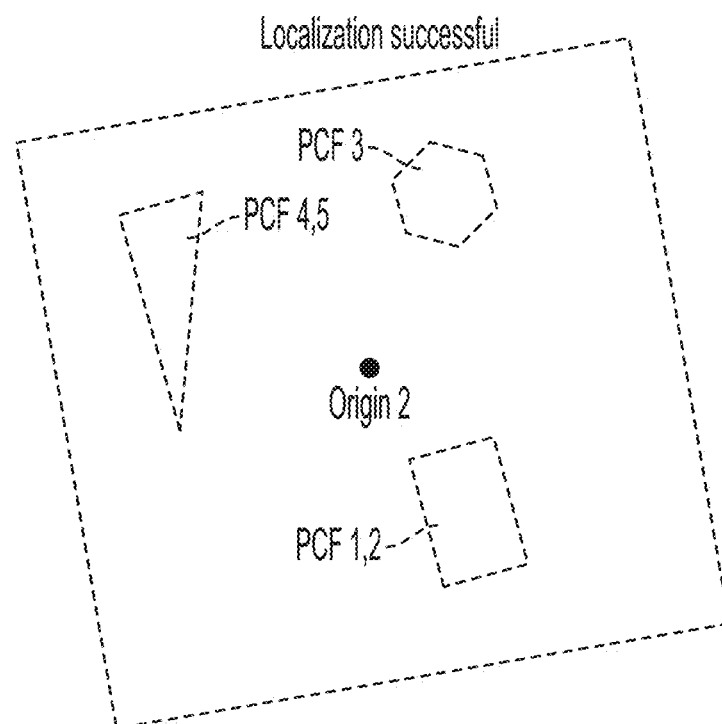
FIG. 46B

CROSS REALITY SYSTEM WITH PRIORITIZATION OF GEOLOCATION INFORMATION FOR LOCALIZATION

CROSS-REFERENCE TO RELATED APPLICATIONS

This application claims the benefit under 35 U.S.C. § 119(e) of U.S. Provisional Patent Application Ser. No. 62/976,154, filed on Feb. 13, 2020, entitled "CROSS REALITY SYSTEM WITH PRIORITIZATION OF GEOLOCATION INFORMATION FOR LOCALIZATION," which is hereby incorporated herein by reference in its entirety.

TECHNICAL FIELD

This application relates generally to a cross reality system.

BACKGROUND

Computers may control human user interfaces to create a cross reality (XR) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users' sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

To realistically render virtual content, an XR system may build a representation of the physical world around a user of the system. This representation, for example, may be constructed by processing images acquired with sensors on a wearable device that forms a part of the XR system. In such a system, a user might perform an initialization routine by looking around a room or other physical environment in which the user intends to use the XR system until the system acquires sufficient information to construct a representation of that environment. As the system operates and the user moves around the environment or to other environments, the sensors on the wearable devices might acquire additional information to expand or update the representation of the physical world.

BRIEF SUMMARY

Aspects of the present application relate to methods and apparatus for providing cross reality (XR) scenes. Techniques as described herein may be used together, separately, or in any suitable combination.

According to one aspect, a portable electronic device configured to operate within a cross reality system is provided. The portable electronic device comprises one or more sensors configured to capture information about a three-dimensional (3D) environment, the captured information comprising a plurality of images; at least one processor configured to execute computer executable instructions, wherein the computer executable instructions comprise instructions for: extracting a plurality of features from the plurality of images of the 3D environment associated with the portable electronic device; associating location metadata with the plurality of features; communicating over a network, to a localization service, information about the plurality of features, position information for the plurality of features expressed in a local coordinate frame of the portable electronic device, and the associated location metadata; and receiving, from the localization service, at least one transform relating the local coordinate frame to a second coordinate frame.

According to one embodiment, the location metadata includes prior localization information.

According to one embodiment, the portable electronic device comprises an operating system with a geo-location API and the computer executable instructions further comprise instructions for obtaining the location metadata by calling the geo-location application programming interface (API).

According to one embodiment, the computer executable instructions further comprise instructions for receiving a description of virtual content in a location based on the second coordinate frame and rendering the virtual content based on the at least one transform.

According to one embodiment, the portable electronic device comprises a buffer configured to store a plurality of data structures; and associating the location metadata with the plurality of features comprises storing in a data structure of the plurality of data structures in the buffer the location metadata, the information about the plurality of features, and the position information for the plurality of features.

According to one embodiment, communicating over the network to the localization service comprises transmitting the plurality of data structures from the buffer as a localization request.

According to one embodiment, the computer executable instructions further comprise instructions for: constructing a local device map from the plurality of images, defining persistent locations in the local device map, and associating geo-location information with the persistent locations; and associating the location metadata with the plurality of features comprises accessing, from the local device map, geo-location information associated with a persistent location of the persistent locations proximate to the portable electronic device coincident in time with capture of the plurality of images from which the plurality of features were extracted.

According to one embodiment, the computer executable instructions further comprise instructions for obtaining the location metadata by filtering, clustering, and/or normalizing location information.

According to one embodiment, associating location metadata with the plurality of features includes an act of generating or receiving geolocation information on a current location of the portable electronic device in the 3D environment.

According to one aspect, a cross reality system that supports specification of a position of virtual content relative to stored maps is provided. The system comprises one or more computing devices configured for network communication with one or more portable electronic devices, comprising: a communication component configured to receive, from a portable electronic device, information about a set of features in a three-dimensional (3D) environment of the portable electronic device, position information for the set of features expressed in a first coordinate frame, and location metadata associated with a position of the portable electronic device in the 3D environment; a localization component, connected to the communication component, the localization component configured to: select, based on the received location metadata and location metadata associated with the stored maps, a set of stored maps; identify a stored map from the set of stored maps based on matching the received set of features to features of the identified stored map, wherein the identified stored map comprises a second coordinate frame; generate a transform between the first coordinate frame and the second coordinate frame based on a computed alignment between the received set of features and the matching set of features in the identified stored map; and send the transform to the portable electronic device.

According to one embodiment, the localization component is configured to select a type of location metadata for the selecting the set of stored maps based on a priority associated with types of location metadata.

According to one embodiment, the priority associated with the types of location metadata prioritizes prior localization information over a WiFi fingerprint.

According to one embodiment, the priority associated with the types of location metadata prioritizes the WiFi fingerprint over geo-location information obtained from an operating system of the portable electronic device.

According to one embodiment, the one or more computing devices further comprise a geo-location database identifying the stored maps by geo-location.

According to one embodiment, the localization component is further configured to select the set of stored maps by querying the geo-location database based on the received location metadata.

According to one embodiment, the localization component is further configured to update the geo-location database based on the received location metadata and the identifying the stored map.

According to one embodiment, the localization component is further configured to send geo-location information to the portable electronic device based on location metadata associated with the identified stored map.

According to one embodiment, the localization component is further configured to update the location metadata associated with the stored maps based on the received location metadata and the identifying the stored map.

According to one embodiment, the localization component is further configured to: identify a localization failure; and update the location metadata associated with the stored maps responsive to a localization failure based on prior successful localization information for the portable electronic device.

According to one embodiment, the stored maps comprise a plurality of segments; and selecting a set of stored maps comprises selecting tiles of the stored maps.

According to one aspect, a portable electronic device configured to operate within a three-dimensional (3D) environment and display virtual content of a cross reality system is provided. The portable device comprises at least one processor; an operating system executing on the at least one processor, the operating system providing a geo-location application programming interface (API); computer executable instructions configured to, when executed by the at least one processor: form a map of the 3D environment based on a local coordinate frame as the portable electronic device moves in the 3D environment, the map comprising persistent locations; an augmented reality application comprising computer executable instructions configured to, when executed by the at least one processor: query the geo-location API; and store geo-location information received through the geo-location API as location metadata associated with the persistent locations.

According to one embodiment, storing the location metadata associated with the persistent locations comprises updating location metadata stored in association with a persistent location of the plurality of persistent locations selected.

According to one embodiment, updating location metadata stored in association with the persistent location comprises combining the received geo-location information with previously stored location metadata associated with the persistent location.

According to one aspect a cloud service for a cross reality system is provided. The service comprises: computer storage media storing: a database of maps; a plurality of types of location metadata associated with maps of the database of maps, the types of location metadata comprising wireless finger prints and geo-location information; one or more computing devices configured for network communication with a plurality of portable electronic devices, the one or more computing devices comprising non-transitory computer-readable media comprising computer executable instructions that, when executed perform a method comprising: receiving, from a portable electronic device of the plurality of portable electronic devices, a communication comprising position information for the portable electronic device and location metadata; selecting, for the communication, a type of location metadata of the plurality of types of location metadata; selecting a set of maps from the database of maps based on the received location metadata and the selected type of location metadata associated with the maps of the database of maps; and comparing the received position information to maps of the set of maps.

According to one embodiment, the received position information comprises a device tracking map.

According to one embodiment, comparing the received position information to maps of the set of maps comprises identifying a matching map from the set of maps; and the method further comprises merging the device tracking map with the matching map.

According to one embodiment, merging the tracking map with the matching map comprises: associating location metadata from the device tracking map with a merged map in the database of maps; and storing geo-location information derived from the device tracking map as an index of a record of a geo-location database, wherein the record identifies at least a portion of the merged map.

According to one embodiment, selecting the set of maps comprises querying the geo-location database based on the received location metadata.

According to one embodiment, the received position information comprises information about a set of features in a three-dimensional (3D) environment of the portable electronic device.

According to one embodiment, comparing the received position information to maps of the set of maps comprises attempting to localize the portable electronic device to a map of the set of maps.

According to one embodiment, the method further comprises, based on successfully localizing the portable electronic device to a location in the map of the set of maps, transmitting to the portable electronic device geo-location information derived from location metadata stored in association with the location in the map of the set of maps.

According to one embodiment, the method further comprises, based on successfully localizing the portable electronic device to a location in the map of the set of maps, storing geo-location information derived from the received location metadata as location metadata associated with the location in the map of the set of maps.

According to one embodiment, storing geo-location information as location metadata associated with the location in the map of the set of maps comprises: hashing the geo-location information; and updating a database indexed by geo-hash value with the hashed geo-location information.

According to one embodiment, the method further comprises, based on unsuccessfully localizing the portable electronic device, storing geo-location information derived from the received location metadata as location metadata associated with a location in the map of the set of maps against which the portable electronic device previously successfully localized. The foregoing summary is provided by way of illustration and is not intended to be limiting.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 17 is a schematic diagram illustrating a room and key frames that are established for various areas in the room, according to some embodiments;

FIG. 18 is a schematic diagram illustrating the establishment of persistent poses based on the key frames, according to some embodiments;

FIG. 19 is a schematic diagram illustrating the establishment of a persistent coordinate frame (PCF) based on the persistent poses, according to some embodiments;

FIG. 34 is a schematic diagram illustrating an example of use of localization of FIG. 29, according to some embodiments;

FIG. 41 is a block diagram illustrating uploading Map 1 from the first XR device to the server of FIG. 9, according to some embodiments;

FIG. 43A is a block diagram illustrating a new session for the second XR device of FIG. 42, according to some embodiments;

FIGS. 46A-46B are a schematic diagram illustrating a successful localization of Map 2 of FIG. 45 to the canonical map, according to some embodiments;

DETAILED DESCRIPTION

Figure 1:
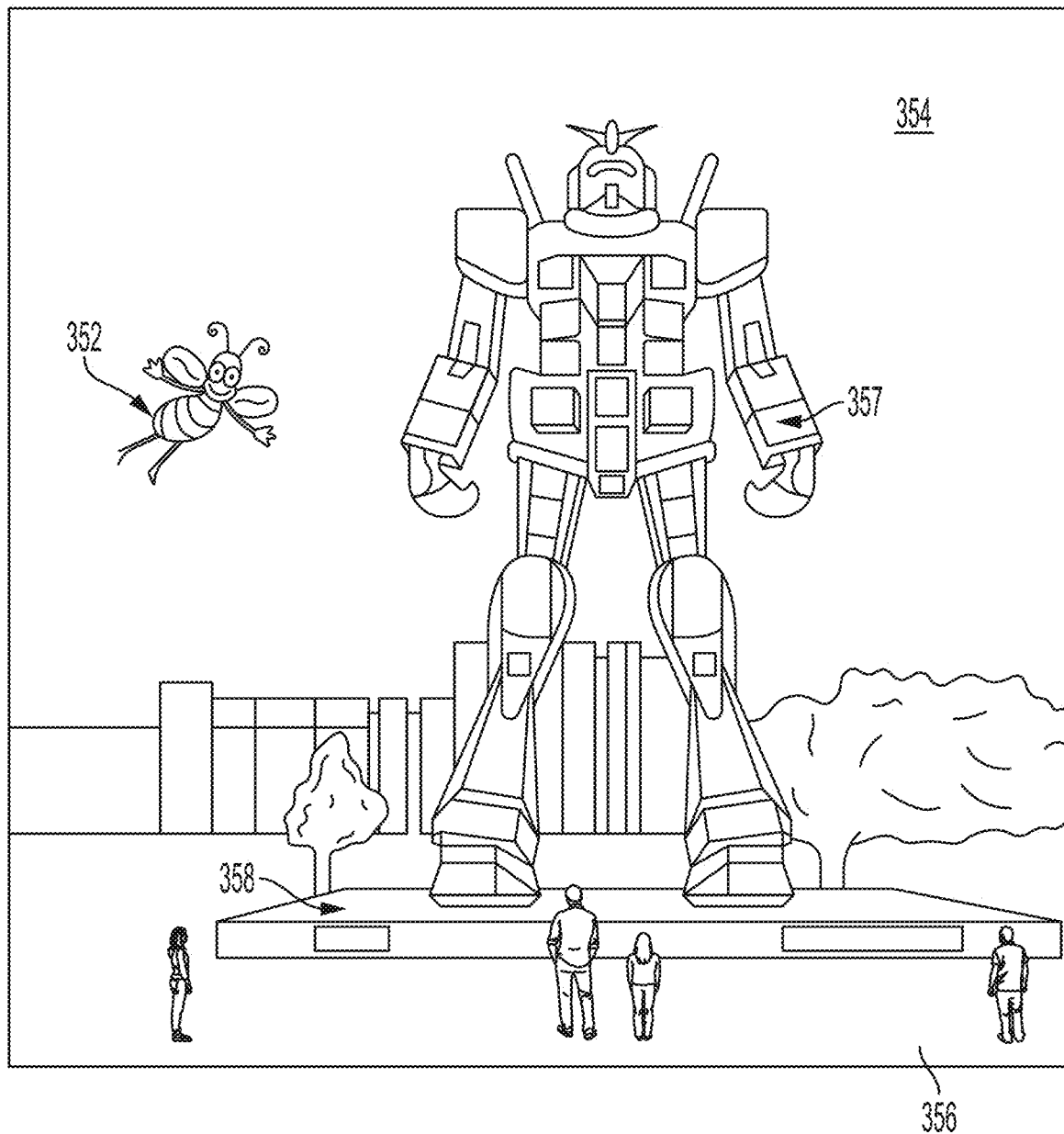
FIG. 1 is a sketch illustrating an example of a simplified augmented reality (AR) scene, according to some embodiments.

Described herein are methods and apparatus for providing cross reality (XR) scenes. To provide realistic XR experiences to multiple users, an XR system must know the users' physical surroundings in order to correctly correlate locations of virtual objects in relation to real objects. An XR system may build an environment map of a scene, which may be created from image and/or depth information collected with sensors that are part of XR devices worn by users of the XR system.

In an XR system, each XR device may develop a local map of its physical environment by integrating information from one or more images collected during a scan at a point in time. In some embodiments, the coordinate system of that map is tied to the orientation of the device when the scan was initiated. That orientation may change from session to session as a user interacts with the XR system, whether different sessions are associated with different users, each with their own wearable device with sensors that scan the environment, or the same user who uses the same device at different times.

However, applications executing on the XR system may specify the location of virtual content based on persistent spatial information, such as may be obtained from a canonical map that may be accessed in a shared manner by multiple users interacting with the XR system. The persistent spatial information may be represented by a persistent map. The persistent map may be stored in a remote storage medium (e.g., a cloud). For example, the wearable device worn by a user, after being turned on, may retrieve from persistent storage, such as cloud storage, an appropriate stored map that was previously created and stored. Retrieving a stored map may enable use of the wearable device without a scan of the physical world with the sensors on the wearable device. Alternatively or additionally, the system/device, upon entering a new region of the physical world, may similarly retrieve an appropriate stored map.

Sharing data about the physical world among multiple devices may enable shared user experiences of virtual content. Two XR devices that have access to the same stored map, for example, may both localize with respect to the stored map. Once localized, a user device may render virtual content that has a location specified by reference to the stored map by translating that location to a frame of reference maintained by the user device. The user device may use this local frame of reference to control the display of the user device to render the virtual content in the specified location.

To support these and other functions, the XR system may include components that, based on data about the physical world collected with sensors on user devices, develop, maintain, and use persistent spatial information, including one or more stored maps. These components may be distributed across the XR system, with some operating, for example, on a head mounted portion of a user device. Other components may operate on a computer, associated with the user coupled to the head mounted portion over a local or personal area network. Yet others may operate at a remote location, such as at one or more servers accessible over a wide area network.

These components, for example, may include a map merge component that can identify from information about the physical world collected by one or more user devices information that is of sufficient quality to be stored as or in a persistent map. Yet other components may apply transformations that transform information captured or described in relation to one reference frame into another reference frame. For example, sensors may be attached to a head mounted display such that the data read from that sensor indicates locations of objects in the physical world with respect to the head pose of the wearer. One or more transformations may be applied to relate that location information to the coordinate frame associated with a persistent environment map. Similarly, data indicating where a virtual object is to be rendered when expressed in a coordinate frame of a persistent environment map may be put through one or more transformations to be in a frame of reference of the display on the user's head. The XR system may include components that determine these transformations, including a localization service that determines a transformation between a local map of a device and a stored map accessible to multiple XR devices.

The stored map may be represented in a canonical form that may be related to a local frame of reference on each XR device. The relationship between the canonical map and a local map for each device may be determined through a localization process. The relationship may be used to enable the device to use its local map to render content in locations specified relative to the canonical map. Alternatively or additionally, a relationship between a local map and a canonical map may enable merging of the local map into a set of canonical maps—either by updating or extending an existing canonical map or by determining that the local map depicts a region for which no canonical map exists and adding the local map as a new canonical map to a set of stored canonical maps.

The localization process may be performed on each XR device based on a set of canonical maps selected and sent to the device. Alternatively or additionally, localization may be performed by a localization service, which may be implemented on remote processors, such as might be deployed in the cloud.

Regardless of where the localization is performed, the inventors have recognized and appreciated that the efficient selection of one or a small number of canonical maps, or more specifically one or more segments of the canonical map with which to attempt localization, may reduce computational requirements and latency for the localization process. As a result, localization may be completed more quickly, more frequently and/or with lower power consumption such that virtual content may be displayed with less latency or more accuracy, creating a more immersive user experience.

In some embodiments, localization may be made more efficient by storing location metadata in connection with segments of the set of canonical maps with which localization may be attempted. A portable device may obtain or maintain or location metadata in connection with its local map. That location metadata may be used to select a set of candidate segments of the set of canonical maps for use in attempting the localization process or to quickly determine that no suitable canonical map segment exists.

The inventors have further recognized and appreciated, however, that different types of information from which location metadata can be derived may be available on different types of portable devices interacting with an XR system. Further, these different types of information may lead to different effectiveness in selecting a set of candidate map segments.

Some portable devices, for example, may maintain wireless fingerprints associated with persistent locations in their local maps, which may serve as location metadata. Maintaining the wireless fingerprints may entail repetitively updating a wireless fingerprint associated with the tracking map as the device moves throughout a region of the physical world. Updating in this way may enable filtering and averaging wireless characteristics within regions of the physical world in the vicinity of locations represented by persistent poses. Such processing may result in stable and accurate wireless fingerprints, which in turn may lead to more accurate matching with other, similarly created wireless fingerprints. Moreover, such a process increases the availability of wireless fingerprints, reducing latency associated with localization processing. With more efficient localization, there is a greater ability within a system for sharing data about the physical world among multiple devices.

Other portable devices may have access to GPS data. Yet, other devices may alternatively or additionally have an operating system that provides an API that, when accessed, provides geolocation information. Yet other devices may alternatively or additionally, upon localization with a canonical map for which geolocation information is available, store location information derived from the canonical map to which it was localized. In a subsequent localization attempt, this prior localization information may be used to select candidate map segments. In scenarios in which some or all of the processing is performed on a server, some or all of this location information may be stored by the server such that it need not be sent with from the portable device for use in selecting candidate maps.

A service, using location metadata in conjunction with local map information from a portable XR device—whether for localizing the device with respect to a canonical map or for merging the local map with the set of canonical maps—may prioritize one type of location metadata over others. The prioritization may be based on the effectiveness of the selection of candidate map segments using each type of location metadata. Location metadata derived from a prior localization may be given high priority, for example. As another example, a wireless fingerprint may be given a lower priority than a prior localization, but a higher priority than geolocation information obtained through an operating system API. In other embodiments, where direct access to a GPS data is available, GPS data may be given higher priority.

Such a service may contain components to facilitate selection of map segments based on location metadata. Those components may include a component to translate between formats of the metadata, such as translating a wireless signature into latitude and longitude to facilitate comparison to geolocation information obtained from an operating system API. The location metadata from multiples sources, for example, may be converted to a common format such as a geohash. Alternatively or additionally, such a service may include components that efficiently select map segments based on metadata associated with a portable device. The service, for example, may maintain an index linking geohashes to map segments, such that map segments proximate a location identified by location metadata for a portable device can be quickly selected. Techniques as described herein may be used together or separately with many types of devices and for many types of scenes, including wearable or portable devices with limited computational resources that provide an augmented or mixed reality scene. In some embodiments, the techniques may be implemented by one or more services that form a portion of an XR system.

AR System Overview

Figure 2:
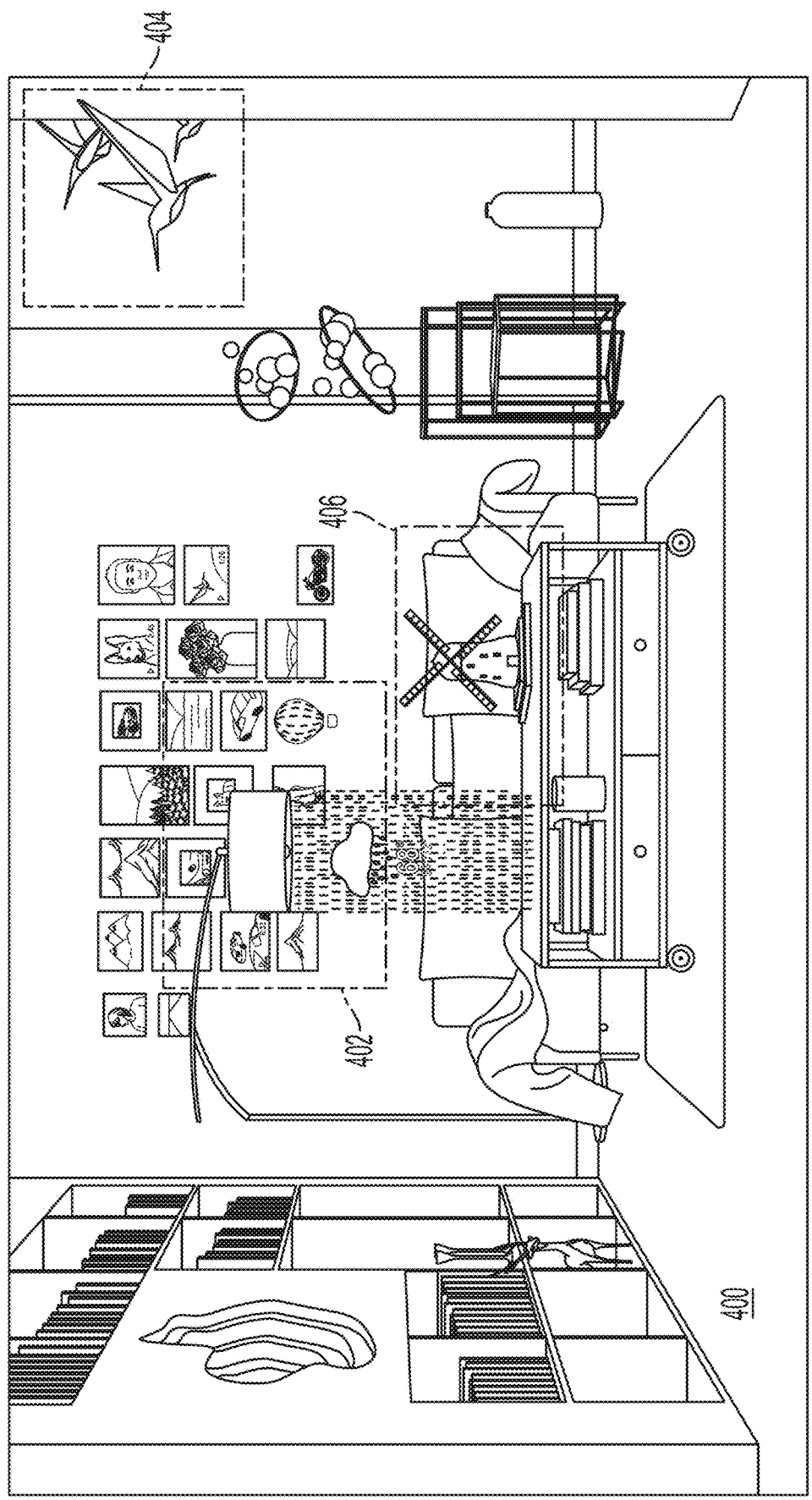
FIG. 2 is a sketch of an exemplary simplified AR scene, showing exemplary use cases of an XR system, according to some embodiments.

FIGS. 1 and 2 illustrate scenes with virtual content displayed in conjunction with a portion of the physical world. For purposes of illustration, an AR system is used as an example of an XR system. FIGS. 3-6B illustrate an exemplary AR system, including one or more processors, memory, sensors and user interfaces that may operate according to the techniques described herein.

Referring to FIG. 1, an outdoor AR scene 354 is depicted in which a user of an AR technology sees a physical world park-like setting 356, featuring people, trees, buildings in the background, and a concrete platform 358. In addition to these items, the user of the AR technology also perceives that they "see" a robot statue 357 standing upon the physical world concrete platform 358, and a cartoon-like avatar character 352 flying by which seems to be a personification of a bumble bee, even though these elements (e.g., the avatar character 352, and the robot statue 357) do not exist in the physical world. Due to the extreme complexity of the human visual perception and nervous system, it is challenging to produce an AR technology that facilitates a comfortable, natural-feeling, rich presentation of virtual image elements amongst other virtual or physical world imagery elements.

Such an AR scene may be achieved with a system that builds maps of the physical world based on tracking information, enable users to place AR content in the physical world, determine locations in the maps of the physical world where AR content are placed, preserve the AR scenes such that the placed AR content can be reloaded to display in the physical world during, for example, a different AR experience session, and enable multiple users to share an AR experience. The system may build and update a digital representation of the physical world surfaces around the user. This representation may be used to render virtual content so as to appear fully or partially occluded by physical objects between the user and the rendered location of the virtual content, to place virtual objects, in physics based interactions, and for virtual character path planning and navigation, or for other operations in which information about the physical world is used.

FIG. 2 depicts another example of an indoor AR scene 400, showing exemplary use cases of an XR system, according to some embodiments. The exemplary scene 400 is a living room having walls, a bookshelf on one side of a wall, a floor lamp at a corner of the room, a floor, a sofa, and coffee table on the floor. In addition to these physical items, the user of the AR technology also perceives virtual objects such as images on the wall behind the sofa, birds flying through the door, a deer peeking out from the book shelf, and a decoration in the form of a windmill placed on the coffee table.

For the images on the wall, the AR technology requires information about not only surfaces of the wall but also objects and surfaces in the room such as lamp shape, which are occluding the images to render the virtual objects correctly. For the flying birds, the AR technology requires information about all the objects and surfaces around the room for rendering the birds with realistic physics to avoid the objects and surfaces or bounce off them if the birds collide. For the deer, the AR technology requires information about the surfaces such as the floor or coffee table to compute where to place the deer. For the windmill, the system may identify that is an object separate from the table and may determine that it is movable, whereas corners of shelves or corners of the wall may be determined to be stationary. Such a distinction may be used in determinations as to which portions of the scene are used or updated in each of various operations.

The virtual objects may be placed in a previous AR experience session. When new AR experience sessions start in the living room, the AR technology requires the virtual objects being accurately displayed at the locations previously placed and realistically visible from different viewpoints. For example, the windmill should be displayed as standing on the books rather than drifting above the table at a different location without the books. Such drifting may happen if the locations of the users of the new AR experience sessions are not accurately localized in the living room. As another example, if a user is viewing the windmill from a viewpoint different from the viewpoint when the windmill was placed, the AR technology requires corresponding sides of the windmill being displayed.

A scene may be presented to the user via a system that includes multiple components, including a user interface that can stimulate one or more user senses, such as sight, sound, and/or touch. In addition, the system may include one or more sensors that may measure parameters of the physical portions of the scene, including position and/or motion of the user within the physical portions of the scene. Further, the system may include one or more computing devices, with associated computer hardware, such as memory. These components may be integrated into a single device or may be distributed across multiple interconnected devices. In some embodiments, some or all of these components may be integrated into a wearable device.

Figure 3:
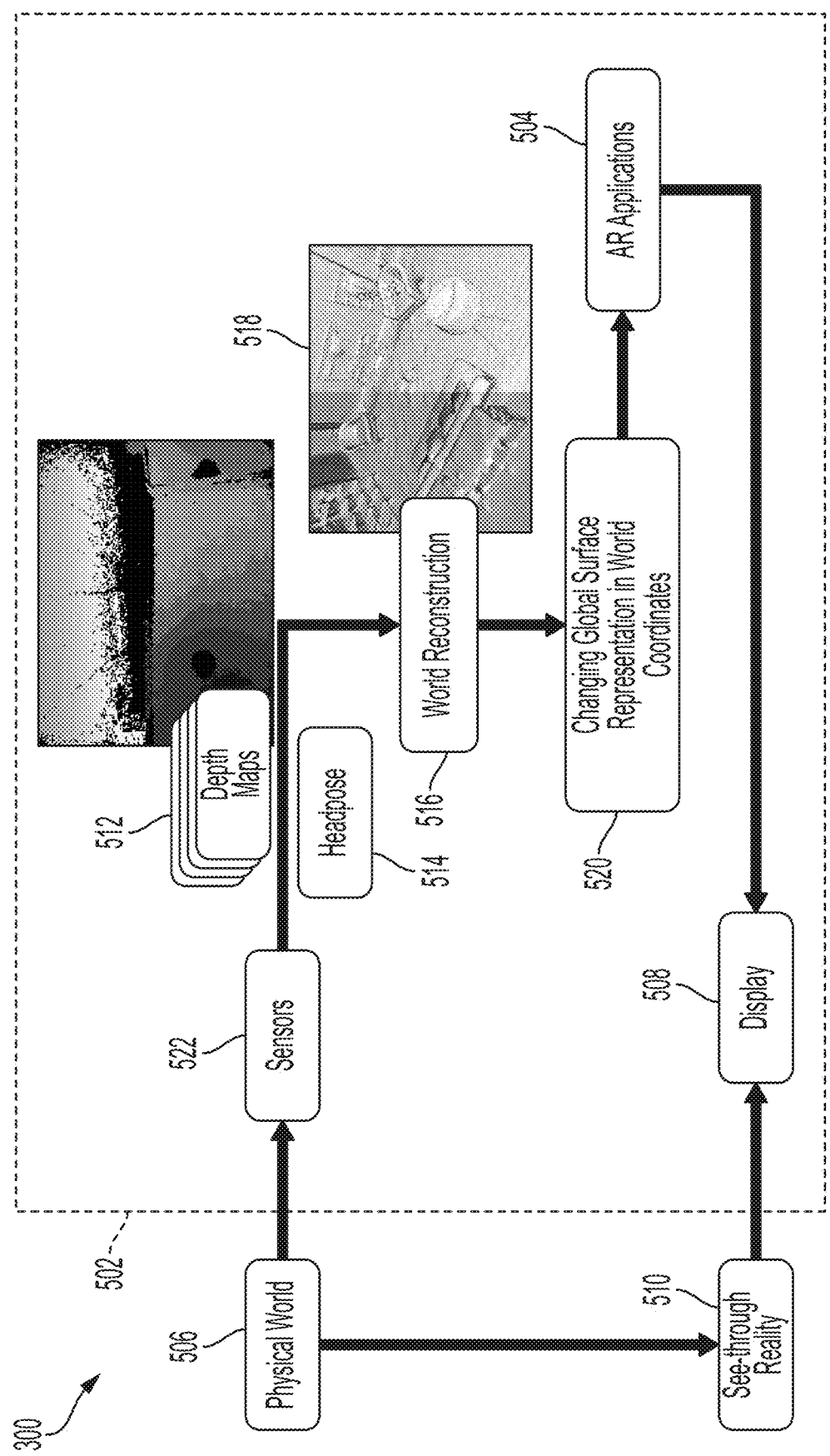
FIG. 3 is a schematic diagram illustrating data flow for a single user in an AR system configured to provide an experience to the user of AR content interacting with a physical world, according to some embodiments.

FIG. 3 depicts an AR system 502 configured to provide an experience of AR contents interacting with a physical world 506, according to some embodiments. The AR system 502 may include a display 508. In the illustrated embodiment, the display 508 may be worn by the user as part of a headset such that a user may wear the display over their eyes like a pair of goggles or glasses. At least a portion of the display may be transparent such that a user may observe a see-through reality 510. The see-through reality 510 may correspond to portions of the physical world 506 that are within a present viewpoint of the AR system 502, which may correspond to the viewpoint of the user in the case that the user is wearing a headset incorporating both the display and sensors of the AR system to acquire information about the physical world.

AR contents may also be presented on the display 508, overlaid on the see-through reality 510. To provide accurate interactions between AR contents and the see-through reality 510 on the display 508, the AR system 502 may include sensors 522 configured to capture information about the physical world 506.

The sensors 522 may include one or more depth sensors that output depth maps 512. Each depth map 512 may have multiple pixels, each of which may represent a distance to a surface in the physical world 506 in a particular direction relative to the depth sensor. Raw depth data may come from a depth sensor to create a depth map. Such depth maps may be updated as fast as the depth sensor can form a new image, which may be hundreds or thousands of times per second. However, that data may be noisy and incomplete, and have holes shown as black pixels on the illustrated depth map.

The system may include other sensors, such as image sensors. The image sensors may acquire monocular or stereoscopic information that may be processed to represent the physical world in other ways. For example, the images may be processed in world reconstruction component 516 to create a mesh, representing connected portions of objects in the physical world. Metadata about such objects, including for example, color and surface texture, may similarly be acquired with the sensors and stored as part of the world reconstruction.

The system may also acquire information about the headpose (or "pose") of the user with respect to the physical world. In some embodiments, a head pose tracking component of the system may be used to compute headposes in real time. The head pose tracking component may represent a headpose of a user in a coordinate frame with six degrees of freedom including, for example, translation in three perpendicular axes (e.g., forward/backward, up/down, left/right) and rotation about the three perpendicular axes (e.g., pitch, yaw, and roll). In some embodiments, sensors 522 may include inertial measurement units ("IMUs") that may be used to compute and/or determine a headpose 514. A headpose 514 for a depth map may indicate a present viewpoint of a sensor capturing the depth map with six degrees of freedom, for example, but the headpose 514 may be used for other purposes, such as to relate image information to a particular portion of the physical world or to relate the position of the display worn on the user's head to the physical world.

In some embodiments, the headpose information may be derived in other ways than from an IMU, such as from analyzing objects in an image. For example, the head pose tracking component may compute relative position and orientation of an AR device to physical objects based on visual information captured by cameras and inertial information captured by IMUs. The head pose tracking component may then compute a headpose of the AR device by, for example, comparing the computed relative position and orientation of the AR device to the physical objects with features of the physical objects. In some embodiments, that comparison may be made by identifying features in images captured with one or more of the sensors 522 that are stable over time such that changes of the position of these features in images captured over time can be associated with a change in headpose of the user.

The inventors have realized and appreciated techniques for operating XR systems to provide XR scenes for a more immersive user experience such as estimating head pose at a frequency of 1 kHz, with low usage of computational resources in connection with an XR device, that may be configured with, for example, four video graphic array (VGA) cameras operating at 30 Hz, one inertial measurement unit (IMU) operating at 1 kHz, compute power of a single advanced RISC machine (ARM) core, memory less than 1 GB, and network bandwidth less than 100 Mbp. These techniques relate to reducing processing required to generate and maintain maps and estimate head pose as well as to providing and consuming data with low computational overhead. The XR system may calculate its pose based on the matched visual features. U.S. patent application Ser. No. 16/221,065 describes hybrid tracking and is hereby incorporated herein by reference in its entirety.

In some embodiments, the AR device may construct a map from the feature points recognized in successive images in a series of image frames captured as a user moves throughout the physical world with the AR device. Though each image frame may be taken from a different pose as the user moves, the system may adjust the orientation of the features of each successive image frame to match the orientation of the initial image frame by matching features of the successive image frames to previously captured image frames. Translations of the successive image frames so that points representing the same features will match corresponding feature points from previously collected image frames, can be used to align each successive image frame to match the orientation of previously processed image frames. The frames in the resulting map may have a common orientation established when the first image frame was added to the map. This map, with sets of feature points in a common frame of reference, may be used to determine the user's pose within the physical world by matching features from current image frames to the map. In some embodiments, this map may be called a tracking map.

In addition to enabling tracking of the user's pose within the environment, this map may enable other components of the system, such as world reconstruction component 516, to determine the location of physical objects with respect to the user. The world reconstruction component 516 may receive the depth maps 512 and headposes 514, and any other data from the sensors, and integrate that data into a reconstruction 518. The reconstruction 518 may be more complete and less noisy than the sensor data. The world reconstruction component 516 may update the reconstruction 518 using spatial and temporal averaging of the sensor data from multiple viewpoints over time.

The reconstruction 518 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 518, portions of the physical world are presented as a global surface; on the right side of the reconstruction 518, portions of the physical world are presented as meshes.

In some embodiments, the map maintained by headpose component 514 may be sparse relative to other maps that might be maintained of the physical world. Rather than providing information about locations, and possibly other characteristics, of surfaces, the sparse map may indicate locations of interest points and/or structures, such as corners or edges. In some embodiments, the map may include image frames as captured by the sensors 522. These frames may be reduced to features, which may represent the interest points and/or structures. In conjunction with each frame, information about a pose of a user from which the frame was acquired may also be stored as part of the map. In some embodiments, every image acquired by the sensor may or may not be stored. In some embodiments, the system may process images as they are collected by sensors and select subsets of the image frames for further computation. The selection may be based on one or more criteria that limits the addition of information yet ensures that the map contains useful information. The system may add a new image frame to the map, for example, based on overlap with a prior image frame already added to the map or based on the image frame containing a sufficient number of features determined as likely to represent stationary objects. In some embodiments, the selected image frames, or groups of features from selected image frames may serve as key frames for the map, which are used to provide spatial information.

In some embodiments, the amount of data that is processed when constructing maps may be reduced, such as by constructing sparse maps with a collection of mapped points and keyframes and/or dividing the maps into blocks to enable updates by blocks. A mapped point may be associated with a point of interest in the environment. A keyframe may include selected information from camera-captured data. U.S. patent application Ser. No. 16/520,582 describes determining and/or evaluating localization maps and is hereby incorporated herein by reference in its entirety.

The AR system 502 may integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world may be fused together into a single, combined reconstruction of the physical world, which may serve as an abstract layer for the map and provide spatial information. The reconstruction may be more complete and less noisy than the original sensor data by using spatial and temporal averaging (i.e. averaging data from multiple viewpoints over time), or any other suitable method.

In the illustrated embodiment in FIG. 3, a map represents the portion of the physical world in which a user of a single, wearable device is present. In that scenario, headpose associated with frames in the map may be represented as a local headpose, indicating orientation relative to an initial orientation for a single device at the start of a session. For example, the headpose may be tracked relative to an initial headpose when the device was turned on or otherwise operated to scan an environment to build a representation of that environment.

In combination with content characterizing that portion of the physical world, the map may include metadata. The metadata, for example, may indicate time of capture of the sensor information used to form the map. Metadata alternatively or additionally may indicate location of the sensors at the time of capture of information used to form the map. Location may be expressed directly, such as with information from a GPS chip, or indirectly, such as with a wireless (e.g. Wi-Fi) signature indicating strength of signals received from one or more wireless access points while the sensor data was being collected and/or with identifiers, such as BSSIDs, of wireless access points to which the user device connected while the sensor data was collected.

The reconstruction 518 may be used for AR functions, such as producing a surface representation of the physical world for occlusion processing or physics-based processing. This surface representation may change as the user moves or objects in the physical world change. Aspects of the reconstruction 518 may be used, for example, by a component 520 that produces a changing global surface representation in world coordinates, which may be used by other components.

The AR content may be generated based on this information, such as by AR applications 504. An AR application 504 may be a game program, for example, that performs one or more functions based on information about the physical world, such as visual occlusion, physics-based interactions, and environment reasoning. It may perform these functions by querying data in different formats from the reconstruction 518 produced by the world reconstruction component 516. In some embodiments, component 520 may be configured to output updates when a representation in a region of interest of the physical world changes. That region of interest, for example, may be set to approximate a portion of the physical world in the vicinity of the user of the system, such as the portion within the view field of the user, or is projected (predicted/determined) to come within the view field of the user.

The AR applications 504 may use this information to generate and update the AR contents. The virtual portion of the AR contents may be presented on the display 508 in combination with the see-through reality 510, creating a realistic user experience.

Figure 4:
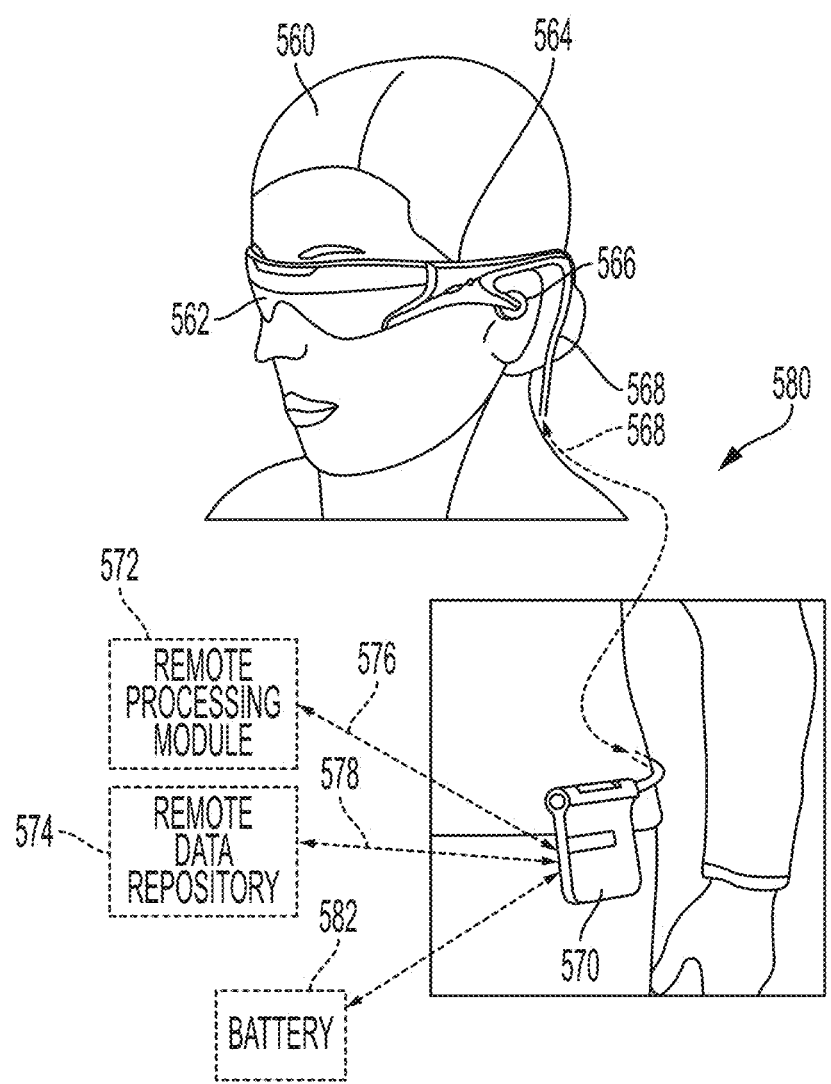
FIG. 4 is a schematic diagram illustrating an exemplary AR display system, displaying virtual content for a single user, according to some embodiments.

In some embodiments, an AR experience may be provided to a user through an XR device, which may be a wearable display device, which may be part of a system that may include remote processing and or remote data storage and/or, in some embodiments, other wearable display devices worn by other users. FIG. 4 illustrates an example of system 580 (hereinafter referred to as "system 580") including a single wearable device for simplicity of illustration. The system 580 includes a head mounted display device 562 (hereinafter referred to as "display device 562"), and various mechanical and electronic modules and systems to support the functioning of the display device 562. The display device 562 may be coupled to a frame 564, which is wearable by a display system user or viewer 560 (hereinafter referred to as "user 560") and configured to position the display device 562 in front of the eyes of the user 560. According to various embodiments, the display device 562 may be a sequential display. The display device 562 may be monocular or binocular. In some embodiments, the display device 562 may be an example of the display 508 in FIG. 3.

In some embodiments, a speaker 566 is coupled to the frame 564 and positioned proximate an ear canal of the user 560. In some embodiments, another speaker, not shown, is positioned adjacent another ear canal of the user 560 to provide for stereo/shapeable sound control. The display device 562 is operatively coupled, such as by a wired lead or wireless connectivity 568, to a local data processing module 570 which may be mounted in a variety of configurations, such as fixedly attached to the frame 564, fixedly attached to a helmet or hat worn by the user 560, embedded in headphones, or otherwise removably attached to the user 560 (e.g., in a backpack-style configuration, in a belt-coupling style configuration).

The local data processing module 570 may include a processor, as well as digital memory, such as non-volatile memory (e.g., flash memory), both of which may be utilized to assist in the processing, caching, and storage of data. The data include data a) captured from sensors (which may be, e.g., operatively coupled to the frame 564) or otherwise attached to the user 560, such as image capture devices (such as cameras), microphones, inertial measurement units, accelerometers, compasses, GPS units, radio devices, and/or gyros; and/or b) acquired and/or processed using remote processing module 572 and/or remote data repository 574, possibly for passage to the display device 562 after such processing or retrieval.

In some embodiments, the wearable deice may communicate with remote components. The local data processing module 570 may be operatively coupled by communication links 576, 578, such as via a wired or wireless communication links, to the remote processing module 572 and remote data repository 574, respectively, such that these remote modules 572, 574 are operatively coupled to each other and available as resources to the local data processing module 570. In further embodiments, in addition or as alternative to remote data repository 574, the wearable device can access cloud based remote data repositories, and/or services. In some embodiments, the head pose tracking component described above may be at least partially implemented in the local data processing module 570. In some embodiments, the world reconstruction component 516 in FIG. 3 may be at least partially implemented in the local data processing module 570. For example, the local data processing module 570 may be configured to execute computer executable instructions to generate the map and/or the physical world representations based at least in part on at least a portion of the data.

In some embodiments, processing may be distributed across local and remote processors. For example, local processing may be used to construct a map on a user device (e.g. tracking map) based on sensor data collected with sensors on that user's device. Such a map may be used by applications on that user's device. Additionally, previously created maps (e.g., canonical maps) may be stored in remote data repository 574. Where a suitable stored or persistent map is available, it may be used instead of or in addition to the tracking map created locally on the device. In some embodiments, a tracking map may be localized to the stored map, such that a correspondence is established between a tracking map, which might be oriented relative to a position of the wearable device at the time a user turned the system on, and the canonical map, which may be oriented relative to one or more persistent features. In some embodiments, the persistent map might be loaded on the user device to allow the user device to render virtual content without a delay associated with scanning a location to build a tracking map of the user's full environment from sensor data acquired during the scan. In some embodiments, the user device may access a remote persistent map (e.g., stored on a cloud) without the need to download the persistent map on the user device.

In some embodiments, spatial information may be communicated from the wearable device to remote services, such as a cloud service that is configured to localize a device to stored maps maintained on the cloud service. According to one embodiment, the localization processing can take place in the cloud matching the device location to existing maps, such as canonical maps, and return transforms that link virtual content to the wearable device location. In such embodiments, the system can avoid communicating maps from remote resources to the wearable device. Other embodiments can be configured for both device-based and cloud-based localization, for example, to enable functionality where network connectivity is not available or a user opts not to enable could-based localization.

Alternatively or additionally, the tracking map may be merged with previously stored maps to extend or improve the quality of those maps. The processing to determine whether a suitable previously created environment map is available and/or to merge a tracking map with one or more stored environment maps may be done in local data processing module 570 or remote processing module 572.

In some embodiments, the local data processing module 570 may include one or more processors (e.g., a graphics processing unit (GPU)) configured to analyze and process data and/or image information. In some embodiments, the local data processing module 570 may include a single processor (e.g., a single-core or multi-core ARM processor), which would limit the local data processing module 570's compute budget but enable a more miniature device. In some embodiments, the world reconstruction component 516 may use a compute budget less than a single Advanced RISC Machine (ARM) core to generate physical world representations in real-time on a non-predefined space such that the remaining compute budget of the single ARM core can be accessed for other uses such as, for example, extracting meshes.

In some embodiments, the remote data repository 574 may include a digital data storage facility, which may be available through the Internet or other networking configuration in a "cloud" resource configuration. In some embodiments, all data is stored and all computations are performed in the local data processing module 570, allowing fully autonomous use from a remote module. In some embodiments, all data is stored and all or most computations are performed in the remote data repository 574, allowing for a smaller device. A world reconstruction, for example, may be stored in whole or in part in this repository 574.

In embodiments in which data is stored remotely, and accessible over a network, data may be shared by multiple users of an augmented reality system. For example, user devices may upload their tracking maps to augment a database of environment maps. In some embodiments, the tracking map upload occurs at the end of a user session with a wearable device. In some embodiments, the tracking map uploads may occur continuously, semi-continuously, intermittently, at a pre-defined time, after a pre-defined period from the previous upload, or when triggered by an event. A tracking map uploaded by any user device may be used to expand or improve a previously stored map, whether based on data from that user device or any other user device. Likewise, a persistent map downloaded to a user device may be based on data from that user device or any other user device. In this way, high quality environment maps may be readily available to users to improve their experiences with the AR system.

In further embodiments, persistent map downloads can be limited and/or avoided based on localization executed on remote resources (e.g., in the cloud). In such configurations, a wearable device or other XR device communicates to the cloud service feature information coupled with pose information (e.g., positioning information for the device at the time the features represented in the feature information were sensed). One or more components of the cloud service may match the feature information to respective stored maps (e.g., canonical maps) and generates transforms between a tracking map maintained by the XR device and the coordinate system of the canonical map. Each XR device that has its tracking map localized with respect to the canonical map may accurately render virtual content in locations specified with respect to the canonical map based on its own tracking.

In some embodiments, the local data processing module 570 is operatively coupled to a battery 582. In some embodiments, the battery 582 is a removable power source, such as over the counter batteries. In other embodiments, the battery 582 is a lithium-ion battery. In some embodiments, the battery 582 includes both an internal lithium-ion battery chargeable by the user 560 during non-operation times of the system 580 and removable batteries such that the user 560 may operate the system 580 for longer periods of time without having to be tethered to a power source to charge the lithium-ion battery or having to shut the system 580 off to replace batteries.

Figure 5A:
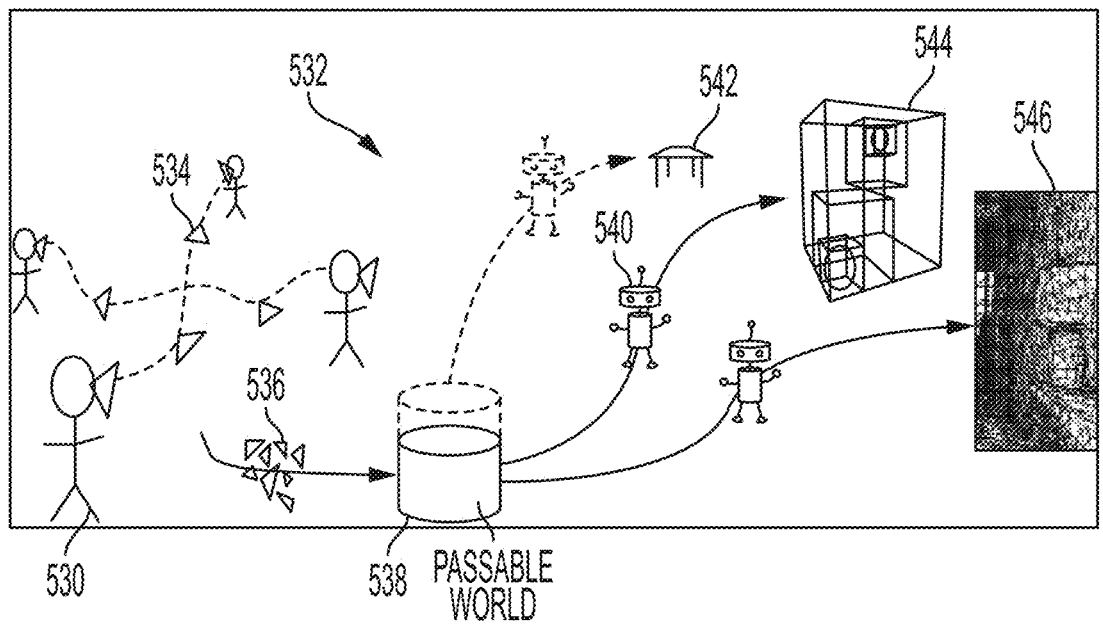
FIG. 5A is a schematic diagram illustrating a user wearing an AR display system rendering AR content as the user moves through a physical world environment, according to some embodiments.

FIG. 5A illustrates a user 530 wearing an AR display system rendering AR content as the user 530 moves through a physical world environment 532 (hereinafter referred to as "environment 532"). The information captured by the AR system along the movement path of the user may be processed into one or more tracking maps. The user 530 positions the AR display system at positions 534, and the AR display system records ambient information of a passable world (e.g., a digital representation of the real objects in the physical world that can be stored and updated with changes to the real objects in the physical world) relative to the positions 534. That information may be stored as poses in combination with images, features, directional audio inputs, or other desired data. The positions 534 are aggregated to data inputs 536, for example, as part of a tracking map, and processed at least by a passable world module 538, which may be implemented, for example, by processing on a remote processing module 572 of FIG. 4. In some embodiments, the passable world module 538 may include the head pose component 514 and the world reconstruction component 516, such that the processed information may indicate the location of objects in the physical world in combination with other information about physical objects used in rendering virtual content.

The passable world module 538 determines, at least in part, where and how AR content 540 can be placed in the physical world as determined from the data inputs 536. The AR content is "placed" in the physical world by presenting via the user interface both a representation of the physical world and the AR content, with the AR content rendered as if it were interacting with objects in the physical world and the objects in the physical world presented as if the AR content were, when appropriate, obscuring the user's view of those objects. In some embodiments, the AR content may be placed by appropriately selecting portions of a fixed element 542 (e.g., a table) from a reconstruction (e.g., the reconstruction 518) to determine the shape and position of the AR content 540. As an example, the fixed element may be a table and the virtual content may be positioned such that it appears to be on that table. In some embodiments, the AR content may be placed within structures in a field of view 544, which may be a present field of view or an estimated future field of view. In some embodiments, the AR content may be persisted relative to a model 546 of the physical world (e.g. a mesh).

As depicted, the fixed element 542 serves as a proxy (e.g. digital copy) for any fixed element within the physical world which may be stored in the passable world module 538 so that the user 530 can perceive content on the fixed element 542 without the system having to map to the fixed element 542 each time the user 530 sees it. The fixed element 542 may, therefore, be a mesh model from a previous modeling session or determined from a separate user but nonetheless stored by the passable world module 538 for future reference by a plurality of users. Therefore, the passable world module 538 may recognize the environment 532 from a previously mapped environment and display AR content without a device of the user 530 mapping all or part of the environment 532 first, saving computation process and cycles and avoiding latency of any rendered AR content.

The mesh model 546 of the physical world may be created by the AR display system and appropriate surfaces and metrics for interacting and displaying the AR content 540 can be stored by the passable world module 538 for future retrieval by the user 530 or other users without the need to completely or partially recreate the model. In some embodiments, the data inputs 536 are inputs such as geo-location, user identification, and current activity to indicate to the passable world module 538 which fixed element 542 of one or more fixed elements are available, which AR content 540 has last been placed on the fixed element 542, and whether to display that same content (such AR content being "persistent" content regardless of user viewing a particular passable world model).

Even in embodiments in which objects are considered to be fixed (e.g. a kitchen table), the passable world module 538 may update those objects in a model of the physical world from time to time to account for the possibility of changes in the physical world. The model of fixed objects may be updated with a very low frequency. Other objects in the physical world may be moving or otherwise not regarded as fixed (e.g. kitchen chairs). To render an AR scene with a realistic feel, the AR system may update the position of these non-fixed objects with a much higher frequency than is used to update fixed objects. To enable accurate tracking of all of the objects in the physical world, an AR system may draw information from multiple sensors, including one or more image sensors.

Figure 5B:
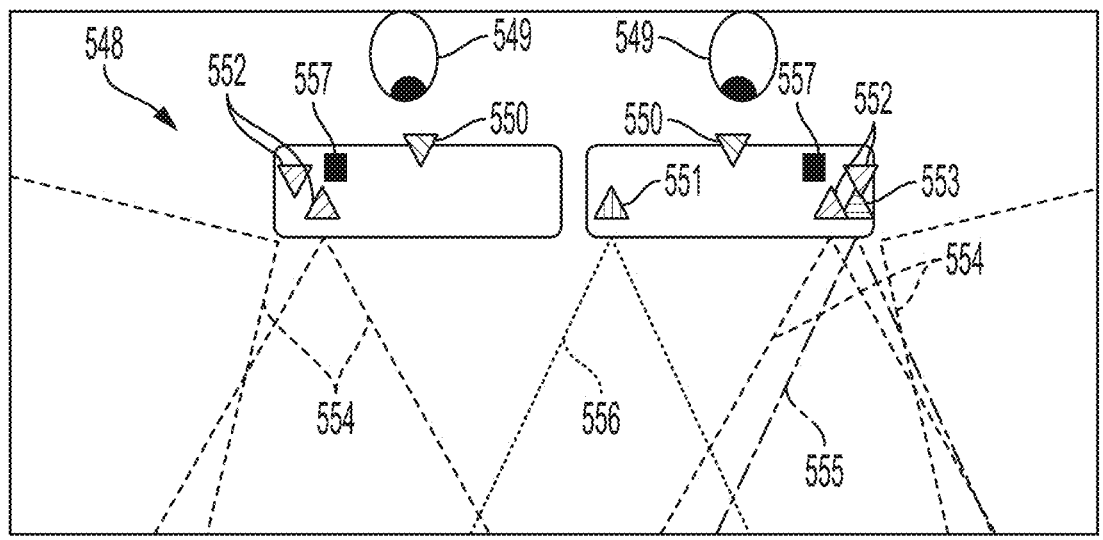
FIG. 5B is a schematic diagram illustrating a viewing optics assembly and attendant components, according to some embodiments.

FIG. 5B is a schematic illustration of a viewing optics assembly 548 and attendant components. In some embodiments, two eye tracking cameras 550, directed toward user eyes 549, detect metrics of the user eyes 549, such as eye shape, eyelid occlusion, pupil direction and glint on the user eyes 549.

In some embodiments, one of the sensors may be a depth sensor 551, such as a time of flight sensor, emitting signals to the world and detecting reflections of those signals from nearby objects to determine distance to given objects. A depth sensor, for example, may quickly determine whether objects have entered the field of view of the user, either as a result of motion of those objects or a change of pose of the user. However, information about the position of objects in the field of view of the user may alternatively or additionally be collected with other sensors. Depth information, for example, may be obtained from stereoscopic visual image sensors or plenoptic sensors.

In some embodiments, world cameras 552 record a greater-than-peripheral view to map and/or otherwise create a model of the environment 532 and detect inputs that may affect AR content. In some embodiments, the world camera 552 and/or camera 553 may be grayscale and/or color image sensors, which may output grayscale and/or color image frames at fixed time intervals. Camera 553 may further capture physical world images within a field of view of the user at a specific time. Pixels of a frame-based image sensor may be sampled repetitively even if their values are unchanged. Each of the world cameras 552, the camera 553 and the depth sensor 551 have respective fields of view of 554, 555, and 556 to collect data from and record a physical world scene, such as the physical world environment 532 depicted in FIG. 34A.

Inertial measurement units 557 may determine movement and orientation of the viewing optics assembly 548. In some embodiments, each component is operatively coupled to at least one other component. For example, the depth sensor 551 is operatively coupled to the eye tracking cameras 550 as a confirmation of measured accommodation against actual distance the user eyes 549 are looking at.

It should be appreciated that a viewing optics assembly 548 may include some of the components illustrated in FIG. 34B and may include components instead of or in addition to the components illustrated. In some embodiments, for example, a viewing optics assembly 548 may include two world camera 552 instead of four. Alternatively or additionally, cameras 552 and 553 need not capture a visible light image of their full field of view. A viewing optics assembly 548 may include other types of components. In some embodiments, a viewing optics assembly 548 may include one or more dynamic vision sensor (DVS), whose pixels may respond asynchronously to relative changes in light intensity exceeding a threshold.

In some embodiments, a viewing optics assembly 548 may not include the depth sensor 551 based on time of flight information. In some embodiments, for example, a viewing optics assembly 548 may include one or more plenoptic cameras, whose pixels may capture light intensity and an angle of the incoming light, from which depth information can be determined. For example, a plenoptic camera may include an image sensor overlaid with a transmissive diffraction mask (TDM). Alternatively or additionally, a plenoptic camera may include an image sensor containing angle-sensitive pixels and/or phase-detection auto-focus pixels (PDAF) and/or micro-lens array (MLA). Such a sensor may serve as a source of depth information instead of or in addition to depth sensor 551.

It also should be appreciated that the configuration of the components in FIG. 5B is provided as an example. A viewing optics assembly 548 may include components with any suitable configuration, which may be set to provide the user with the largest field of view practical for a particular set of components. For example, if a viewing optics assembly 548 has one world camera 552, the world camera may be placed in a center region of the viewing optics assembly instead of at a side.

Information from the sensors in viewing optics assembly 548 may be coupled to one or more of processors in the system. The processors may generate data that may be rendered so as to cause the user to perceive virtual content interacting with objects in the physical world. That rendering may be implemented in any suitable way, including generating image data that depicts both physical and virtual objects. In other embodiments, physical and virtual content may be depicted in one scene by modulating the opacity of a display device that a user looks through at the physical world. The opacity may be controlled so as to create the appearance of the virtual object and also to block the user from seeing objects in the physical world that are occluded by the virtual objects. In some embodiments, the image data may only include virtual content that may be modified such that the virtual content is perceived by a user as realistically interacting with the physical world (e.g. clip content to account for occlusions), when viewed through the user interface.

The location on the viewing optics assembly 548 at which content is displayed to create the impression of an object at a particular location may depend on the physics of the viewing optics assembly. Additionally, the pose of the user's head with respect to the physical world and the direction in which the user's eyes are looking may impact where in the physical world content displayed at a particular location on the viewing optics assembly content will appear. Sensors as described above may collect this information, and or supply information from which this information may be calculated, such that a processor receiving sensor inputs may compute where objects should be rendered on the viewing optics assembly 548 to create a desired appearance for the user.

Regardless of how content is presented to a user, a model of the physical world may be used so that characteristics of the virtual objects, which can be impacted by physical objects, including the shape, position, motion, and visibility of the virtual object, can be correctly computed. In some embodiments, the model may include the reconstruction of a physical world, for example, the reconstruction 518.

That model may be created from data collected from sensors on a wearable device of the user. Though, in some embodiments, the model may be created from data collected by multiple users, which may be aggregated in a computing device remote from all of the users (and which may be "in the cloud").

Figure 6A:
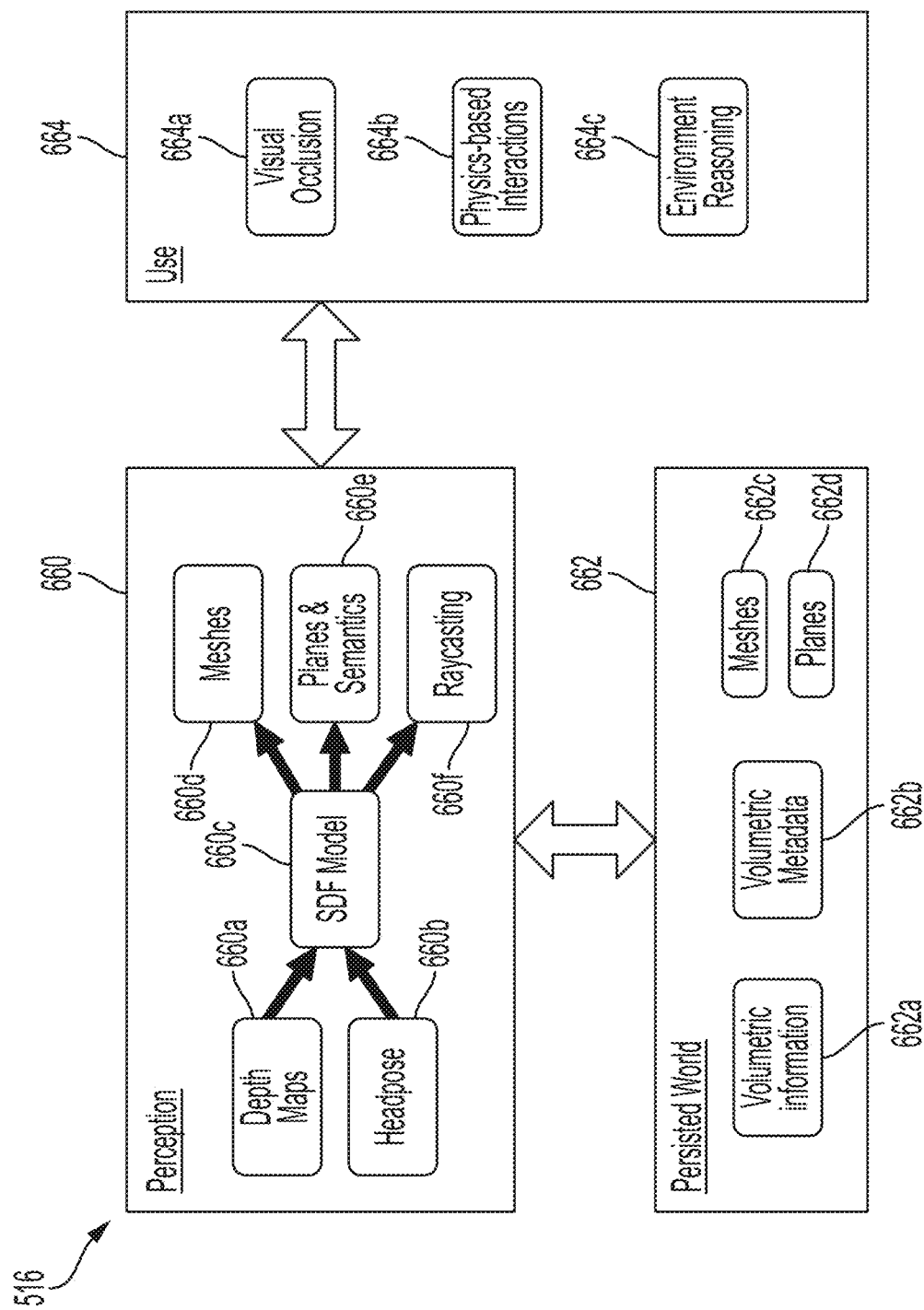
FIG. 6A is a schematic diagram illustrating an AR system using a world reconstruction system, according to some embodiments.

The model may be created, at least in part, by a world reconstruction system such as, for example, the world reconstruction component 516 of FIG. 3 depicted in more detail in FIG. 6A. The world reconstruction component 516 may include a perception module 660 that may generate, update, and store representations for a portion of the physical world. In some embodiments, the perception module 660 may represent the portion of the physical world within a reconstruction range of the sensors as multiple voxels. Each voxel may correspond to a 3D cube of a predetermined volume in the physical world, and include surface information, indicating whether there is a surface in the volume represented by the voxel. Voxels may be assigned values indicating whether their corresponding volumes have been determined to include surfaces of physical objects, determined to be empty or have not yet been measured with a sensor and so their value is unknown. It should be appreciated that values indicating that voxels that are determined to be empty or unknown need not be explicitly stored, as the values of voxels may be stored in computer memory in any suitable way, including storing no information for voxels that are determined to be empty or unknown.

In addition to generating information for a persisted world representation, the perception module 660 may identify and output indications of changes in a region around a user of an AR system. Indications of such changes may trigger updates to volumetric data stored as part of the persisted world, or trigger other functions, such as triggering components 604 that generate AR content to update the AR content.

In some embodiments, the perception module 660 may identify changes based on a signed distance function (SDF) model. The perception module 660 may be configured to receive sensor data such as, for example, depth maps 660a and headposes 660b, and then fuse the sensor data into a SDF model 660c. Depth maps 660a may provide SDF information directly, and images may be processed to arrive at SDF information. The SDF information represents distance from the sensors used to capture that information. As those sensors may be part of a wearable unit, the SDF information may represent the physical world from the perspective of the wearable unit and therefore the perspective of the user. The headposes 660b may enable the SDF information to be related to a voxel in the physical world.

In some embodiments, the perception module 660 may generate, update, and store representations for the portion of the physical world that is within a perception range. The perception range may be determined based, at least in part, on a sensor's reconstruction range, which may be determined based, at least in part, on the limits of a sensor's observation range. As a specific example, an active depth sensor that operates using active IR pulses may operate reliably over a range of distances, creating the observation range of the sensor, which may be from a few centimeters or tens of centimeters to a few meters.

The world reconstruction component 516 may include additional modules that may interact with the perception module 660. In some embodiments, a persisted world module 662 may receive representations for the physical world based on data acquired by the perception module 660. The persisted world module 662 also may include various formats of representations of the physical world. For example, volumetric metadata 662b such as voxels may be stored as well as meshes 662c and planes 662d. In some embodiments, other information, such as depth maps could be saved.

In some embodiments, representations of the physical world, such as those illustrated in FIG. 6A may provide relatively dense information about the physical world in comparison to sparse maps, such as a tracking map based on feature points as described above.

In some embodiments, the perception module 660 may include modules that generate representations for the physical world in various formats including, for example, meshes 660d, planes and semantics 660e. The representations for the physical world may be stored across local and remote storage mediums. The representations for the physical world may be described in different coordinate frames depending on, for example, the location of the storage medium. For example, a representation for the physical world stored in the device may be described in a coordinate frame local to the device. The representation for the physical world may have a counterpart stored in a cloud. The counterpart in the cloud may be described in a coordinate frame shared by all devices in an XR system.

In some embodiments, these modules may generate representations based on data within the perception range of one or more sensors at the time the representation is generated as well as data captured at prior times and information in the persisted world module 662. In some embodiments, these components may operate on depth information captured with a depth sensor. However, the AR system may include vision sensors and may generate such representations by analyzing monocular or binocular vision information.

In some embodiments, these modules may operate on regions of the physical world. Those modules may be triggered to update a subregion of the physical world, when the perception module 660 detects a change in the physical world in that subregion. Such a change, for example, may be detected by detecting a new surface in the SDF model 660c or other criteria, such as changing the value of a sufficient number of voxels representing the subregion.

The world reconstruction component 516 may include components 664 that may receive representations of the physical world from the perception module 660. Information about the physical world may be pulled by these components according to, for example, a use request from an application. In some embodiments, information may be pushed to the use components, such as via an indication of a change in a pre-identified region or a change of the physical world representation within the perception range. The components 664, may include, for example, game programs and other components that perform processing for visual occlusion, physics-based interactions, and environment reasoning.

Responding to the queries from the components 664, the perception module 660 may send representations for the physical world in one or more formats. For example, when the component 664 indicates that the use is for visual occlusion or physics-based interactions, the perception module 660 may send a representation of surfaces. When the component 664 indicates that the use is for environmental reasoning, the perception module 660 may send meshes, planes and semantics of the physical world.

In some embodiments, the perception module 660 may include components that format information to provide the component 664. An example of such a component may be raycasting component 660f. A use component (e.g., component 664), for example, may query for information about the physical world from a particular point of view. Raycasting component 660f may select from one or more representations of the physical world data within a field of view from that point of view.

As should be appreciated from the foregoing description, the perception module 660, or another component of an AR system, may process data to create 3D representations of portions of the physical world. Data to be processed may be reduced by culling parts of a 3D reconstruction volume based at last in part on a camera frustum and/or depth image, extracting and persisting plane data, capturing, persisting, and updating 3D reconstruction data in blocks that allow local update while maintaining neighbor consistency, providing occlusion data to applications generating such scenes, where the occlusion data is derived from a combination of one or more depth data sources, and/or performing a multi-stage mesh simplification. The reconstruction may contain data of different levels of sophistication including, for example, raw data such as live depth data, fused volumetric data such as voxels, and computed data such as meshes.

In some embodiments, components of a passable world model may be distributed, with some portions executing locally on an XR device and some portions executing remotely, such as on a network connected server, or otherwise in the cloud. The allocation of the processing and storage of information between the local XR device and the cloud may impact functionality and user experience of an XR system. For example, reducing processing on a local device by allocating processing to the cloud may enable longer battery life and reduce heat generated on the local device. But, allocating too much processing to the cloud may create undesirable latency that causes an unacceptable user experience.

Figure 6B:
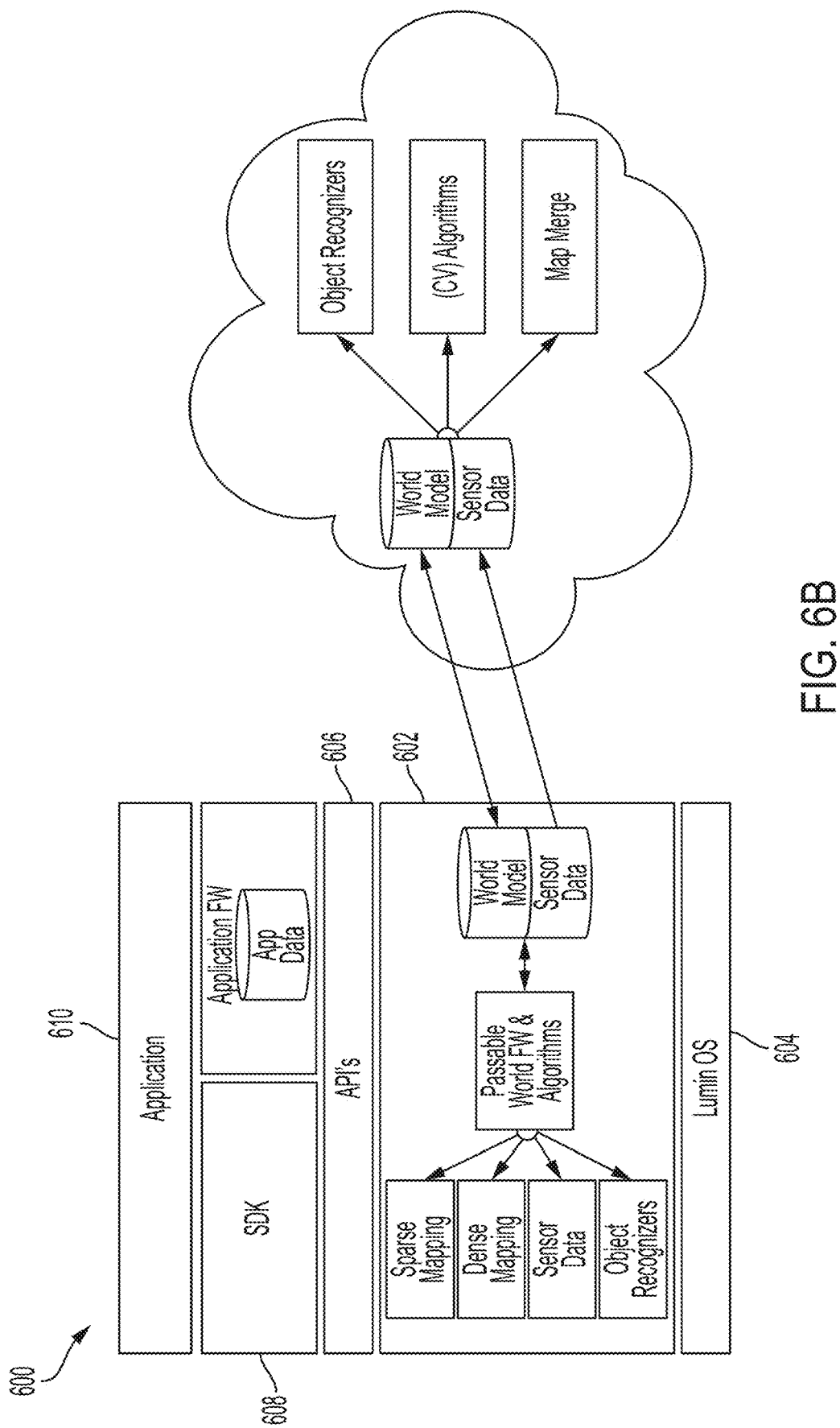
FIG. 6B is a schematic diagram illustrating components of an AR system that maintain a model of a passable world, according to some embodiments.

FIG. 6B depicts a distributed component architecture 600 configured for spatial computing, according to some embodiments. The distributed component architecture 600 may include a passable world component 602 (e.g., PW 538 in FIG. 5A), a Lumin OS 604, API's 606, SDK 608, and Application 610. The Lumin OS 604 may include a Linux-based kernel with custom drivers compatible with an XR device. The API's 606 may include application programming interfaces that grant XR applications (e.g., Applications 610) access to the spatial computing features of an XR device. The SDK 608 may include a software development kit that allows the creation of XR applications.

One or more components in the architecture 600 may create and maintain a model of a passable world. In this example sensor data is collected on a local device. Processing of that sensor data may be performed in part locally on the XR device and partially in the cloud. PW 538 may include environment maps created based, at least in part, on data captured by AR devices worn by multiple users. During sessions of an AR experience, individual AR devices (such as wearable devices described above in connection with FIG. 4 may create tracking maps, which is one type of map.

In some embodiments, the device may include components that construct both sparse maps and dense maps. A tracking map may serve as a sparse map and may include headposes of the AR device scanning an environment as well as information about objects detected within that environment at each headpose. Those headposes may be maintained locally for each device. For example, the headpose on each device may be relative to an initial headpose when the device was turned on for its session. As a result, each tracking map may be local to the device creating it. The dense map may include surface information, which may be represented by a mesh or depth information. Alternatively or additionally, a dense map may include higher level information derived from surface or depth information, such as the location and/or characteristics of planes and/or other objects.

Creation of the dense maps may be independent of the creation of sparse maps, in some embodiments. The creation of dense maps and sparse maps, for example, may be performed in separate processing pipelines within an AR system. Separating processing, for example, may enable generation or processing of different types of maps to be performed at different rates. Sparse maps, for example, may be refreshed at a faster rate than dense maps. In some embodiments, however, the processing of dense and sparse maps may be related, even if performed in different pipelines. Changes in the physical world revealed in a sparse map, for example, may trigger updates of a dense map, or vice versa. Further, even if independently created, the maps might be used together. For example, a coordinate system derived from a sparse map may be used to define position and/or orientation of objects in a dense map.

The sparse map and/or dense map may be persisted for re-use by the same device and/or sharing with other devices. Such persistence may be achieved by storing information in the cloud. The AR device may send the tracking map to a cloud to, for example, merge with environment maps selected from persisted maps previously stored in the cloud. In some embodiments, the selected persisted maps may be sent from the cloud to the AR device for merging. In some embodiments, the persisted maps may be oriented with respect to one or more persistent coordinate frames. Such maps may serve as canonical maps, as they can be used by any of multiple devices. In some embodiments, a model of a passable world may comprise or be created from one or more canonical maps. Devices, even though they perform some operations based on a coordinate frame local to the device, may nonetheless use the canonical map by determining a transformation between their coordinate frame local to the device and the canonical map.

A canonical map may originate as a tracking map (TM) (e.g., TM 1102 in FIG. 31A), which may be promoted to a canonical map. The canonical map may be persisted such that devices that access the canonical map may, once determining a transformation between their local coordinate system and a coordinate system of the canonical map, use the information in the canonical map to determine locations of objects represented in the canonical map in the physical world around the device. In some embodiments, a TM may be a headpose sparse map created by an XR device. In some embodiments, the canonical map may be created when an XR device sends one or more TMs to a cloud server for merging with additional TMs captured by the XR device at a different time or by other XR devices.

Figure 7:
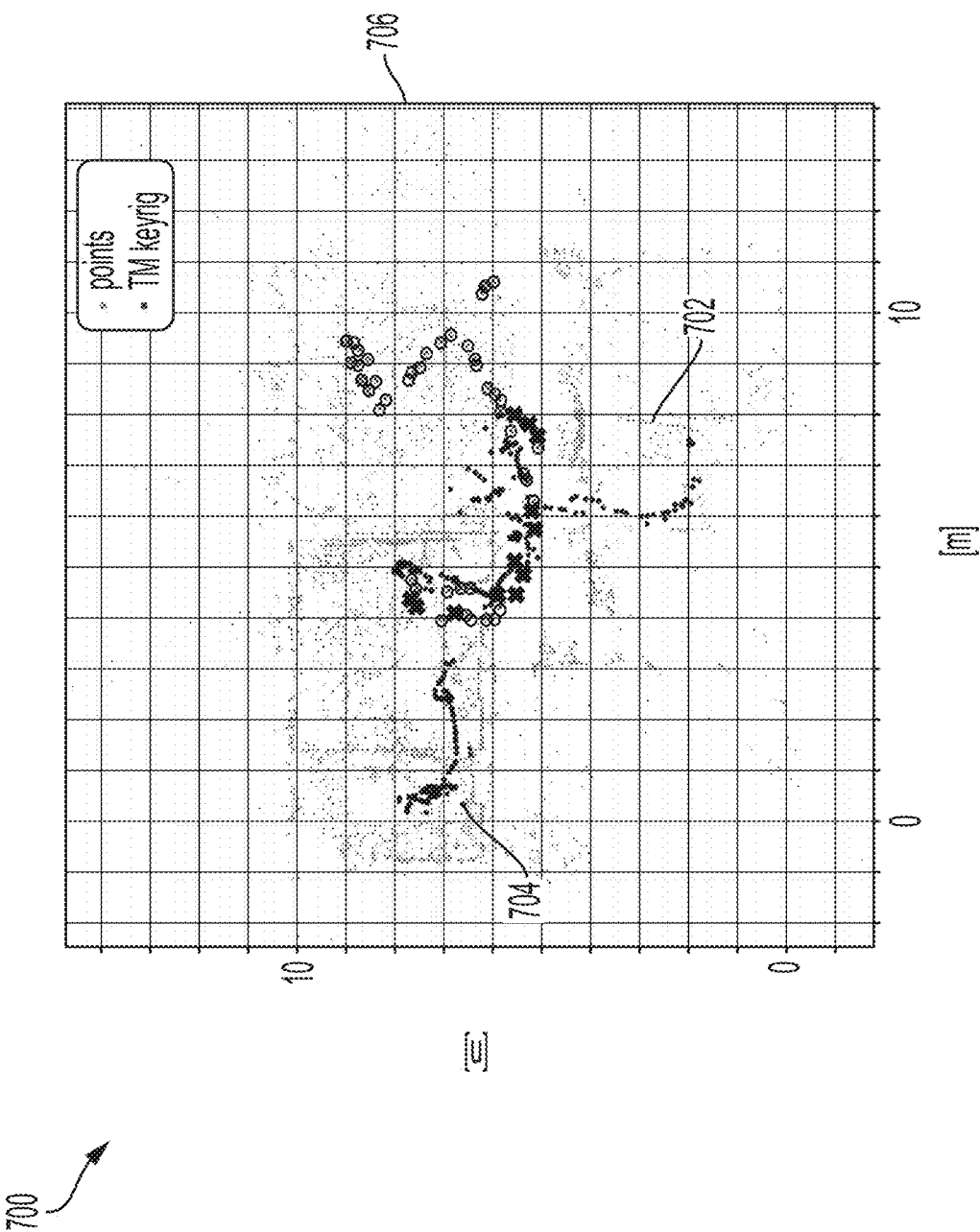
FIG. 7 is a schematic illustration of a tracking map formed by a device traversing a path through a physical world.

The canonical maps, or other maps, may provide information about the portions of the physical world represented by the data processed to create respective maps. FIG. 7 depicts an exemplary tracking map 700, according to some embodiments. The tracking map 700 may provide a floor plan 706 of physical objects in a corresponding physical world, represented by points 702. In some embodiments, a map point 702 may represent a feature of a physical object that may include multiple features. For example, each corner of a table may be a feature that is represented by a point on a map. The features may be derived from processing images, such as may be acquired with the sensors of a wearable device in an augmented reality system. The features, for example, may be derived by processing an image frame output by a sensor to identify features based on large gradients in the image or other suitable criteria. Further processing may limit the number of features in each frame. For example, processing may select features that likely represent persistent objects. One or more heuristics may be applied for this selection.

The tracking map 700 may include data on points 702 collected by a device. For each image frame with data points included in a tracking map, a pose may be stored. The pose may represent the orientation from which the image frame was captured, such that the feature points within each image frame may be spatially correlated. The pose may be determined by positioning information, such as may be derived from the sensors, such as an IMU sensor, on the wearable device. Alternatively or additionally, the pose may be determined from matching image frames to other image frames that depict overlapping portions of the physical world. By finding such positional correlation, which may be accomplished by matching subsets of features points in two frames, the relative pose between the two frames may be computed. A relative pose may be adequate for a tracking map, as the map may be relative to a coordinate system local to a device established based on the initial pose of the device when construction of the tracking map was initiated.

Not all of the feature points and image frames collected by a device may be retained as part of the tracking map, as much of the information collected with the sensors is likely to be redundant. Rather, only certain frames may be added to the map. Those frames may be selected based on one or more criteria, such as degree of overlap with image frames already in the map, the number of new features they contain or a quality metric for the features in the frame. Image frames not added to the tracking map may be discarded or may be used to revise the location of features. As a further alternative, all or most of the image frames, represented as a set of features may be retained, but a subset of those frames may be designated as key frames, which are used for further processing.

The key frames may be processed to produce keyrigs 704. The key frames may be processed to produce three dimensional sets of feature points and saved as keyrigs 704. Such processing may entail, for example, comparing image frames derived simultaneously from two cameras to stereoscopically determine the 3D position of feature points. Metadata may be associated with these keyframes and/or keyrigs, such as poses.

The environment maps may have any of multiple formats depending on, for example, the storage locations of an environment map including, for example, local storage of AR devices and remote storage. For example, a map in remote storage may have higher resolution than a map in local storage on a wearable device where memory is limited. To send a higher resolution map from remote storage to local storage, the map may be down sampled or otherwise converted to an appropriate format, such as by reducing the number of poses per area of the physical world stored in the map and/or the number of feature points stored for each pose. In some embodiments, a slice or portion of a high resolution map from remote storage may be sent to local storage, where the slice or portion is not down sampled.

A database of environment maps may be updated as new tracking maps are created. To determine which of a potentially very large number of environment maps in a database is to be updated, updating may include efficiently selecting one or more environment maps stored in the database relevant to the new tracking map. The selected one or more environment maps may be ranked by relevance and one or more of the highest ranking maps may be selected for processing to merge higher ranked selected environment maps with the new tracking map to create one or more updated environment maps. When a new tracking map represents a portion of the physical world for which there is no preexisting environment map to update, that tracking map may be stored in the database as a new environment map.

View Independent Display

Described herein are methods and apparatus for providing virtual contents using an XR system, independent of locations of eyes viewing the virtual content. Conventionally, a virtual content is re-rendered upon any motion of the displaying system. For example, if a user wearing a display system views a virtual representation of a three-dimensional (3D) object on the display and walks around the area where the 3D object appears, the 3D object should be re-rendered for each viewpoint such that the user has the perception that he or she is walking around an object that occupies real space. However, the re-rendering consumes significant computational resources of a system and causes artifacts due to latency.

The inventors have recognized and appreciated that head pose (e.g., the location and orientation of a user wearing an XR system) may be used to render a virtual content independent of eye rotations within a head of the user. In some embodiments, dynamic maps of a scene may be generated based on multiple coordinate frames in real space across one or more sessions such that virtual contents interacting with the dynamic maps may be rendered robustly, independent of eye rotations within the head of the user and/or independent of sensor deformations caused by, for example, heat generated during high-speed, computation-intensive operation. In some embodiments, the configuration of multiple coordinate frames may enable a first XR device worn by a first user and a second XR device worn by a second user to recognize a common location in a scene. In some embodiments, the configuration of multiple coordinate frames may enable users wearing XR devices to view a virtual content in a same location of a scene.

In some embodiments, a tracking map may be built in a world coordinate frame, which may have a world origin. The world origin may be the first pose of an XR device when the XR device is powered on. The world origin may be aligned to gravity such that a developer of an XR application can get gravity alignment without extra work. Different tracking maps may be built in different world coordinate frames because the tracking maps may be captured by a same XR device at different sessions and/or different XR devices worn by different users. In some embodiments, a session of an XR device may span from powering on to powering off the device. In some embodiments, an XR device may have a head coordinate frame, which may have a head origin. The head origin may be the current pose of an XR device when an image is taken. The difference between head pose of a world coordinate frame and of a head coordinate frame may be used to estimate a tracking route.

In some embodiments, an XR device may have a camera coordinate frame, which may have a camera origin. The camera origin may be the current pose of one or more sensors of an XR device. The inventors have recognized and appreciated that the configuration of a camera coordinate frame enables robust displaying virtual contents independent of eye rotation within a head of a user. This configuration also enables robust displaying of virtual contents independent of sensor deformation due to, for example, heat generated during operation.

In some embodiments, an XR device may have a head unit with a head-mountable frame that a user can secure to their head and may include two waveguides, one in front of each eye of the user. The waveguides may be transparent so that ambient light from real-world objects can transmit through the waveguides and the user can see the real-world objects. Each waveguide may transmit projected light from a projector to a respective eye of the user. The projected light may form an image on the retina of the eye. The retina of the eye thus receives the ambient light and the projected light. The user may simultaneously see real-world objects and one or more virtual objects that are created by the projected light.

In some embodiments, XR devices may have sensors that detect real-world objects around a user. These sensors may, for example, be cameras that capture images that may be processed to identify the locations of real-world objects.

In some embodiments, an XR system may assign a coordinate frame to a virtual content, as opposed to attaching the virtual content in a world coordinate frame. Such configuration enables a virtual content to be described without regard to where it is rendered for a user, but it may be attached to a more persistent frame position such as a persistent coordinate frame (PCF) described in relation to, for example, FIGS. 14-20C, to be rendered in a specified location. When the locations of the objects change, the XR device may detect the changes in the environment map and determine movement of the head unit worn by the user relative to real-world objects.

Figure 8:
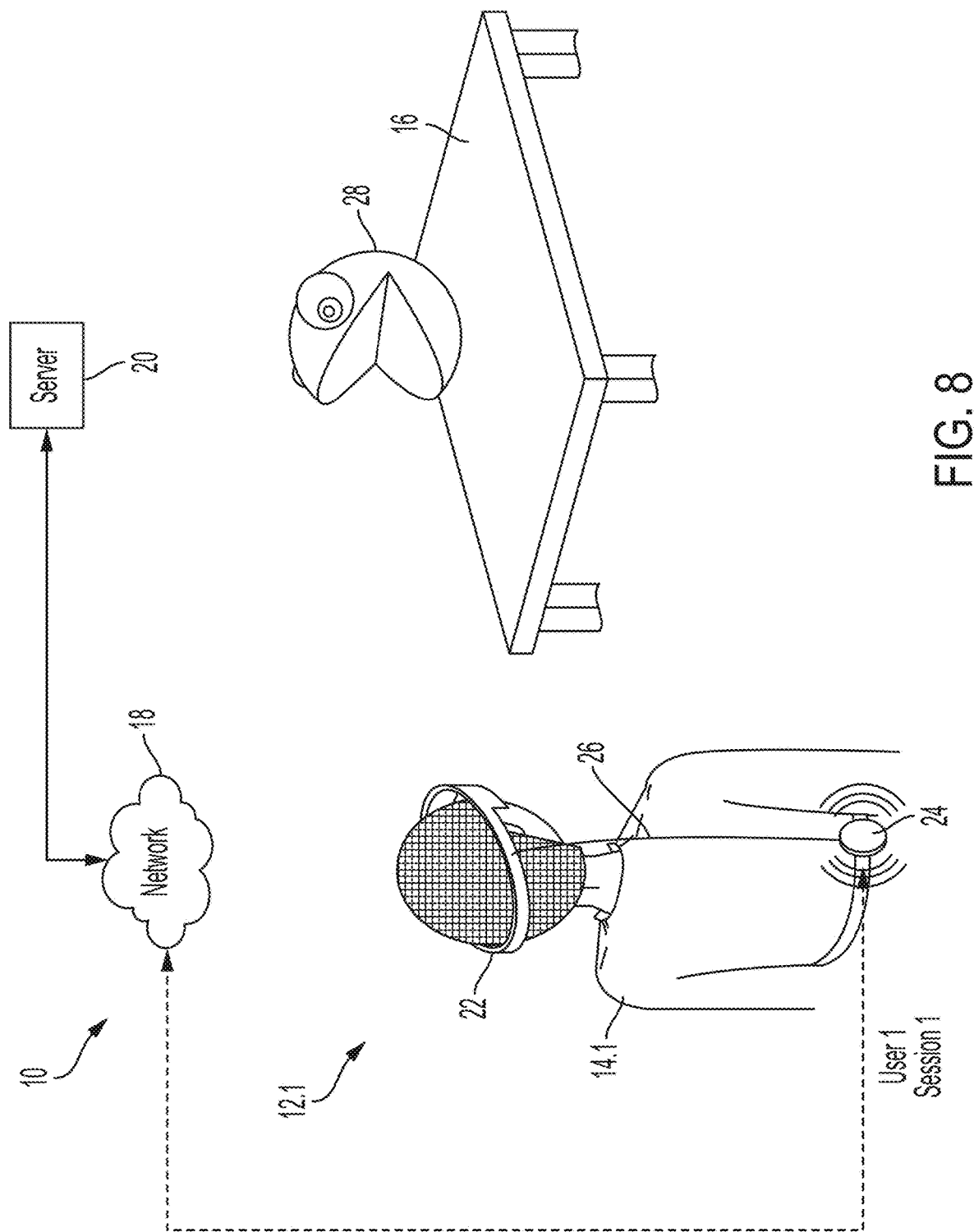
FIG. 8 is a schematic diagram illustrating a user of a cross reality (XR) system, perceiving virtual content, according to some embodiments.

FIG. 8 illustrates a user experiencing virtual content, as rendered by an XR system 10, in a physical environment, according to some embodiments. The XR system may include a first XR device 12.1 that is worn by a first user 14.1, a network 18 and a server 20. The user 14.1 is in a physical environment with a real object in the form of a table 16.

In the illustrated example, the first XR device 12.1 includes a head unit 22, a belt pack 24 and a cable connection 26. The first user 14.1 secures the head unit 22 to their head and the belt pack 24 remotely from the head unit 22 on their waist. The cable connection 26 connects the head unit 22 to the belt pack 24. The head unit 22 includes technologies that are used to display a virtual object or objects to the first user 14.1 while the first user 14.1 is permitted to see real objects such as the table 16. The belt pack 24 includes primarily processing and communications capabilities of the first XR device 12.1. In some embodiments, the processing and communication capabilities may reside entirely or partially in the head unit 22 such that the belt pack 24 may be removed or may be located in another device such as a backpack.

In the illustrated example, the belt pack 24 is connected via a wireless connection to the network 18. The server 20 is connected to the network 18 and holds data representative of local content. The belt pack 24 downloads the data representing the local content from the server 20 via the network 18. The belt pack 24 provides the data via the cable connection 26 to the head unit 22. The head unit 22 may include a display that has a light source, for example, a laser light source or a light emitting diode (LED), and a waveguide that guides the light.

In some embodiments, the first user 14.1 may mount the head unit 22 to their head and the belt pack 24 to their waist. The belt pack 24 may download image data representing virtual content over the network 18 from the server 20. The first user 14.1 may see the table 16 through a display of the head unit 22. A projector forming part of the head unit 22 may receive the image data from the belt pack 24 and generate light based on the image data. The light may travel through one or more of the waveguides forming part of the display of the head unit 22. The light may then leave the waveguide and propagates onto a retina of an eye of the first user 14.1. The projector may generate the light in a pattern that is replicated on a retina of the eye of the first user 14.1. The light that falls on the retina of the eye of the first user 14.1 may have a selected field of depth so that the first user 14.1 perceives an image at a preselected depth behind the waveguide. In addition, both eyes of the first user 14.1 may receive slightly different images so that a brain of the first user 14.1 perceives a three-dimensional image or images at selected distances from the head unit 22. In the illustrated example, the first user 14.1 perceives a virtual content 28 above the table 16. The proportions of the virtual content 28 and its location and distance from the first user 14.1 are determined by the data representing the virtual content 28 and various coordinate frames that are used to display the virtual content 28 to the first user 14.1.

In the illustrated example, the virtual content 28 is not visible from the perspective of the drawing and is visible to the first user 14.1 through using the first XR device 12.1. The virtual content 28 may initially reside as data structures within vision data and algorithms in the belt pack 24. The data structures may then manifest themselves as light when the projectors of the head unit 22 generate light based on the data structures. It should be appreciated that although the virtual content 28 has no existence in three-dimensional space in front of the first user 14.1, the virtual content 28 is still represented in FIG. 1 in three-dimensional space for illustration of what a wearer of head unit 22 perceives. The visualization of computer data in three-dimensional space may be used in this description to illustrate how the data structures that facilitate the renderings are perceived by one or more users relate to one another within the data structures in the belt pack 24.

Figure 9:
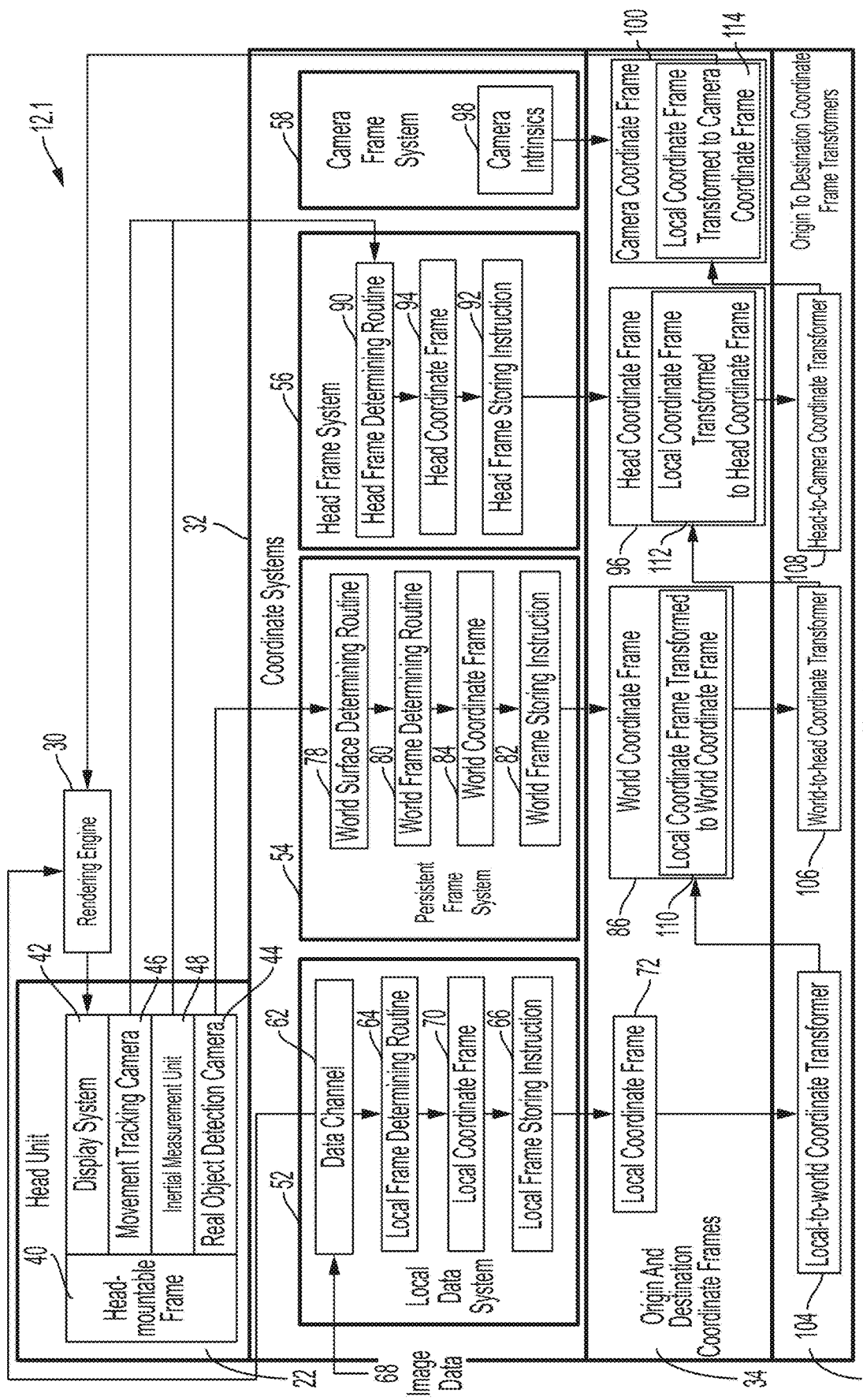
FIG. 9 is a block diagram of components of a first XR device of the XR system of FIG. 8 that transform between coordinate systems, according to some embodiments.

FIG. 9 illustrates components of the first XR device 12.1, according to some embodiments. The first XR device 12.1 may include the head unit 22, and various components forming part of the vision data and algorithms including, for example, a rendering engine 30, various coordinate systems 32, various origin and destination coordinate frames 34, and various origin to destination coordinate frame transformers 36. The various coordinate systems may be based on intrinsics of to the XR device or may be determined by reference to other information, such as a persistent pose or a persistent coordinate system, as described herein.

The head unit 22 may include a head-mountable frame 40, a display system 42, a real object detection camera 44, a movement tracking camera 46, and an inertial measurement unit 48.

The head-mountable frame 40 may have a shape that is securable to the head of the first user 14.1 in FIG. 8. The display system 42, real object detection camera 44, movement tracking camera 46, and inertial measurement unit 48 may be mounted to the head-mountable frame 40 and therefore move together with the head-mountable frame 40.

The coordinate systems 32 may include a local data system 52, a world frame system 54, a head frame system 56, and a camera frame system 58.

The local data system 52 may include a data channel 62, a local frame determining routine 64 and a local frame storing instruction 66. The data channel 62 may be an internal software routine, a hardware component such as an external cable or a radio frequency receiver, or a hybrid component such as a port that is opened up. The data channel 62 may be configured to receive image data 68 representing a virtual content.

The local frame determining routine 64 may be connected to the data channel 62. The local frame determining routine 64 may be configured to determine a local coordinate frame 70. In some embodiments, the local frame determining routine may determine the local coordinate frame based on real world objects or real world locations. In some embodiments, the local coordinate frame may be based on a top edge relative to a bottom edge of a browser window, head or feet of a character, a node on an outer surface of a prism or bounding box that encloses the virtual content, or any other suitable location to place a coordinate frame that defines a facing direction of a virtual content and a location (e.g. a node, such as a placement node or PCF node) with which to place the virtual content, etc.

The local frame storing instruction 66 may be connected to the local frame determining routine 64. One skilled in the art will understand that software modules and routines are "connected" to one another through subroutines, calls, etc. The local frame storing instruction 66 may store the local coordinate frame 70 as a local coordinate frame 72 within the origin and destination coordinate frames 34. In some embodiments, the origin and destination coordinate frames 34 may be one or more coordinate frames that may be manipulated or transformed in order for a virtual content to persist between sessions. In some embodiments, a session may be the period of time between a boot-up and shut-down of an XR device. Two sessions may be two start-up and shut-down periods for a single XR device, or may be a start-up and shut-down for two different XR devices.

In some embodiments, the origin and destination coordinate frames 34 may be the coordinate frames involved in one or more transformations required in order for a first user's XR device and a second user's XR device to recognize a common location. In some embodiments, the destination coordinate frame may be the output of a series of computations and transformations applied to the target coordinate frame in order for a first and second user to view a virtual content in the same location.

The rendering engine 30 may be connected to the data channel 62. The rendering engine 30 may receive the image data 68 from the data channel 62 such that the rendering engine 30 may render virtual content based, at least in part, on the image data 68.

The display system 42 may be connected to the rendering engine 30. The display system 42 may include components that transform the image data 68 into visible light. The visible light may form two patterns, one for each eye. The visible light may enter eyes of the first user 14.1 in FIG. 8 and may be detected on retinas of the eyes of the first user 14.1.

The real object detection camera 44 may include one or more cameras that may capture images from different sides of the head-mountable frame 40. The movement tracking camera 46 may include one or more cameras that capture images on sides of the head-mountable frame 40. One set of one or more cameras may be used instead of the two sets of one or more cameras representing the real object detection camera(s) 44 and the movement tracking camera(s) 46. In some embodiments, the cameras 44, 46 may capture images. As described above these cameras may collect data that is used to construct a tacking map.

The inertial measurement unit 48 may include a number of devices that are used to detect movement of the head unit 22. The inertial measurement unit 48 may include a gravitation sensor, one or more accelerometers and one or more gyroscopes. The sensors of the inertial measurement unit 48, in combination, track movement of the head unit 22 in at least three orthogonal directions and about at least three orthogonal axes.

In the illustrated example, the world frame system 54 includes a world surface determining routine 78, a world frame determining routine 80, and a world frame storing instruction 82. The world surface determining routine 78 is connected to the real object detection camera 44. The world surface determining routine 78 receives images and/or key frames based on the images that are captured by the real object detection camera 44 and processes the images to identify surfaces in the images. A depth sensor (not shown) may determine distances to the surfaces. The surfaces are thus represented by data in three dimensions including their sizes, shapes, and distances from the real object detection camera.

In some embodiments, a world coordinate frame 84 may be based on the origin at the initialization of the head pose session. In some embodiments, the world coordinate frame may be located where the device was booted up, or could be somewhere new if head pose was lost during the boot session. In some embodiments, the world coordinate frame may be the origin at the start of a head pose session.

In the illustrated example, the world frame determining routine 80 is connected to the world surface determining routine 78 and determines a world coordinate frame 84 based on the locations of the surfaces as determined by the world surface determining routine 78. The world frame storing instruction 82 is connected to the world frame determining routine 80 to receive the world coordinate frame 84 from the world frame determining routine 80. The world frame storing instruction 82 stores the world coordinate frame 84 as a world coordinate frame 86 within the origin and destination coordinate frames 34.

The head frame system 56 may include a head frame determining routine 90 and a head frame storing instruction 92. The head frame determining routine 90 may be connected to the movement tracking camera 46 and the inertial measurement unit 48. The head frame determining routine 90 may use data from the movement tracking camera 46 and the inertial measurement unit 48 to calculate a head coordinate frame 94. For example, the inertial measurement unit 48 may have a gravitation sensor that determines the direction of gravitational force relative to the head unit 22. The movement tracking camera 46 may continually capture images that are used by the head frame determining routine 90 to refine the head coordinate frame 94. The head unit 22 moves when the first user 14.1 in FIG. 8 moves their head. The movement tracking camera 46 and the inertial measurement unit 48 may continuously provide data to the head frame determining routine 90 so that the head frame determining routine 90 can update the head coordinate frame 94.

The head frame storing instruction 92 may be connected to the head frame determining routine 90 to receive the head coordinate frame 94 from the head frame determining routine 90. The head frame storing instruction 92 may store the head coordinate frame 94 as a head coordinate frame 96 among the origin and destination coordinate frames 34. The head frame storing instruction 92 may repeatedly store the updated head coordinate frame 94 as the head coordinate frame 96 when the head frame determining routine 90 recalculates the head coordinate frame 94. In some embodiments, the head coordinate frame may be the location of the wearable XR device 12.1 relative to the local coordinate frame 72.

The camera frame system 58 may include camera intrinsics 98. The camera intrinsics 98 may include dimensions of the head unit 22 that are features of its design and manufacture. The camera intrinsics 98 may be used to calculate a camera coordinate frame 100 that is stored within the origin and destination coordinate frames 34.

In some embodiments, the camera coordinate frame 100 may include all pupil positions of a left eye of the first user 14.1 in FIG. 8. When the left eye moves from left to right or up and down, the pupil positions of the left eye are located within the camera coordinate frame 100. In addition, pupil positions of a right eye are located within a camera coordinate frame 100 for the right eye. In some embodiments, the camera coordinate frame 100 may include the location of the camera relative to the local coordinate frame when an image is taken.

The origin to destination coordinate frame transformers 36 may include a local-to-world coordinate transformer 104, a world-to-head coordinate transformer 106, and a head-to-camera coordinate transformer 108. The local-to-world coordinate transformer 104 may receive the local coordinate frame 72 and transform the local coordinate frame 72 to the world coordinate frame 86. The transformation of the local coordinate frame 72 to the world coordinate frame 86 may be represented as a local coordinate frame transformed to world coordinate frame 110 within the world coordinate frame 86.

The world-to-head coordinate transformer 106 may transform from the world coordinate frame 86 to the head coordinate frame 96. The world-to-head coordinate transformer 106 may transform the local coordinate frame transformed to world coordinate frame 110 to the head coordinate frame 96. The transformation may be represented as a local coordinate frame transformed to head coordinate frame 112 within the head coordinate frame 96.

The head-to-camera coordinate transformer 108 may transform from the head coordinate frame 96 to the camera coordinate frame 100. The head-to-camera coordinate transformer 108 may transform the local coordinate frame transformed to head coordinate frame 112 to a local coordinate frame transformed to camera coordinate frame 114 within the camera coordinate frame 100. The local coordinate frame transformed to camera coordinate frame 114 may be entered into the rendering engine 30. The rendering engine 30 may render the image data 68 representing the local content 28 based on the local coordinate frame transformed to camera coordinate frame 114.

Figure 10:
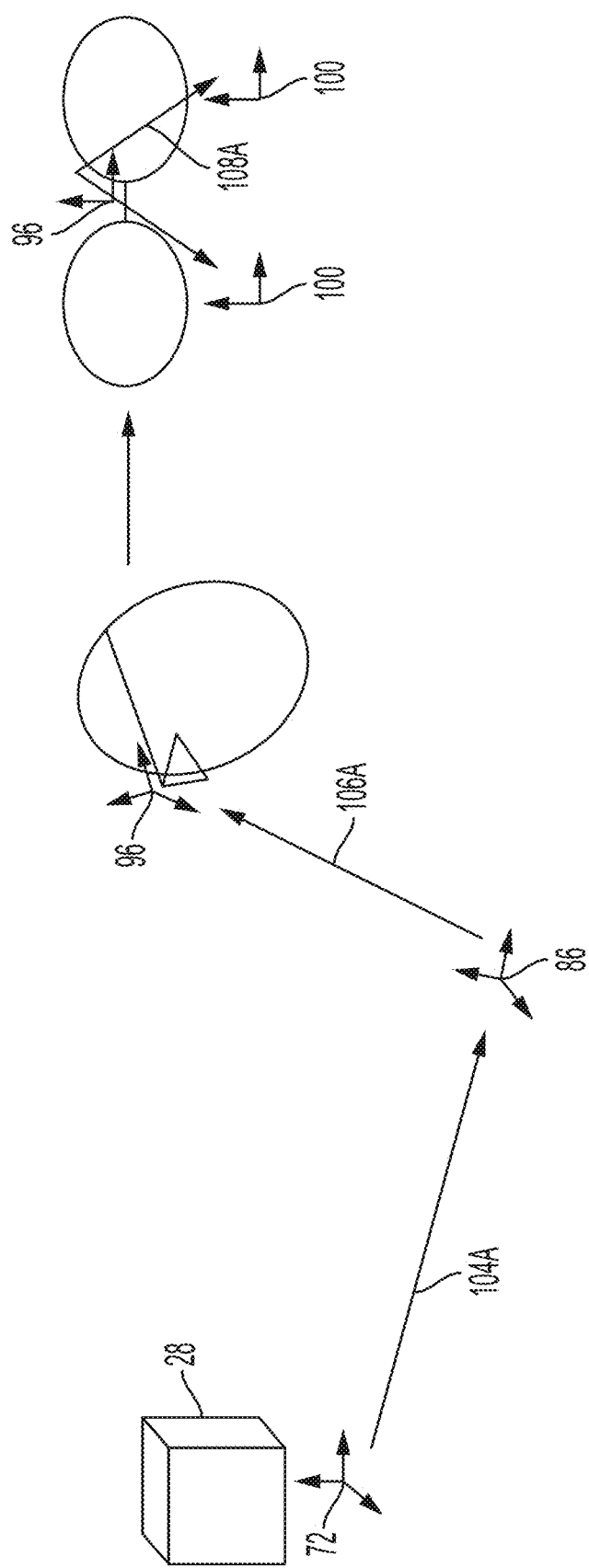
FIG. 10 is a schematic diagram illustrating an exemplary transformation of origin coordinate frames into destination coordinate frames in order to correctly render local XR content, according to some embodiments.

FIG. 10 is a spatial representation of the various origin and destination coordinate frames 34. The local coordinate frame 72, world coordinate frame 86, head coordinate frame 96, and camera coordinate frame 100 are represented in the figure. In some embodiments, the local coordinate frame associated with the XR content 28 may have a position and rotation (e.g. may provide a node and facing direction) relative to a local and/or world coordinate frame and/or PCF when the virtual content is placed in the real world so the virtual content may be viewed by the user. Each camera may have its own camera coordinate frame 100 encompassing all pupil positions of one eye. Reference numerals 104A and 106A represent the transformations that are made by the local-to-world coordinate transformer 104, world-to-head coordinate transformer 106, and head-to-camera coordinate transformer 108 in FIG. 9, respectively.

Figure 11:
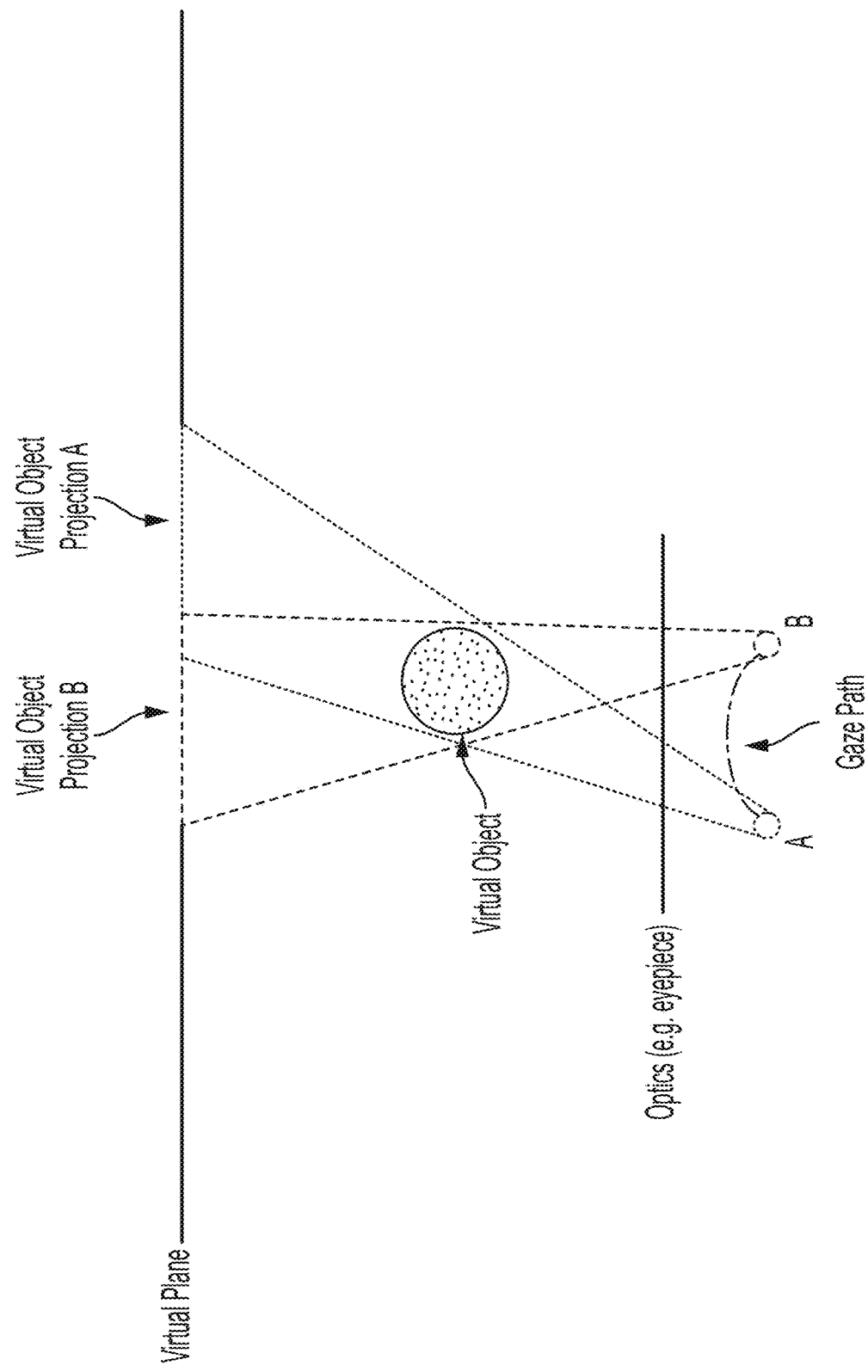
FIG. 11 is a top plan view illustrating pupil-based coordinate frames, according to some embodiments.

FIG. 11 depicts a camera render protocol for transforming from a head coordinate frame to a camera coordinate frame, according to some embodiments. In the illustrated example, a pupil for a single eye moves from position A to B. A virtual object that is meant to appear stationary will project onto a depth plane at one of the two positions A or B depending on the position of the pupil (assuming that the camera is configured to use a pupil-based coordinate frame). As a result, using a pupil coordinate frame transformed to a head coordinate frame will cause jitter in a stationary virtual object as the eye moves from position A to position B. This situation is referred to as view dependent display or projection.

Figure 12:
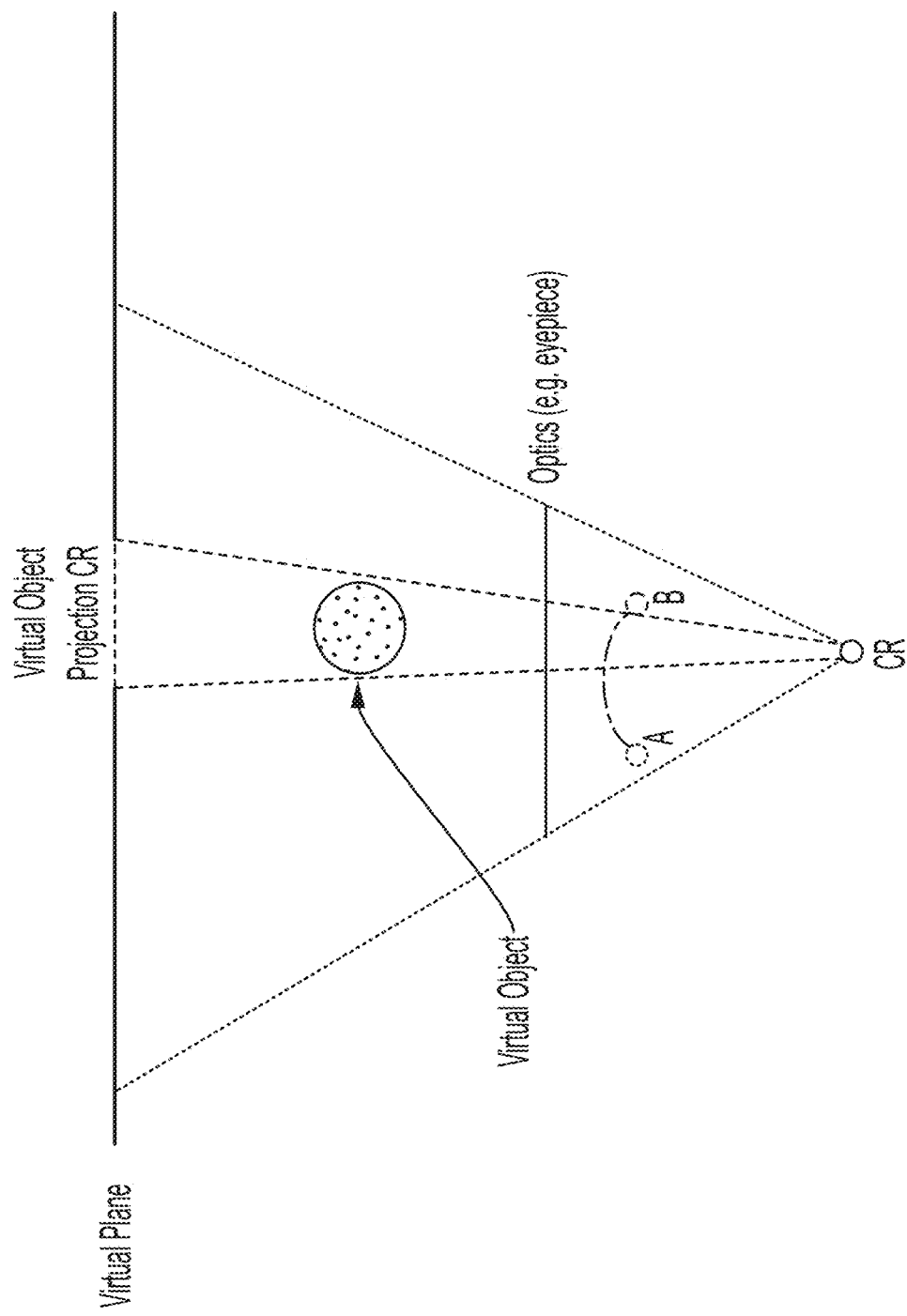
FIG. 12 is a top plan view illustrating a camera coordinate frame that includes all pupil positions, according to some embodiments.

As depicted in FIG. 12, a camera coordinate frame (e.g., CR) is positioned and encompasses all pupil positions and object projection will now be consistent regardless of pupil positions A and B. The head coordinate frame transforms to the CR frame, which is referred to as view independent display or projection. An image reprojection may be applied to the virtual content to account for a change in eye position, however, as the rendering is still in the same position, jitter is minimized.

Figure 13:
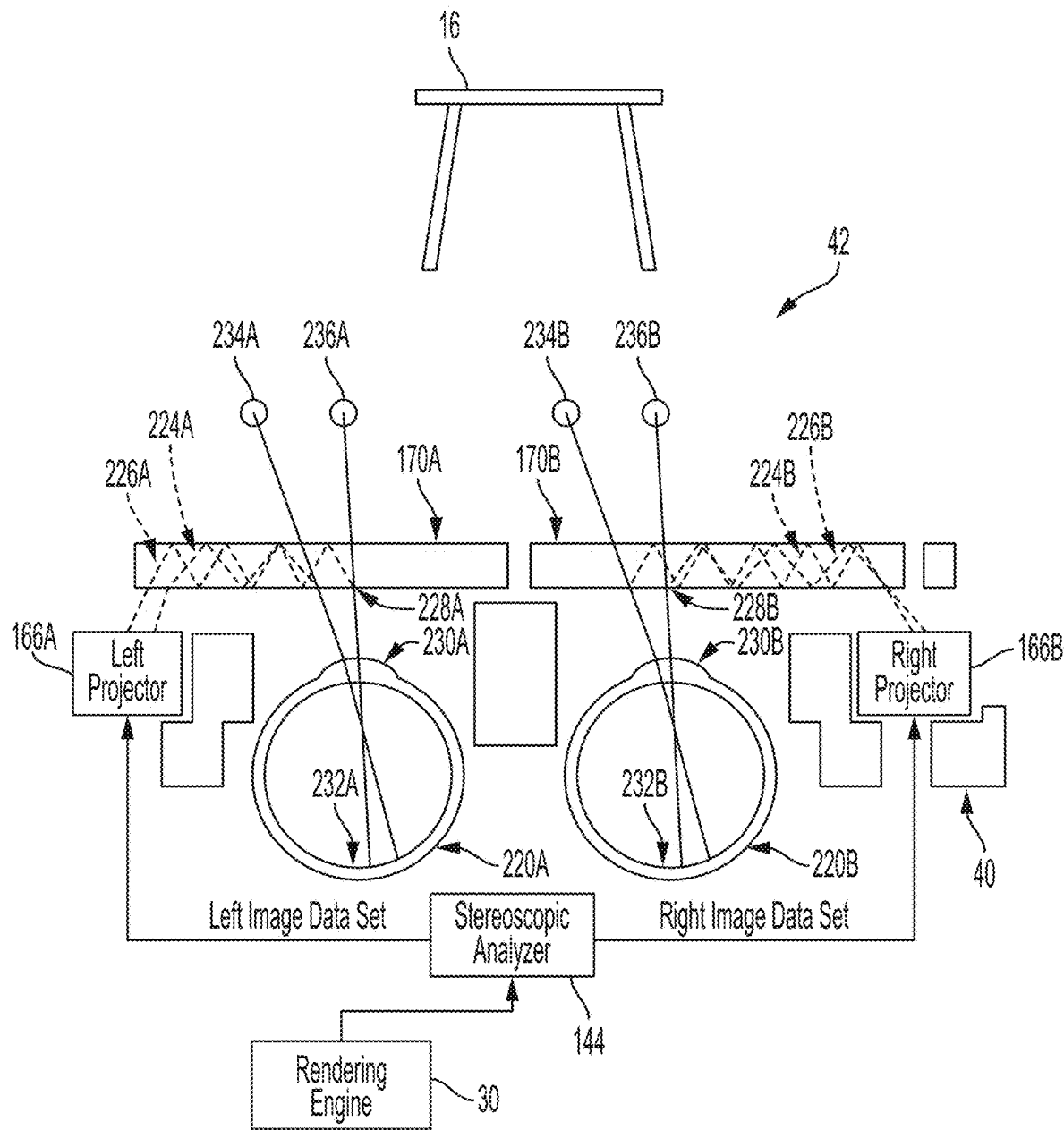
FIG. 13 is a schematic diagram of the display system of FIG. 9, according to some embodiments.

FIG. 13 illustrates the display system 42 in more detail. The display system 42 includes a stereoscopic analyzer 144 that is connected to the rendering engine 30 and forms part of the vision data and algorithms.

The display system 42 further includes left and right projectors 166A and 166B and left and right waveguides 170A and 170B. The left and right projectors 166A and 166B are connected to power supplies. Each projector 166A and 166B has a respective input for image data to be provided to the respective projector 166A or 166B. The respective projector 166A or 166B, when powered, generates light in two-dimensional patterns and emanates the light therefrom. The left and right waveguides 170A and 170B are positioned to receive light from the left and right projectors 166A and 166B, respectively. The left and right waveguides 170A and 170B are transparent waveguides.

In use, a user mounts the head mountable frame 40 to their head. Components of the head mountable frame 40 may, for example, include a strap (not shown) that wraps around the back of the head of the user. The left and right waveguides 170A and 170B are then located in front of left and right eyes 220A and 220B of the user.

The rendering engine 30 enters the image data that it receives into the stereoscopic analyzer 144. The image data is three-dimensional image data of the local content 28 in FIG. 8. The image data is projected onto a plurality of virtual planes. The stereoscopic analyzer 144 analyzes the image data to determine left and right image data sets based on the image data for projection onto each depth plane. The left and right image data sets are data sets that represent two-dimensional images that are projected in three-dimensions to give the user a perception of a depth.

The stereoscopic analyzer 144 enters the left and right image data sets into the left and right projectors 166A and 166B. The left and right projectors 166A and 166B then create left and right light patterns. The components of the display system 42 are shown in plan view, although it should be understood that the left and right patterns are two-dimensional patterns when shown in front elevation view. Each light pattern includes a plurality of pixels. For purposes of illustration, light rays 224A and 226A from two of the pixels are shown leaving the left projector 166A and entering the left waveguide 170A. The light rays 224A and 226A reflect from sides of the left waveguide 170A. It is shown that the light rays 224A and 226A propagate through internal reflection from left to right within the left waveguide 170A, although it should be understood that the light rays 224A and 226A also propagate in a direction into the paper using refractory and reflective systems.

The light rays 224A and 226A exit the left light waveguide 170A through a pupil 228A and then enter a left eye 220A through a pupil 230A of the left eye 220A. The light rays 224A and 226A then fall on a retina 232A of the left eye 220A. In this manner, the left light pattern falls on the retina 232A of the left eye 220A. The user is given the perception that the pixels that are formed on the retina 232A are pixels 234A and 236A that the user perceives to be at some distance on a side of the left waveguide 170A opposing the left eye 220A. Depth perception is created by manipulating the focal length of the light.

In a similar manner, the stereoscopic analyzer 144 enters the right image data set into the right projector 166B. The right projector 166B transmits the right light pattern, which is represented by pixels in the form of light rays 224B and 226B. The light rays 224B and 226B reflect within the right waveguide 170B and exit through a pupil 228B. The light rays 224B and 226B then enter through a pupil 230B of the right eye 220B and fall on a retina 232B of a right eye 220B. The pixels of the light rays 224B and 226B are perceived as pixels 134B and 236B behind the right waveguide 170B.

The patterns that are created on the retinas 232A and 232B are individually perceived as left and right images. The left and right images differ slightly from one another due to the functioning of the stereoscopic analyzer 144. The left and right images are perceived in a mind of the user as a three-dimensional rendering.

As mentioned, the left and right waveguides 170A and 170B are transparent. Light from a real-life object such as the table 16 on a side of the left and right waveguides 170A and 170B opposing the eyes 220A and 220B can project through the left and right waveguides 170A and 170B and fall on the retinas 232A and 232B.

Persistent Coordinate Frame (PCF)

Described herein are methods and apparatus for providing spatial persistence across user instances within a shared space. Without spatial persistence, virtual content placed in the physical world by a user in a session may not exist or may be misplaced in the user's view in a different session. Without spatial persistence, virtual content placed in the physical world by one user may not exist or may be out of place in a second user's view, even if the second user is intended to be sharing an experience of the same physical space with the first user.

The inventors have recognized and appreciated that spatial persistence may be provided through persistent coordinate frames (PCFs). A PCF may be defined based on one or more points, representing features recognized in the physical world (e.g., corners, edges). The features may be selected such that they are likely to be the same from a user instance to another user instance of an XR system.

Further, drift during tracking, which causes the computed tracking path (e.g., camera trajectory) to deviate from the actual tracking path, can cause the location of virtual content, when rendered with respect to a local map that is based solely on a tracking map to appear out of place. A tracking map for the space may be refined to correct the drifts as an XR device collects more information of the scene overtime. However, if virtual content is placed on a real object before a map refinement and saved with respect to the world coordinate frame of the device derived from the tracking map, the virtual content may appear displaced, as if the real object has been moved during the map refinement. PCFs may be updated according to map refinement because the PCFs are defined based on the features and are updated as the features move during map refinements.

In some embodiments, persistent spatial information may be represented in a way that may be readily shared among users and among the distributed components, including applications. Information about the physical world, for example, may be represented as persistent coordinate frames (PCFs). A PCF may be defined based on one or more points that represent features recognized in the physical world. The features may be selected such that they are likely to be the same from user session to user session of the XR system. PCFs may exist sparsely, providing less than all of the available information about the physical world, such that they may be efficiently processed and transferred. Techniques for processing persistent spatial information may include creating dynamic maps based on one or more coordinate systems in real space across one or more sessions, and generating persistent coordinate frames (PCF) over the sparse maps, which may be exposed to XR applications via, for example, an application programming interface (API). These capabilities may be supported by techniques for ranking and merging multiple maps created by one or more XR devices. Persistent spatial information may also enable quickly recovering and resetting head poses on each of one or more XR devices in a computationally efficient way.

A PCF may comprise six degrees of freedom with translations and rotations relative to a map coordinate system. A PCF may be stored in a local and/or remote storage medium. The translations and rotations of a PCF may be computed relative to a map coordinate system depending on, for example, the storage location. For example, a PCF used locally by a device may have translations and rotations relative to a world coordinate frame of the device. A PCF in the cloud may have translations and rotations relative to a canonical coordinate frame of a canonical map.

PCFs may provide a sparse representation of the physical world, providing less than all of the available information about the physical world, such that they may be efficiently processed and transferred. Techniques for processing persistent spatial information may include creating dynamic maps based on one or more coordinate systems in real space across one or more sessions, generating persistent coordinate frames (PCF) over the sparse maps, which may be exposed to XR applications via, for example, an application programming interface (API).

Figure 14:
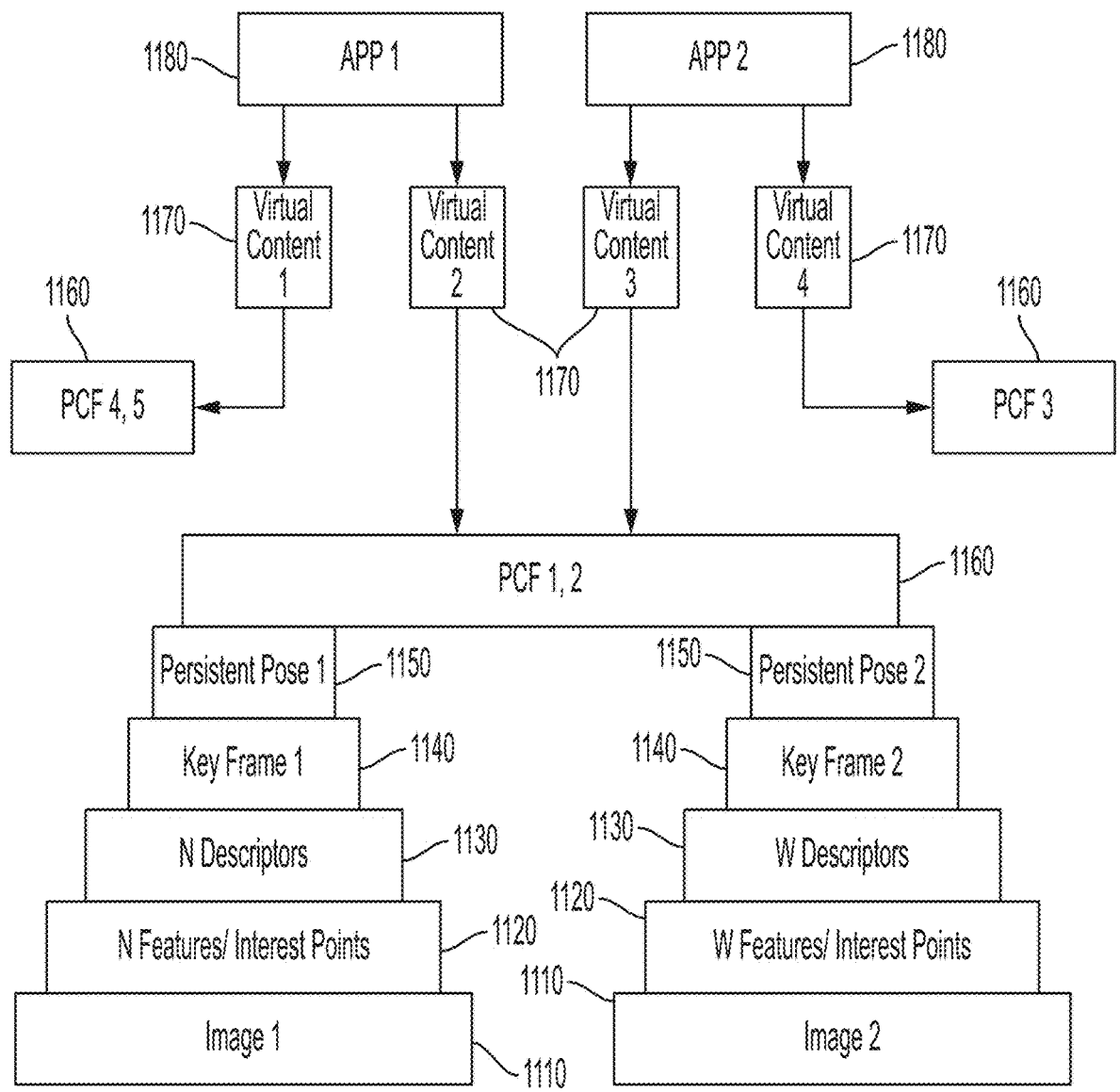
FIG. 14 is a block diagram illustrating the creation of a persistent coordinate frame (PCF) and the attachment of XR content to the PCF, according to some embodiments.

FIG. 14 is a block diagram illustrating the creation of a persistent coordinate frame (PCF) and the attachment of XR content to the PCF, according to some embodiments. Each block may represent digital information stored in a computer memory. In the case of applications 1180, the data may represent computer-executable instructions. In the case of virtual content 1170, the digital information may define a virtual object, as specified by the application 1180, for example. In the case of the other boxes, the digital information may characterize some aspect of the physical world.

In the illustrated embodiment, one or more PCFs are created from images captured with sensors on a wearable device. In the embodiment of FIG. 14, the sensors are visual image cameras. These cameras may be the same cameras used for forming a tracking map. Accordingly, some of the processing suggested by FIG. 14 may be performed as part of updating a tracking map. However, FIG. 14 illustrates that information that provides persistence is generated in addition to the tracking map.

In order to derive a 3D PCF, two images 1110 from two cameras mounted to a wearable device in a configuration that enables stereoscopic image analysis are processed together. FIG. 14 illustrates an Image 1 and an Image 2, each derived from one of the cameras. A single image from each camera is illustrated for simplicity. However, each camera may output a stream of image frames and the processing illustrated in FIG. 14 may be performed for multiple image frames in the stream.

Accordingly, Image 1 and Image 2 may each be one frame in a sequence of image frames. Processing as depicted in FIG. 14 may be repeated on successive image frames in the sequence until image frames containing feature points providing a suitable image from which to form persistent spatial information is processed. Alternatively or additionally, the processing of FIG. 14 might be repeated as a user moves such that the user is no longer close enough to a previously identified PCF to reliably use that PCF for determining positions with respect to the physical world. For example, an XR system may maintain a current PCF for a user. When that distance exceeds a threshold, the system may switch to a new current PCF, closer to the user, which may be generated according to the process of FIG. 14, using image frames acquired in the user's current location.

Even when generating a single PCF, a stream of image frames may be processed to identify image frames depicting content in the physical world that is likely stable and can be readily identified by a device in the vicinity of the region of the physical world depicted in the image frame. In the embodiment of FIG. 14, this processing begins with the identification of features 1120 in the image. Features may be identified, for example, by finding locations of gradients in the image above a threshold or other characteristics, which may correspond to a corner of an object, for example. In the embodiment illustrated, the features are points, but other recognizable features, such as edges, may alternatively or additionally be used.

In the embodiment illustrated, a fixed number, N, of features 1120 are selected for further processing. Those feature points may be selected based on one or more criteria, such as magnitude of the gradient, or proximity to other feature points. Alternatively or additionally, the feature points may be selected heuristically, such as based on characteristics that suggest the feature points are persistent. For example, heuristics may be defined based on the characteristics of feature points that likely correspond to a corner of a window or a door or a large piece of furniture. Such heuristics may take into account the feature point itself and what surrounds it. As a specific example, the number of feature points per image may be between 100 and 500 or between 150 and 250, such as 200.

Regardless of the number of feature points selected, descriptors 1130 may be computed for the feature points. In this example, a descriptor is computed for each selected feature point, but a descriptor may be computed for groups of feature points or for a subset of the feature points or for all features within an image. The descriptor characterizes a feature point such that feature points representing the same object in the physical world are assigned similar descriptors. The descriptors may facilitate alignment of two frames, such as may occur when one map is localized with respect to another. Rather than searching for a relative orientation of the frames that minimizes the distance between feature points of the two images, an initial alignment of the two frames may be made by identifying feature points with similar descriptors. Alignment of the image frames may be based on aligning points with similar descriptors, which may entail less processing than computing an alignment of all the feature points in the images.

The descriptors may be computed as a mapping of the feature points or, in some embodiments a mapping of a patch of an image around a feature point, to a descriptor. The descriptor may be a numeric quantity. U.S. patent application Ser. No. 16/190,948 describes computing descriptors for feature points and is hereby incorporated herein by reference in its entirety.

In the example of FIG. 14, a descriptor 1130 is computed for each feature point in each image frame. Based on the descriptors and/or the feature points and/or the image itself, the image frame may be identified as a key frame 1140. In the embodiment illustrated, a key frame is an image frame meeting certain criteria that is then selected for further processing. In making a tracking map, for example, image frames that add meaningful information to the map may be selected as key frames that are integrated into the map. On the other hand, image frames that substantially overlap a region for which an image frame has already been integrated into the map may be discarded such that they do not become key frames. Alternatively or additionally, key frames may be selected based on the number and/or type of feature points in the image frame. In the embodiment of FIG. 14, key frames 1150 selected for inclusion in a tracking map may also be treated as key frames for determining a PCF, but different or additional criteria for selecting key frames for generation of a PCF may be used.

Though FIG. 14 shows that a key frame is used for further processing, information acquired from an image may be processed in other forms. For example, the feature points, such as in a key rig, may alternatively or additionally be processed. Moreover, though a key frame is described as being derived from a single image frame, it is not necessary that there be a one to one relationship between a key frame and an acquired image frame. A key frame, for example, may be acquired from multiple image frames, such as by stitching together or aggregating the image frames such that only features appearing in multiple images are retained in the key frame.

A key frame may include image information and/or metadata associated with the image information. In some embodiments, images captured by the cameras 44, 46 (FIG. 9) may be computed into one or more key frames (e.g., key frames 1, 2). In some embodiments, a key frame may include a camera pose. In some embodiments, a key frame may include one or more camera images captured at the camera pose. In some embodiments, an XR system may determine a portion of the camera images captured at the camera pose as not useful and thus not include the portion in a key frame. Therefore, using key frames to align new images with earlier knowledge of a scene reduces the use of computational resource of the XR system. In some embodiments, a key frame may include an image, and/or image data, at a location with a direction/angle. In some embodiments, a key frame may include a location and a direction from which one or more map points may be observed. In some embodiments, a key frame may include a coordinate frame with an ID. U.S. patent application Ser. No. 15/877, 359 describes key frames and is hereby incorporated herein by reference in its entirety.

Some or all of the key frames 1140 may be selected for further processing, such as the generation of a persistent pose 1150 for the key frame. The selection may be based on the characteristics of all, or a subset of, the feature points in the image frame. Those characteristics may be determined from processing the descriptors, features and/or image frame, itself. As a specific example, the selection may be based on a cluster of feature points identified as likely to relate to a persistent object.

Each key frame is associated with a pose of the camera at which that key frame was acquired. For key frames selected for processing into a persistent pose, that pose information may be saved along with other metadata about the key frame, such as a WiFi fingerprint and/or GPS coordinates at the time of acquisition and/or at the location of acquisition. In some embodiments, the metadata, for example the GPS coordinates, may individually or in combination be used as a part of the localization process.

The persistent poses are a source of information that a device may use to orient itself relative to previously acquired information about the physical world. For example, if the key frame from which a persistent pose was created is incorporated into a map of the physical world, a device may orient itself relative to that persistent pose using a sufficient number of feature points in the key frame that are associated with the persistent pose. The device may align a current image that it takes of its surroundings to the persistent pose. This alignment may be based on matching the current image to the image 1110, the features 1120, and/or the descriptors 1130 that gave rise to the persistent pose, or any subset of that image or those features or descriptors. In some embodiments, the current image frame that is matched to the persistent pose may be another key frame that has been incorporated into the device's tracking map.

Information about a persistent pose may be stored in a format that facilitates sharing among multiple applications, which may be executing on the same or different devices. In the example of FIG. 14, some or all of the persistent poses may be reflected as a persistent coordinate frames (PCF) 1160. Like a persistent pose, a PCF may be associated with a map and may comprise a set of features, or other information, that a device can use to determine its orientation with respect to that PCF. The PCF may include a transformation that defines its transformation with respect to the origin of its map, such that, by correlating its position to a PCF, the device can determine its position with respect to any objects in the physical world reflected in the map.

As the PCF provides a mechanism for determining locations with respect to the physical objects, an application, such as applications 1180, may define positions of virtual objects with respect to one or more PCFs, which serve as anchors for the virtual content 1170. FIG. 14 illustrates, for example, that App 1 has associated its virtual content 2 with PCF 1.2. Likewise, App 2 has associated its virtual content 3 with PCF 1.2. App 1 is also shown associating its virtual content 1 to PCF 4.5, and App 2 is shown associating its virtual content 4 with PCF 3. In some embodiments, PCF 3 may be based on Image 3 (not shown), and PCF 4.5 may be based on Image 4 and Image 5 (not shown) analogously to how PCF 1.2 is based on Image 1 and Image 2. When rendering this virtual content, a device may apply one or more transformations to compute information, such as the location of the virtual content with respect to the display of the device and/or the location of physical objects with respect to the desired location of the virtual content. Using the PCFs as reference may simplify such computations.

In some embodiments, a persistent pose may be a coordinate location and/or direction that has one or more associated key frames. In some embodiments, a persistent pose may be automatically created after the user has traveled a certain distance, e.g., three meters. In some embodiments, the persistent poses may act as reference points during localization. In some embodiments, the persistent poses may be stored in a passable world (e.g., the passable world module 538).

In some embodiments, a new PCF may be determined based on a pre-defined distance allowed between adjacent PCFs. In some embodiments, one or more persistent poses may be computed into a PCF when a user travels a pre-determined distance, e.g. five meters. In some embodiments, PCFs may be associated with one or more world coordinate frames and/or canonical coordinate frames, e.g., in the passable world. In some embodiments, PCFs may be stored in a local and/or remote database depending on, for example, security settings.

Figure 15:
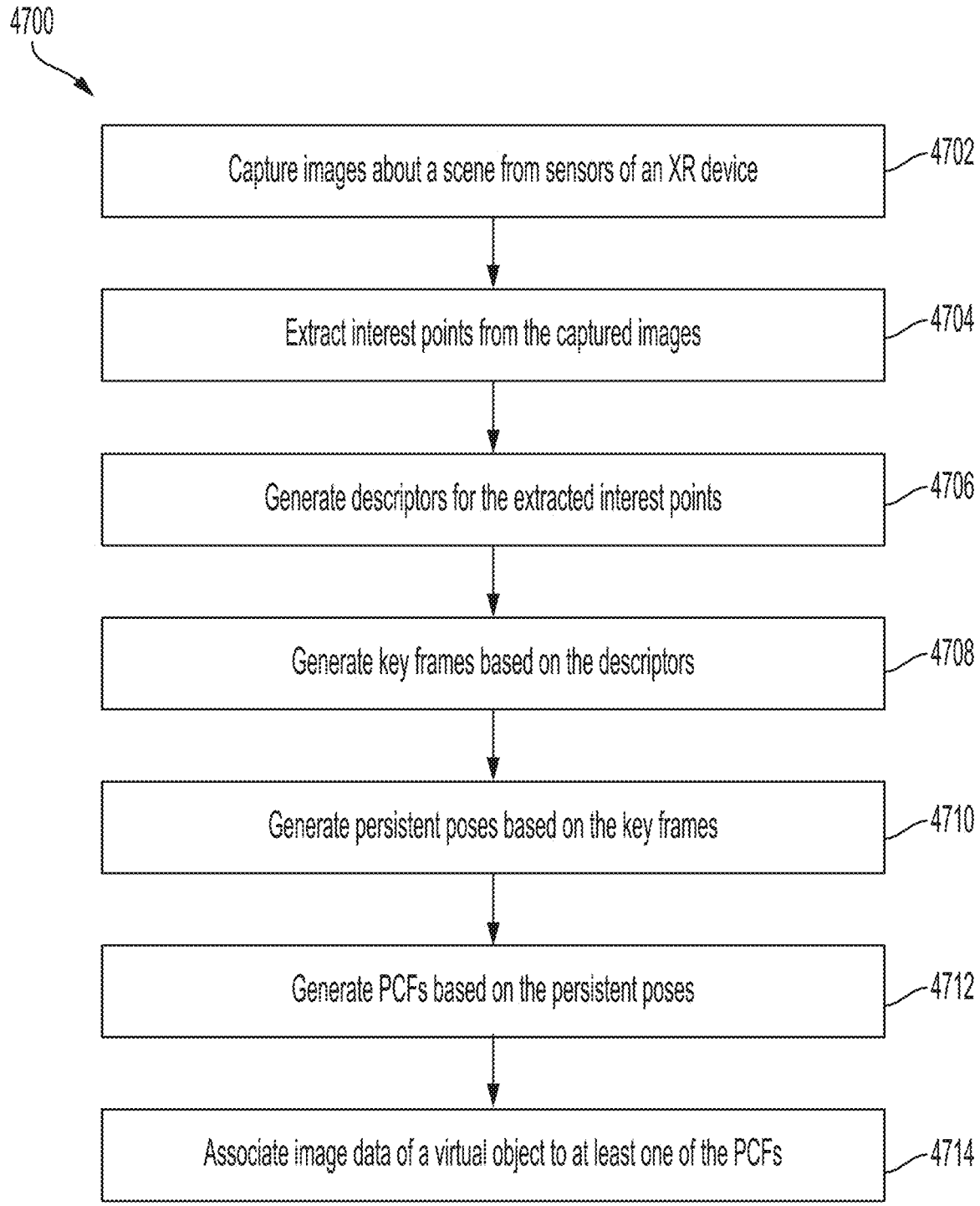
FIG. 15 is a flow chart illustrating a method of establishing and using a PCF, according to some embodiments.

FIG. 15 illustrates a method 4700 of establishing and using a persistence coordinate frame, according to some embodiments. The method 4700 may start from capturing (Act 4702) images (e.g., Image 1 and Image 2 in FIG. 14) about a scene using one or more sensors of an XR device. Multiple cameras may be used and one camera may generate multiple images, for example, in a stream.

The method 4700 may include extracting (4704) interest points (e.g., map points 702 in FIG. 7, features 1120 in FIG. 14) from the captured images, generating (Act 4706) descriptors (e.g., descriptors 1130 in FIG. 14) for the extracted interest points, and generating (Act 4708) key frames (e.g., key frames 1140) based on the descriptors. In some embodiments, the method may compare interest points in the key frames, and form pairs of key frames that share a predetermined amount of interest points. The method may reconstruct parts of the physical world using individual pairs of key frames. Mapped parts of the physical world may be saved as 3D features (e.g., keyrig 704 in FIG. 7). In some embodiments, a selected portion of the pairs of key frames may be used to build 3D features. In some embodiments, results of the mapping may be selectively saved. Key frames not used for building 3D features may be associated with the 3D features through poses, for example, representing distances between key frames with a covariance matrix between poses of keyframes. In some embodiments, pairs of key frames may be selected to build the 3D features such that distances between each two of the build 3D features are within a predetermined distance, which may be determined to balance the amount of computation needed and the level of accuracy of a resulting model. Such approaches enable providing a model of the physical world with the amount of data that is suitable for efficient and accurate computation with an XR system. In some embodiments, a covariance matrix of two images may include covariances between poses of the two images (e.g., six degree of freedom).

The method 4700 may include generating (Act 4710) persistent poses based on the key frames. In some embodiments, the method may include generating the persistent poses based on the 3D features reconstructed from pairs of key frames. In some embodiments, a persistent pose may be attached to a 3D feature. In some embodiments, the persistent pose may include a pose of a key frame used to construct the 3D feature. In some embodiments, the persistent pose may include an average pose of key frames used to construct the 3D feature. In some embodiments, persistent poses may be generated such that distances between neighboring persistent poses are within a predetermined value, for example, in the range of one meter to five meters, any value in between, or any other suitable value. In some embodiments, the distances between neighboring persistent poses may be represented by a covariance matrix of the neighboring persistent poses.

The method 4700 may include generating (Act 4712) PCFs based on the persistent poses. In some embodiments, a PCF may be attached to a 3D feature. In some embodiments, a PCF may be associated with one or more persistent poses. In some embodiments, a PCF may include a pose of one of the associated persistent poses. In some embodiments, a PCF may include an average pose of the poses of the associated persistent poses. In some embodiments, PCFs may be generated such that distances between neighboring PCFs are within a predetermined value, for example, in the range of three meters to ten meters, any value in between, or any other suitable value. In some embodiments, the distances between neighboring PCFs may be represented by a covariance matrix of the neighboring PCFs. In some embodiments, PCFs may be exposed to XR applications via, for example, an application programming interface (API) such that the XR applications can access a model of the physical world through the PCFs without accessing the model itself.

The method 4700 may include associating (Act 4714) image data of a virtual object to be displayed by the XR device to at least one of the PCFs. In some embodiments, the method may include computing translations and orientations of the virtual object with respect to the associated PCF. It should be appreciated that it is not necessary to associate a virtual object to a PCF generated by the device placing the virtual object. For example, a device may retrieve saved PCFs in a canonical map in a cloud and associate a virtual object to a retrieved PCF. It should be appreciated that the virtual object may move with the associated PCF as the PCF is adjusted overtime.

Figure 16:
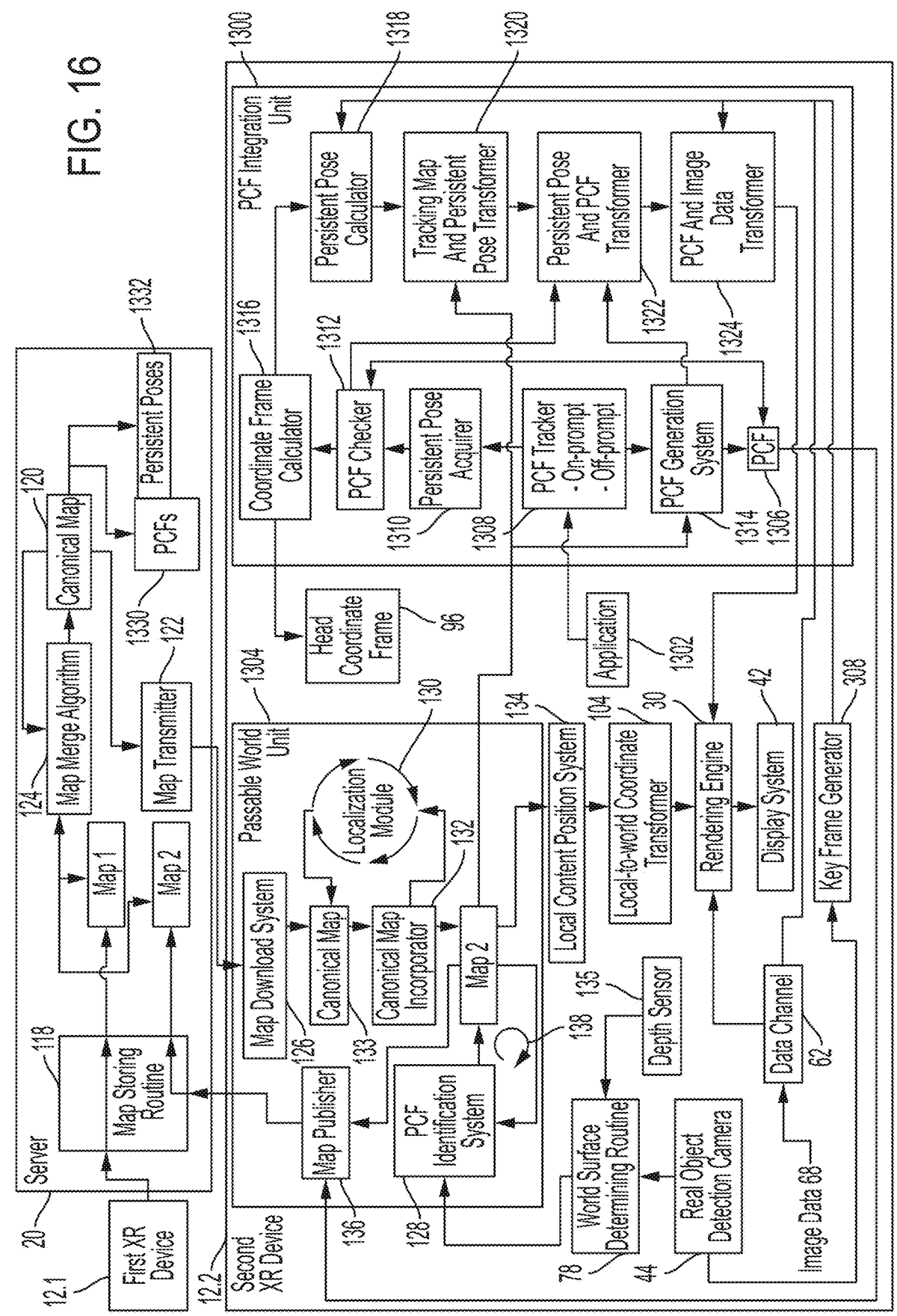
FIG. 16 is a block diagram of the XR system of FIG. 8, including a second XR device, according to some embodiments.

FIG. 16 illustrates the first XR device 12.1 and vision data and algorithms of a second XR device 12.2 and the server 20, according to some embodiments. The components illustrated in FIG. 16 may operate to perform some or all of the operations associated with generating, updating, and/or using spatial information, such as persistent poses, persistent coordinate frames, tracking maps, or canonical maps, as described herein. Although not illustrated, the first XR device 12.1 may be configured the same as the second XR device 12.2. The server 20 may have a map storing routine 118, a canonical map 120, a map transmitter 122, and a map merge algorithm 124.

Figure 21:
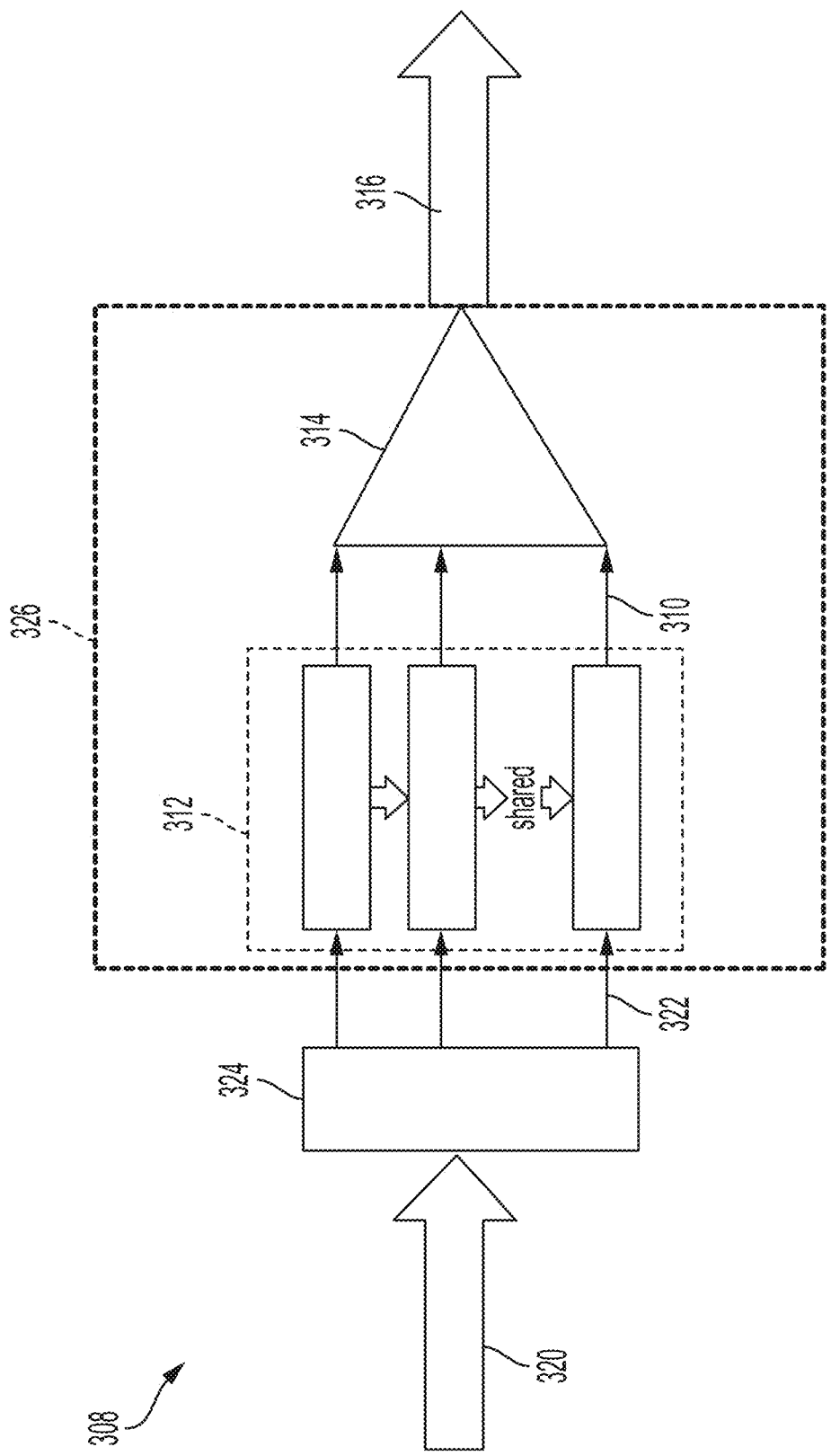
FIG. 21 is a block diagram illustrating a system for generating global descriptors for individual images and/or maps, according to some embodiments.

The second XR device 12.2, which may be in the same scene as the first XR device 12.1, may include a persistent coordinate frame (PCF) integration unit 1300, an application 1302 that generates the image data 68 that may be used to render a virtual object, and a frame embedding generator 308 (See FIG. 21). In some embodiments, a map download system 126, PCF identification system 128, Map 2, localization module 130, canonical map incorporator 132, canonical map 133, and map publisher 136 may be grouped into a passable world unit 1304. The PCF integration unit 1300 may be connected to the passable world unit 1304 and other components of the second XR device 12.2 to allow for the retrieval, generation, use, upload, and download of PCFs.

A map, comprising PCFs, may enable more persistence in a changing world. In some embodiments, localizing a tracking map including, for example, matching features for images, may include selecting features that represent persistent content from the map constituted by PCFs, which enables fast matching and/or localizing. For example, a world where people move into and out of the scene and objects such as doors move relative to the scene, requires less storage space and transmission rates, and enables the use of individual PCFs and their relationships relative to one another (e.g., integrated constellation of PCFs) to map a scene.

In some embodiments, the PCF integration unit 1300 may include PCFs 1306 that were previously stored in a data store on a storage unit of the second XR device 12.2, a PCF tracker 1308, a persistent pose acquirer 1310, a PCF checker 1312, a PCF generation system 1314, a coordinate frame calculator 1316, a persistent pose calculator 1318, and three transformers, including a tracking map and persistent pose transformer 1320, a persistent pose and PCF transformer 1322, and a PCF and image data transformer 1324.

In some embodiments, the PCF tracker 1308 may have an on-prompt and an off-prompt that are selectable by the application 1302. The application 1302 may be executable by a processor of the second XR device 12.2 to, for example, display a virtual content. The application 1302 may have a call that switches the PCF tracker 1308 on via the on-prompt. The PCF tracker 1308 may generate PCFs when the PCF tracker 1308 is switched on. The application 1302 may have a subsequent call that can switch the PCF tracker 1308 off via the off-prompt. The PCF tracker 1308 terminates PCF generation when the PCF tracker 1308 is switched off.

In some embodiments, the server 20 may include a plurality of persistent poses 1332 and a plurality of PCFs 1330 that have previously been saved in association with a canonical map 120. The map transmitter 122 may transmit the canonical map 120 together with the persistent poses 1332 and/or the PCFs 1330 to the second XR device 12.2. The persistent poses 1332 and PCFs 1330 may be stored in association with the canonical map 133 on the second XR device 12.2. When Map 2 localizes to the canonical map 133, the persistent poses 1332 and the PCFs 1330 may be stored in association with Map 2.

In some embodiments, the persistent pose acquirer 1310 may acquire the persistent poses for Map 2. The PCF checker 1312 may be connected to the persistent pose acquirer 1310. The PCF checker 1312 may retrieve PCFs from the PCFs 1306 based on the persistent poses retrieved by the persistent pose acquirer 1310. The PCFs retrieved by the PCF checker 1312 may form an initial group of PCFs that are used for image display based on PCFs.

In some embodiments, the application 1302 may require additional PCFs to be generated. For example, if a user moves to an area that has not previously been mapped, the application 1302 may switch the PCF tracker 1308 on. The PCF generation system 1314 may be connected to the PCF tracker 1308 and begin to generate PCFs based on Map 2 as Map 2 begins to expand. The PCFs generated by the PCF generation system 1314 may form a second group of PCFs that may be used for PCF-based image display.

The coordinate frame calculator 1316 may be connected to the PCF checker 1312. After the PCF checker 1312 retrieved PCFs, the coordinate frame calculator 1316 may invoke the head coordinate frame 96 to determine a head pose of the second XR device 12.2. The coordinate frame calculator 1316 may also invoke the persistent pose calculator 1318. The persistent pose calculator 1318 may be directly or indirectly connected to the frame embedding generator 308. In some embodiments, an image/frame may be designated a key frame after a threshold distance from the previous key frame, e.g. 3 meters, is traveled. The persistent pose calculator 1318 may generate a persistent pose based on a plurality, for example three, key frames. In some embodiments, the persistent pose may be essentially an average of the coordinate frames of the plurality of key frames.

The tracking map and persistent pose transformer 1320 may be connected to Map 2 and the persistent pose calculator 1318. The tracking map and persistent pose transformer 1320 may transform Map 2 to the persistent pose to determine the persistent pose at an origin relative to Map 2.

The persistent pose and PCF transformer 1322 may be connected to the tracking map and persistent pose transformer 1320 and further to the PCF checker 1312 and the PCF generation system 1314. The persistent pose and PCF transformer 1322 may transform the persistent pose (to which the tracking map has been transformed) to the PCFs from the PCF checker 1312 and the PCF generation system 1314 to determine the PCFs relative to the persistent pose.

The PCF and image data transformer 1324 may be connected to the persistent pose and PCF transformer 1322 and to the data channel 62. The PCF and image data transformer 1324 transforms the PCFs to the image data 68. The rendering engine 30 may be connected to the PCF and image data transformer 1324 to display the image data 68 to the user relative to the PCFs.

The PCF integration unit 1300 may store the additional PCFs that are generated with the PCF generation system 1314 within the PCFs 1306. The PCFs 1306 may be stored relative to persistent poses. The map publisher 136 may retrieve the PCFs 1306 and the persistent poses associated with the PCFs 1306 when the map publisher 136 transmits Map 2 to the server 20, the map publisher 136 also transmits the PCFs and persistent poses associated with Map 2 to the server 20. When the map storing routine 118 of the server 20 stores Map 2, the map storing routine 118 may also store the persistent poses and PCFs generated by the second viewing device 12.2. The map merge algorithm 124 may create the canonical map 120 with the persistent poses and PCFs of Map 2 associated with the canonical map 120 and stored within the persistent poses 1332 and PCFs 1330, respectively.

The first XR device 12.1 may include a PCF integration unit similar to the PCF integration unit 1300 of the second XR device 12.2. When the map transmitter 122 transmits the canonical map 120 to the first XR device 12.1, the map transmitter 122 may transmit the persistent poses 1332 and PCFs 1330 associated with the canonical map 120 and originating from the second XR device 12.2. The first XR device 12.1 may store the PCFs and the persistent poses within a data store on a storage device of the first XR device 12.1. The first XR device 12.1 may then make use of the persistent poses and the PCFs originating from the second XR device 12.2 for image display relative to the PCFs. Additionally or alternatively, the first XR device 12.1 may retrieve, generate, make use, upload, and download PCFs and persistent poses in a manner similar to the second XR device 12.2 as described above.

In the illustrated example, the first XR device 12.1 generates a local tracking map (referred to hereinafter as "Map 1") and the map storing routine 118 receives Map 1 from the first XR device 12.1. The map storing routine 118 then stores Map 1 on a storage device of the server 20 as the canonical map 120.

The second XR device 12.2 includes a map download system 126, an anchor identification system 128, a localization module 130, a canonical map incorporator 132, a local content position system 134, and a map publisher 136.

In use, the map transmitter 122 sends the canonical map 120 to the second XR device 12.2 and the map download system 126 downloads and stores the canonical map 120 as a canonical map 133 from the server 20.

The anchor identification system 128 is connected to the world surface determining routine 78. The anchor identification system 128 identifies anchors based on objects detected by the world surface determining routine 78. The anchor identification system 128 generates a second map (Map 2) using the anchors. As indicated by the cycle 138, the anchor identification system 128 continues to identify anchors and continues to update Map 2. The locations of the anchors are recorded as three-dimensional data based on data provided by the world surface determining routing 78. The world surface determining routine 78 receives images from the real object detection camera 44 and depth data from depth sensors 135 to determine the locations of surfaces and their relative distance from the depth sensors 135.

The localization module 130 is connected to the canonical map 133 and Map 2. The localization module 130 repeatedly attempts to localize Map 2 to the canonical map 133. The canonical map incorporator 132 is connected to the canonical map 133 and Map 2. When the localization module 130 localizes Map 2 to the canonical map 133, the canonical map incorporator 132 incorporates the canonical map 133 into anchors of Map 2. Map 2 is then updated with missing data that is included in the canonical map.

The local content position system 134 is connected to Map 2. The local content position system 134 may, for example, be a system wherein a user can locate local content in a particular location within a world coordinate frame. The local content then attaches itself to one anchor of Map 2. The local-to-world coordinate transformer 104 transforms the local coordinate frame to the world coordinate frame based on the settings of the local content position system 134. The functioning of the rendering engine 30, display system 42, and data channel 62 have been described with reference to FIG. 2.

The map publisher 136 uploads Map 2 to the server 20. The map storing routine 118 of the server 20 then stores Map 2 within a storage medium of the server 20.

The map merge algorithm 124 merges Map 2 with the canonical map 120. When more than two maps, for example, three or four maps relating to the same or adjacent regions of the physical world, have been stored, the map merge algorithm 124 merges all the maps into the canonical map 120 to render a new canonical map 120. The map transmitter 122 then transmits the new canonical map 120 to any and all devices 12.1 and 12.2 that are in an area represented by the new canonical map 120. When the devices 12.1 and 12.2 localize their respective maps to the canonical map 120, the canonical map 120 becomes the promoted map.

FIG. 17 illustrates an example of generating key frames for a map of a scene, according to some embodiments. In the illustrated example, a first key frame, KF1, is generated for a door on a left wall of the room. A second key frame, KF2, is generated for an area in a corner where a floor, the left wall, and a right wall of the room meet. A third key frame, KF3, is generated for an area of a window on the right wall of the room. A fourth key frame, KF4, is generated for an area at a far end of a rug on a floor of the wall. A fifth key frame, KF5, is generated for an area of the rug closest to the user.

FIG. 18 illustrates an example of generating persistent poses for the map of FIG. 17, according to some embodiments. In some embodiments, a new persistent pose is created when the device measures a threshold distance traveled, and/or when an application requests a new persistent pose (PP). In some embodiments, the threshold distance may be 3 meters, 5 meters, 20 meters, or any other suitable distance. Selecting a smaller threshold distance (e.g., 1 m) may result in an increase in compute load since a larger number of PPs may be created and managed compared to larger threshold distances. Selecting a larger threshold distance (e.g. 40 m) may result in increased virtual content placement error since a smaller number of PPs would be created, which would result in fewer PCFs being created, which means the virtual content attached to the PCF could be a relatively large distance (e.g. 30 m) away from the PCF, and error increases with increasing distance from a PCF to the virtual content.

In some embodiments, a PP may be created at the start of a new session. This initial PP may be thought of as zero, and can be visualized as the center of a circle that has a radius equal to the threshold distance. When the device reaches the perimeter of the circle, and, in some embodiments, an application requests a new PP, a new PP may be placed at the current location of the device (at the threshold distance). In some embodiments, a new PP will not be created at the threshold distance if the device is able to find an existing PP within the threshold distance from the device's new position. In some embodiments, when a new PP (e.g., PP1150 in FIG. 14) is created, the device attaches one or more of the closest key frames to the PP. In some embodiments, the location of the PP relative to the key frames may be based on the location of the device at the time a PP is created. In some embodiments, a PP will not be created when the device travels a threshold distance unless an application requests a PP.

In some embodiments, an application may request a PCF from the device when the application has virtual content to display to the user. The PCF request from the application may trigger a PP request, and a new PP would be created after the device travels the threshold distance. FIG. 18 illustrates a first persistent pose PP1 which may have the closest key frames, (e.g. KF1, KF2, and KF3) attached by, for example, computing relative poses between the key frames to the persistent pose. FIG. 18 also illustrates a second persistent pose PP2 which may have the closest key frames (e.g. KF4 and KF5) attached.

FIG. 19 illustrates an example of generating a PCF for the map of FIG. 17, according to some embodiments. In the illustrated example, a PCF 1 may include PP1 and PP2. As described above, the PCF may be used for displaying image data relative to the PCF. In some embodiments, each PCF may have coordinates in another coordinate frame (e.g., a world coordinate frame) and a PCF descriptor, for example, uniquely identifying the PCF. In some embodiments, the PCF descriptor may be computed based on feature descriptors of features in frames associated with the PCF. In some embodiments, various constellations of PCFs may be combined to represent the real world in a persistent manner and that requires less data and less transmission of data.

Figure 20A:
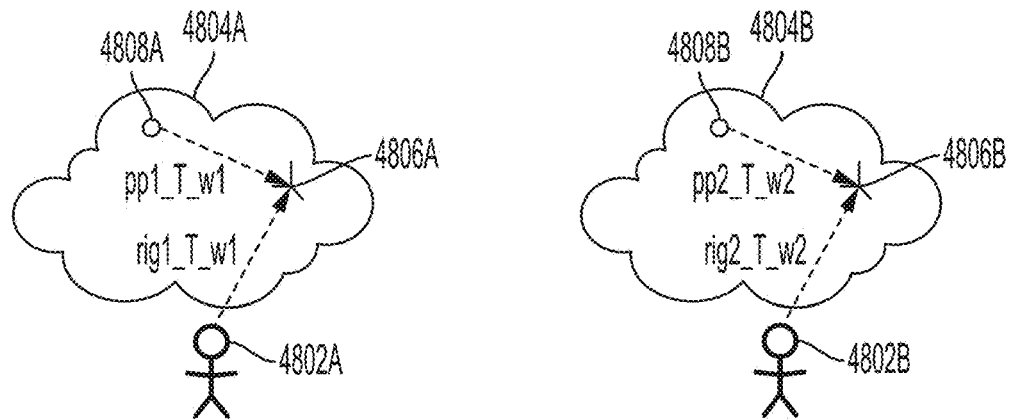
FIGS. 20A to 20C are schematic diagrams illustrating an example of creating PCFs, according to some embodiments.
Figure 20B:
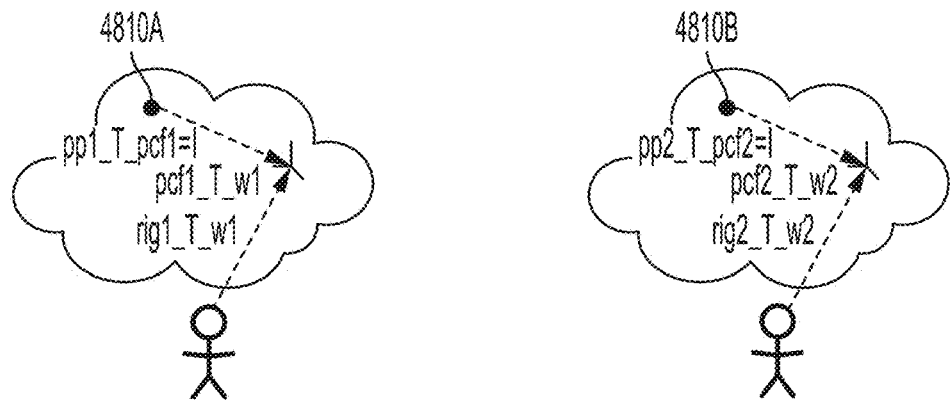
Figure 20C:
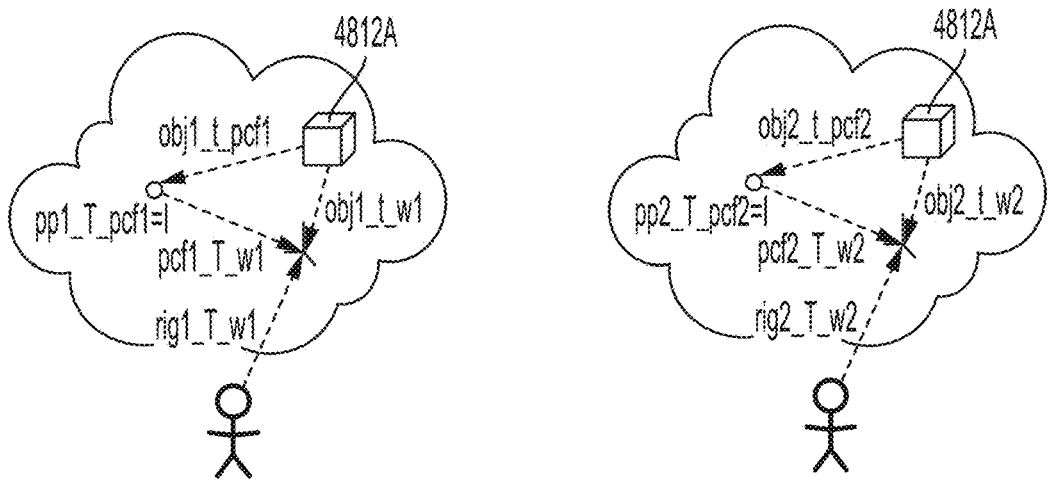

FIGS. 20A to 20C are schematic diagrams illustrating an example of establishing and using a persistent coordinate frame. FIG. 20A shows two users 4802A, 4802B with respective local tracking maps 4804A, 4804B that have not localized to a canonical map. The origins 4806A, 4806B for individual users are depicted by the coordinate system (e.g., a world coordinate system) in their respective areas. These origins of each tracking map may be local to each user, as the origins are dependent on the orientation of their respective devices when tracking was initiated.

As the sensors of the user device scan the environment, the device may capture images that, as described above in connection with FIG. 14, may contain features representing persistent objects such that those images may be classified as key frames, from which a persistent pose may be created. In this example, the tracking map 4802A includes a persistent pose (PP) 4808A; the tracking 4802B includes a PP 4808B.

Also as described above in connection with FIG. 14, some of the PPs may be classified as PCFs which are used to determine the orientation of virtual content for rendering it to the user. FIG. 20B shows that XR devices worn by respective users 4802A, 4802B may create local PCFs 4810A, 4810B based on the PP 4808A, 4808B. FIG. 20C shows that persistent content 4812A, 4812B (e.g., a virtual content) may be attached to the PCFs 4810A, 4810B by respective XR devices.

In this example, virtual content may have a virtual content coordinate frame, that may be used by an application generating virtual content, regardless of how the virtual content should be displayed. The virtual content, for example, may be specified as surfaces, such as triangles of a mesh, at particular locations and angles with respect to the virtual content coordinate frame. To render that virtual content to a user, the locations of those surfaces may be determined with respect to the user that is to perceive the virtual content.

Attaching virtual content to the PCFs may simplify the computation involved in determining locations of the virtual content with respect to the user. The location of the virtual content with respect to a user may be determined by applying a series of transformations. Some of those transformations may change, and may be updated frequently. Others of those transformations may be stable and may be updated in frequently or not at all. Regardless, the transformations may be applied with relatively low computational burden such that the location of the virtual content can be updated with respect to the user frequently, providing a realistic appearance to the rendered virtual content.

In the example of FIGS. 20A-20C, user 1's device has a coordinate system that can be related to the coordinate system that defines the origin of the map by the transformation rig1_T_w1. User 2's device has a similar transformation rig2_T_w2. These transformations may be expressed as 6 degree of transformation, specifying translation and rotation to align the device coordinate systems with the map coordinate systems. In some embodiments, the transformation may be expressed as two separate transformations, one specifying translation and the other specifying rotation. Accordingly, it should be appreciated that the transformations may be expressed in a form that simplifies computation or otherwise provides an advantage.

Transformations between the origins of the tracking maps and the PCFs identified by the respective user devices are expressed as pcf1_T_w1 and pcf2 T_w2. In this example the PCF and the PP are identical, such that the same transformation also characterizes the PPs.

The location of the user device with respect to the PCF can therefore be computed by the serial application of these transformations, such as rig1_T_pcf1=(rig1_T_w1)*(pcf1 T_w1).

As shown in FIG. 20C, the virtual content is locate with respect to the PCFs, with a transformation of obj1_T_pcf1. This transformation may be set by an application generating the virtual content that may receive information from a world reconstruction system describing physical objects with respect to the PCF. To render the virtual content to the user, a transformation to the coordinate system of the user's device is computed, which may be computed by relating the virtual content coordinate frame to the origin of the tracking map through the transformation obj1_t_w1=(obj1_T_pcf1)* (pcf1_T_w1). That transformation may then be related to the user's device through further transformation rig1_T_w1.

The location of the virtual content may change, based on output from an application generating the virtual content. When that changes, the end-to-end transformation, from a source coordinate system to a destination coordinate system, may be recomputed. Additionally, the location and/or head pose of the user may change as the user moves. As a result, the transformation rig1_T_w1 may change, as would any end-to-end transformation that depends on the location or head pose of the user.

The transformation rig1_T_w1 may be updated with motion of the user based on tracking the position of the user with respect to stationary objects in the physical world. Such tracking may be performed by a headphone tacking component processing a sequence of images, as described above, or other component of the system. Such updates may be made by determining pose of the user with respect to a stationary frame of reference, such as a PP.

In some embodiments, the location and orientation of a user device may be determined relative to the nearest persistent pose, or, in this example, a PCF, as the PP is used as a PCF. Such a determination may be made by identifying in current images captured with sensors on the device feature points that characterize the PP. Using image processing techniques, such as stereoscopic image analysis, the location of the device with respect to those feature points may be determined. From this data, the system could calculate the change in transformation associated with the user's motions based on the relationship rig1_T_pcf1=(rig1 T_w1)*(pcf1 T_w1).

A system may determine and apply transformations in an order that is computationally efficient. For example, the need to compute rig1_T_w1 from a measurement yielding rig1_T_pcf1 might be avoided by tracking both user pose and defining the location of virtual content relative to the PP or a PCF built on a persistent pose. In this way the transformation from a source coordinate system of the virtual content to the destination coordinate system of the user's device may be based on the measured transformation according to the expression (rig1_T_pcf1)*(obj1_t_pcf1), with the first transformation being measured by the system and the latter transformation being supplied by an application specifying virtual content for rendering. In embodiments in which the virtual content is positioned with respect to the origin of the map, the end-to-end transformation may relate the virtual object coordinate system to the PCF coordinate system based on a further transformation between the map coordinates and the PCF coordinates. In embodiments in which the virtual content is positioned with respect to a different PP or PCF than the one against which user position is being tracked, a transformation between the two may be applied. Such a transformation may be fixed and may be determined, for example, from a map in which both appear.

A transform-based approach may be implemented, for example, in a device with components that process sensor data to build a tracking map. As part of that process, those components may identify feature points that may be used as persistent poses, which in turn may be turned into PCFs. Those components may limit the number of persistent poses generated for the map, to provide a suitable spacing between persistent poses, while allowing the user, regardless of location in the physical environment, to be close enough to a persistent pose location to accurately compute the user's pose, as described above in connection with FIGS. 17-19. As the closest persistent pose to a user is updated, as a result of user movement, refinements to the tracking map or other causes, any of the transformations that are used to compute the location of virtual content relative to the user that depend on the location of the PP (or PCF if being used) may be updated and stored for use, at least until the user moves away from that persistent pose. Nonetheless, by computing and storing transformations, the computational burden each time the location of virtual content is update may be relatively low, such that it may be performed with relatively low latency.

FIGS. 20A-20C illustrate positioning with respect to a tracking map, and each device had its own tracking map. However, transformations may be generated with respect to any map coordinate system. Persistence of content across user sessions of an XR system may be achieved by using a persistent map. Shared experiences of users may also be facilitated by using a map to which multiple user devices may be oriented.

In some embodiments, described in greater detail below, the location of virtual content may be specified in relation to coordinates in a canonical map, formatted such that any of multiple devices may use the map. Each device might maintain a tracking map and may determine the change of pose of the user with respect to the tracking map. In this example, a transformation between the tracking map and the canonical map may be determined through a process of "localization"—which may be performed by matching structures in the tracking map (such as one or more persistent poses) to one or more structures of the canonical map (such as one or more PCFs).

Described in greater below are techniques for creating and using canonical maps in this way.

Deep Key Frame

Techniques as described herein rely on comparison of image frames. For example, to establish the position of a device with respect to a tracking map, a new image may be captured with sensors worn by the user and an XR system may search, in a set of images that were used to create the tracking map, images that share at least a predetermined amount of interest points with the new image. As an example of another scenario involving comparisons of image frames, a tracking map might be localized to a canonical map by first finding image frames associated with a persistent pose in the tracking map that is similar to an image frame associated with a PCF in the canonical map. Alternatively, a transformation between two canonical maps may be computed by first finding similar image frames in the two maps.

Techniques as described herein may enable efficient comparison of spatial information. In some embodiments, an image frame may be represented by a numeric descriptor. That descriptor may be computed via a transformation that maps a set of features identified in the image to the descriptor. That transformation may be performed in a trained neural network. In some embodiments, the set of features that is supplied as an input to the neural network may be a filtered set of features, extracted from the image using techniques, for example, that preferentially select features that are likely to be persistent.

The representation of image frames as a descriptor enables, for example, efficient matching of new image information to stored image information. An XR system may store in conjunction with persistent maps descriptors of one or more frames underlying the persistent map. A local image frame acquired by a user device may similarly be converted to such a descriptor. By selecting stored maps with descriptors similar to that of the local image frame, one or more persistent maps likely representing the same physical space as the user device may be selected with a relatively small amount of processing. In some embodiments, the descriptor may be computed for key frames in the local map and the persistent map, further reducing processing when comparing maps. Such an efficient comparison may be used, for example, to simplify finding a persistent map to load in a local device or to find a persistent map to update based on image information acquired with a local device.

Deep key frames provide a way to reduce the amount of processing required to identify similar image frames. For example, in some embodiments, the comparison may be between image features in a new 2D image (e.g., "2D features") and 3D features in the map. Such a comparison may be made in any suitable way, such as by projecting the 3D images into a 2D plane. A conventional method such as Bag of Words (BoW) searches the 2D features of a new image in a database including all 2D features in a map, which may require significant computing resources especially when a map represents a large area. The conventional method then locates the images that share at least one of the 2D features with the new image, which may include images that are not useful for locating meaningful 3D features in the map. The conventional method then locates 3D features that are not meaningful with respect to the 2D features in the new image.

The inventors have recognized and appreciated techniques to retrieve images in the map using less memory resource (e.g., a quarter of the memory resource used by BoW), higher efficiency (e.g., 2.5 ms processing time for each key frame, 100 μs for comparing against 500 key frames), and higher accuracy (e.g., 20% better retrieval recall than BoW for 1024 dimensional model, 5% better retrieval recall than BoW for 256 dimensional model).

To reduce computation, a descriptor may be computed for an image frame that may be used to compare an image frame to other image frames. The descriptors may be stored instead of or in addition to the image frames and feature points. In a map in which persistent poses and/or PCFs may be generated from image frames, the descriptor of the image frame or frames from which each persistent pose or PCF was generated may be stored as part of the persistent pose and/or PCF.

In some embodiments, the descriptor may be computed as a function of feature points in the image frame. In some embodiments, a neural network is configured to compute a unique frame descriptor to represent an image. The image may have a resolution higher than 1 Megabyte such that enough details of a 3D environment within a field-of-view of a device worn by a user is captured in the image. The frame descriptor may be much shorter, such as a string of numbers, for example, in the range of 128 Bytes to 512 Bytes or any number in between.

In some embodiments, the neural network is trained such that the computed frame descriptors indicate similarity between images. Images in a map may be located by identifying, in a database comprising images used to generate the map, the nearest images that may have frame descriptors within a predetermined distance to a frame descriptor for a new image. In some embodiments, the distances between images may be represented by a difference between the frame descriptors of the two images.

FIG. 21 is a block diagram illustrating a system for generating a descriptor for an individual image, according to some embodiments. In the illustrated example, a frame embedding generator 308 is shown. The frame embedding generator 308, in some embodiments, may be used within the server 20, but may alternatively or additionally execute in whole or in part within one of the XR devices 12.1 and 12.2, or any other device processing images for comparison to other images.

In some embodiments, the frame embedding generator may be configured to generate a reduced data representation of an image from an initial size (e.g., 76,800 bytes) to a final size (e.g., 256 bytes) that is nonetheless indicative of the content in the image despite a reduced size. In some embodiments, the frame embedding generator may be used to generate a data representation for an image which may be a key frame or a frame used in other ways. In some embodiments, the frame embedding generator 308 may be configured to convert an image at a particular location and orientation into a unique string of numbers (e.g., 256 bytes). In the illustrated example, an image 320 taken by an XR device may be processed by feature extractor 324 to detect interest points 322 in the image 320. Interest points may be or may not be derived from feature points identified as described above for features 1120 (FIG. 14) or as otherwise described herein. In some embodiments, interest points may be represented by descriptors as described above for descriptors 1130 (FIG. 14), which may be generated using a deep sparse feature method. In some embodiments, each interest point 322 may be represented by a string of numbers (e.g., 32 bytes). There may, for example, be n features (e.g., 100) and each feature is represented by a string of 32 bytes.

In some embodiments, the frame embedding generator 308 may include a neural network 326. The neural network 326 may include a multi-layer perceptron unit 312 and a maximum (max) pool unit 314. In some embodiments, the multi-layer perceptron (MLP) unit 312 may comprise a multi-layer perceptron, which may be trained. In some embodiments, the interest points 322 (e.g., descriptors for the interest points) may be reduced by the multi-layer perceptron 312, and may output as weighted combinations 310 of the descriptors. For example, the MLP may reduce n features to m feature that is less than n features.

In some embodiments, the MLP unit 312 may be configured to perform matrix multiplication. The multi-layer perceptron unit 312 receives the plurality of interest points 322 of an image 320 and converts each interest point to a respective string of numbers (e.g., 256). For example, there may be 100 features and each feature may be represented by a string of 256 numbers. A matrix, in this example, may be created having 100 horizontal rows and 256 vertical columns. Each row may have a series of 256 numbers that vary in magnitude with some being smaller and others being larger. In some embodiments, the output of the MLP may be an n×256 matrix, where n represents the number of interest points extracted from the image. In some embodiments, the output of the MLP may be an m×256 matrix, where m is the number of interest points reduced from n.

Figure 25:
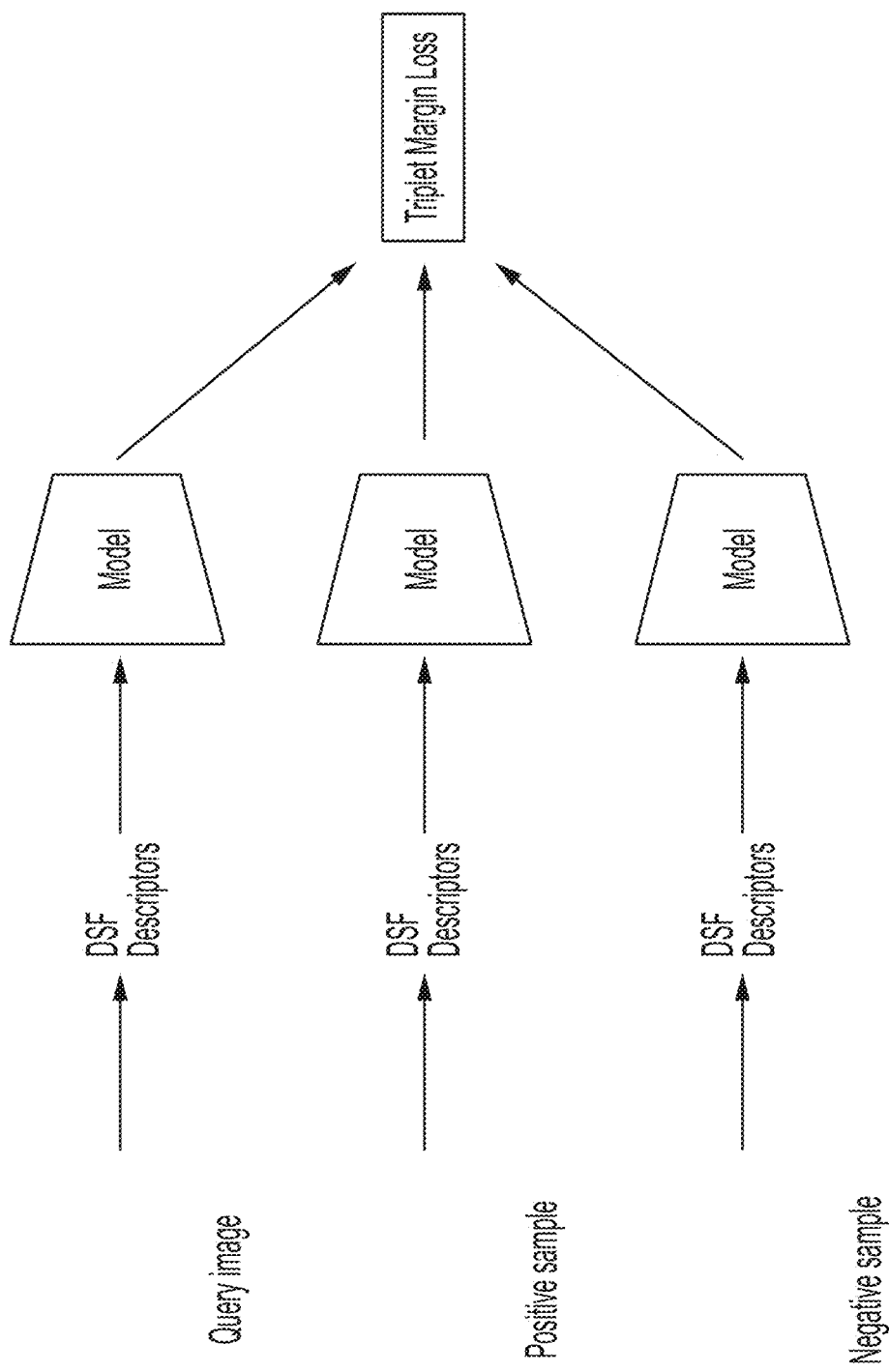
FIG. 25 is a block diagram illustrating a method of training a neural network, according to some embodiments.

In some embodiments, the MLP 312 may have a training phase, during which model parameters for the MLP are determined, and a use phase. In some embodiments, the MLP may be trained as illustrated in FIG. 25. The input training data may comprise data in sets of three, the set of three comprising 1) a query image, 2) a positive sample, and 3) a negative sample. The query image may be considered the reference image.

In some embodiments, the positive sample may comprise an image that is similar to the query image. For example, in some embodiments, similar may be having the same object in both the query and positive sample image but viewed from a different angle. In some embodiments, similar may be having the same object in both the query and positive sample images but having the object shifted (e.g. left, right, up, down) relative to the other image.

In some embodiments, the negative sample may comprise an image that is dissimilar to the query image. For example, in some embodiments, a dissimilar image may not contain any objects that are prominent in the query image or may contain only a small portion of a prominent object in the query image (e.g. <10%, 1%). A similar image, in contrast, may have most of an object (e.g. >50%, or >75%) in the query image, for example.

In some embodiments, interest points may be extracted from the images in the input training data and may be converted to feature descriptors. These descriptors may be computed both for the training images as shown in FIG. 25 and for extracted features in operation of frame embedding generator 308 of FIG. 21. In some embodiments, a deep sparse feature (DSF) process may be used to generate the descriptors (e.g., DSF descriptors) as described in U.S. patent application Ser. No. 16/190,948. In some embodiments, DSF descriptors are n×32 dimension. The descriptors may then be passed through the model/MLP to create a 256 byte output. In some embodiments, the model/MLP may have the same structure as MLP 312 such that once the model parameters are set through training, the resulting trained MLP may be used as MLP 312.

In some embodiments, the feature descriptors (e.g., the 256 byte output from the MLP model) may then be sent to a triplet margin loss module (which may only be used during the training phase, not during use phase of the MLP neural network). In some embodiments, the triplet margin loss module may be configured to select parameters for the model so as to reduce the difference between the 256 byte output from the query image and the 256 byte output from the positive sample, and to increase the difference between the 256 byte output from the query image and the 256 byte output from the negative sample. In some embodiments, the training phase may comprise feeding a plurality of triplet input images into the learning process to determine model parameters. This training process may continue, for example, until the differences for positive images is minimized and the difference for negative images is maximized or until other suitable exit criteria are reached.

Referring back to FIG. 21, the frame embedding generator 308 may include a pooling layer, here illustrated as maximum (max) pool unit 314. The max pool unit 314 may analyze each column to determine a maximum number in the respective column. The max pool unit 314 may combine the maximum value of each column of numbers of the output matrix of the MLP 312 into a global feature string 316 of, for example, 256 numbers. It should be appreciated that images processed in XR systems might, desirably, have high-resolution frames, with potentially millions of pixels. The global feature string 316 is a relatively small number that takes up relatively little memory and is easily searchable compared to an image (e.g., with a resolution higher than 1 Megabyte). It is thus possible to search for images without analyzing each original frame from the camera and it is also cheaper to store 256 bytes instead of complete frames.

Figure 22:
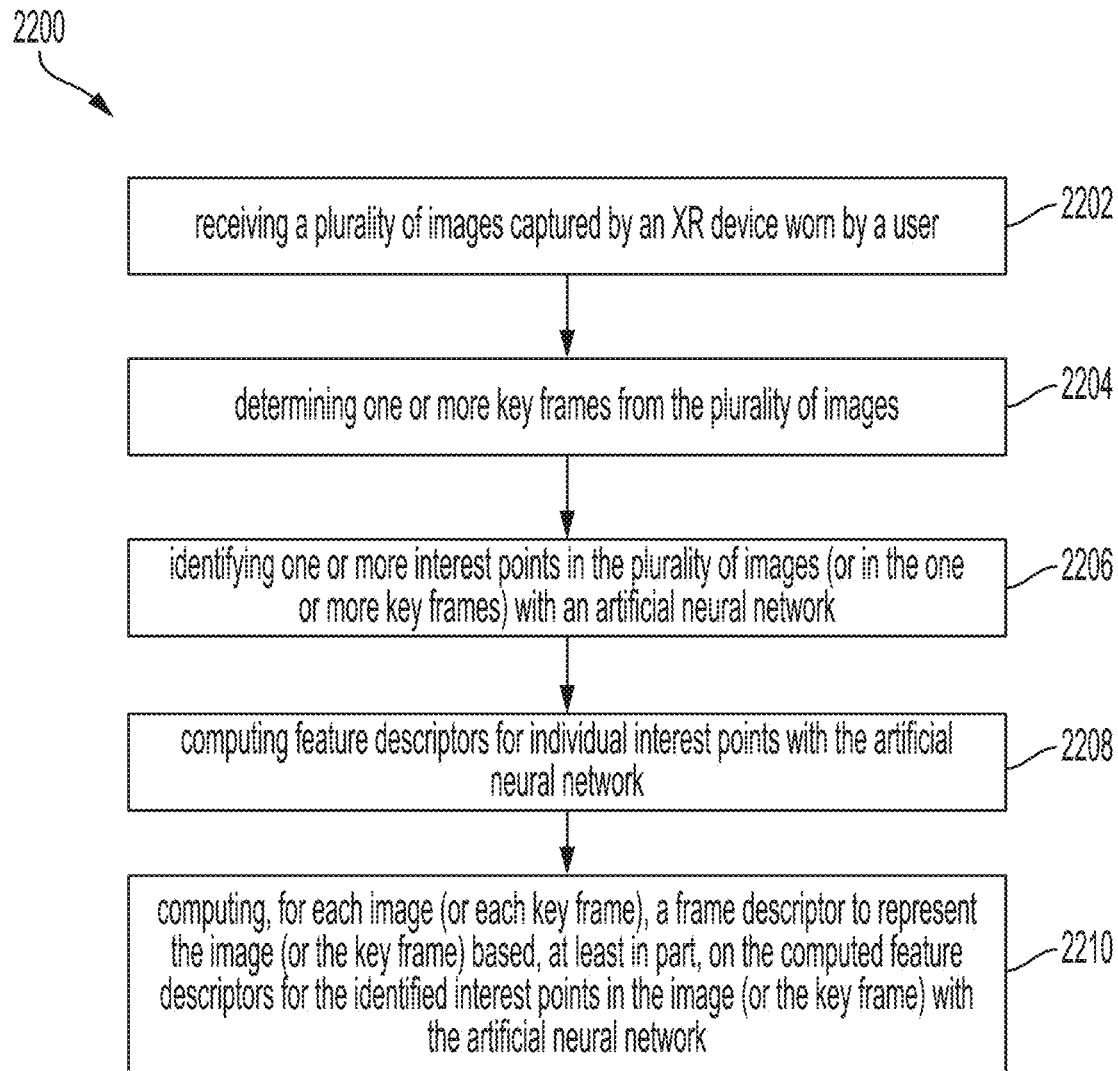
FIG. 22 is a flow chart illustrating a method of computing an image descriptor, according to some embodiments.

FIG. 22 is a flow chart illustrating a method 2200 of computing an image descriptor, according to some embodiments. The method 2200 may start from receiving (Act 2202) a plurality of images captured by an XR device worn by a user. In some embodiments, the method 2200 may include determining (Act 2204) one or more key frames from the plurality of images. In some embodiments, Act 2204 may be skipped and/or may occur after step 2210 instead.

The method 2200 may include identifying (Act 2206) one or more interest points in the plurality of images with an artificial neural network, and computing (Act 2208) feature descriptors for individual interest points with the artificial neural network. The method may include computing (Act 2210), for each image, a frame descriptor to represent the image based, at least in part, on the computed feature descriptors for the identified interest points in the image with the artificial neural network.

Figure 23:
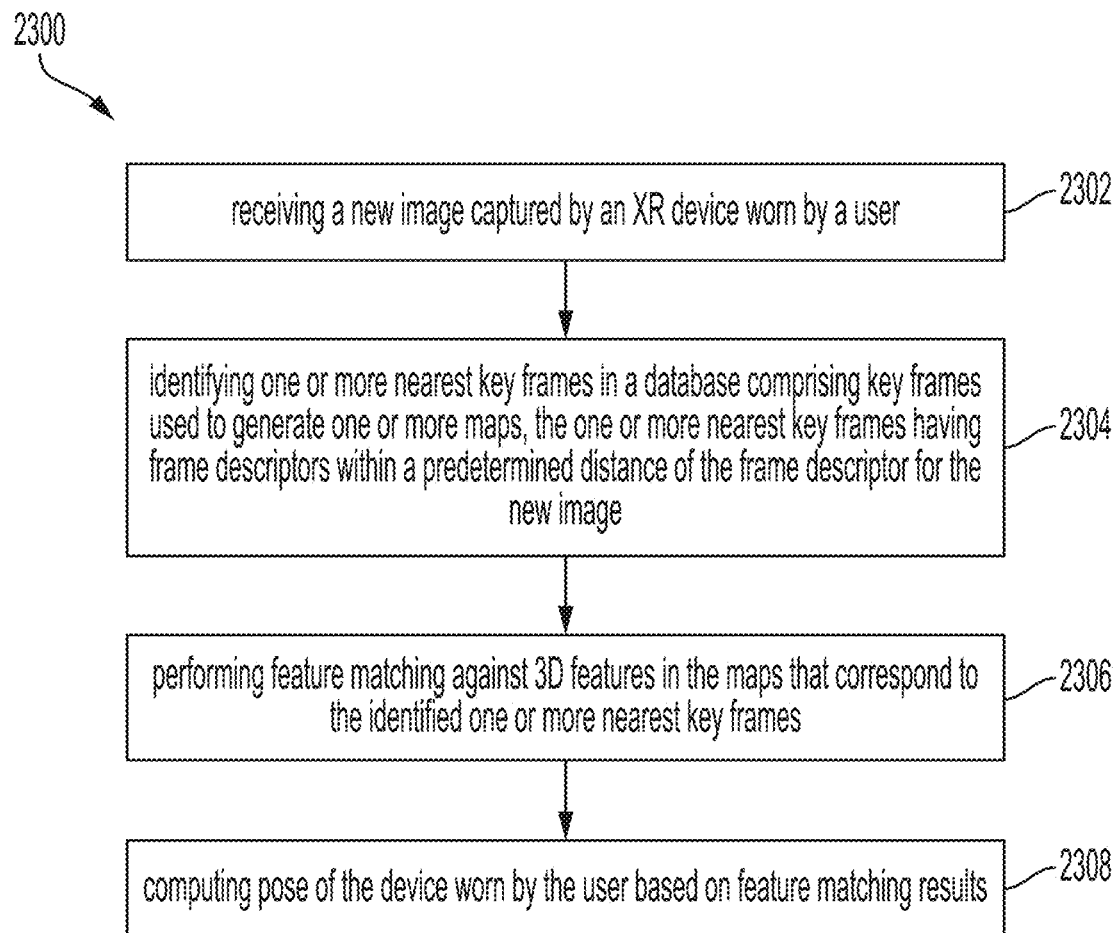
FIG. 23 is a flow chart illustrating a method of localization using image descriptors, according to some embodiments.

FIG. 23 is a flow chart illustrating a method 2300 of localization using image descriptors, according to some embodiments. In this example, a new image frame, depicting the current location of the XR device may be compared to image frames stored in connection with points in a map (such as a persistent pose or a PCF as described above). The method 2300 may start from receiving (Act 2302) a new image captured by an XR device worn by a user. The method 2300 may include identifying (Act 2304) one or more nearest key frames in a database comprising key frames used to generate one or more maps. In some embodiments, a nearest key frame may be identified based on coarse spatial information and/or previously determined spatial information. For example, coarse spatial information may indicate that the XR device is in a geographic region represented by a 50 m×50 m area of a map. Image matching may be performed only for points within that area. As another example, based on tracking, the XR system may know that an XR device was previously proximate a first persistent pose in the map and was moving in a direction of a second persistent pose in the map. That second persistent pose may be considered the nearest persistent pose and the key frame stored with it may be regarded as the nearest key frame. Alternatively or additionally, other metadata, such as GPS data or WiFi fingerprints, may be used to select a nearest key frame or set of nearest key frames.

Regardless of how the nearest key frames are selected, frame descriptors may be used to determine whether the new image matches any of the frames selected as being associated with a nearby persistent pose. The determination may be made by comparing a frame descriptor of the new image with frame descriptors of the closest key frames, or a subset of key frames in the database selected in any other suitable way, and selecting key frames with frame descriptors that are within a predetermined distance of the frame descriptor of the new image. In some embodiments, a distance between two frame descriptors may be computed by obtaining the difference between two strings of numbers that may represent the two frame descriptors. In embodiments in which the strings are processed as strings of multiple quantities, the difference may be computed as a vector difference.

Once a matching image frame is identified, the orientation of the XR device relative to that image frame may be determined. The method 2300 may include performing (Act 2306) feature matching against 3D features in the maps that correspond to the identified nearest key frames, and computing (Act 2308) pose of the device worn by the user based on the feature matching results. In this way, the computationally intensive matching of features points in two images may be performed for as few as one image that has already been determined to be a likely match for the new image.

Figure 24:
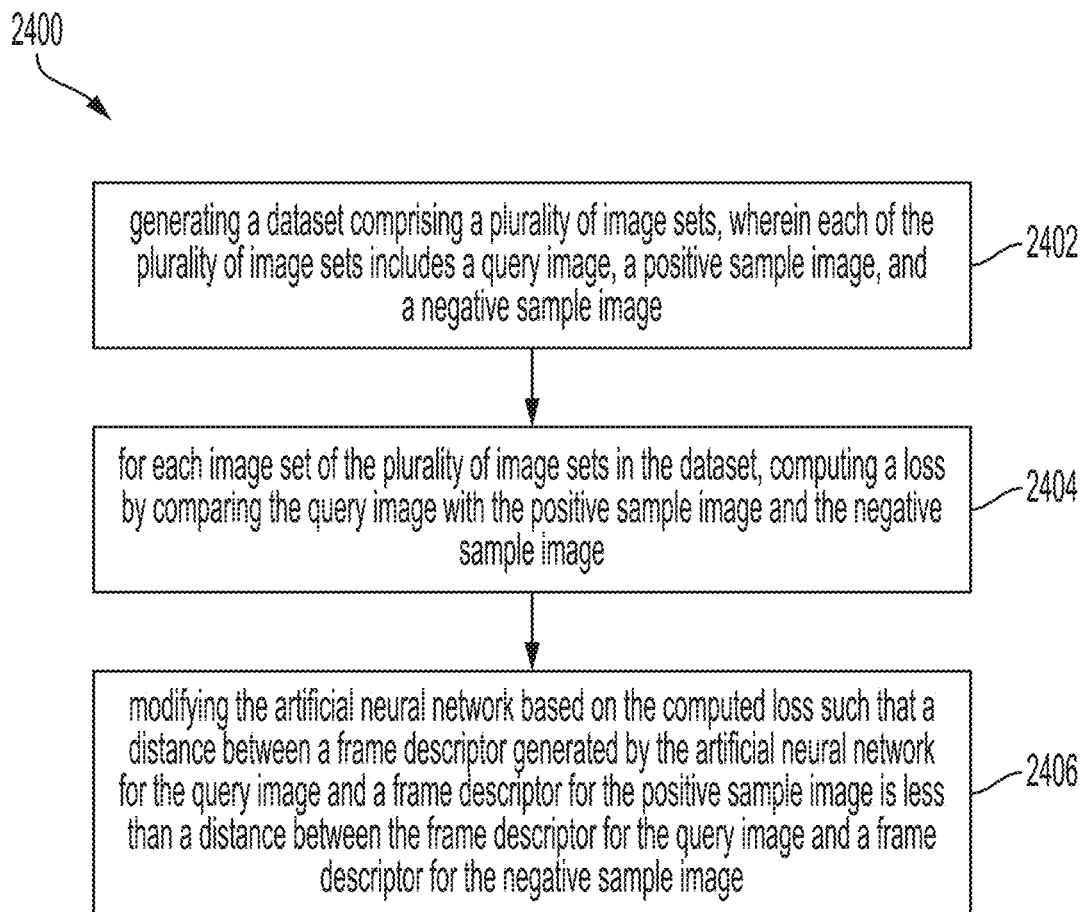
FIG. 24 is a flow chart illustrating a method of training a neural network, according to some embodiments.

FIG. 24 is a flow chart illustrating a method 2400 of training a neural network, according to some embodiments. The method 2400 may start from generating (Act 2402) a dataset comprising a plurality of image sets. Each of the plurality of image sets may include a query image, a positive sample image, and a negative sample image. In some embodiments, the plurality of image sets may include synthetic recording pairs configured to, for example, teach the neural network basic information such as shapes. In some embodiments, the plurality of image sets may include real recording pairs, which may be recorded from a physical world.

In some embodiments, inliers may be computed by fitting a fundamental matrix between two images. In some embodiments, sparse overlap may be computed as the intersection over union (IoU) of interest points seen in both images. In some embodiments, a positive sample may include at least twenty interest points, serving as inliers, that are the same as in the query image. A negative sample may include less than ten inlier points. A negative sample may have less than half of the sparse points overlapping with the sparse points of the query image.

The method 2400 may include computing (Act 2404), for each image set, a loss by comparing the query image with the positive sample image and the negative sample image. The method 2400 may include modifying (Act 2406) the artificial neural network based on the computed loss such that a distance between a frame descriptor generated by the artificial neural network for the query image and a frame descriptor for the positive sample image is less than a distance between the frame descriptor for the query image and a frame descriptor for the negative sample image.

It should be appreciated that although methods and apparatus configured to generate global descriptors for individual images are described above, methods and apparatus may be configured to generate descriptors for individual maps. For example, a map may include a plurality of key frames, each of which may have a frame descriptor as described above. A max pool unit may analyze the frame descriptors of the map's key frames and combines the frame descriptors into a unique map descriptor for the map.

Further, it should be appreciated that other architectures may be used for processing as described above. For example, separate neural networks are described for generating DSF descriptors and frame descriptors. Such an approach is computationally efficient. However, in some embodiments, the frame descriptors may be generated from selected feature points, without first generating DSF descriptors.

Ranking and Merging Maps

Described herein are methods and apparatus for ranking a plurality of environment maps in a cross reality (XR) system as a precursor to further processing, such as merging maps or localizing a device relative to a map. Map merging may enable maps representing overlapping portions of the physical world to be combined to represent a larger area. Ranking maps may enable efficiently performing techniques as described herein, including map merging or localization, both of which may involve selecting a map from a set of maps based on similarity. In some embodiments, for example, a set of canonical maps formatted in a way that they may be accessed by any of a number of XR devices may be maintained by the system. These canonical maps may be formed by merging selected tracking maps from those devices with other tracking maps or previously stored canonical maps.

The canonical maps may be ranked, for example, for use in selecting one or more canonical maps to merge with a new tracking map and/or to select one or more canonical maps from the set to use within a device. The ranking may indicate canonical maps that have regions similar to a region of the tracking map such that, upon attempting to merge the tracking map into the canonical map, it is likely that there will be a correspondence between a portion of the tracking map and a portion of the canonical map. Such a correspondence may be a precursor to further processing in which the tracking map is aligned with the canonical map such that it can be merged into the canonical map.

In some embodiments, a tracking map may be merged with a tile or other defined area of a canonical map so as to limit the amount of processing required to merge a tracking map with a canonical map. Operating on areas of a canonical map, particularly for canonical maps that represent a relatively large area such as multiple rooms in a building, may require less processing than operations on an entire map. In those embodiments, the map ranking or other selection pre-processing, may identify one or more areas of previously stored canonical maps to attempt to merge.

For localization, the information about the location of a portable device is compared to information in a canonical map. A region of correspondence between the information from the local device and a canonical map may be more quickly identified if a set of candidate areas in a set of canonical maps is identified by ranking the canonical maps in the set.

The inventors have recognized and appreciated that an XR system could provide an enhanced XR experience to multiple users sharing a same world, comprising real and/or virtual content, by enabling efficient sharing of environment maps of the real/physical world collected by multiple users, whether those users are present in the world at the same or different times. However, there are significant challenges in providing such a system. Such a system may store multiple maps generated by multiple users and/or the system may store multiple maps generated at different times. For operations that might be performed with a previously generated map, such as localization or map merge, for example, substantial processing may be required to identify a relevant environment map of a same world (e.g. same real world location) from all the environment maps collected in an XR system.

In some systems, there may be a large number of environment maps from which to make a selection of a map. The inventors have recognized and appreciated techniques to quickly and accurately rank the relevance of environment maps out of all possible environment maps, such as the universe of all canonical maps 120 in FIG. 28, for example. A high ranking map, or a small set of high ranking maps, may then be selected for further processing. That further processing may include determining the location of a user device with respect to a selected map, or rendering virtual objects on a user display realistically interacting with the physical world around the user or merging map data collected by that user device with stored maps to create larger or more accurate maps.

In some embodiments, a stored map that is relevant to a task for a user at a location in the physical world may be identified by filtering stored maps based on multiple criteria. Those criteria may indicate comparisons of a tracking map or other location information generated by the wearable device of the user in the location to candidate environment maps stored in a database. The comparisons may be performed based on metadata associated with the maps, such as a Wi-Fi fingerprint detected by the device generating the map and/or set of BSSIDs to which the device was connected while forming the map. Geolocation information, such as GPS data, may alternatively or additionally be used in selecting one or more candidate environment maps. A priori information may also be used in the selection of candidate maps. For example, if a device's location has been recently determined with respect to a canonical map, canonical maps representing the prior determined location, and adjacent locations, may be selected.

The comparisons may be performed based on compressed or uncompressed content of the map. Comparisons based on a compressed representation may be performed, for example, by comparison of vectors computed from map content. Comparisons based on un-compressed representations may be performed, for example, by localizing the tracking map within the stored map, or vice versa. Localization may be performed, for example, by matching one or more sets of features representing a portion of one map with sets of features in another map. Multiple comparisons may be performed in an order based on computation time needed to reduce the number of candidate maps for consideration, with comparisons involving less computation being performed earlier in the order than other comparisons requiring more computation.

In some embodiments, the comparison may be based on a portion of the tracking map, and the portion of the tracking may be different depending on the process for which an environment map is being selected. For example, for localization, candidate maps may be selected based on the persistent pose in the tracking map that is closest to the user at the time localization is to be performed. In contrast, when selecting candidate maps for a map merge operation, candidate maps may be selected based on similarity between any one or more persistent poses in the tracking map and the canonical maps. Regardless of what portions of two maps are compared, finding matching portions may entail substantial process associated with finding sets of features in the maps that likely correspond to the same location in the physical world.

Figure 26:
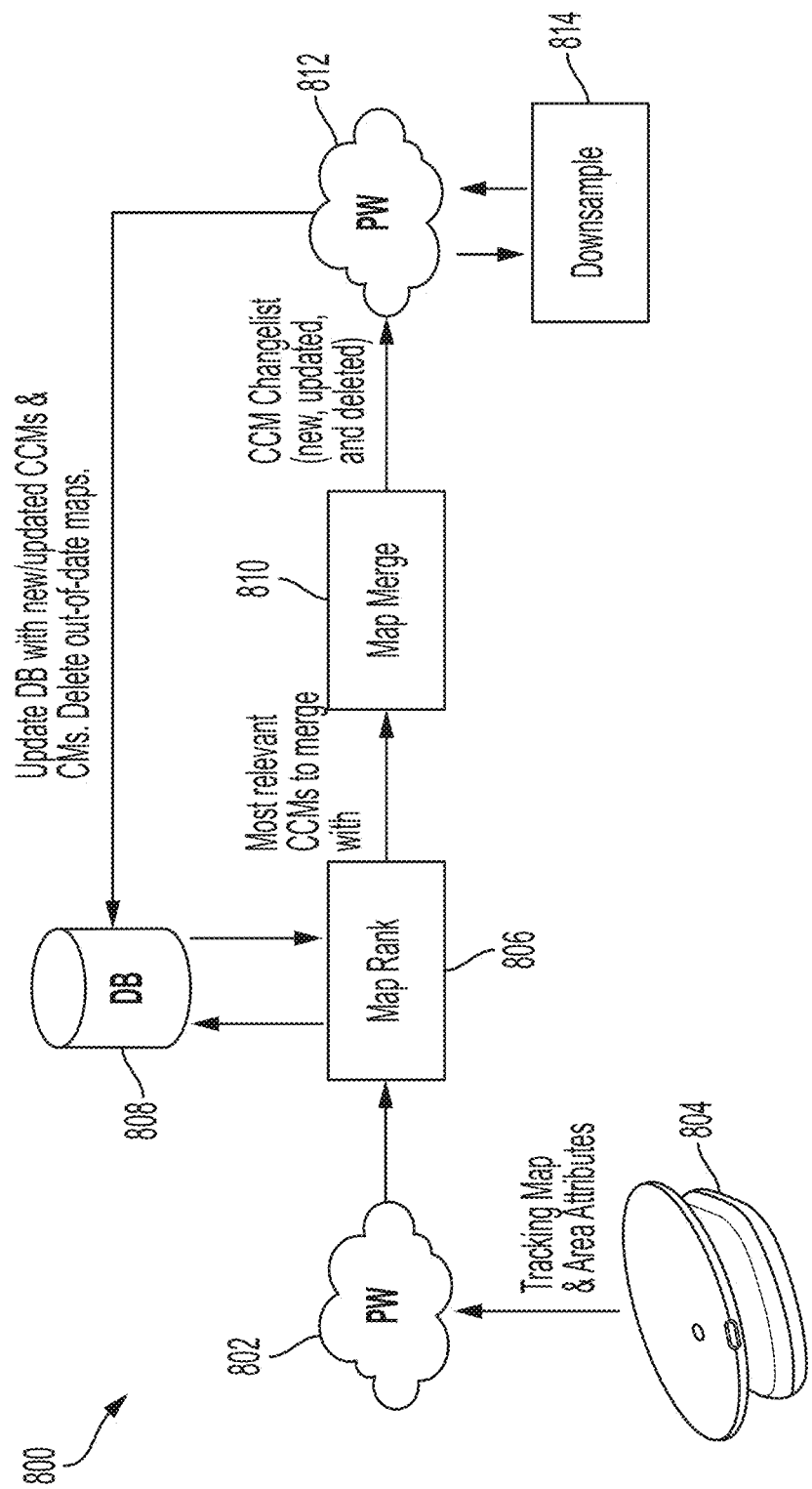
FIG. 26 is a schematic diagram illustrating an AR system configured to rank and merge a plurality of environment maps, according to some embodiments.

FIG. 26 depicts an AR system 800 configured to rank one or more environment maps, according to some embodiments. In this example, the ranking is being done as a precursor to a merge operation. The AR system may include a passable world model 802 of an AR device. Information to populate the passable world model 802 may come from sensors on the AR device, which may include computer executable instructions stored in a processor 804 (e.g., a local data processing module 570 in FIG. 4), which may perform some or all of the processing to convert sensor data into a map. Such a map may be a tracking map, as it can be built as sensor data is collected as the AR device operates in a region. Along with that tracking map, area attributes, which may be formatted as metadata of the map, may be supplied so as to indicate the area that the tracking map represents. These area attributes may be a geographic location identifier, such as coordinates presented as latitude and longitude or an ID used by the AR system to represent a location. Alternatively or additionally, the area attributes may be measured characteristics that have a high likelihood of being unique for that area. The area attributes, for example, may be derived from parameters of wireless networks detected in the area. In some embodiments, the area attribute may be associated with a unique address of an access-point the AR system is nearby and/or connected to. For example, the area attribute may be associated with a MAC address or basic service set identifiers (BSSIDs) of a 5G base station/router, a Wi-Fi router, and the like.

The attributes may be attached to the map itself or to locations represented in the map. For example, an attribute of a tracking map may be associated with a persistent pose in the map. For a canonical map, the attributes may be associated with a persistent coordinate frame or a tile or other area of the map.

In the example of FIG. 26, the tracking maps may be merged with other maps of the environment. A map rank portion 806 receives tracking maps from the device PW 802 and communicates with a map database 808 to select and rank environment maps from the map database 808. Higher ranked, selected maps are sent to a map merge portion 810.

The map merge portion 810 may perform merge processing on the maps sent from the map rank portion 806. Merge processing may entail merging the tracking map with some or all of the ranked maps and transmitting the new, merged maps to a passable world model 812. The map merge portion may merge maps by identifying maps that depict overlapping portions of the physical world. Those overlapping portions may be aligned such that information in both maps may be aggregated into a final map.

In some embodiments, the overlapping portions may be identified by first identifying a set of features in a canonical map that likely correspond with a set of features associated with a persistent pose in a tracking map. The set of features in the canonical map may be a set of features defining a persistent coordinate frame. However, there is no requirement that the set of features be associated with a single persistent location in either the canonical map or the tracking map. In some embodiments, processing may be simplified by identifying correspondences between sets of features to which attributes have been assigned, such that values of those attributes may be compared to select sets of features for further processing.

Once a set of candidate maps, or in some embodiments candidate areas of maps, have been identified, further steps may reduce the set of candidates, and may ultimately lead to the identification of a matching map. One such step may be computing a transformation of the set of feature points in the tracking map to align with the candidate set of features in the canonical map. This transformation may be applied to the entire tracking map, enabling overlapping portions of the tracking map and the canonical map to be identified. Correspondence, above a threshold, between features in the overlapping portions may indicate a strong likelihood that the tracking map has been registered with the canonical map. If the correspondence is below the threshold, other candidate sets of features in the tracking map and/or canonical map may be processed in an attempt to find matching regions of the maps. When a sufficiently large correspondence is found, the tracking map may be regarded as being localized with respect to the canonical map, with the transformation leading to the large correspondence indicating the location of the tracking map relative to the canonical map.

Similar processing may be performed to merge canonical maps with other canonical maps as well as with tracking maps. Merging of canonical map may be performed from time to time to identify scenarios in which canonical maps have been extended through repeated merging of tracking maps such that multiple maps represent an overlapping region of the physical world. Regardless of the type of maps that are merged, when there is overlap between the maps being merged, merging may entail aggregating data from both maps. The aggregation may entail extending one map with information from another map. Alternatively or additionally, aggregation may entail adjusting the representation of the physical world in one map, based on information in another map. A later map, for example, may reveal that objects giving rise to feature points have moved, such that the map may be updated based on later information. Alternatively, two maps may characterize the same region with different feature points and aggregating may entail selecting a set of feature points from the two maps to better represent that region.

Regardless of the specific processing that occurs in the merging process, in some embodiments, persistent locations, such as persistent poses or PCFs, from all maps that are merged may be retained, such that applications positioning content with respect to them may continue to do so. In some embodiments, merging of maps may result in redundant persistent poses, and some of the persistent poses may be deleted. When a PCF is associated with a persistent pose that is to be deleted, merging maps may entail modifying the PCF to be associated with a persistent pose remaining in the map after merging.

In some embodiments, as maps are extended and or updated, they may be refined. Refinement may entail computation to reduce internal inconsistency between feature points that likely represent the same object in the physical world. Inconsistency may result from inaccuracies in the poses associated with key frames supplying feature points that represent the same objects in the physical world. Such inconsistency may result, for example, from an XR device computing poses relative to a tracking map, which in turn is built based on estimating poses, such that errors in pose estimation accumulate, creating a "drift" in pose accuracy over time. By performing a bundle adjustment or other operation to reduce inconsistencies of the feature points from multiple key frames, the map may be refined.

Upon a refinement, the location of a persistent point relative to the origin of a map may change. Accordingly, the transformation associated with that persistent point, such as a persistent pose or a PCF, may change. In some embodiments, the XR system, in connection with map refinement (whether as part of a merge operation or performed for other reasons) may re-compute transformations associated with any persistent points that have changed. These transformations might be pushed from a component computing the transformations to a component using the transformation such that any uses of the transformations may be based on the updated location of the persistent points.

Merging may also entail assigning location metadata to locations in the merged map based on attributes associated with locations in the maps to being merged. For example, the attributes of a canonical map may be derived from the attributes of the tracking map or maps used to form an area of the canonical map. In scenarios in which a persistent coordinate frame of a canonical map is defined based on a persistent pose in a tracking map that was merged into the canonical map, the persistent coordinate frame may be assigned the same attributes as the persistent pose. Where a persistent coordinate frame is derived from one or more persistent poses from one or more tracking maps, the attributes assigned to the persistent coordinate frame may be an aggregation of the attributes of the persistent poses. The manner in which attributes are aggregated may vary based on the type of attribute. Geo-location attributes may be aggregated by interpolating a value of the attribute for the location of the persistent coordinate frame from the geo-location information associated with the persistent poses. For other attributes, the values may be aggregated by considering all to apply to the persistent coordinate frame. Similar logic may be applied to derive attributes for tiles or other areas of a map.

In scenarios in which a tracking map submitted for merging does not have sufficient correlation to any previously stored canonical map, the system may create a new canonical map based on that tracking map. In some embodiments, the tracking map may be promoted to a canonical map. In this way, the region of the physical world represented by the set of canonical maps may grow as user devices submit tracking maps for merging.

Passable world model 812 may be a cloud model, which may be shared by multiple AR devices. Passable world model 812 may store or otherwise have access to the environment maps in map database 808. In some embodiments, when a previously computed environment map is updated, the prior version of that map may be deleted so as to remove out of date maps from the database. In some embodiments, when a previously computed environment map is updated, the prior version of that map may be archived enabling retrieving/viewing prior versions of an environment. In some embodiments, permissions may be set such that only AR systems having certain read/write access may trigger prior versions of maps being deleted/archived.

These environment maps created from tracking maps supplied by one or more AR devices/systems may be accessed by AR devices in the AR system. The map rank portion 806 also may be used in supplying environment maps to an AR device. The AR device may send a message requesting an environment map for its current location, and map rank portion 806 may be used to select and rank environment maps relevant to the requesting device.

In some embodiments, the AR system 800 may include a downsample portion 814 configured to receive the merged maps from the cloud PW 812. The received merged maps from the cloud PW 812 may be in a storage format for the cloud, which may include high resolution information, such as a large number of PCFs per square meter or multiple image frames or a large set of feature points associated with a PCF. The downsample portion 814 may be configured to downsample the cloud format maps to a format suitable for storage on AR devices. The device format maps may have less data, such as fewer PCFs or less data stored for each PCF to accommodate the limited local computing power and storage space of AR devices.

Figure 27:
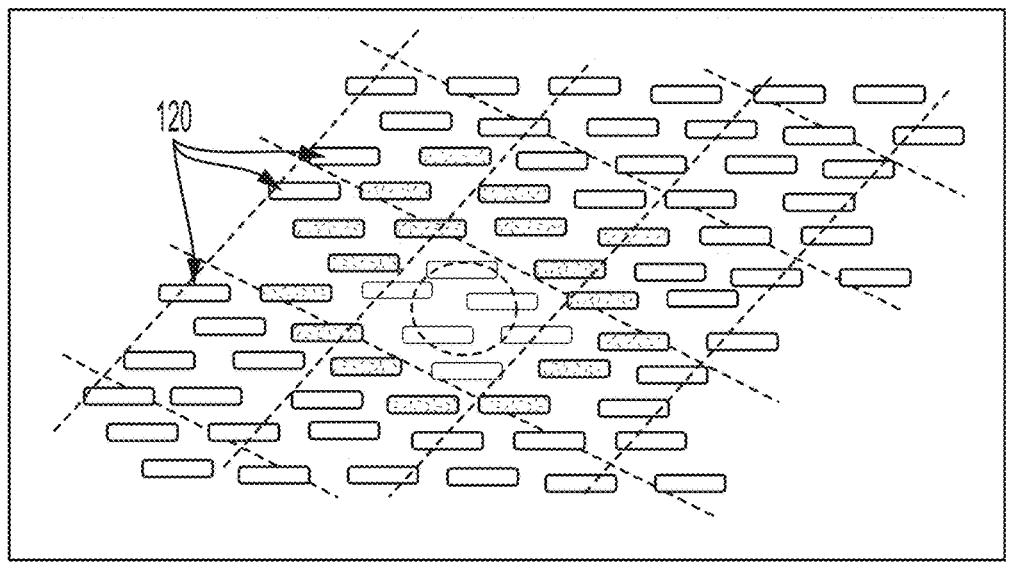
FIG. 27 is a simplified block diagram illustrating a plurality of canonical maps stored on a remote storage medium, according to some embodiments.

FIG. 27 is a simplified block diagram illustrating a plurality of canonical maps 120 that may be stored in a remote storage medium, for example, a cloud. Each canonical map 120 may include a plurality attributes serving as canonical map identifiers indicating the canonical map's location within a physical space, such as somewhere on the planet earth. These canonical map identifiers may include one or more of the following identifiers: area identifiers represented by a range of longitudes and latitudes, frame descriptors (e.g., global feature string 316 in FIG. 21), Wi-Fi fingerprints, feature descriptors (e.g., feature descriptors 310 in FIG. 21), and device identities indicating one or more devices that contributed to the map. In searching for a correspondence between maps, these attributes may be used to define which maps are compared and/or which portions or maps are compared.

Though each of the elements in FIG. 27 may be regarded as a separate map, in some embodiments, processing may be performed on tiles or other areas of canonical maps. Canonical maps 120, for example, may each represent an area of a larger map. In those embodiments, attributes may be assigned to areas instead of or in addition to the entire map. Accordingly, discussions herein of selection of a map may alternatively or additionally apply to selecting a segment of a map, such as one or more tiles.

In the illustrated example, the canonical maps 120 are disposed geographically in a two-dimensional pattern as they may exist on a surface of the earth. The canonical maps 120 may be uniquely identifiable by corresponding longitudes and latitudes because any canonical maps that have overlapping longitudes and latitudes may be merged into a new canonical map.

Figure 28:
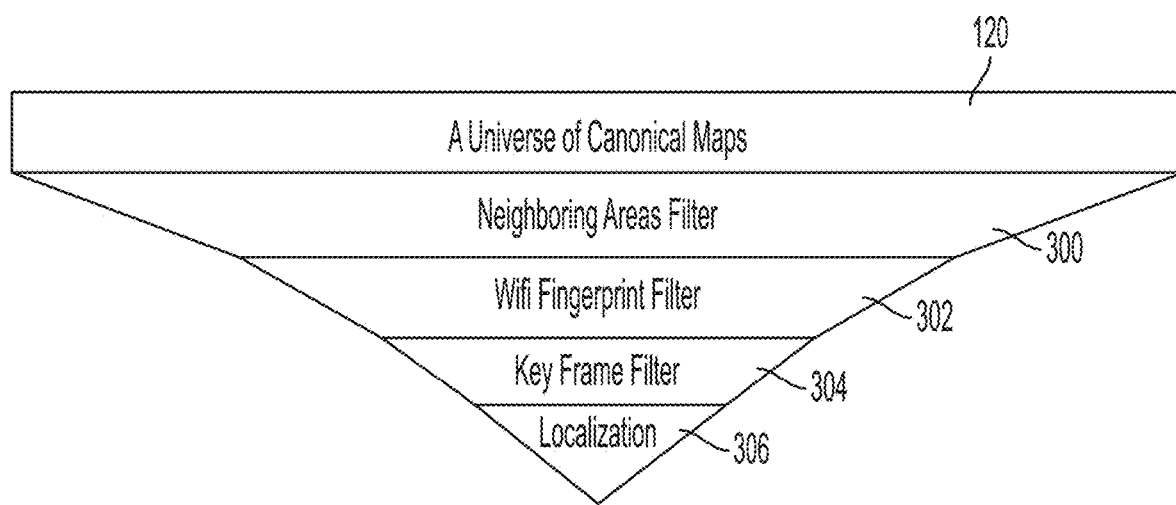
FIG. 28 is a schematic diagram illustrating a method of selecting canonical maps to, for example, localize a new tracking map in one or more canonical maps and/or obtain PCFs from the canonical maps, according to some embodiments.

FIG. 28 is a schematic diagram illustrating a method of selecting canonical maps, which may be used for localizing a new tracking map to one or more canonical maps, according to some embodiment. Such processing may be used in identifying candidate maps for merging or may be used to localize a user device with respect to a canonical map. The method may start from accessing (Act 120) a universe of canonical maps 120, which may be stored, as an example, in a database in a passable world (e.g., the passable world module 538). The universe of canonical maps may include canonical maps from all previously visited locations. An XR system may filter the universe of all canonical maps to a small subset or just a single map. The selected set may be sent to a user device for further processing on the device. Alternatively or additionally, some or all of the further processing may be performed in the cloud, and results of that processing may be sent to the user device and/or stored in the cloud, as is the case for merging maps.

The method may include filtering (Act 300) the universe of canonical maps. In some embodiments, Act 300 may select at least one matching canonical map 120 covering longitude and latitude that include that longitude and latitude of the position identifier received from an XR device, as long as at least one map exists at that longitude and latitude. In some embodiments, the Act 300 may select at least one neighboring canonical map covering longitude and latitude that are adjacent the matching canonical map. In some embodiments, the Act 300 may select a plurality of matching canonical maps and a plurality of neighboring canonical maps. The Act 300 may, for example, reduce the number of canonical maps approximately ten times, for example, from thousands to hundreds to form a first filtered selection. Alternatively or additionally, criteria other than latitude and longitude may be used to identify neighboring maps. An XR device, for example, may have previously localized with a canonical map in the set as part of the same session. A cloud service may retain information about the XR device, including maps previously localized to. In this example, the maps selected at Act 300 may include those that cover an area adjacent to the map to which the XR device localized to.

The method may include filtering (Act 302) the first filtered selection of canonical maps based on Wi-Fi fingerprints. The Act 302 may determine a latitude and longitude based on a Wi-Fi fingerprint received as part of the position identifier from an XR device. The Act 302 may compare the latitude and longitude from the Wi-Fi fingerprint with latitude and longitude of the canonical maps 120 to determine one or more canonical maps that form a second filtered selection. The Act 302 may reduce the number of canonical maps approximately ten times, for example, from hundreds to tens of canonical maps (e.g., 50) that form a second selection For example, a first filtered selection may include 130 canonical maps and the second filtered selection may include 50 of the 130 canonical maps and may not include the other 80 of the 130 canonical maps.

The method may include filtering (Act 304) the second filtered selection of canonical maps based on key frames. The Act 304 may compare data representing an image captured by an XR device with data representing the canonical maps 120. In some embodiments, the data representing the image and/or maps may include feature descriptors (e.g., DSF descriptors in FIG. 25) and/or global feature strings (e.g., 316 in FIG. 21). The Act 304 may provide a third filtered selection of canonical maps. In some embodiments, the output of Act 304 may only be five of the 50 canonical maps identified following the second filtered selection, for example. The map transmitter 122 then transmits the one or more canonical maps based on the third filtered selection to the viewing device. The Act 304 may reduce the number of canonical maps for approximately ten times, for example, from tens to single digits of canonical maps (e.g., 5) that form a third selection. In some embodiments, an XR device may receive canonical maps in the third filtered selection, and attempt to localize into the received canonical maps.

For example, the Act 304 may filter the canonical maps 120 based on the global feature strings 316 of the canonical maps 120 and the global feature string 316 that is based on an image that is captured by the viewing device (e.g. an image that may be part of the local tracking map for a user). Each one of the canonical maps 120 in FIG. 27 thus has one or more global feature strings 316 associated therewith. In some embodiments, the global feature strings 316 may be acquired when an XR device submits images or feature details to the cloud and the cloud processes the image or feature details to generate global feature strings 316 for the canonical maps 120.

In some embodiments, the cloud may receive feature details of a live/new/current image captured by a viewing device, and the cloud may generate a global feature string 316 for the live image. The cloud may then filter the canonical maps 120 based on the live global feature string 316. In some embodiments, the global feature string may be generated on the local viewing device. In some embodiments, the global feature string may be generated remotely, for example on the cloud. In some embodiments, a cloud may transmit the filtered canonical maps to an XR device together with the global feature strings 316 associated with the filtered canonical maps. In some embodiments, when the viewing device localizes its tracking map to the canonical map, it may do so by matching the global feature strings 316 of the local tracking map with the global feature strings of the canonical map.

It should be appreciated that an operation of an XR device may not perform all of the Acts (300, 302, 304). For example, if a universe of canonical maps are relatively small (e.g., 500 maps), an XR device attempting to localize may filter the universe of canonical maps based on Wi-Fi fingerprints (e.g., Act 302) and Key Frame (e.g., Act 304), but omit filtering based on areas (e.g., Act 300). Moreover, it is not necessary that maps in their entireties be compared. In some embodiments, for example, a comparison of two maps may result in identifying common persistent points, such as persistent poses or PCFs that appear in both the new map the selected map from the universe of maps. In that case, descriptors may be associated with persistent points, and those descriptors may be compared.

Figure 29:
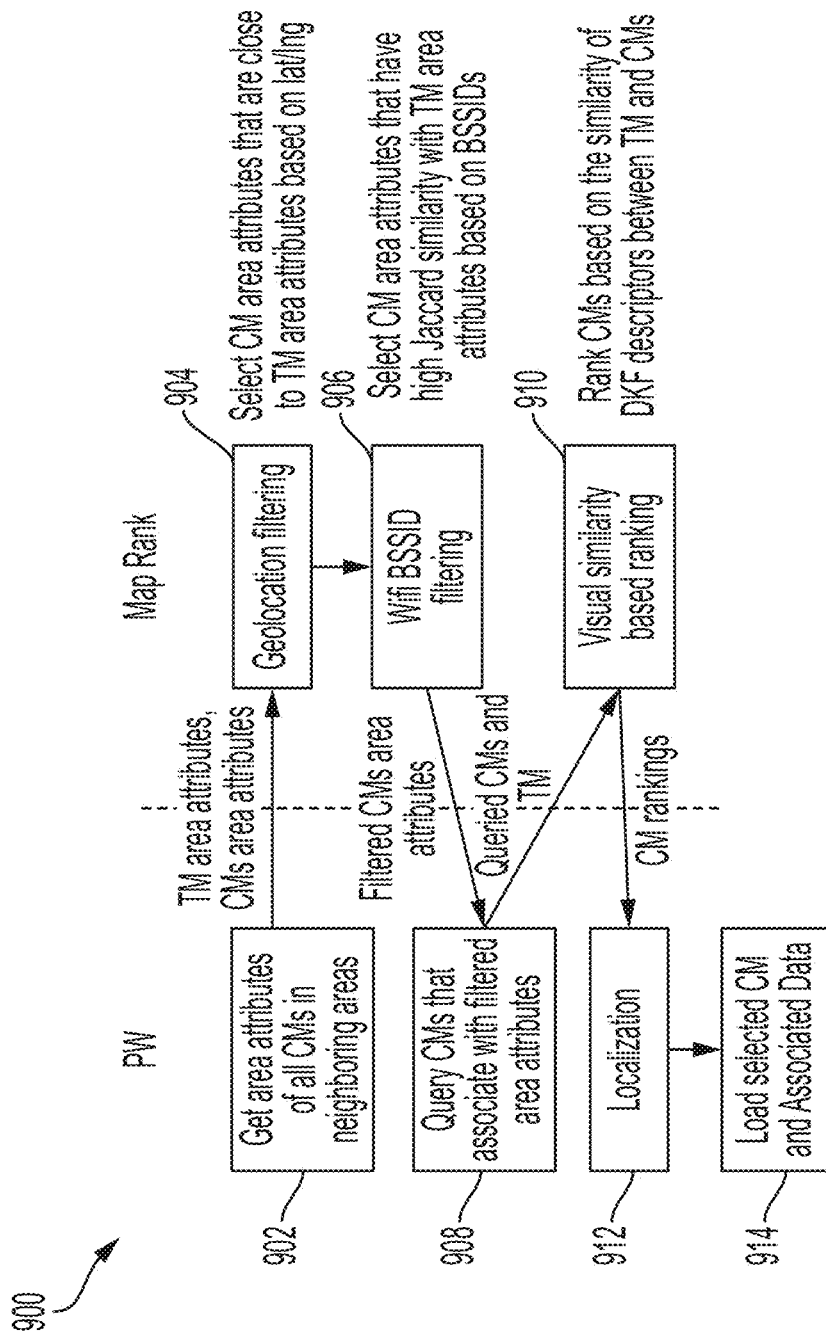
FIG. 29 is flow chart illustrating a method of selecting a plurality of ranked environment maps, according to some embodiments.

FIG. 29 is flow chart illustrating a method 900 of selecting one or more ranked environment maps, according to some embodiments. In the illustrated embodiment, the ranking is performed for a user's AR device that is creating a tracking map. Accordingly, the tracking map is available for use in ranking environment maps. In embodiments in which the tracking map is not available, some or all of portions of the selection and ranking of environment maps that do not expressly rely on the tracking map may be used.

The method 900 may start at Act 902, where a set of maps from a database of environment maps (which may be formatted as canonical maps) that are in the neighborhood of the location where the tracking map was formed may be accessed and then filtered for ranking. Additionally, at Act 902, at least one area attribute for the area in which the user's AR device is operating is determined. In scenarios in which the user's AR device is constructing a tracking map, the area attributes may correspond to the area over which the tracking map was created. As a specific example, the area attributes may be computed based on received signals from access points to computer networks while the AR device was computing the tracking map.

Figure 30:
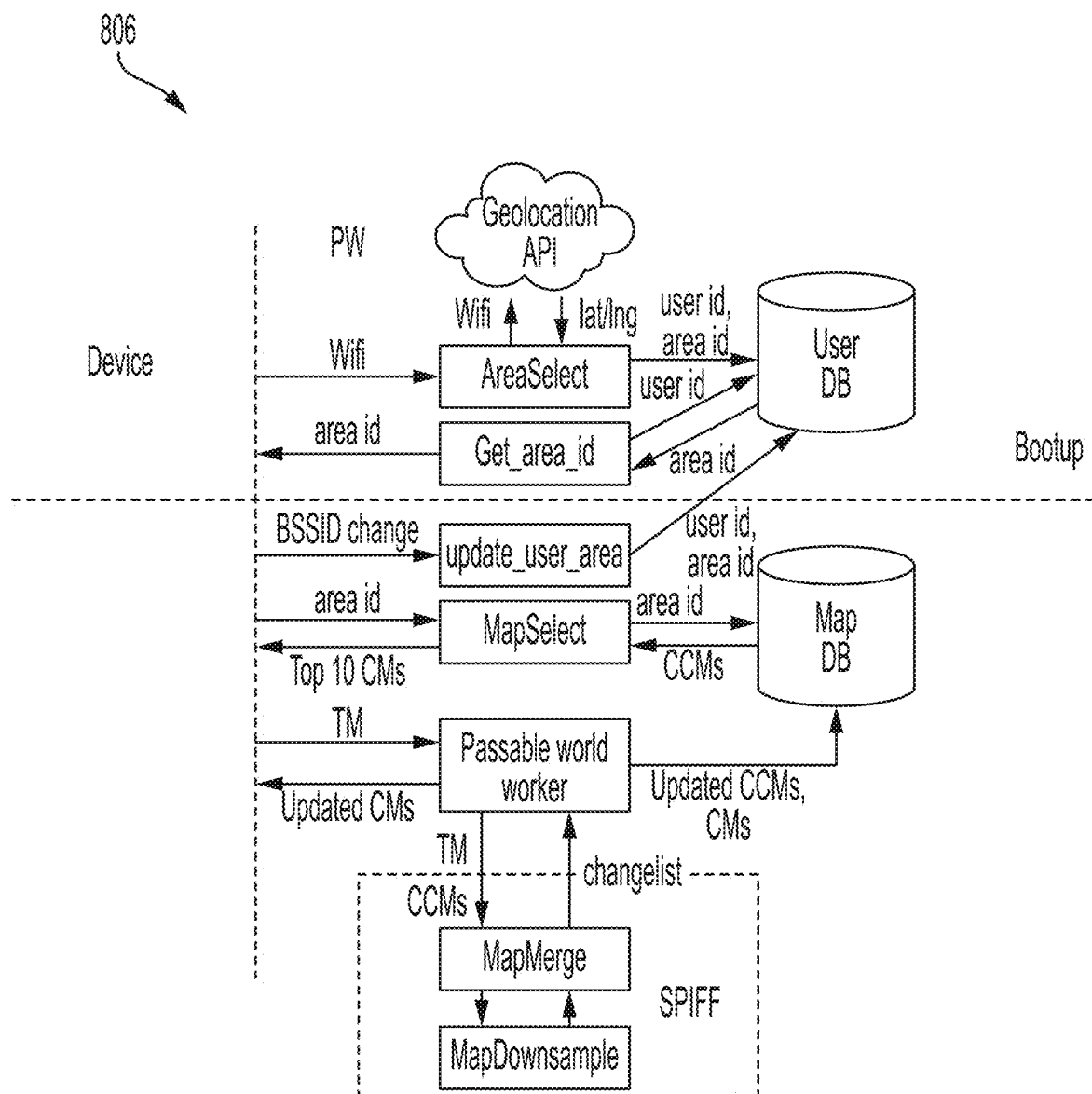
FIG. 30 is a schematic diagram illustrating an exemplary map rank portion of the AR system of FIG. 26, according to some embodiments.

FIG. 30 depicts an exemplary map rank portion 806 of the AR system 800, according to some embodiments. The map rank portion 806 may be executing in a cloud computing environment, as it may include portions executing on AR devices and portions executing on a remote computing system such as a cloud. The map rank portion 806 may be configured to perform at least a portion of the method 900.

Figure 31B:
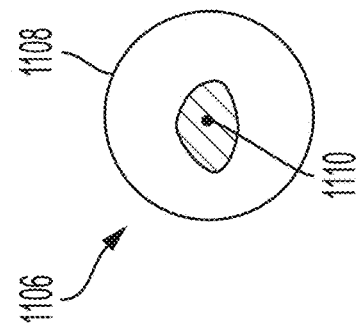
FIG. 31B is a schematic diagram illustrating an example of determining a geographic location of a tracking map (TM) for geo-location filtering of FIG. 29, according to some embodiments.
Figure 31A:
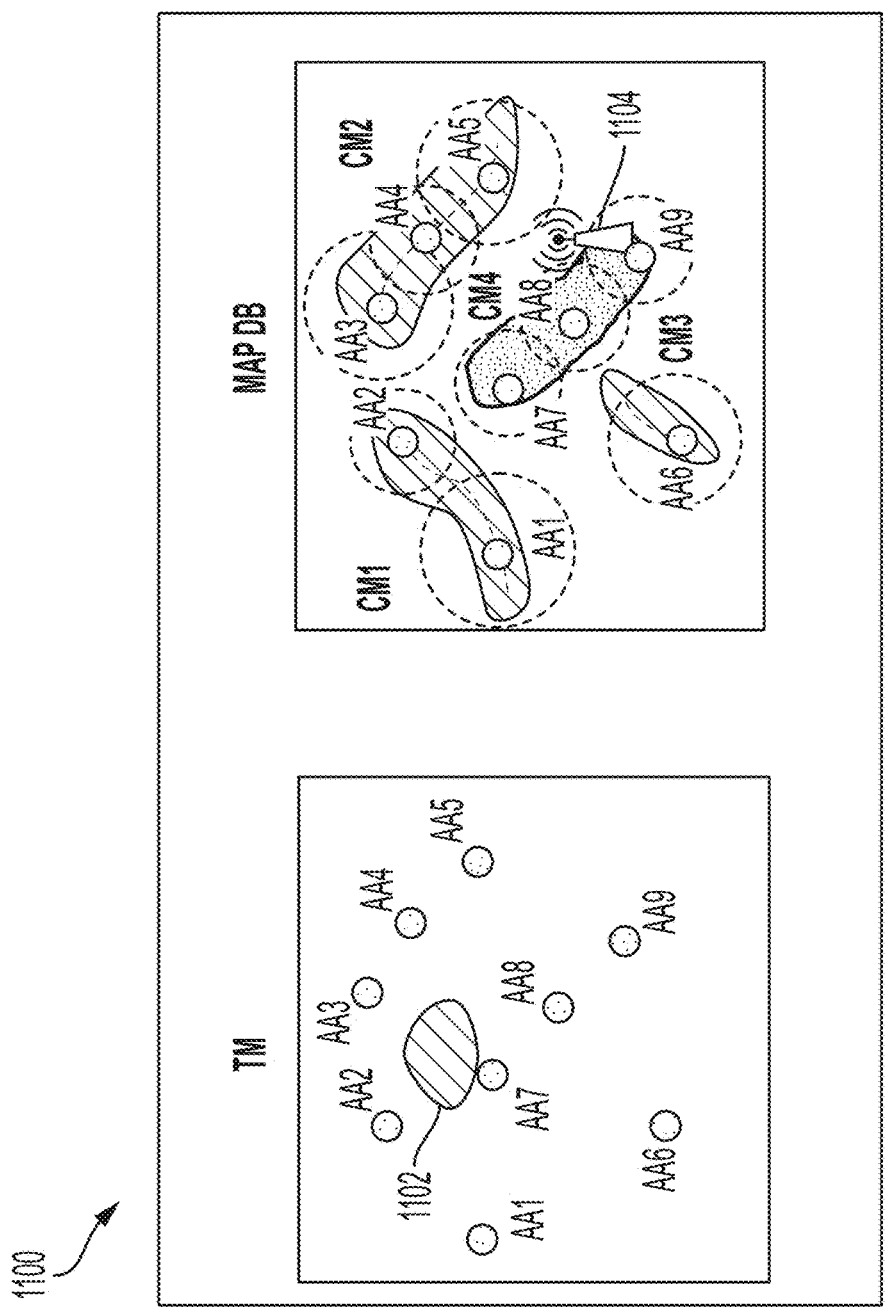
FIG. 31A is a schematic diagram illustrating an example of area attributes of a tracking map (TM) and environment maps in a database, according to some embodiments.

FIG. 31A depicts an example of area attributes AA1-AA8 of a tracking map (TM) 1102 and environment maps CM1-CM4 in a database, according to some embodiments. As illustrated, an environment map may be associated to multiple area attributes. The area attributes AA1-AA8 may include parameters of wireless networks detected by the AR device computing the tracking map 1102, for example, basic service set identifiers (BSSIDs) of networks to which the AR device are connected and/or the strength of the received signals of the access points to the wireless networks through, for example, a network tower 1104. The parameters of the wireless networks may comply with protocols including Wi-Fi and 5G NR. In the example illustrated in FIG. 32, the area attributes are a fingerprint of the area in which the user AR device collected sensor data to form the tracking map.

FIG. 31B depicts an example of the determined geographic location 1106 of the tracking map 1102, according to some embodiments. In the illustrated example, the determined geographic location 1106 includes a centroid point 1110 and an area 1108 circling around the centroid point. It should be appreciated that the determination of a geographic location of the present application is not limited to the illustrated format. A determined geographic location may have any suitable formats including, for example, different area shapes. In this example, the geographic location is determined from area attributes using a database relating area attributes to geographic locations. Databases are commercially available, for example, databases that relate Wi-Fi fingerprints to locations expressed as latitude and longitude and may be used for this operation.

In the embodiment of FIG. 29, a map database, containing environment maps may also include location data for those maps, including latitude and longitude covered by the maps. Processing at Act 902 may entail selecting from that database a set of environment maps that covers the same latitude and longitude determined for the area attributes of the tracking map.

Act 904 is a first filtering of the set of environment maps accessed in Act 902. In Act 902, environment maps are retained in the set based on proximity to the geo-location of the tracking map. This filtering step may be performed by comparing the latitude and longitude associated with the tracking map and the environment maps in the set.

Figure 32:
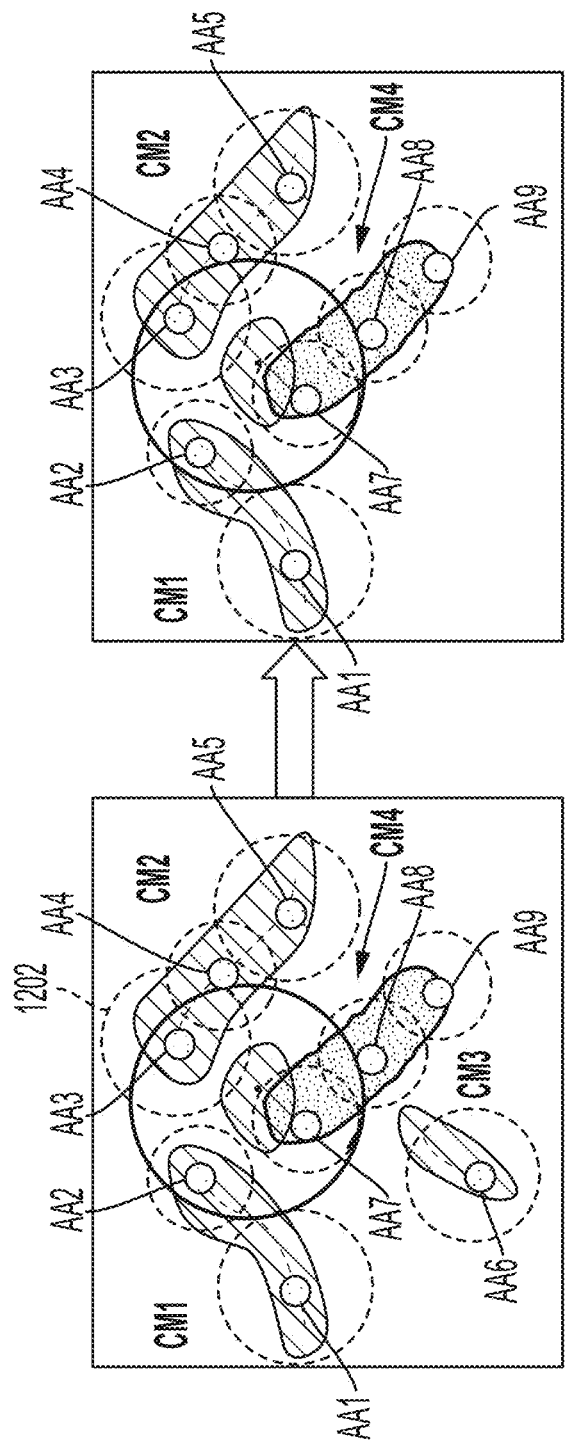
FIG. 32 is a schematic diagram illustrating an example of geo-location filtering of FIG. 29, according to some embodiments.

FIG. 32 depicts an example of Act 904, according to some embodiments. Each area attribute may have a corresponding geographic location 1202. The set of environment maps may include the environment maps with at least one area attribute that has a geographic location overlapping with the determined geographic location of the tracking map. In the illustrated example, the set of identified environment maps includes environment maps CM1, CM2, and CM4, each of which has at least one area attribute that has a geographic location overlapping with the determined geographic location of the tracking map 1102. The environment map CM3 associated with the area attribute AA6 is not included in the set because it is outside the determined geographic location of the tracking map.

Other filtering steps may also be performed on the set of environment maps to reduce/rank the number of environment maps in the set that is ultimately processed (such as for map merge or to provide passable world information to a user device). The method 900 may include filtering (Act 906) the set of environment maps based on similarity of one or more identifiers of network access points associated with the tracking map and the environment maps of the set of environment maps. During the formation of a map, a device collecting sensor data to generate the map may be connected to a network through a network access point, such as through Wi-Fi or similar wireless communication protocol. The access points may be identified by BSSID. The user device may connect to multiple different access points as it moves through an area collecting data to form a map. Likewise, when multiple devices supply information to form a map, the devices may have connected through different access points, so there may be multiple access points used in forming the map for that reason too. Accordingly, there may be multiple access points associated with a map, and the set of access points may be an indication of location of the map. Strength of signals from an access point, which may be reflected as an RSSI value, may provide further geographic information. In some embodiments, a list of BSSID and RSSI values may form the area attribute for a map.

Figure 33:
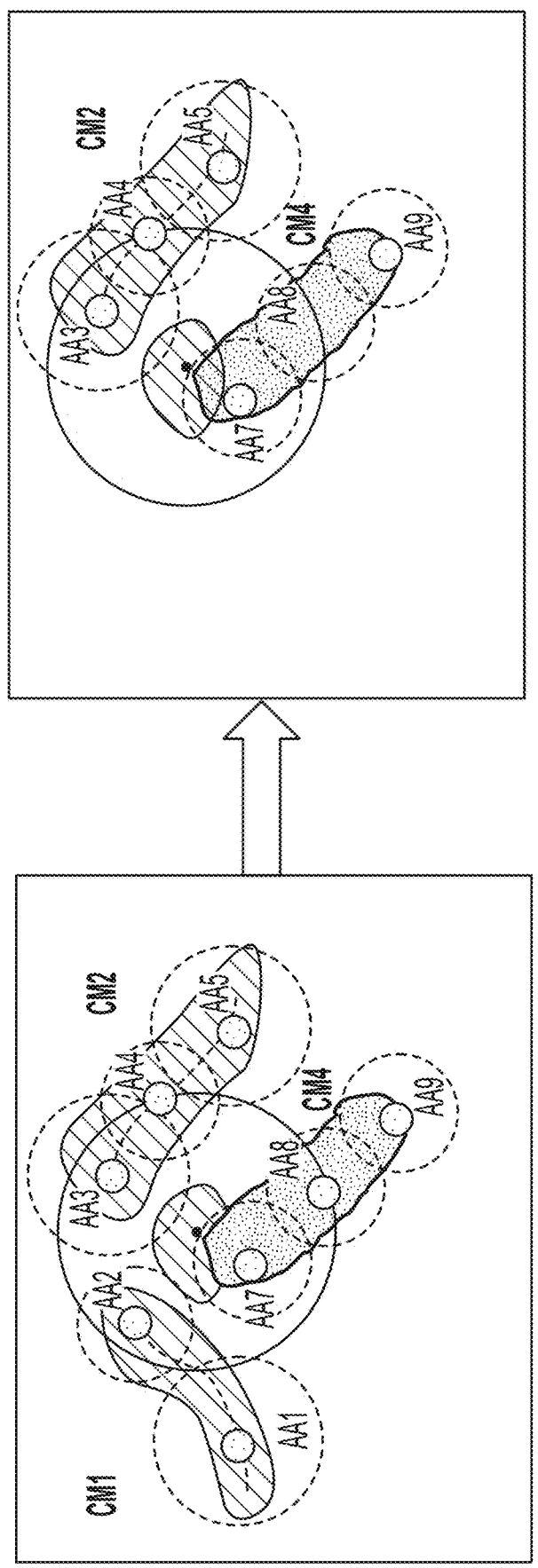
FIG. 33 is a schematic diagram illustrating an example of Wi-Fi BSSID filtering of FIG. 29, according to some embodiments.

In some embodiments, filtering the set of environment maps based on similarity of the one or more identifiers of the network access points may include retaining in the set of environment maps environment maps with the highest Jaccard similarity to the at least one area attribute of the tracking map based on the one or more identifiers of network access points. FIG. 33 depicts an example of Act 906, according to some embodiments. In the illustrated example, a network identifier associated with the area attribute AA7 may be determined as the identifier for the tracking map 1102. The set of environment maps after Act 906 includes environment map CM2, which may have area attributes within higher Jaccard similarity to AA7, and environment map CM4, which also include the area attributes AA7. The environment map CM1 is not included in the set because it has the lowest Jaccard similarity to AA7.

Processing at Acts 902-906 may be performed based on metadata associated with maps and without actually accessing the content of the maps stored in a map database. Other processing may involve accessing the content of the maps. Act 908 indicates accessing the environment maps remaining in the subset after filtering based on metadata. It should be appreciated that this act may be performed either earlier or later in the process, if subsequent operations can be performed with accessed content.

The method 900 may include filtering (Act 910) the set of environment maps based on similarity of metrics representing content of the tracking map and the environment maps of the set of environment maps. The metrics representing content of the tracking map and the environment maps may include vectors of values computed from the contents of the maps. For example, the Deep Key Frame descriptor, as described above, computed for one or more key frames used in forming a map may provide a metric for comparison of maps, or portions of maps. The metrics may be computed from the maps retrieved at Act 908 or may be pre-computed and stored as metadata associated with those maps. In some embodiments, filtering the set of environment maps based on similarity of metrics representing content of the tracking map and the environment maps of the set of environment maps, may include retaining in the set of environment maps environment maps with the smallest vector distance between a vector of characteristics of the tracking map and vectors representing environment maps in the set of environment maps.

The method 900 may include further filtering (Act 912) the set of environment maps based on degree of match between a portion of the tracking map and portions of the environment maps of the set of environment maps. The degree of match may be determined as a part of a localization process. As a non-limiting example, localization may be performed by identifying critical points in the tracking map and the environment map that are sufficiently similar as they could represent the same portion of the physical world. In some embodiments, the critical points may be features, feature descriptors, key frames/key rigs, persistent poses, and/or PCFs. The set of critical points in the tracking map might then be aligned to produce a best fit with the set of critical points in the environment map. A mean square distance between the corresponding critical points might be computed and, if below a threshold for a particular region of the tracking map, used as an indication that the tracking map and the environment map represent the same region of the physical world.

In some embodiments, filtering the set of environment maps based on degree of match between a portion of the tracking map and portions of the environment maps of the set of environment maps may include computing a volume of a physical world represented by the tracking map that is also represented in an environment map of the set of environment maps, and retaining in the set of environment maps environment maps with a larger computed volume than environment maps filtered out of the set. FIG. 34 depicts an example of Act 912, according to some embodiments. In the illustrated example, the set of environment maps after Act 912 includes environment map CM4, which has an area 1402 matched with an area of the tracking map 1102. The environment map CM1 is not included in the set because it has no area matched with an area of the tracking map 1102.

In some embodiments, the set of environment maps may be filtered in the order of Act 906, Act 910, and Act 912. In some embodiments, the set of environment maps may be filtered based on Act 906, Act 910, and Act 912, which may be performed in an order based on processing required to perform the filtering, from lowest to highest. The method 900 may include loading (Act 914) the set of environment maps and data.

In the illustrated example, a user database stores area identities indicating areas that AR devices were used in. The area identities may be area attributes, which may include parameters of wireless networks detected by the AR devices when in use. A map database may store multiple environment maps constructed from data supplied by the AR devices and associated metadata. The associated metadata may include area identities derived from the area identities of the AR devices that supplied data from which the environment maps were constructed. An AR device may send a message to a PW module indicating a new tracking map is created or being created. The PW module may compute area identifiers for the AR device and updates the user database based on the received parameters and/or the computed area identifiers. The PW module may also determine area identifiers associated with the AR device requesting the environment maps, identify sets of environment maps from the map database based on the area identifiers, filter the sets of environment maps, and transmit the filtered sets of environment maps to the AR devices. In some embodiments, the PW module may filter the sets of environment maps based on one or more criteria including, for example, a geographic location of the tracking map, similarity of one or more identifiers of network access points associated with the tracking map and the environment maps of the set of environment maps, similarity of metrics representing contents of the tracking map and the environment maps of the set of environment maps, and degree of match between a portion of the tracking map and portions of the environment maps of the set of environment maps.

Having thus described several aspects of some embodiments, it is to be appreciated that various alterations, modifications, and improvements will readily occur to those skilled in the art. As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

Further, FIG. 29 provides examples of criteria that may be used to filter candidate maps to yield a set of high ranking maps. Other criteria may be used instead of or in addition to the described criteria. For example, if multiple candidate maps have similar values of a metric used for filtering out less desirable maps, characteristics of the candidate maps may be used to determine which maps are retained as candidate maps or filtered out. For example, larger or more dense candidate maps may be prioritized over smaller candidate maps. In some embodiments, FIGS. 27-28 may describe all or part of the systems and methods described in FIGS. 29-34.

Figure 35:
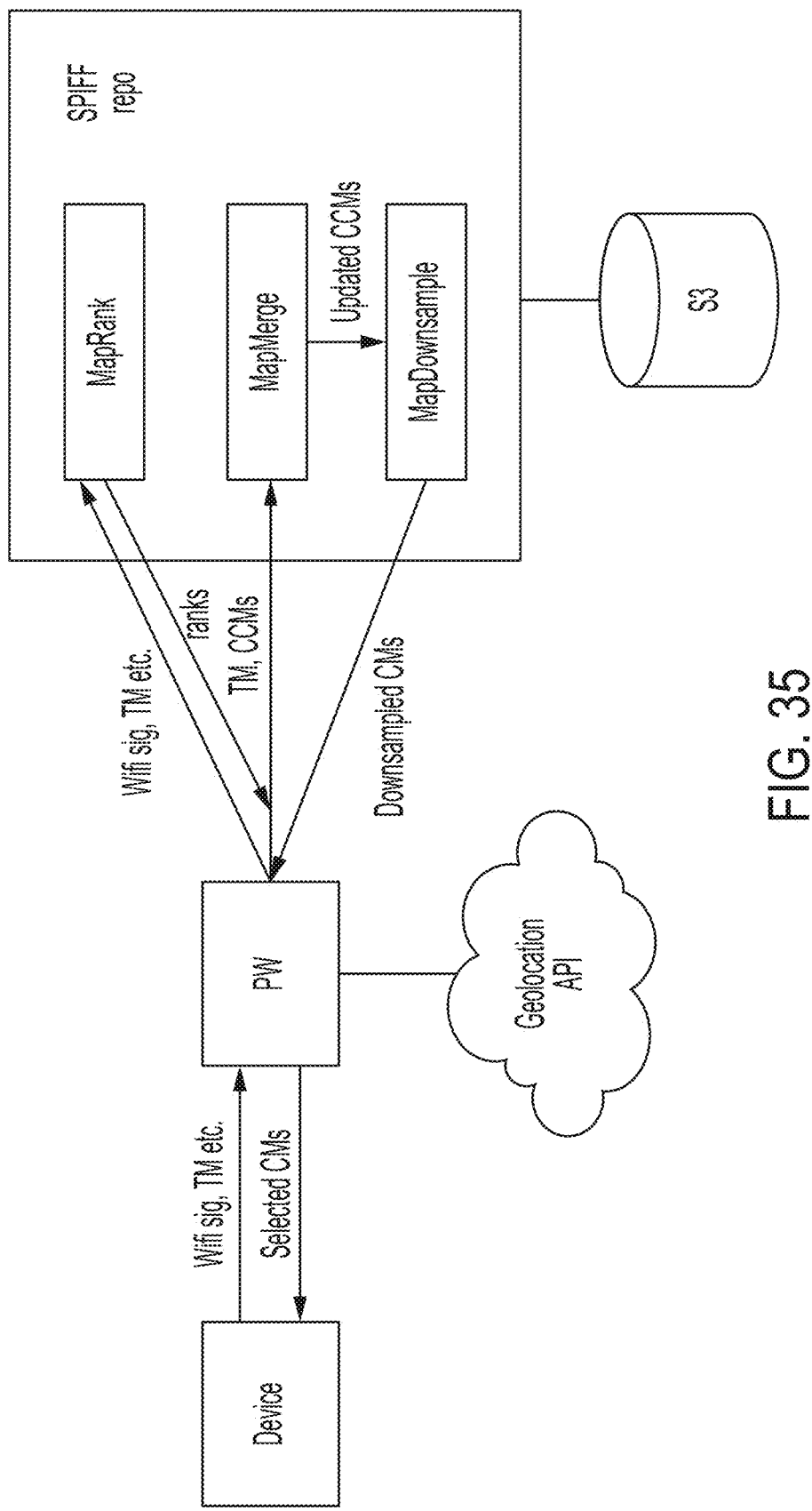
FIGS. 35 and 36 are block diagrams of an XR system configured to rank and merge a plurality of environment maps, according to some embodiments.
Figure 36:
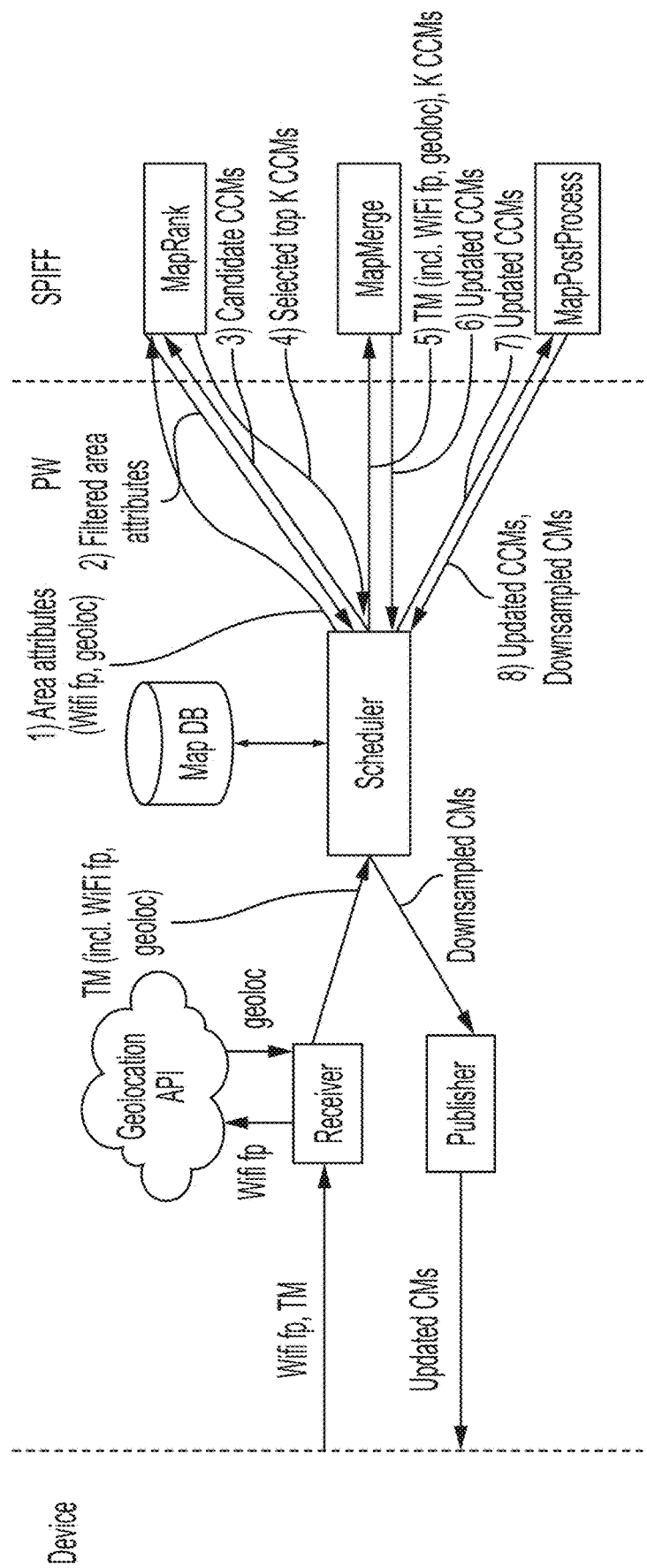

FIGS. 35 and 36 are schematic diagrams illustrating an XR system configured to rank and merge a plurality of environment maps, according to some embodiments. In some embodiments, a passable world (PW) may determine when to trigger ranking and/or merging the maps. In some embodiments, determining a map to be used may be based at least partly on deep key frames described above in relation to FIGS. 21-25, according to some embodiments.

Figure 37:
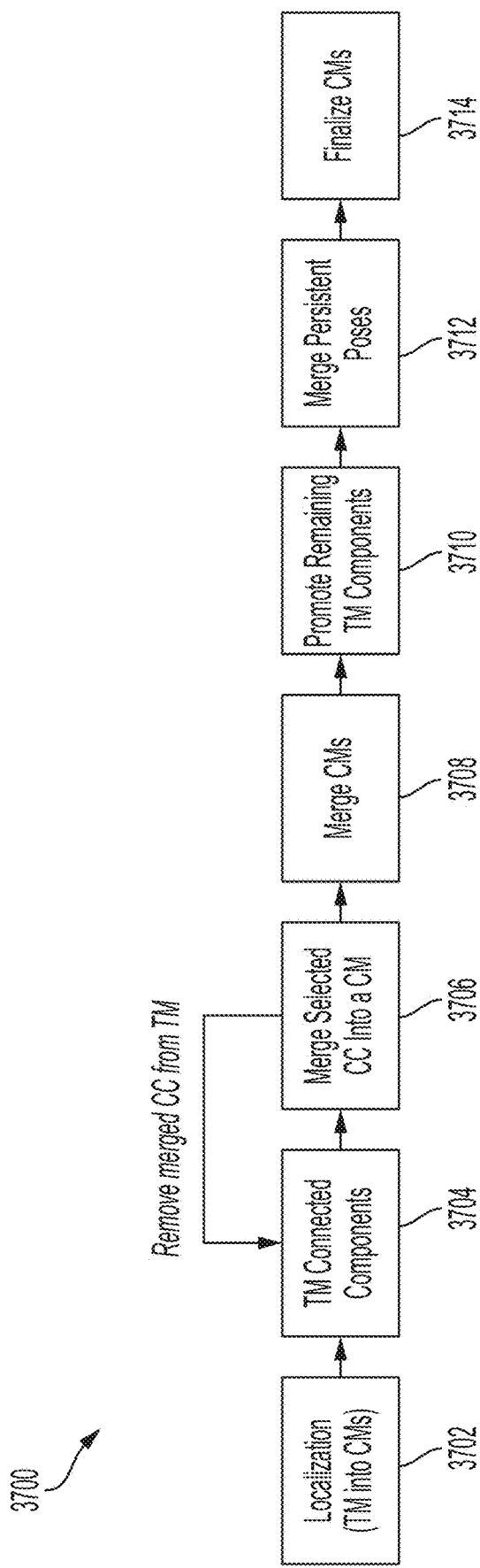
FIG. 37 is a block diagram illustrating a method of creating environment maps of a physical world, in a canonical form, according to some embodiments.

FIG. 37 is a block diagram illustrating a method 3700 of creating environment maps of a physical world, according to some embodiments. The method 3700 may start from localizing (Act 3702) a tracking map captured by an XR device worn by a user to a group of canonical maps (e.g., canonical maps selected by the method of FIG. 28 and/or the method 900 of FIG. 29). The Act 3702 may include localizing keyrigs of the tracking map into the group of canonical maps. The localization result of each keyrig may include the keyrig's localized pose and a set of 2D-to-3D feature correspondences.

In some embodiments, the method 3700 may include splitting (Act 3704) a tracking map into connected components, which may enable merging maps robustly by merging connected pieces. Each connected component may include keyrigs that are within a predetermined distance. The method 3700 may include merging (Act 3706) the connected components that are larger than a predetermined threshold into one or more canonical maps, and removing the merged connected components from the tracking map.

In some embodiments, the method 3700 may include merging (Act 3708) canonical maps of the group that are merged with the same connected components of the tracking map. In some embodiments, the method 3700 may include promoting (Act 3710) the remaining connected components of the tracking map that has not been merged with any canonical maps to be a canonical map. In some embodiments, the method 3700 may include merging (Act 3712) persistent poses and/or PCFs of the tracking maps and the canonical maps that are merged with at least one connected component of the tracking map. In some embodiments, the method 3700 may include finalizing (Act 3714) the canonical maps by, for example, fusing map points and pruning redundant keyrigs.

Figure 38A:
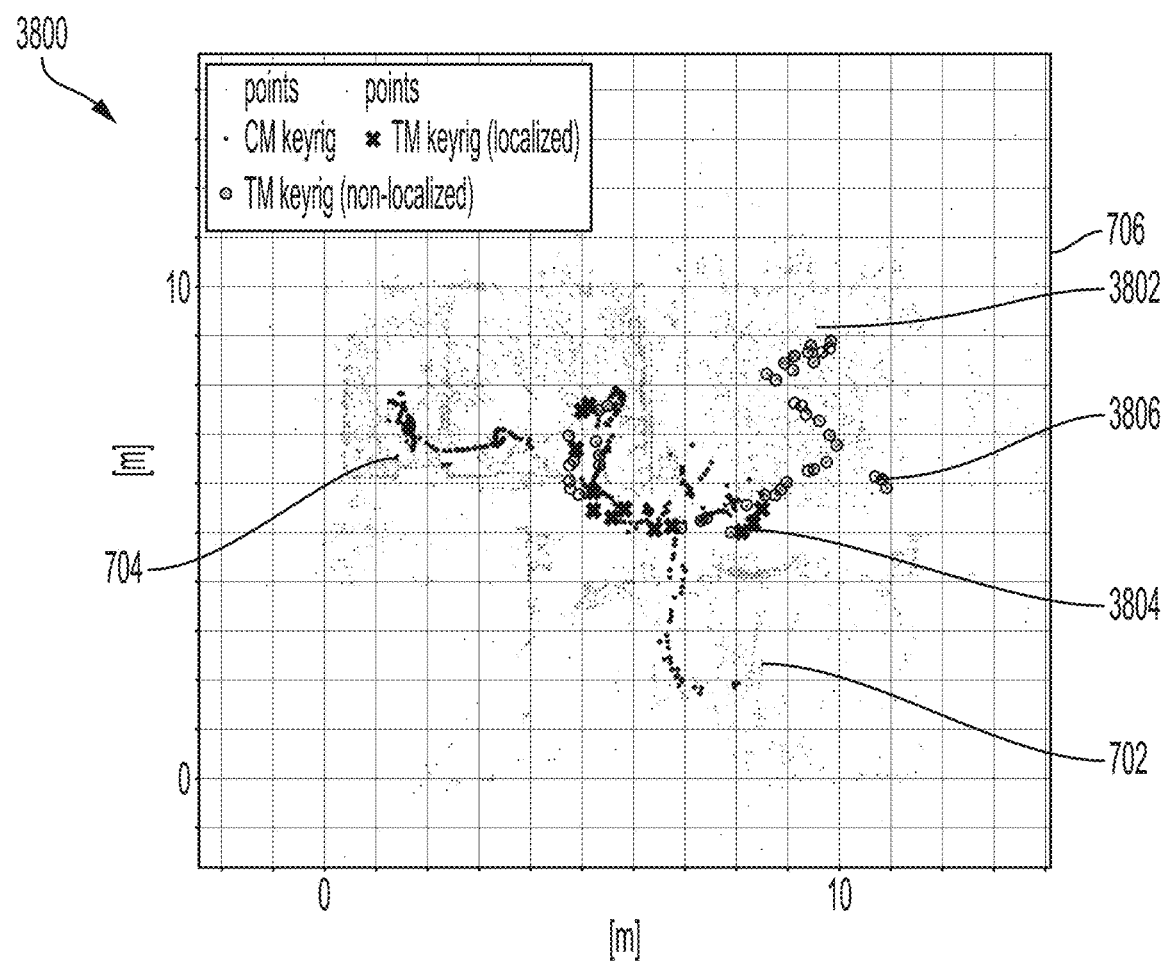
FIGS. 38A and 38B are schematic diagrams illustrating an environment map created in a canonical form by updating the tracking map of FIG. 7 with a new tracking map, according to some embodiments.
Figure 38B:
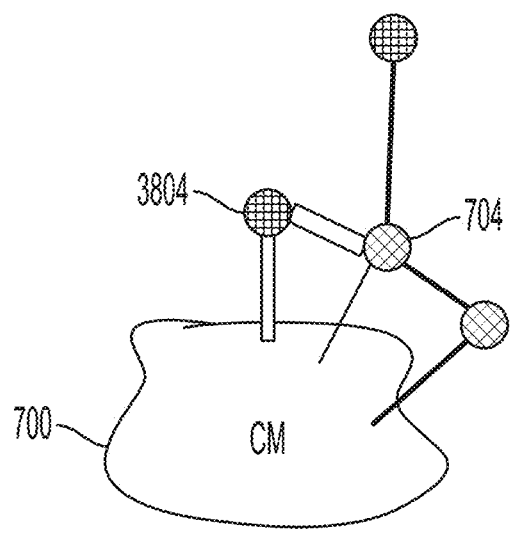

FIGS. 38A and 38B illustrate an environment map 3800 created by updating a canonical map 700, which may be promoted from the tracking map 700 (FIG. 7) with a new tracking map, according to some embodiments. As illustrated and described with respect to FIG. 7, the canonical map 700 may provide a floor plan 706 of reconstructed physical objects in a corresponding physical world, represented by points 702. In some embodiments, a map point 702 may represent a feature of a physical object that may include multiple features. A new tracking map may be captured about the physical world and uploaded to a cloud to merge with the map 700. The new tracking map may include map points 3802, and keyrigs 3804, 3806. In the illustrated example, keyrigs 3804 represent keyrigs that are successfully localized to the canonical map by, for example, establishing a correspondence with a keyrig 704 of the map 700 (as illustrated in FIG. 38B). On the other hand, keyrigs 3806 represent keyrigs that have not been localized to the map 700. Keyrigs 3806 may be promoted to a separate canonical map in some embodiments.

Figure 39A:
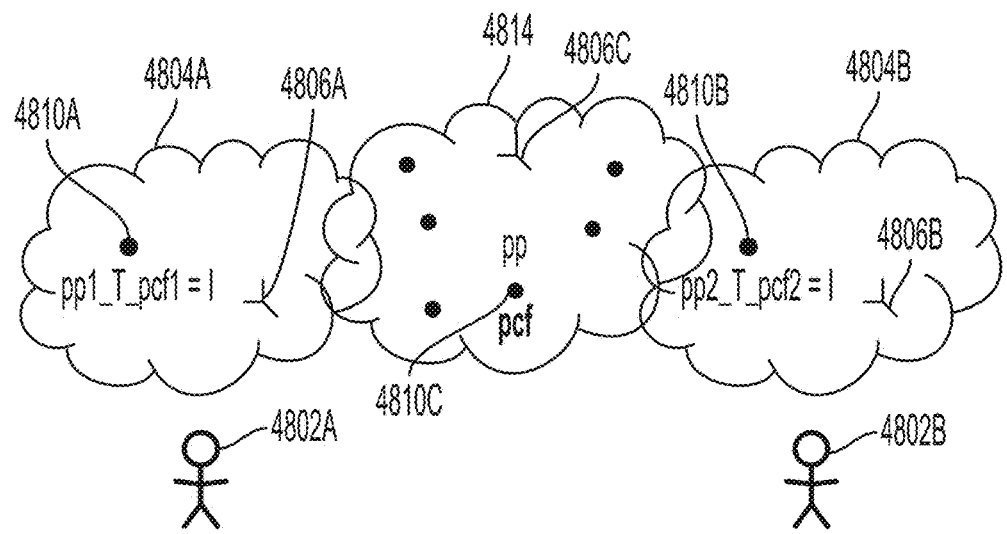
FIGS. 39A to 39F are schematic diagrams illustrating an example of merging maps, according to some embodiments.

FIGS. 39A to 39F are schematic diagrams illustrating an example of a cloud-based persistent coordinate system providing a shared experience for users in the same physical space. FIG. 39A shows that a canonical map 4814, for example, from a cloud, is received by the XR devices worn by the users 4802A and 4802B of FIGS. 20A-20C. The canonical map 4814 may have a canonical coordinate frame 4806C. The canonical map 4814 may have a PCF 4810C with a plurality of associated PPs (e.g., 4818A, 4818B in FIG. 39C).

Figure 39B:
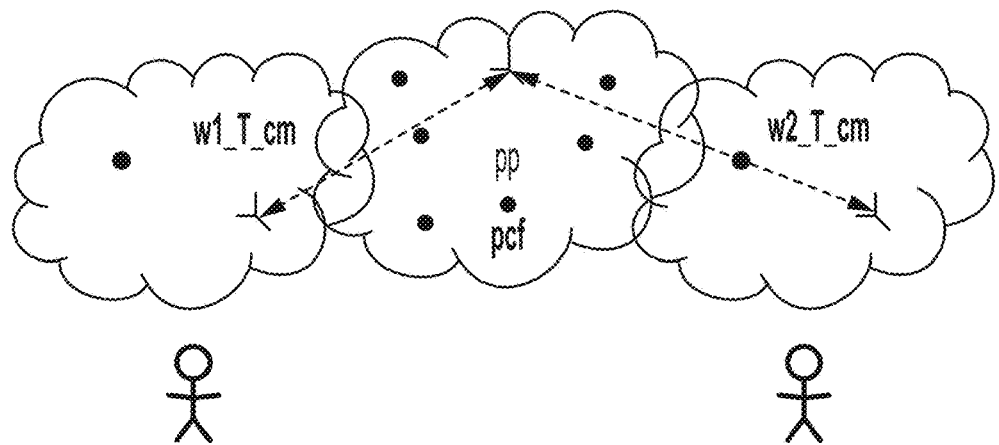

FIG. 39B shows that the XR devices established relationships between their respective world coordinate system 4806A, 4806B with the canonical coordinate frame 4806C. This may be done, for example, by localizing to the canonical map 4814 on the respective devices. Localizing the tracking map to the canonical map may result, for each device, a transformation between its local world coordinate system and the coordinate system of the canonical map.

Figure 39C:
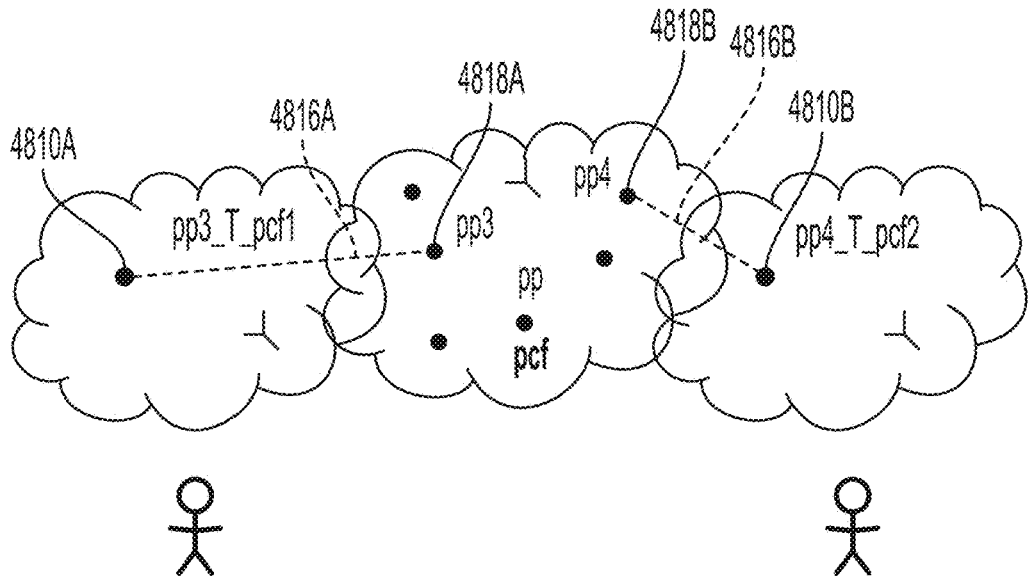

FIG. 39C shows that, as a result of localization, a transformation can be computed (e.g., transformation 4816A, 4816B) between a local PCF (e.g., PCFs 4810A, 4810B) on the respective device to a respective persistent pose (e.g., PPs 4818A, 4818B) on the canonical map. With these transformations, each device may use its local PCFs, which can be detected locally on the device by processing images detected with sensors on the device, to determine where with respect to the local device to display virtual content attached to the PPs 4818A, 4818B or other persistent points of the canonical map. Such an approach may accurately position virtual content with respect to each user and may enable each user to have the same experience of the virtual content in the physical space.

Figure 39D:
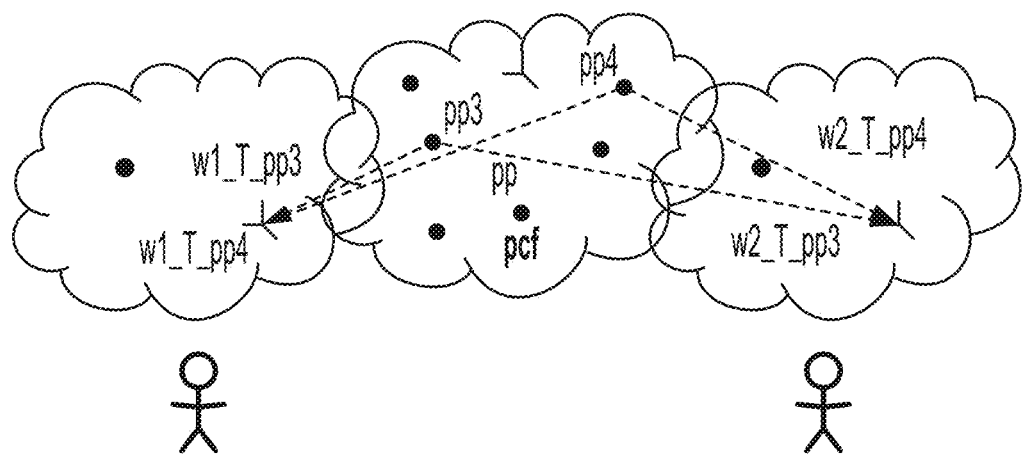
Figure 39E:
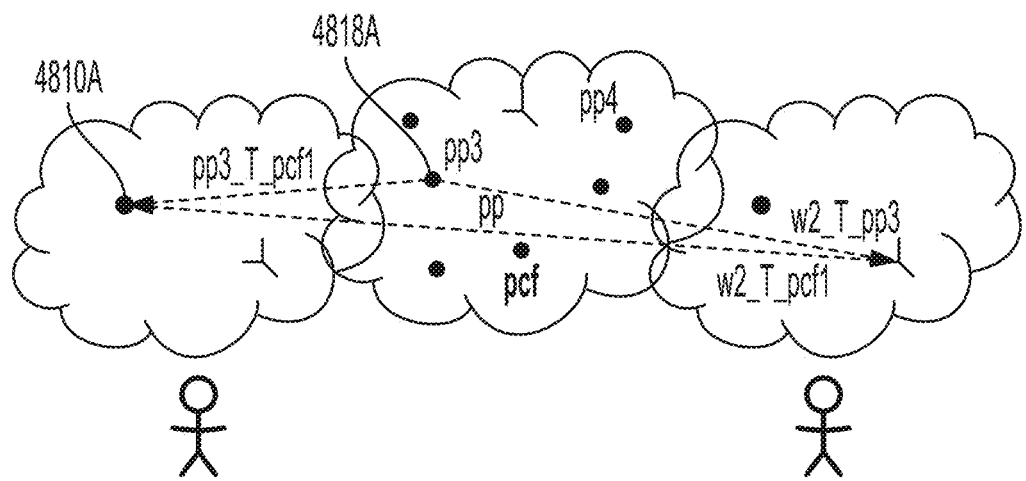
Figure 39F:
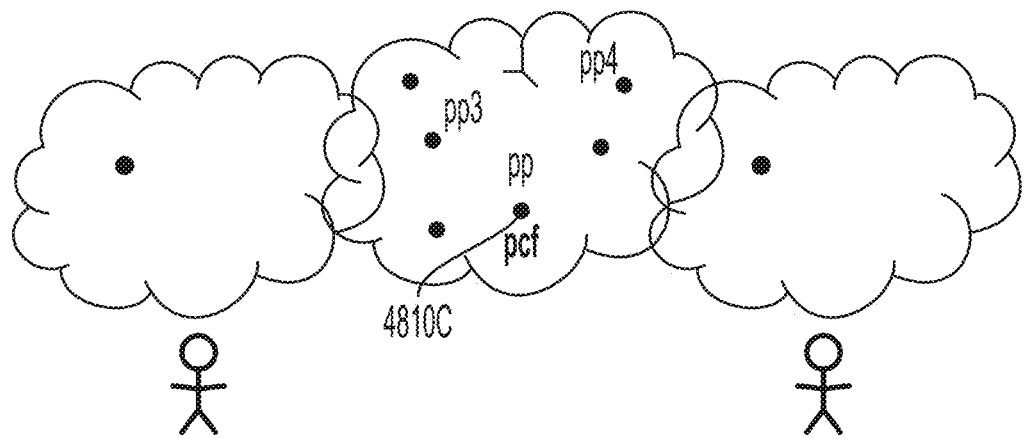

FIG. 39D shows a persistent pose snapshot from the canonical map to the local tracking maps. As can be seen, the local tracking maps are connected to one another via the persistent poses. FIG. 39E shows that the PCF 4810A on the device worn by the user 4802A is accessible in the device worn by the user 4802B through PPs 4818A. FIG. 39F shows that the tracking maps 4804A, 4804B and the canonical 4814 may merge. In some embodiments, some PCFs may be removed as a result of merging. In the illustrated example, the merged map includes the PCF 4810C of the canonical map 4814 but not the PCFs 4810A, 4810B of the tracking maps 4804A, 4804B. The PPs previously associated with the PCFs 4810A, 4810B may be associated with the PCF 4810C after the maps merge.

Examples

Figure 40:
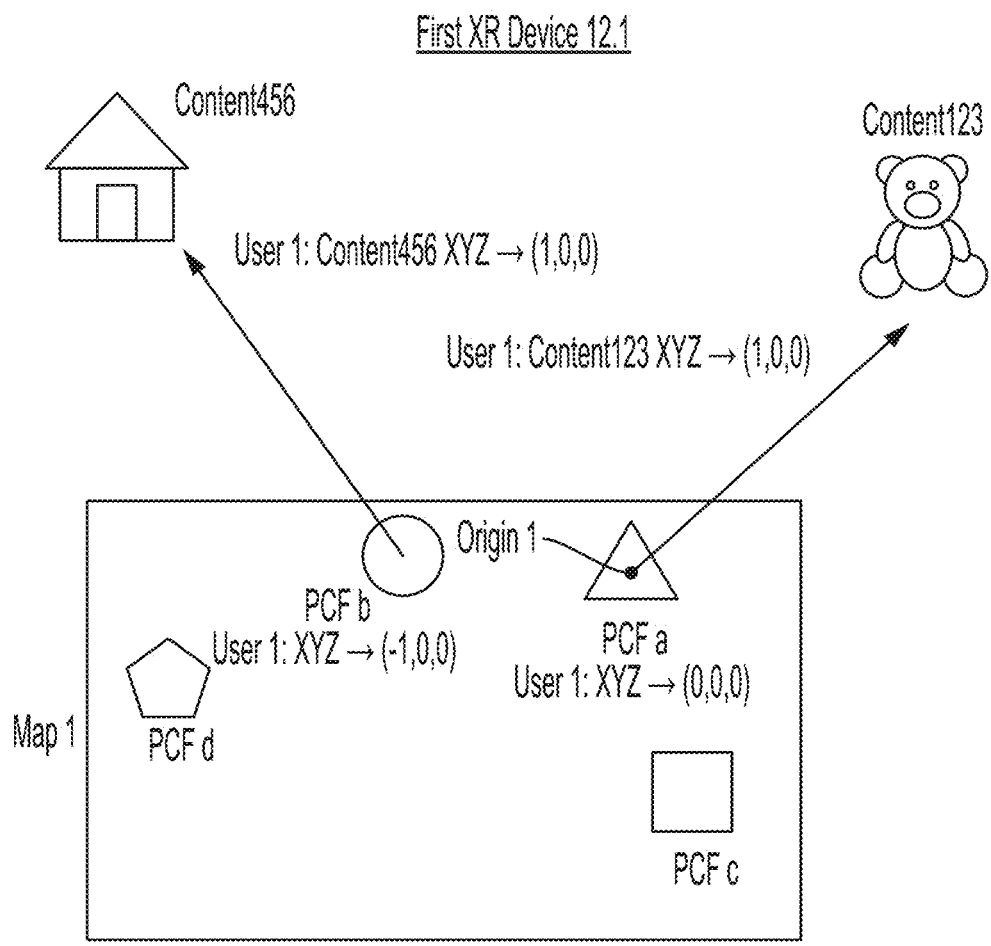
FIG. 40 is a two-dimensional representation of a three-dimensional first local tracking map (Map 1), which may be generated by the first XR device of FIG. 9, according to some embodiments.

FIGS. 40 and 41 illustrate an example of using a tracking map by the first XR device 12.1 of FIG. 9. FIG. 40 is a two-dimensional representation of a three-dimensional first local tracking map (Map 1), which may be generated by the first XR device of FIG. 9, according to some embodiments.

FIG. 41 is a block diagram illustrating uploading Map 1 from the first XR device to the server of FIG. 9, according to some embodiments.

FIG. 40 illustrates Map 1 and virtual content (Content123 and Content456) on the first XR device 12.1. Map 1 has an origin (Origin 1). Map 1 includes a number of PCFs (PCF a to PCF d). From the perspective of the first XR device 12.1, PCF a, by way of example, is located at the origin of Map 1 and has X, Y, and Z coordinates of (0,0,0) and PCF b has X, Y, and Z coordinates (−1,0,0). Content123 is associated with PCF a. In the present example, Content123 has an X, Y, and Z relationship relative to PCF a of (1,0,0). Content456 has a relationship relative to PCF b. In the present example, Content456 has an X, Y, and Z relationship of (1,0,0) relative to PCF b.

In FIG. 41, the first XR device 12.1 uploads Map 1 to the server 20. In this example, as the server stores no canonical map for the same region of the physical world represented by the tracking map, and the tracking map is stored as an initial canonical map. The server 20 now has a canonical map based on Map 1. The first XR device 12.1 has a canonical map that is empty at this stage. The server 20, for purposes of discussion, and in some embodiments, includes no other maps other than Map 1. No maps are stored on the second XR device 12.2.

The first XR device 12.1 also transmits its Wi-Fi signature data to the server 20. The server 20 may use the Wi-Fi signature data to determine a rough location of the first XR device 12.1 based on intelligence gathered from other devices that have, in the past, connected to the server 20 or other servers together with the GPS locations of such other devices that have been recorded. The first XR device 12.1 may now end the first session (See FIG. 8) and may disconnect from the server 20.

Figure 42:
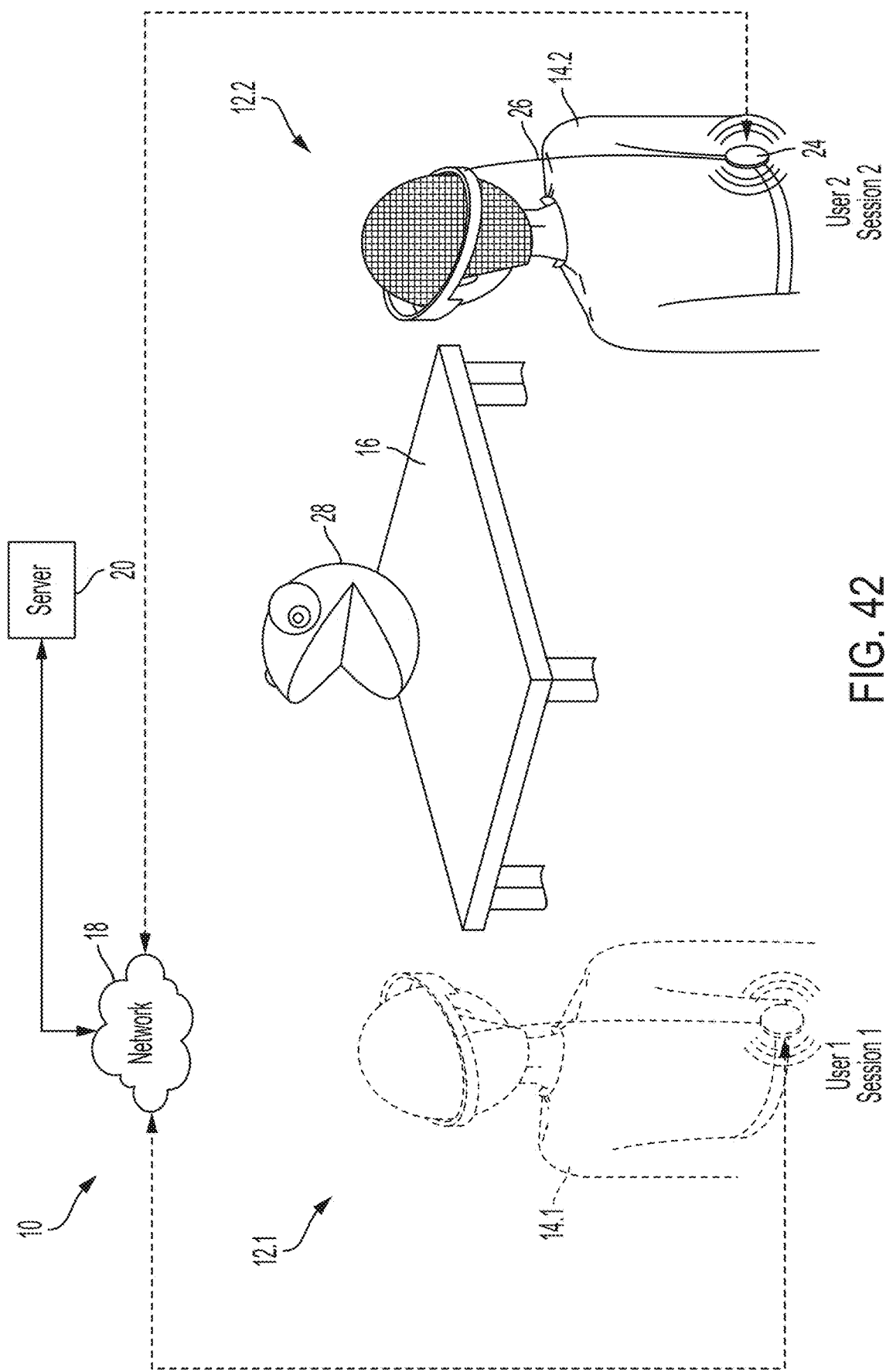
FIG. 42 is a schematic diagram illustrating the XR system of FIG. 16, showing the second user has initiated a second session using a second XR device of the XR system after the first user has terminated a first session, according to some embodiments.

FIG. 42 is a schematic diagram illustrating the XR system of FIG. 16, showing the second user 14.2 has initiated a second session using a second XR device of the XR system after the first user 14.1 has terminated a first session, according to some embodiments. FIG. 43A is a block diagram showing the initiation of a second session by a second user 14.2. The first user 14.1 is shown in phantom lines because the first session by the first user 14.1 has ended. The second XR device 12.2 begins to record objects. Various systems with varying degrees of granulation may be used by the server 20 to determine that the second session by the second XR device 12.2 is in the same vicinity of the first session by the first XR device 12.1. For example, Wi-Fi signature data, global positioning system (GPS) positioning data, GPS data based on Wi-Fi signature data, or any other data that indicates a location may be included in the first and second XR devices 12.1 and 12.2 to record their locations. Alternatively, the PCFs that are identified by the second XR device 12.2 may show a similarity to the PCFs of Map 1.

Figure 43B:
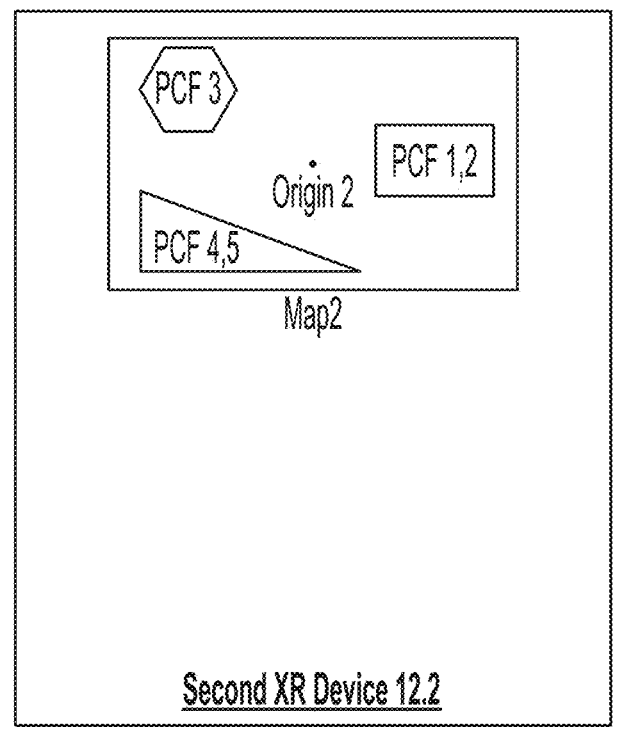
FIG. 43B is a block diagram illustrating the creation of a tracking map for the second XR device of FIG. 42, according to some embodiments.

As shown in FIG. 43B, the second XR device boots up and begins to collect data, such as images 1110 from one or more cameras 44, 46. As shown in FIG. 14, in some embodiments, an XR device (e.g. the second XR device 12.2) may collect one or more images 1110 and perform image processing to extract one or more features/interest points 1120. Each feature may be converted to a descriptor 1130. In some embodiments, the descriptors 1130 may be used to describe a key frame 1140, which may have the position and direction of the associated image attached. One or more key frames 1140 may correspond to a single persistent pose 1150, which may be automatically generated after a threshold distance from the previous persistent pose 1150, e.g., 3 meters. One or more persistent poses 1150 may correspond to a single PCF 1160, which may be automatically generated after a pre-determined distance, e.g. every 5 meters. Over time as the user continues to move around the user's environment, and the XR device continues to collect more data, such as images 1110, additional PCFs (e.g., PCF 3 and PCF 4, 5) may be created. One or more applications 1180 may run on the XR device and provide virtual content 1170 to the XR device for presentation to the user. The virtual content may have an associated content coordinate frame which may be placed relative to one or more PCFs. As shown in FIG. 43B, the second XR device 12.2 creates three PCFs. In some embodiments, the second XR device 12.2 may try to localize into one or more canonical maps stored on the server 20.

Figure 43C:
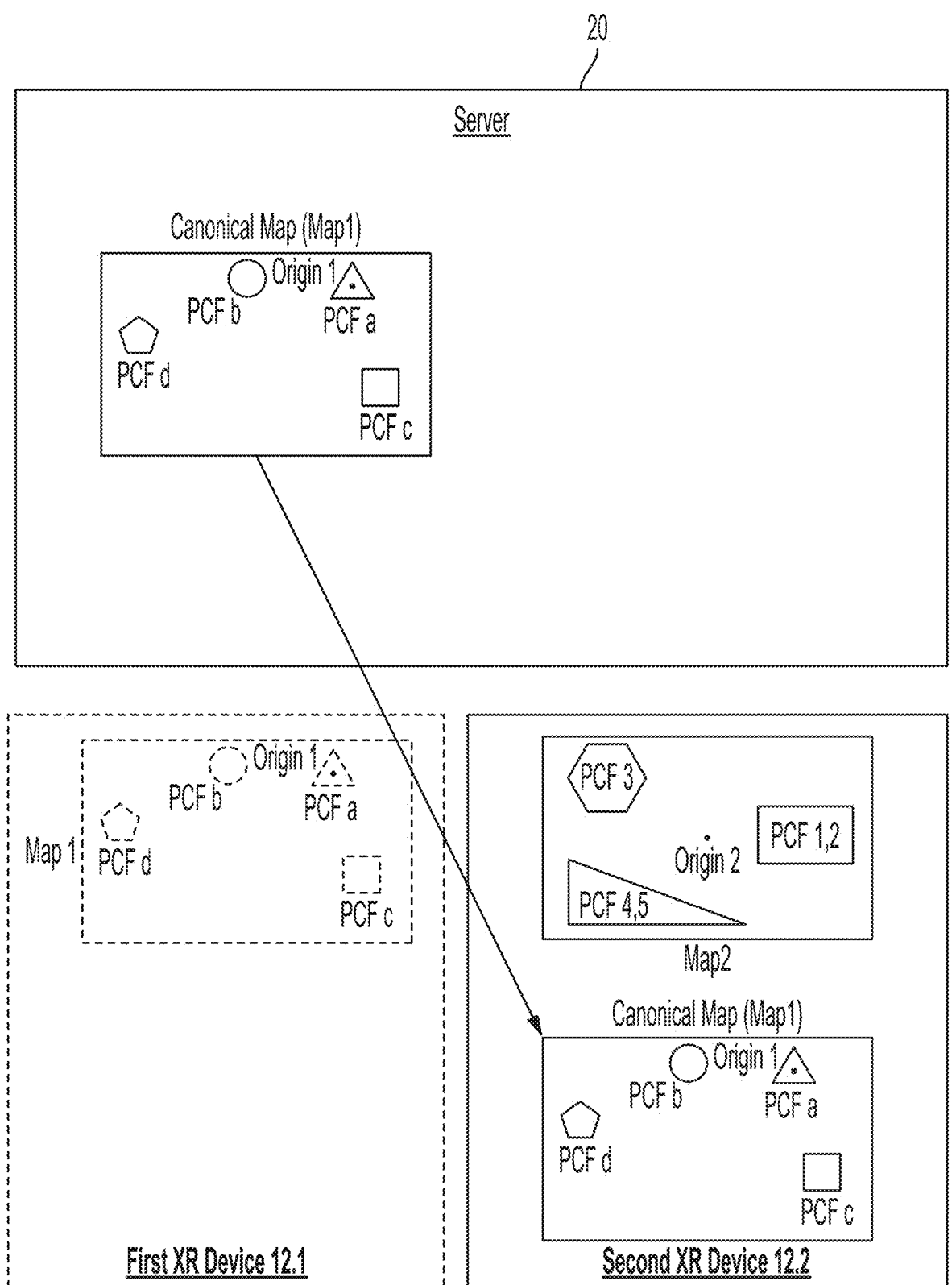
FIG. 43C is a block diagram illustrating downloading a canonical map from the server to the second XR device of FIG. 42, according to some embodiments.

In some embodiments, as shown in FIG. 43C, the second XR device 12.2 may download the canonical map 120 from the server 20. Map 1 on the second XR device 12.2 includes PCFs a to d and Origin 1. In some embodiments, the server 20 may have multiple canonical maps for various locations and may determine that the second XR device 12.2 is in the same vicinity as the vicinity of the first XR device 12.1 during the first session and sends the second XR device 12.2 the canonical map for that vicinity.

Figure 44:
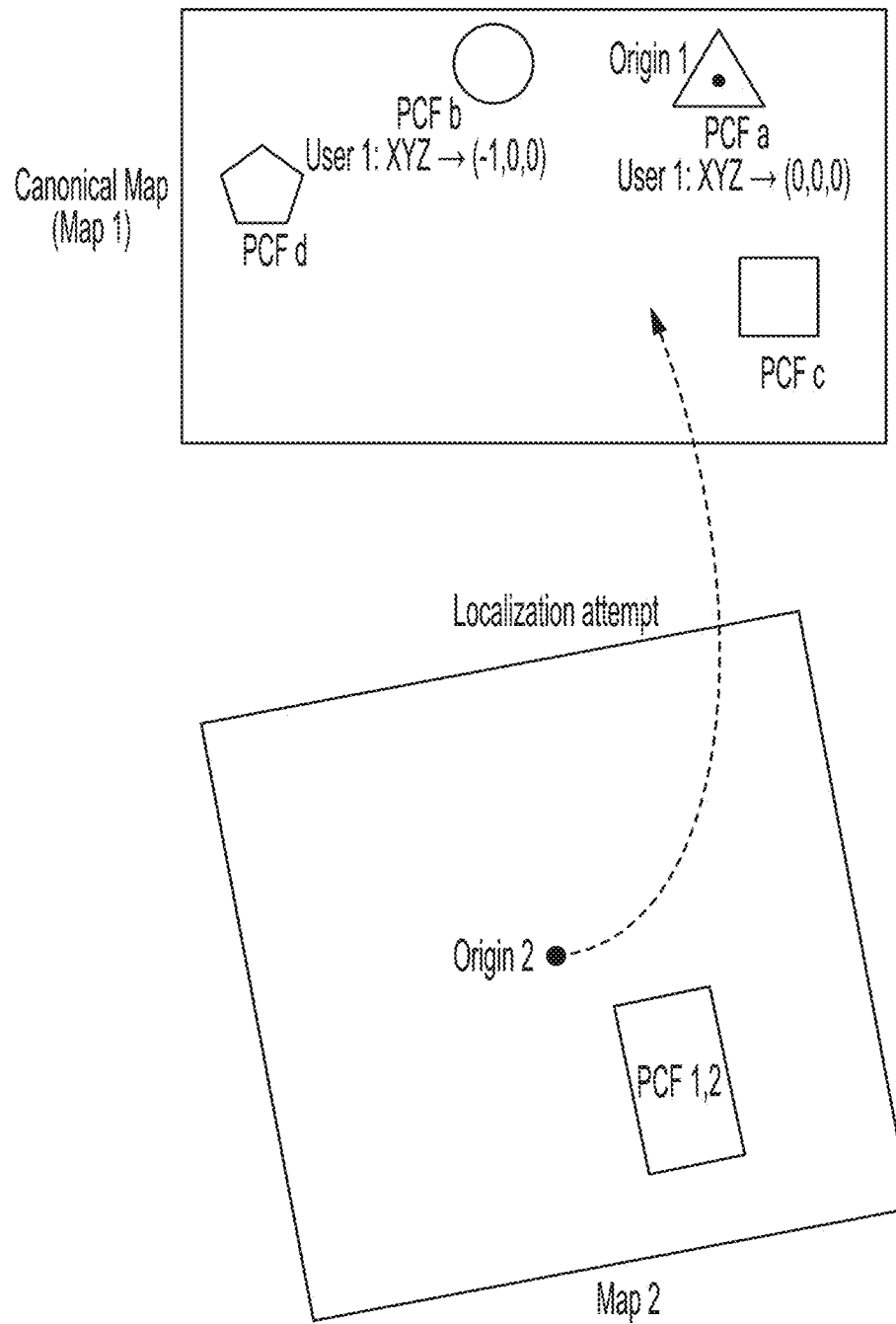
FIG. 44 is a schematic diagram illustrating a localization attempt to localize to a canonical map a second tracking map (Map 2), which may be generated by the second XR device of FIG. 42, according to some embodiments.

FIG. 44 shows the second XR device 12.2 beginning to identify PCFs for purposes of generating Map 2. The second XR device 12.2 has only identified a single PCF, namely PCF 1,2. The X, Y, and Z coordinates of PCF 1,2 for the second XR device 12.2 may be (1,1,1). Map 2 has its own origin (Origin 2), which may be based on the head pose of device 2 at device start-up for the current head pose session. In some embodiments, the second XR device 12.2 may immediately attempt to localize Map 2 to the canonical map. In some embodiments, Map 2 may not be able to localize into Canonical Map (Map 1) (i.e. localization may fail) because the system does not recognize any or enough overlap between the two maps. Localization may be performed by identifying a portion of the physical world represented in a first map that is also represented in a second map, and computing a transformation between the first map and the second map required to align those portions. In some embodiments, the system may localize based on PCF comparison between the local and canonical maps. In some embodiments, the system may localize based on persistent pose comparison between the local and canonical maps. In some embodiments, the system may localize based on key frame comparison between the local and canonical maps.

Figure 45:
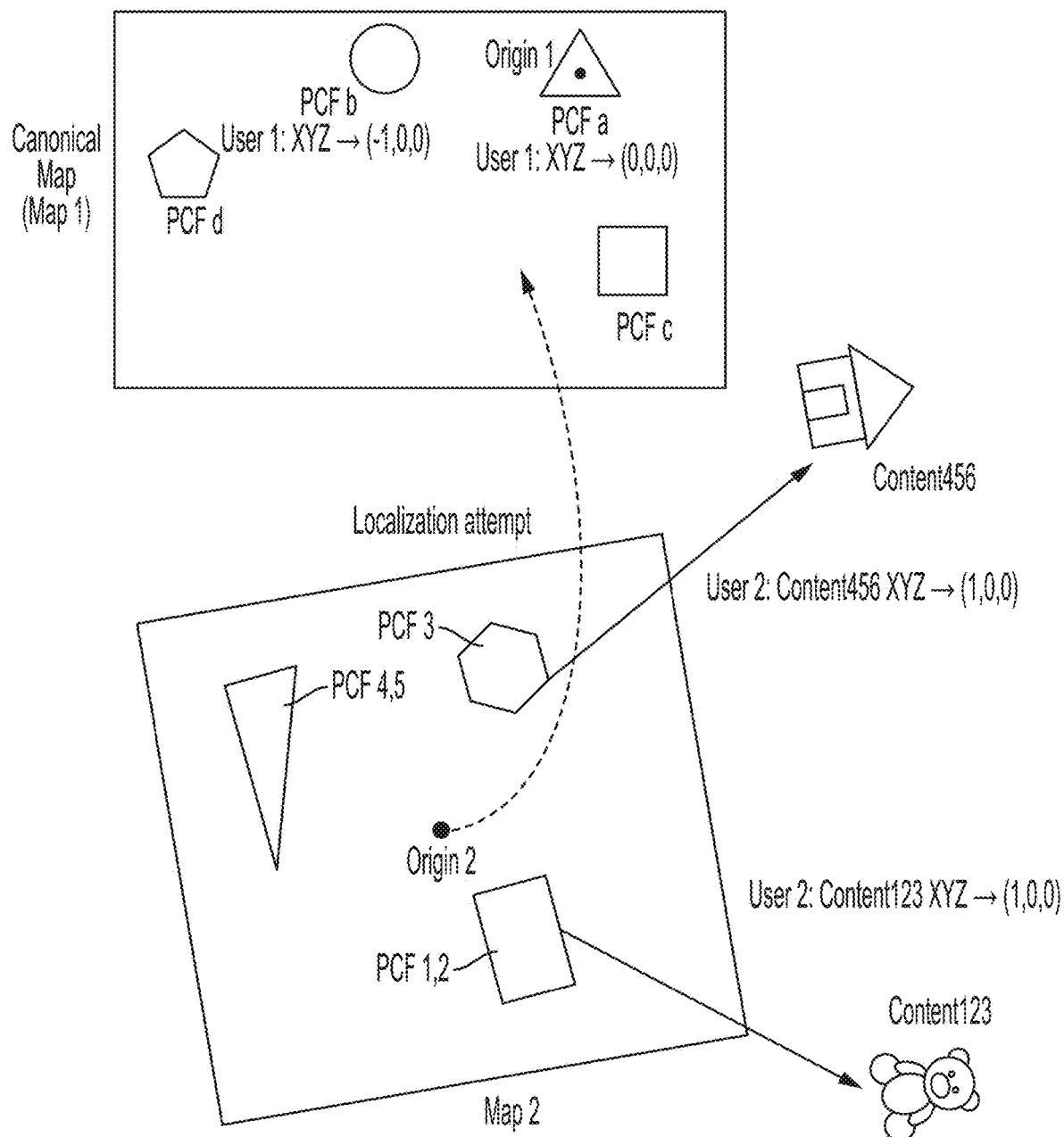
FIG. 45 is a schematic diagram illustrating a localization attempt to localize to a canonical map the second tracking map (Map 2) of FIG. 44, which may be further developed and with XR content associated with PCFs of Map 2, according to some embodiments.

FIG. 45 shows Map 2 after the second XR device 12.2 has identified further PCFs (PCF 1,2, PCF 3, PCF 4,5) of Map 2. The second XR device 12.2 again attempts to localize Map 2 to the canonical map. Because Map 2 has expanded to overlap with at least a portion of the Canonical Map, the localization attempt will succeed. In some embodiments, the overlap between the local tracking map, Map 2, and the Canonical Map may be represented by PCFs, persistent poses, key frames, or any other suitable intermediate or derivative construct.

Furthermore, the second XR device 12.2 has associated Content123 and Content456 to PCFs 1,2 and PCF 3 of Map 2. Content123 has X, Y, and Z coordinates relative to PCF 1,2 of (1,0,0). Similarly, the X, Y, and Z coordinates of Content456 relative to PCF 3 in Map 2 are (1,0,0).

Figure 46A:
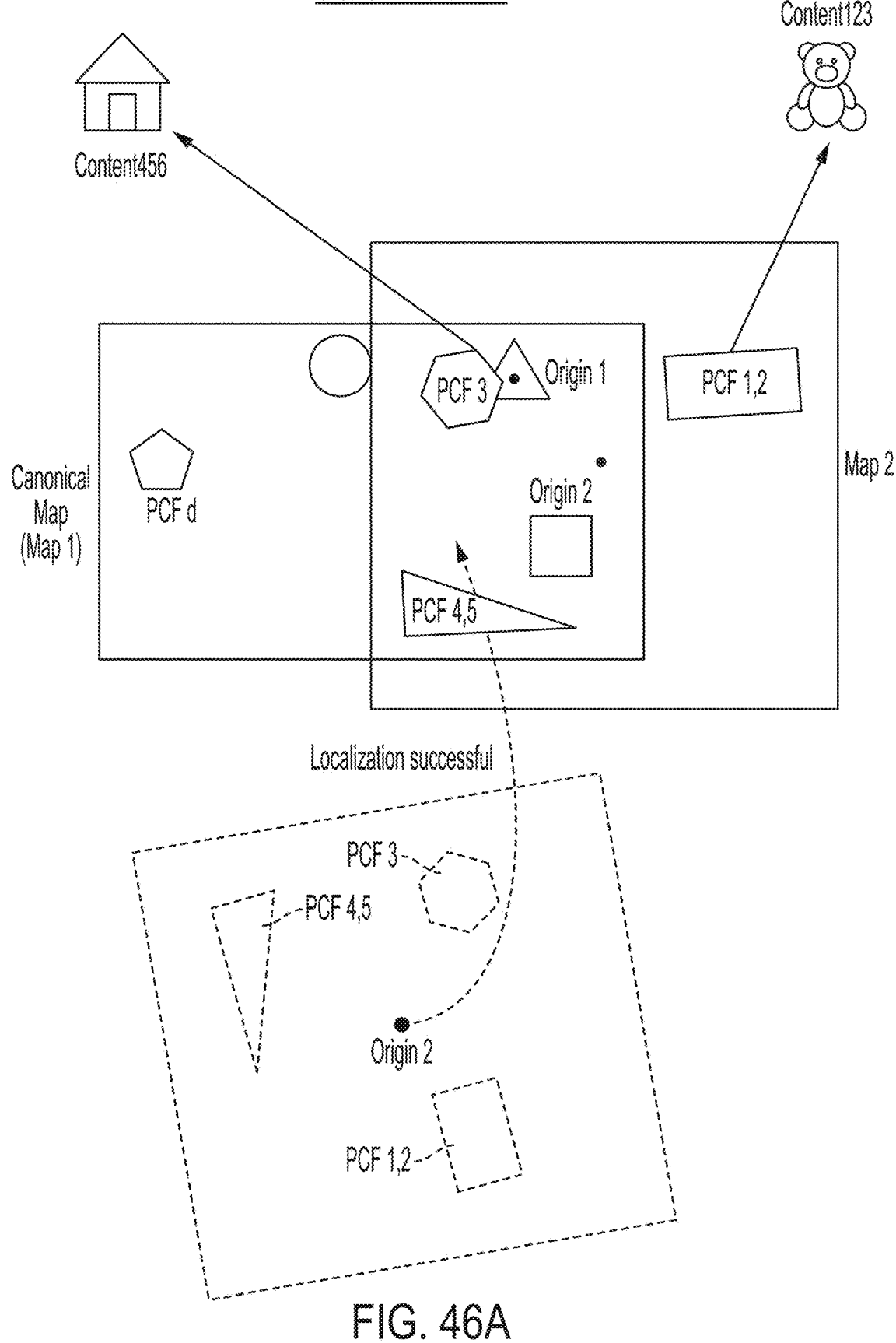

FIGS. 46A and 46B illustrate a successful localization of Map 2 to the canonical map. Localization may be based on matching features in one map to the other. With an appropriate transformation, here involving both translation and rotation of one map with respect to the other, the overlapping area/volume/section of the maps 1410 represent the common parts to Map 1 and the canonical map. Since Map 2 created PCFs 3 and 4,5 before localizing, and the Canonical map created PCFs a and c before Map 2 was created, different PCFs were created to represent the same volume in real space (e.g., in different maps).

Figure 47:
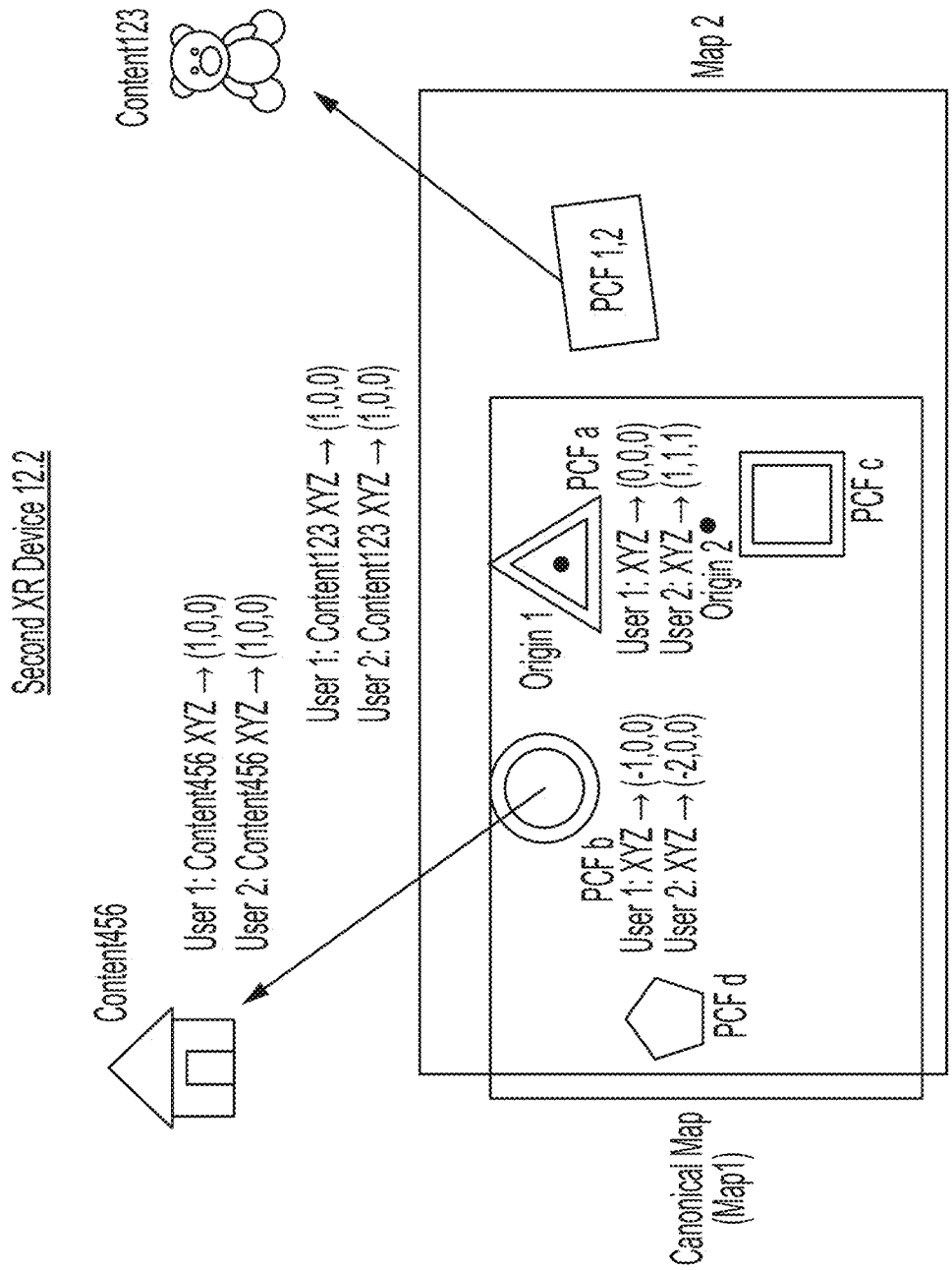
FIG. 47 is a schematic diagram illustrating a canonical map generated by including one or more PCFs from the canonical map of FIG. 46A into Map 2 of FIG. 45, according to some embodiments.

As shown in FIG. 47, the second XR device 12.2 expands Map 2 to include PCFs a-d from the Canonical Map. The inclusion of PCFs a-d represents the localization of Map 2 to the Canonical Map. In some embodiments, the XR system may perform an optimization step to remove duplicate PCFs from overlapping areas, such as the PCFs in 1410, PCF 3 and PCF 4,5. After Map 2 localizes, the placement of virtual content, such as Content456 and Content123 will be relative to the closest updated PCFs in the updated Map 2. The virtual content appears in the same real-world location relative to the user, despite the changed PCF attachment for the content, and despite the updated PCFs for Map 2.

Figure 48:
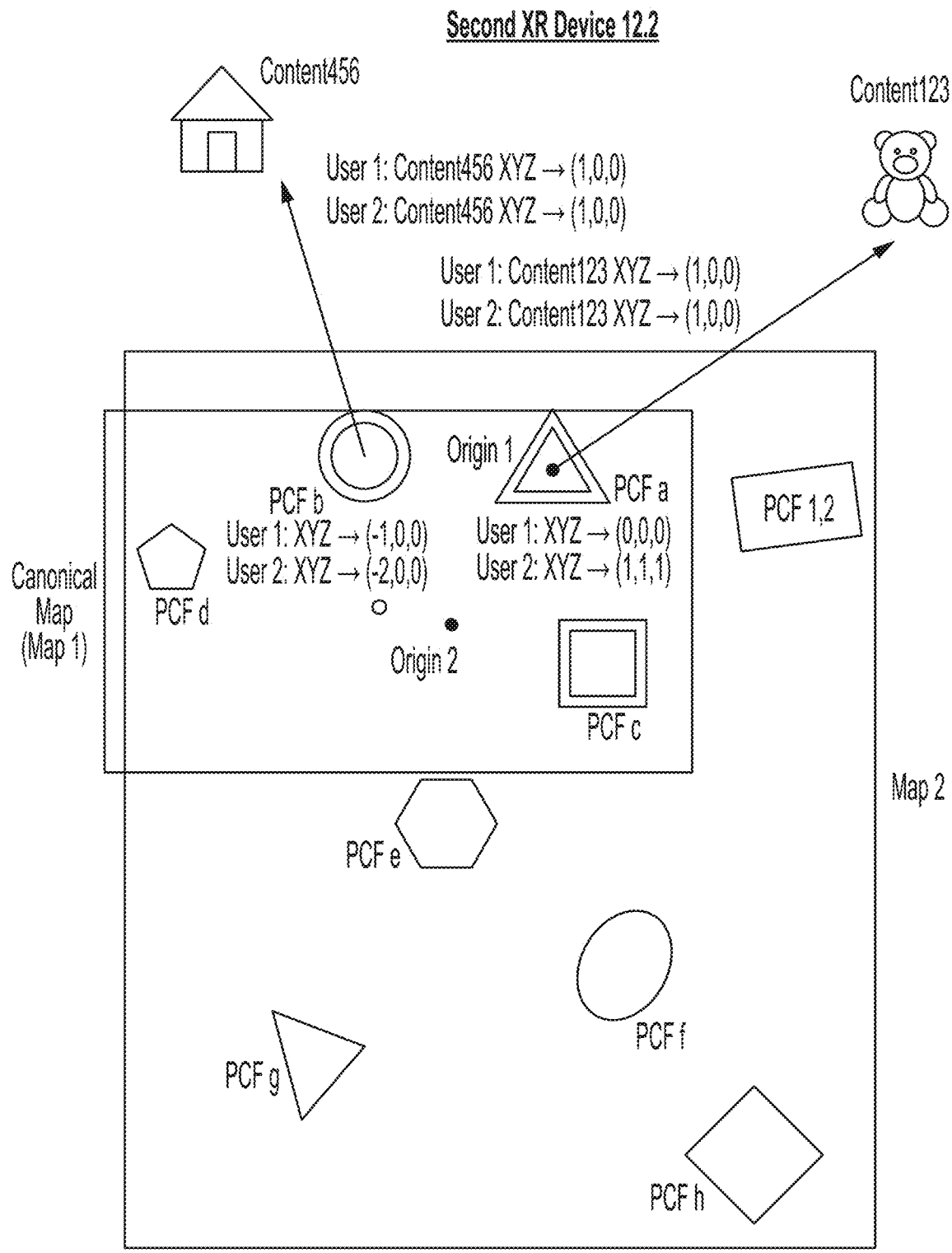
FIG. 48 is a schematic diagram illustrating the canonical map of FIG. 47 with further expansion of Map 2 on the second XR device, according to some embodiments.

As shown in FIG. 48, the second XR device 12.2 continues to expand Map 2 as further PCFs (e.g., PCFs e, f, g, and h) are identified by the second XR device 12.2, for example as the user walks around the real world. It can also be noted that Map 1 has not expanded in FIGS. 47 and 48.

Figure 49:
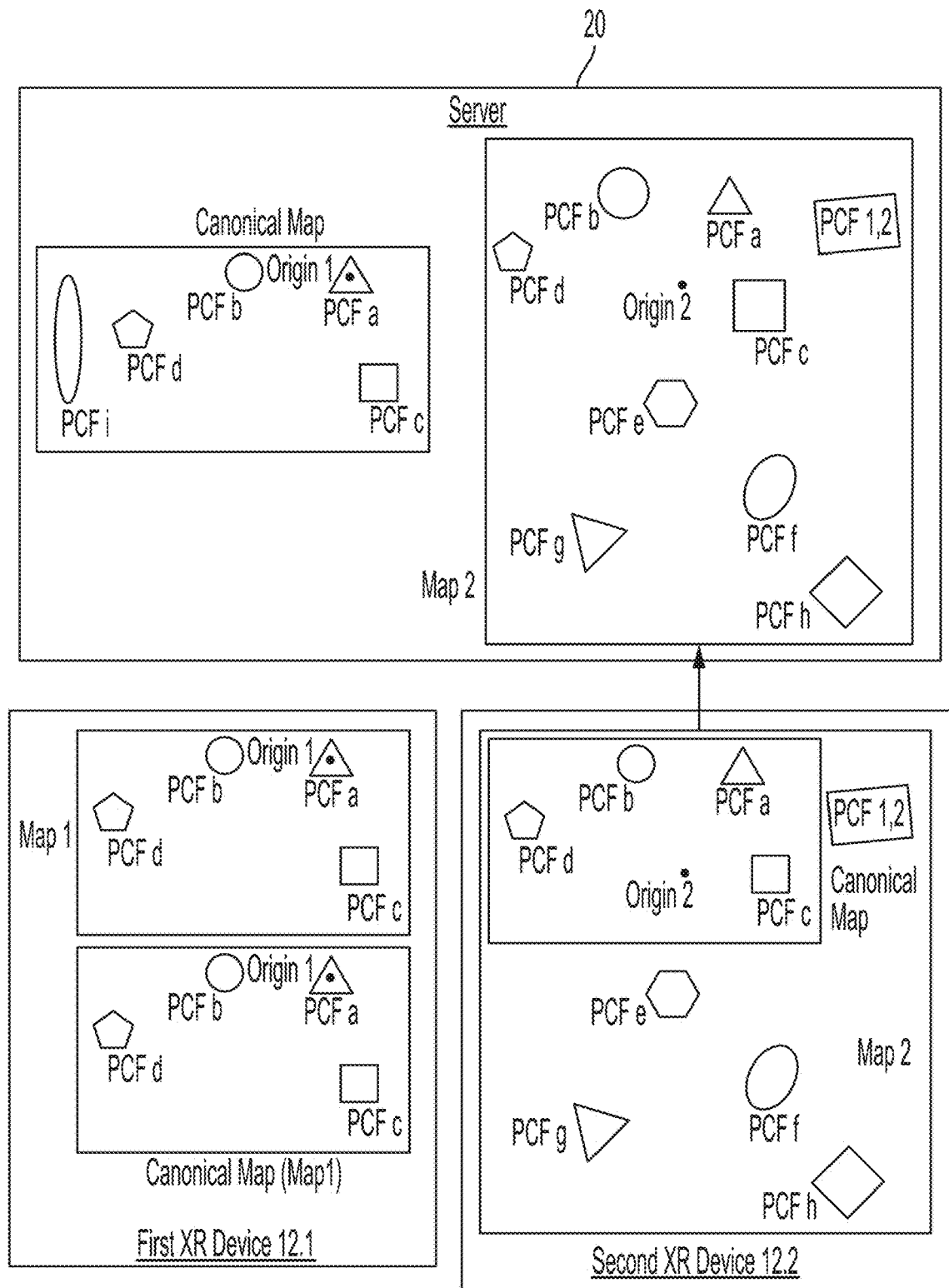
FIG. 49 is a block diagram illustrating uploading Map 2 from the second XR device to the server, according to some embodiments.

Referring to FIG. 49, the second XR device 12.2 uploads Map 2 to the server 20. The server 20 stores Map 2 together with the canonical map. In some embodiments, Map 2 may upload to the server 20 when the session ends for the second XR device 12.2.

The canonical map within the server 20 now includes PCF i which is not included in Map 1 on the first XR device 12.1. The canonical map on the server 20 may have expanded to include PCF i when a third XR device (not shown) uploaded a map to the server 20 and such a map included PCF i.

Figure 50:
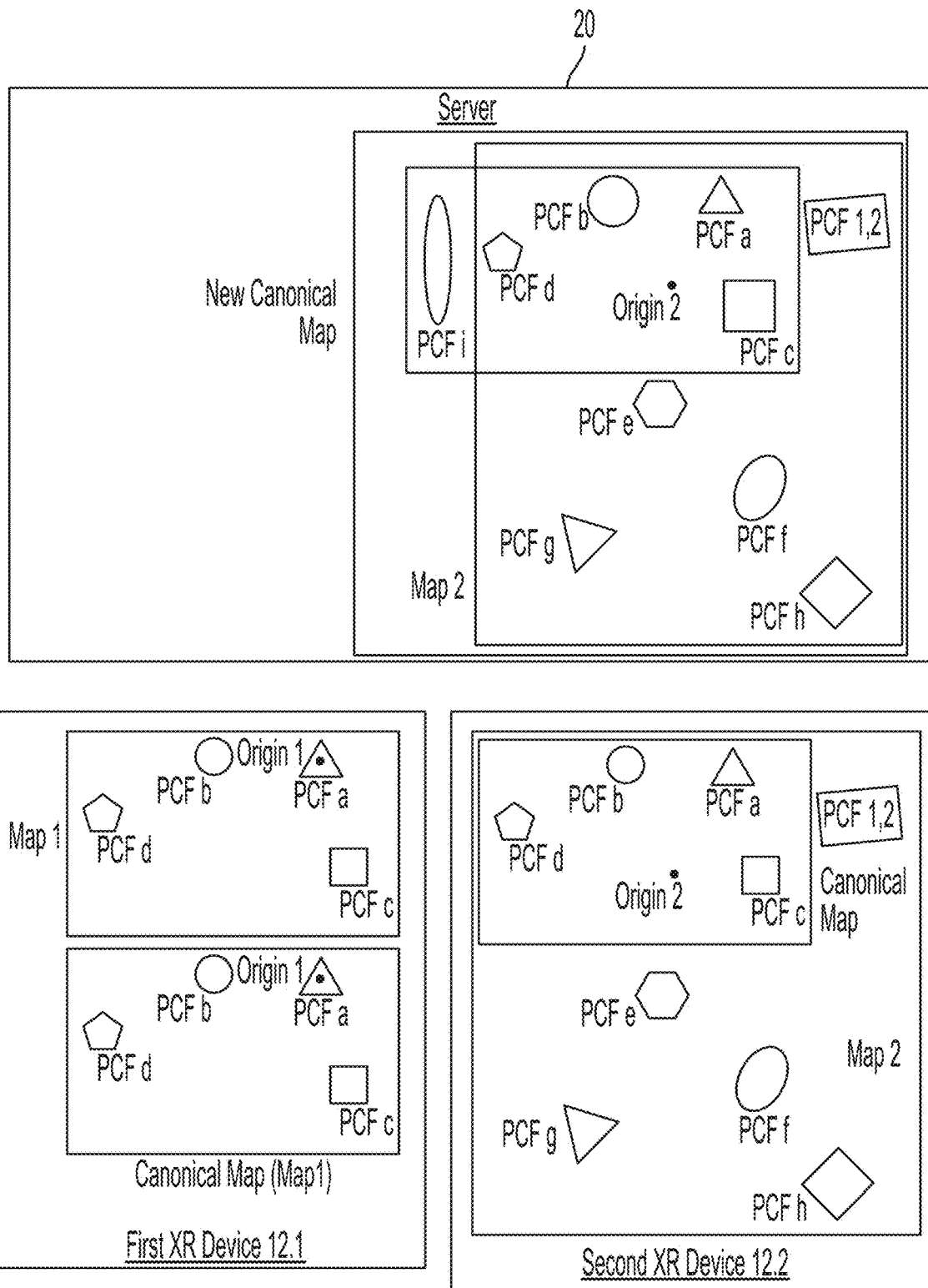
FIG. 50 is a block diagram illustrating merging Map 2 with the canonical map, according to some embodiments.

In FIG. 50, the server 20 merges Map 2 with the canonical map to form a new canonical map. The server 20 determines that PCFs a to d are common to the canonical map and Map 2. The server expands the canonical map to include PCFs e to h and PCF 1,2 from Map 2 to form a new canonical map. The canonical maps on the first and second XR devices 12.1 and 12.2 are based on Map 1 and are outdated.

Figure 51:
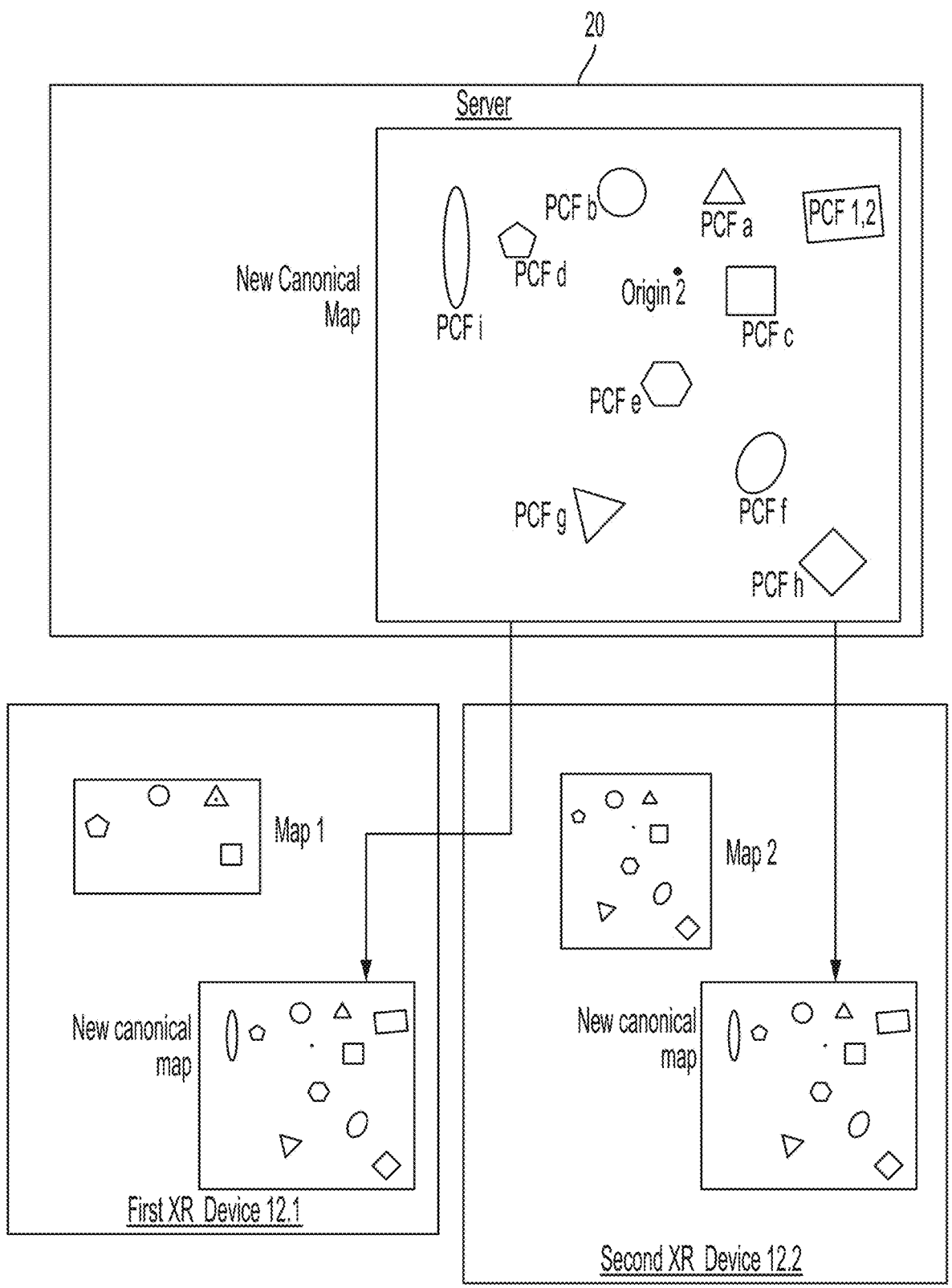
FIG. 51 is a block diagram illustrating transmission of a new canonical map from the server to the first and second XR devices, according to some embodiments.

In FIG. 51, the server 20 transmits the new canonical map to the first and second XR devices 12.1 and 12.2. In some embodiments, this may occur when the first XR device 12.1 and second device 12.2 try to localize during a different or new or subsequent session. The first and second XR devices 12.1 and 12.2 proceed as described above to localize their respective local maps (Map 1 and Map 2 respectively) to the new canonical map.

Figure 52:
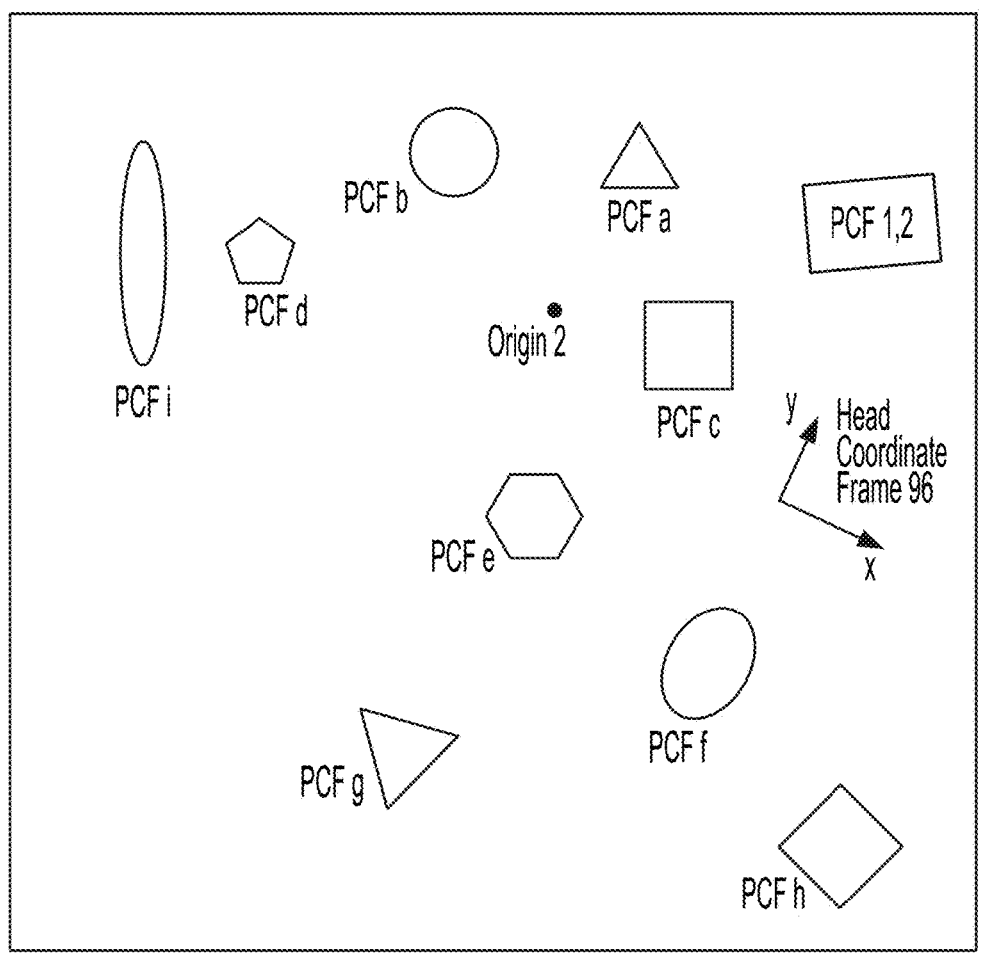
FIG. 52 is a block diagram illustrating a two-dimensional representation of Map 2 and a head coordinate frame of the second XR device that is referenced to Map 2, according to some embodiments.

As shown in FIG. 52, the head coordinate frame 96 or "head pose" is related to the PCFs in Map 2. In some embodiments, the origin of the map, Origin 2, is based on the head pose of second XR device 12.2 at the start of the session. As PCFs are created during the session, the PCFs are placed relative to the world coordinate frame, Origin 2. The PCFs of Map 2 serve as a persistent coordinate frames relative to a canonical coordinate frame, where the world coordinate frame may be a previous session's world coordinate frame (e.g. Map 1's Origin 1 in FIG. 40). These coordinate frames are related by the same transformation used to localize Map 2 to the canonical map, as discussed above in connection with FIG. 46B.

The transformation from the world coordinate frame to the head coordinate frame 96 has been previously discussed with reference to FIG. 9. The head coordinate frame 96 shown in FIG. 52 only has two orthogonal axes that are in a particular coordinate position relative to the PCFs of Map 2, and at particular angles relative to Map 2. It should however be understood that the head coordinate frame 96 is in a three-dimensional location relative to the PCFs of Map 2 and has three orthogonal axes within three-dimensional space.

Figure 53:
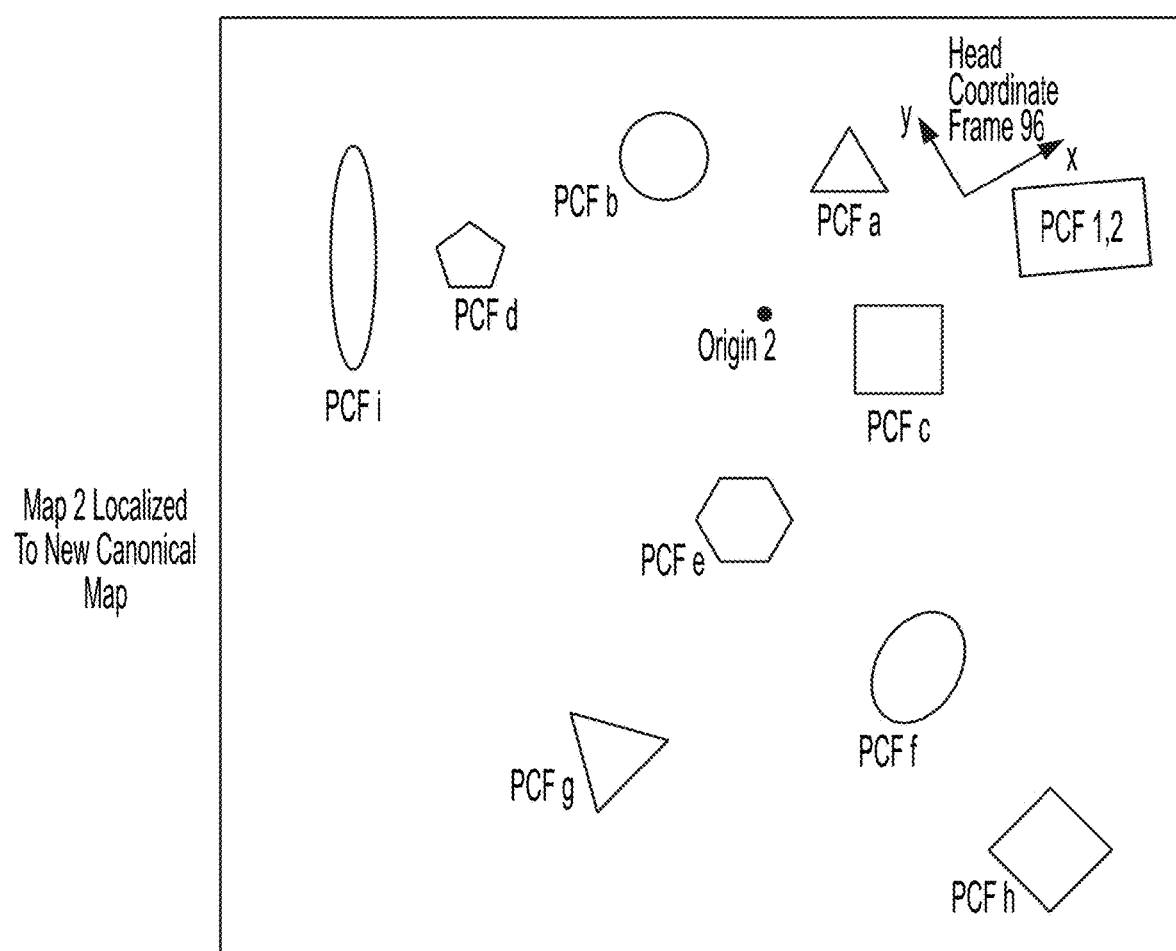
FIG. 53 is a block diagram illustrating, in two-dimensions, adjustment of the head coordinate frame which can occur in six degrees of freedom, according to some embodiments.

In FIG. 53, the head coordinate frame 96 has moved relative to the PCFs of Map 2. The head coordinate frame 96 has moved because the second user 14.2 has moved their head. The user can move their head in six degrees of freedom (6dof). The head coordinate frame 96 can thus move in 6dof, namely in three-dimensions from its previous location in FIG. 52 and about three orthogonal axes relative to the PCFs of Map 2. The head coordinate frame 96 is adjusted when the real object detection camera 44 and inertial measurement unit 48 in FIG. 9 respectively detect real objects and motion of the head unit 22. More information regarding head pose tracking is disclosed in U.S. patent application Ser. No. 16/221,065 entitled "Enhanced Pose Determination for Display Device" and is hereby incorporated by reference in its entirety.

Figure 54:
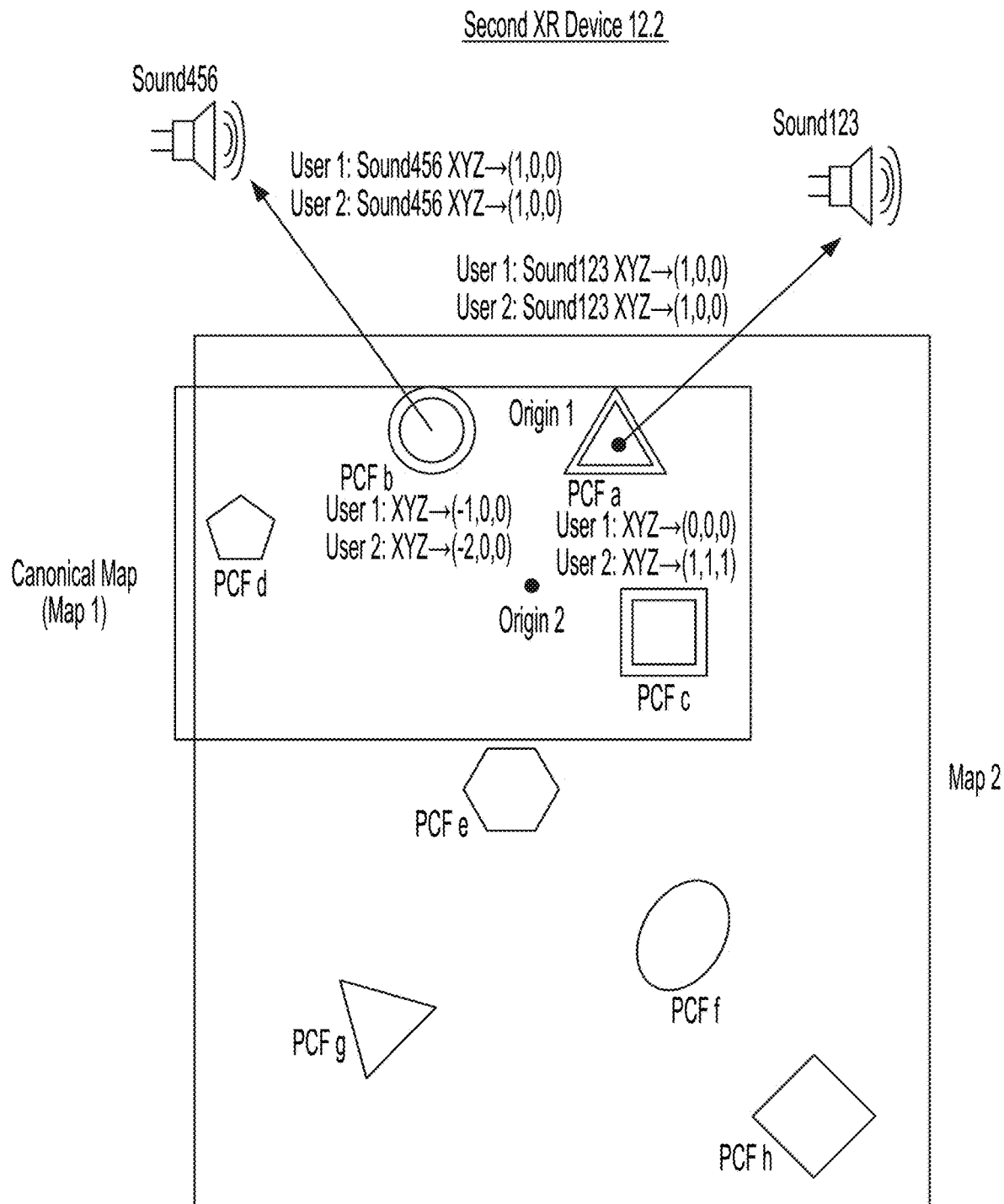
FIG. 54 is a block diagram illustrating a canonical map on the second XR device wherein sound is localized relative to PCFs of Map 2, according to some embodiments.

FIG. 54 shows that sound may be associated with one or more PCFs. A user may, for example, wear headphones or earphones with stereoscopic sound. The location of sound through headphones can be simulated using conventional techniques. The location of sound may be located in a stationary position so that, when the user rotates their head to the left, the location of sound rotates to the right so that the user perceives the sound coming from the same location in the real world. In the present example, location of sound is represented by Sound123 and Sound456. For purposes of discussion, FIG. 54 is similar to FIG. 48 in its analysis. When the first and second users 14.1 and 14.2 are located in the same room at the same or different times, they perceive Sound123 and Sound456 coming from the same locations within the real world.

Figure 55:
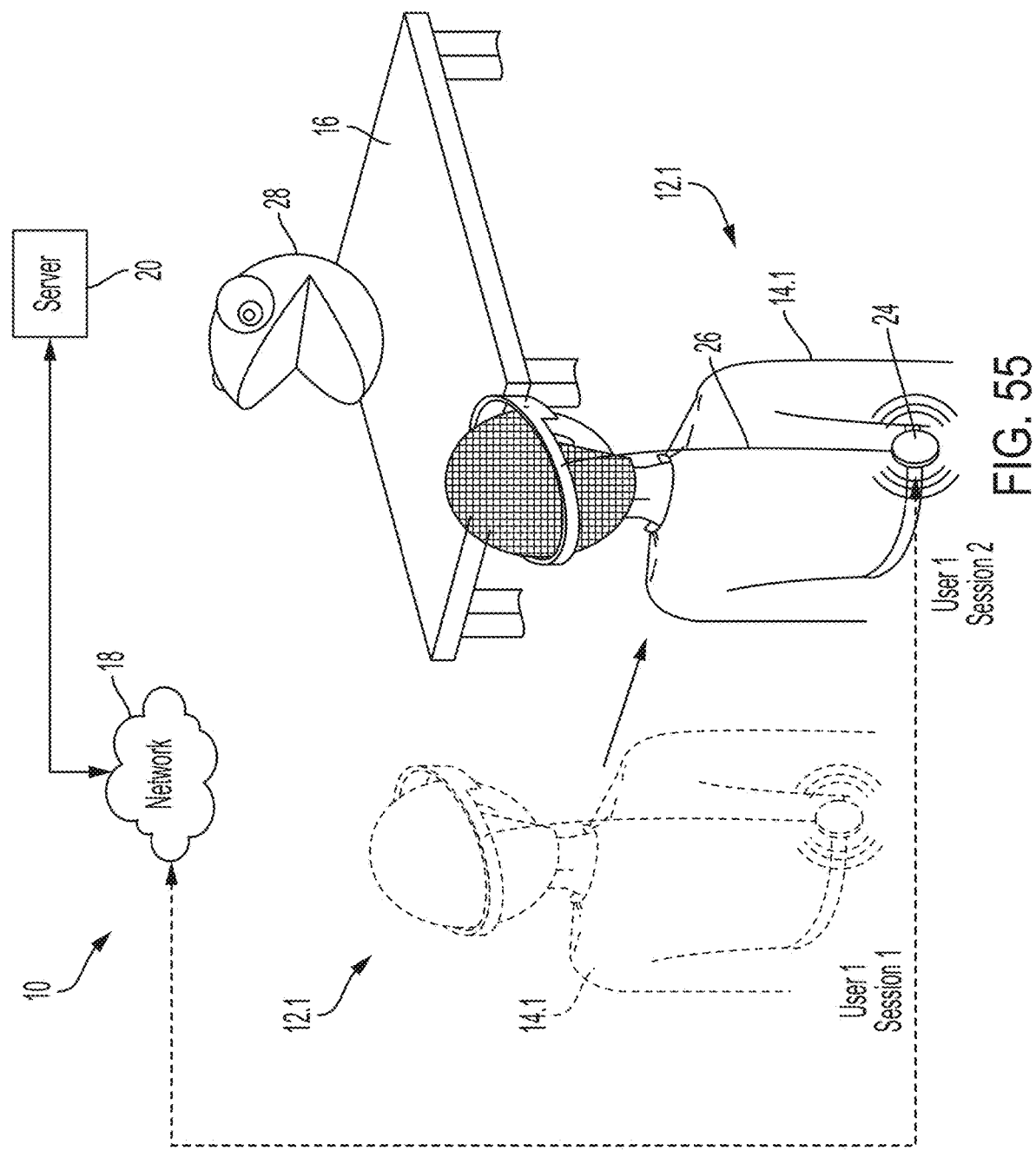
FIGS. 55 and 56 are a perspective view and a block diagram illustrating use of the XR system when the first user has terminated a first session and the first user has initiated a second session using the XR system, according to some embodiments.
Figure 56:
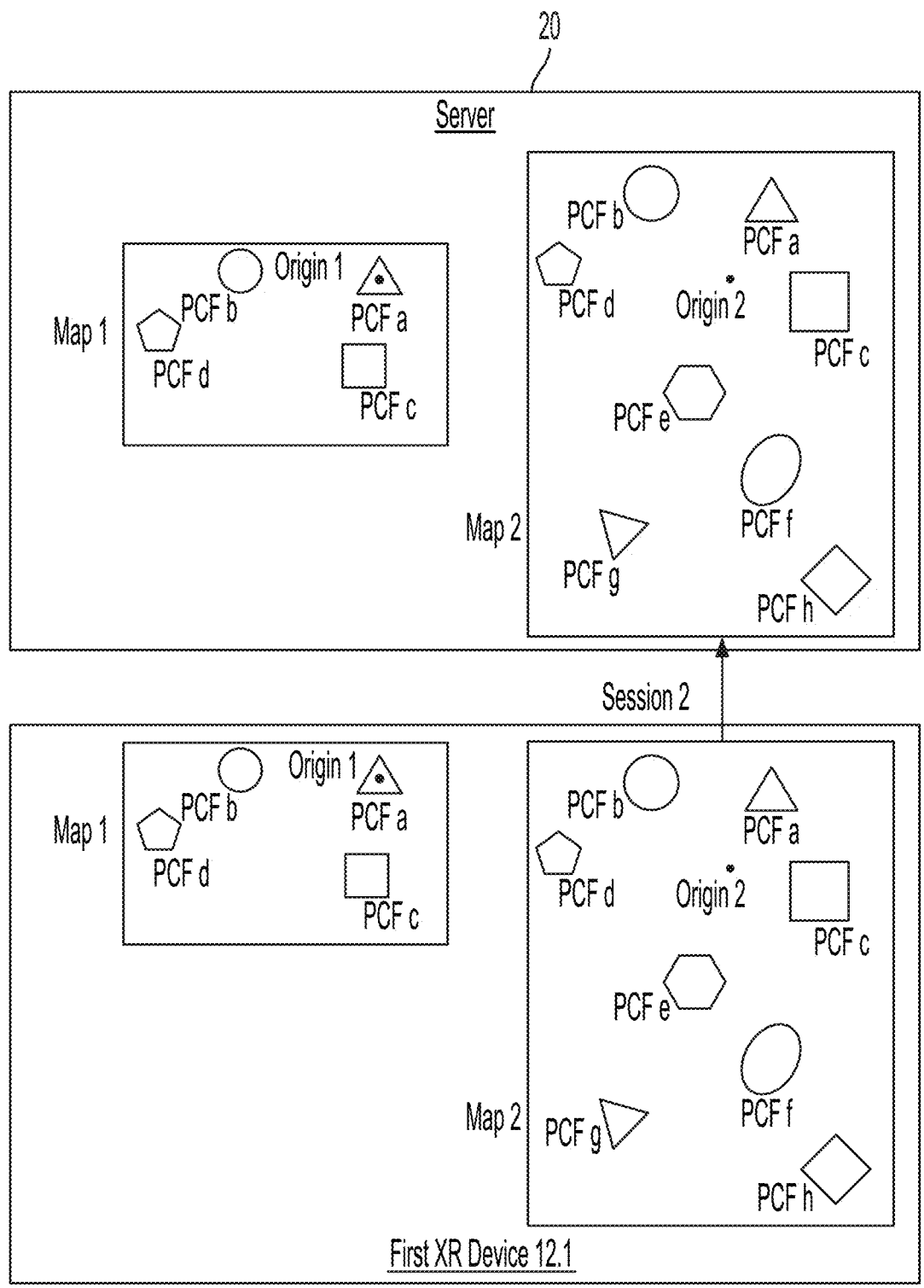

FIGS. 55 and 56 illustrate a further implementation of the technology described above. The first user 14.1 has initiated a first session as described with reference to FIG. 8. As shown in FIG. 55, the first user 14.1 has terminated the first session as indicated by the phantom lines. At the end of the first session, the first XR device 12.1 uploaded Map 1 to the server 20. The first user 14.1 has now initiated a second session at a later time than the first session. The first XR device 12.1 does not download Map 1 from the server 20 because Map 1 is already stored on the first XR device 12.1. If Map 1 is lost, then the first XR device 12.1 downloads Map 1 from the server 20. The first XR device 12.1 then proceeds to build PCFs for Map 2, localizes to Map 1, and further develops a canonical map as described above. Map 2 of the first XR device 12.1 is then used for relating local content, a head coordinate frame, local sound, etc. as described above.

Figure 57:
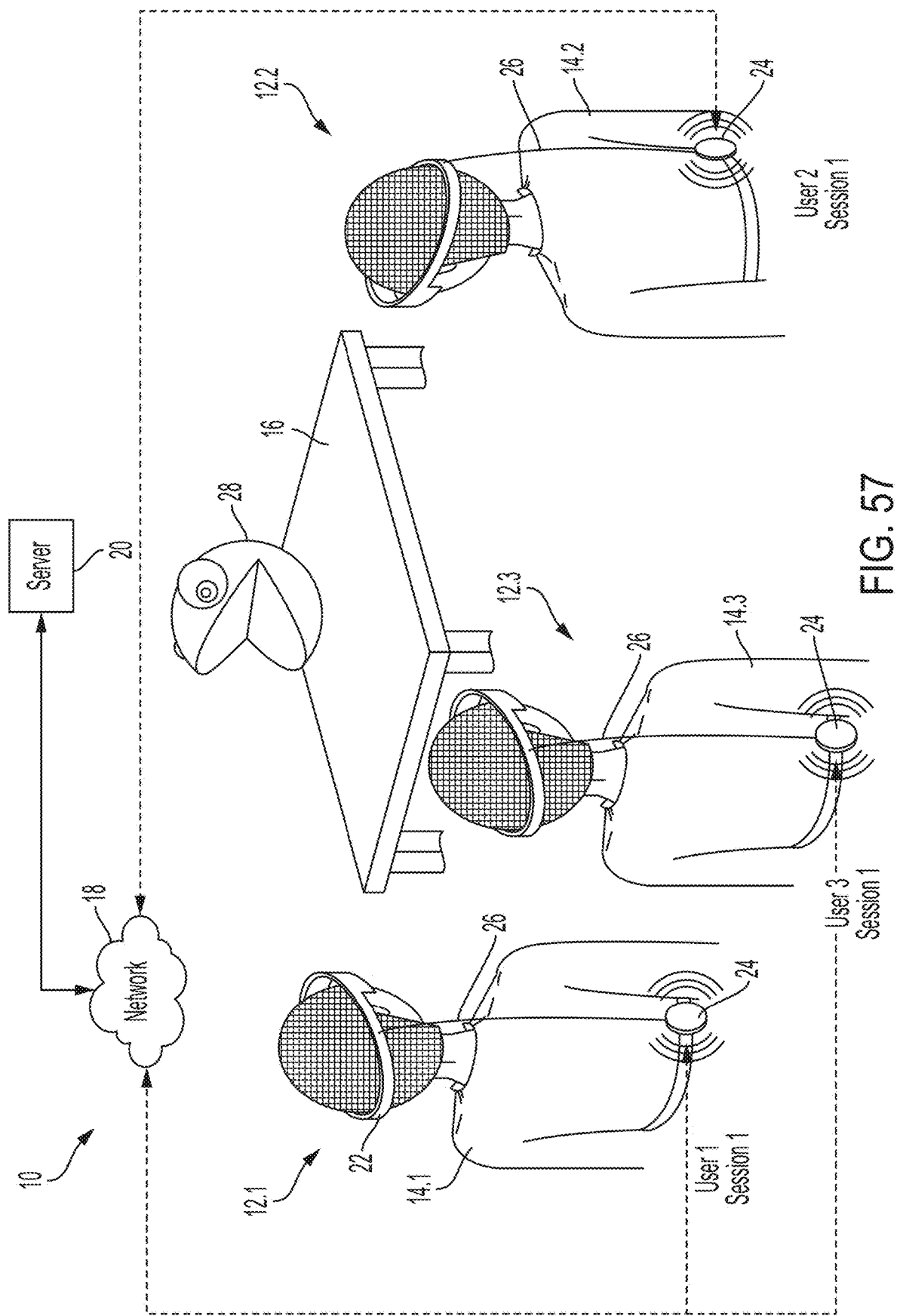
FIGS. 57 and 58 are a perspective view and a block diagram illustrating use of the XR system when three users are simultaneously using the XR system in the same session, according to some embodiments.
Figure 58:
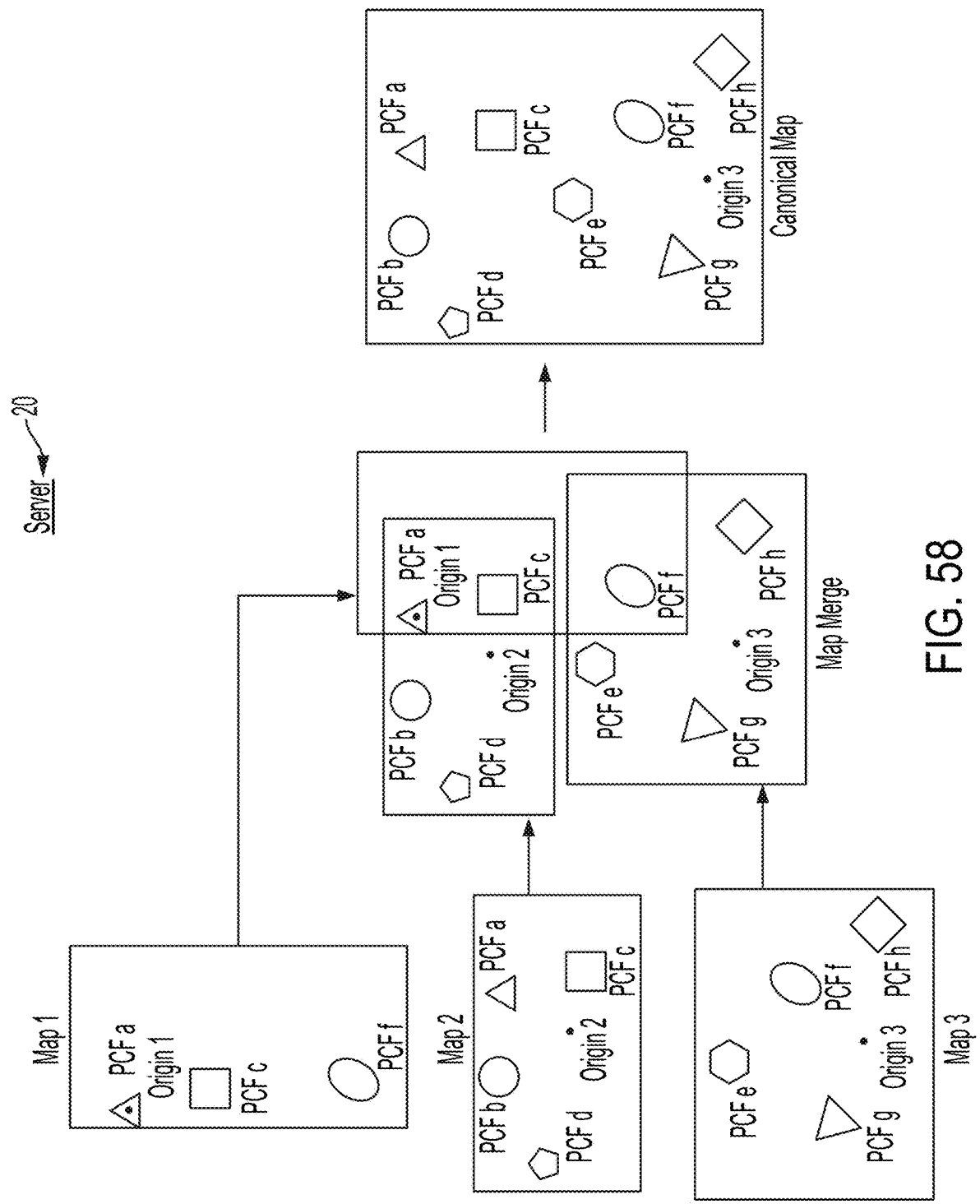

Referring to FIGS. 57 and 58, it may also be possible that more than one user interacts with the server in the same session. In the present example, the first user 14.1 and the second user 14.2 are joined by a third user 14.3 with a third XR device 12.3. Each XR device 12.1, 12.2, and 12.3 begins to generate its own map, namely Map 1, Map 2, and Map 3, respectively. As the XR devices 12.1, 12.2, and 12.3 continue to develop Maps 1, 2, and 3, the maps are incrementally uploaded to the server 20. The server 20 merges Maps 1, 2, and 3 to form a canonical map. The canonical map is then transmitted from the server 20 to each one of the XR devices 12.1, 12.2 and 12.3.

Figure 59:
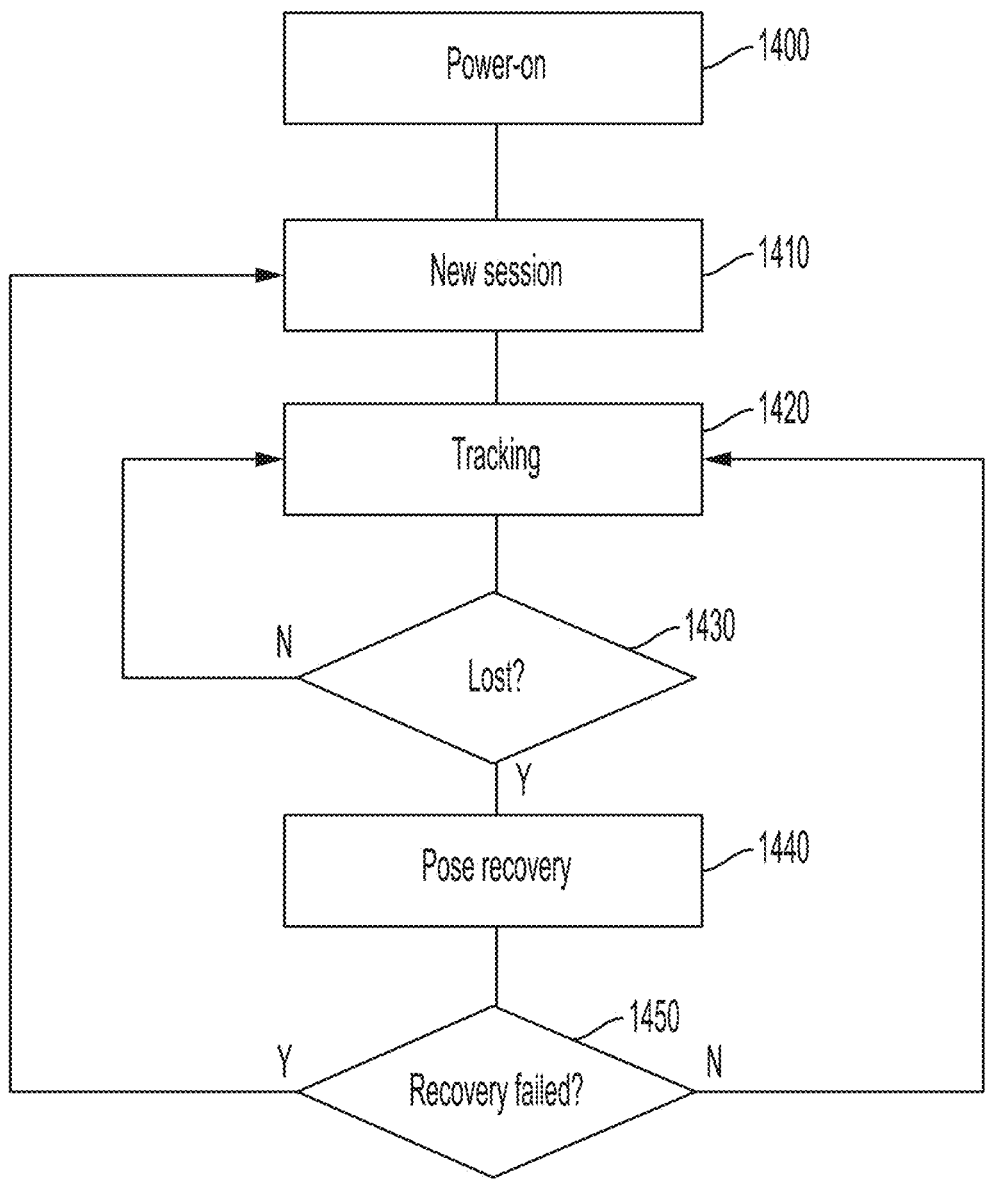
FIG. 59 is a flow chart illustrating a method of recovering and resetting a head pose, according to some embodiments.

FIG. 59 illustrates aspects of a viewing method to recover and/or reset head pose, according to some embodiments. In the illustrated example, at Act 1400, the viewing device is powered on. At Act 1410, in response to being powered on, a new session is initiated. In some embodiments, a new session may include establishing head pose. One or more capture devices on a head-mounted frame secured to a head of a user capture surfaces of an environment by first capturing images of the environment and then determining the surfaces from the images. In some embodiments, surface data may be combined with a data from a gravitational sensor to establish head pose. Other suitable methods of establishing headpose may be used.

At Act 1420, a processor of the viewing device enters a routine for tracking of head pose. The capture devices continue to capture surfaces of the environment as the user moves their head to determine an orientation of the head-mounted frame relative to the surfaces.

At Act 1430, the processor determines whether head pose has been lost. Head pose may become lost due to "edge" cases, such as too many reflective surfaces, low light, blank walls, being outdoor, etc. that may result in low feature acquisition, or because of dynamic cases such as a crowd that moves and forms part of the map. The routine at 1430 allows for a certain amount of time, for example 10 seconds, to pass to allow enough time to determine whether head pose has been lost. If head pose has not been lost, then the processor returns to 1420 and again enters tracking of head pose.

If head pose has been lost at Act 1430, the processor enters a routine at 1440 to recover head pose. If head pose is lost due to low light, then a message such as the following message is displayed to the user through a display of the viewing device:

THE SYSTEM IS DETECTING A LOW LIGHT CONDITION. PLEASE MOVE TO AN AREA WHERE THERE IS MORE LIGHT.

The system will continue to monitor whether there is sufficient light available and whether head pose can be recovered. The system may alternatively determine that low texture of surfaces is causing head pose to be lost, in which case the user is given the following prompt in the display as a suggestion to improve capturing of surfaces:

THE SYSTEM CANNOT DETECT ENOUGH SURFACES WITH FINE TEXTURES. PLEASE MOVE TO AN AREA WHERE THE SURFACES ARE LESS ROUGH IN TEXTURE AND MORE REFINED IN TEXTURE.

At Act 1450, the processor enters a routine to determine whether head pose recovery has failed. If head pose recovery has not failed (i.e. head pose recovery has succeeded), then the processor returns to Act 1420 by again entering tracking of head pose. If head pose recovery has failed, the processor returns to Act 1410 to establish a new session. As part of the new session, all cached data is invalidated, whereafter head pose is established anew. Any suitable method of head tracking may be used in combination with the process described in FIG. 59. U.S. patent application Ser. No. 16/221,065 describes head tracking and is hereby incorporated by reference in its entirety.

Remote Localization

Various embodiments may utilize remote resources to facilitate persistent and consistent cross reality experiences between individual and/or groups of users. The inventors have recognized and appreciated that the benefits of operation of an XR device with canonical maps as described herein can be achieved without downloading a set of canonical maps. FIG. 30, discussed above, illustrates example implementation where canonical would be downloaded to device. The benefit of not downloading maps, for example, may be achieved by sending feature and pose information to a remote service that maintains a set of canonical maps. According to one embodiment, a device seeking to use a canonical map to position virtual content in locations specified relative to the canonical map may receive from the remote service one or more transformations between the features and the canonical maps. Those transformations may be used on the device, which maintains information about the positions of those features in the physical world, to position virtual content in locations specified with respect to a canonical map or to otherwise identify locations in the physical world that are specified with respect to the canonical map.

In some embodiments, spatial information is captured by an XR device and communicated to a remote service, such as a cloud based service, which uses the spatial information to localize the XR device to a canonical map used by applications or other components of an XR system to specify the location of virtual content with respect to the physical world. Once localized, transforms that link a tracking map maintained by the device to the canonical map can be communicated to the device. The transforms may be used, in conjunction with the tracking map, to determine a position in which to render virtual content specified with respect to the canonical map, or otherwise identify locations in the physical world that are specified with respect to the canonical map.

The inventors have realized that the data needed to be exchanged between a device and a remote localization service can be quite small relative to communicating map data, as might occur when a device communicates a tracking map to a remote service and receives from that service a set of canonical maps for device based localization. In some embodiments, performing localization functions on cloud resources requires only a small amount of information to be transmitted from the device to the remote service. It is not a requirement, for example, that a full tracking map be communicated to the remote service to perform localization. In some embodiments, features and pose information, such as might be stored in connection with a persistent pose, as described above, might be transmitted to the remote server. In embodiments in which features are represented by descriptors, as described above, the information uploaded may be even smaller.

The results returned to the device from the localization service may be one or more transformations that relate the uploaded features to portions of a matching canonical map. Those transformations may be used within the XR system, in conjunction with its tracking map, for identifying locations of virtual content or otherwise identifying locations in the physical world. In embodiments in which persistent spatial information, such as PCF's as described above, are used to specify locations with respect to a canonical map, the localization service may download to the device transformations between the features and one or more PCF's after a successful localization.

As a result, network bandwidth consumed by communications between an XR device and a remote service for performing localization may be low. The system may therefore support frequent localization, enabling each device interacting with the system to quickly obtain information for positioning virtual content or performing other location-based functions. As a device moves within the physical environment, it may repeat requests for updated localization information. Additionally, a device may frequently obtain updates to the localization information, such as when the canonical maps change, such as through merging of additional tracking maps to expand the map or increase their accuracy.

Further, uploading features and downloading transformations can enhance privacy in an XR system that shares map information among multiple users by increasing the difficulty of obtaining maps by spoofing. An unauthorized user, for example, may be thwarted from obtaining a map from the system by sending a fake request for a canonical map representing a portion of the physical world in which that unauthorized user is not located. An unauthorized user would be unlikely to have access to the features in the region of the physical world for which it is requesting map information if not physically present in that region. In embodiments in which feature information is formatted as feature descriptions, the difficulty in spoofing feature information in a request for map information would be compounded. Further, when the system returns a transformation intended to be applied to a tracking map of a device operating in the region about which location information is requested, the information returned by the system is likely to be of little or no use to an imposter.

According to one embodiment, a localization service is implemented as a cloud based micro-service. In some examples, implementing a cloud-based localization service can help save device compute resources and may enable computations required for localization to be performed with very low latency. Those operations can be supported by nearly infinite compute power or other computing resources available by provisioning additional cloud resources, ensuring scalability of the XR system to support numerous devices. In one example, many canonical maps can be maintained in memory for nearly instant access, or alternatively stored in high availability devices reducing system latency.

Further, performing localization for multiple devices in a cloud service may enable refinements to the process. Localization telemetry and statistics can provide information on which canonical maps to have in active memory and/or high availability storage. Statistics for multiple devices may be used, for example, to identify most frequently accessed canonical maps.

Additional accuracy may also be achieved as a result of processing in a cloud environment or other remote environment with substantial processing resources relative to a remote device. For example, localization can be made on higher density canonical maps in the cloud relative to processing performed on local devices. Maps may be stored in the cloud, for example, with more PCF's or a greater density of feature descriptors per PCF, increasing the accuracy of a match between a set of features from a device and a canonical map.

Figure 61:
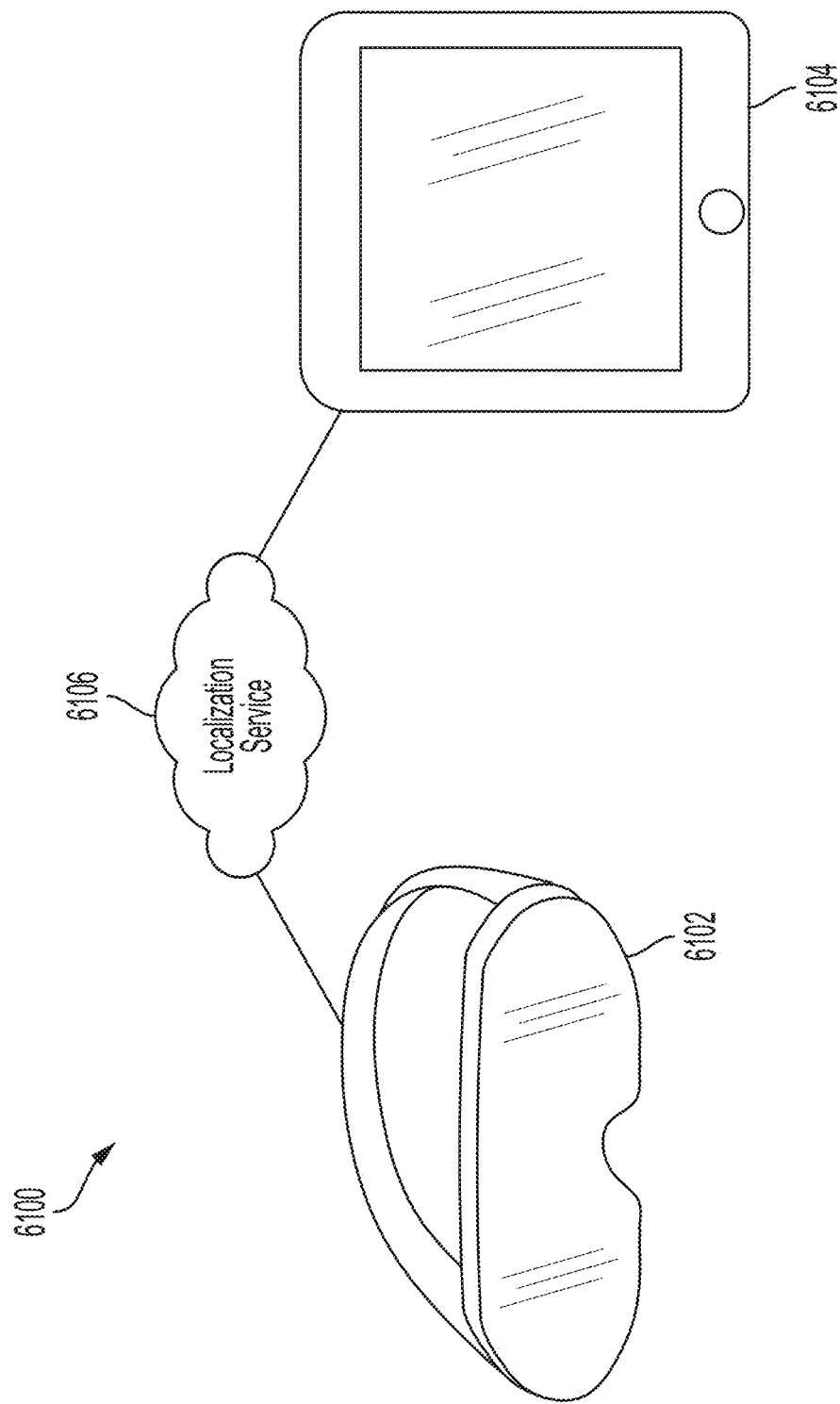
FIG. 61 is a schematic diagram of an example XR system in which any of multiple devices may access a localization service, according to some embodiments.

FIG. 61 is a schematic diagram of an XR system 6100. The user devices that display cross reality content during user sessions can come in a variety of forms. For example, a user device can be a wearable XR device (e.g., 6102) or a handheld mobile device (e.g., 6104). As discussed above, these devices can be configured with software, such as applications or other components, and/or hardwired to generate local position information (e.g., a tracking map) that can be used to render virtual content on their respective displays.

Virtual content positioning information may be specified with respect to global location information, which may be formatted as a canonical map containing one or more PCF's, for example. According to some embodiments, the system 6100 is configured with cloud based services that support the functioning and display of the virtual content on the user device.

In one example, localization functions are provided as a cloud-based service 6106, which may be a micro-service. Cloud-based service 6106 may be implemented on any of multiple computing devices, from which computing resources may be allocated to one or more services executing in the cloud. Those computing devices may be interconnected with each other and accessibly to devices, such as a wearable XR device 6102 and hand held device 6104. Such connections may be provided over one or more networks.

In some embodiments, the cloud-based service 6106 is configured to accept descriptor information from respective user devices and "localize" the device to a matching canonical map or maps. For example, the cloud-based localization service matches descriptor information received to descriptor information for respective canonical map(s). The canonical maps may be created using techniques as described above that create canonical maps by merging maps provided by one or more devices that have image sensors or other sensors that acquire information about a physical world. However, it is not a requirement that the canonical maps be created by the devices that access them, as such maps may be created by a map developer, for example, who may publish the maps by making them available to localization service 6106.

According to some embodiments, the cloud service handles canonical map identification, and may include operations to filter a repository of canonical maps to a set of potential matches. Filtering may be performed as illustrated in FIG. 29, or by using any subset of the filter criteria and other filter criteria instead of or in addition to the filter criteria shown in FIG. 29. In one embodiment, geographic data can be used to limit a search for matching canonical map to maps representing areas proximate to the device requesting localization. For example, area attributes such as Wi-Fi signal data, Wi-Fi fingerprint information, GPS data, and/or other device location information can be used as a coarse filter on stored canonical maps, and thereby limit analysis of descriptors to canonical maps known or likely to be in proximity to the user device. Similarly, location history of each device may be maintained by the cloud service such that canonical maps in the vicinity of the device's last location are preferentially searched. In some examples, filtering can include the functions discussed above with respect to FIGS. 31B, 32, 33, and 34.

Figure 62:
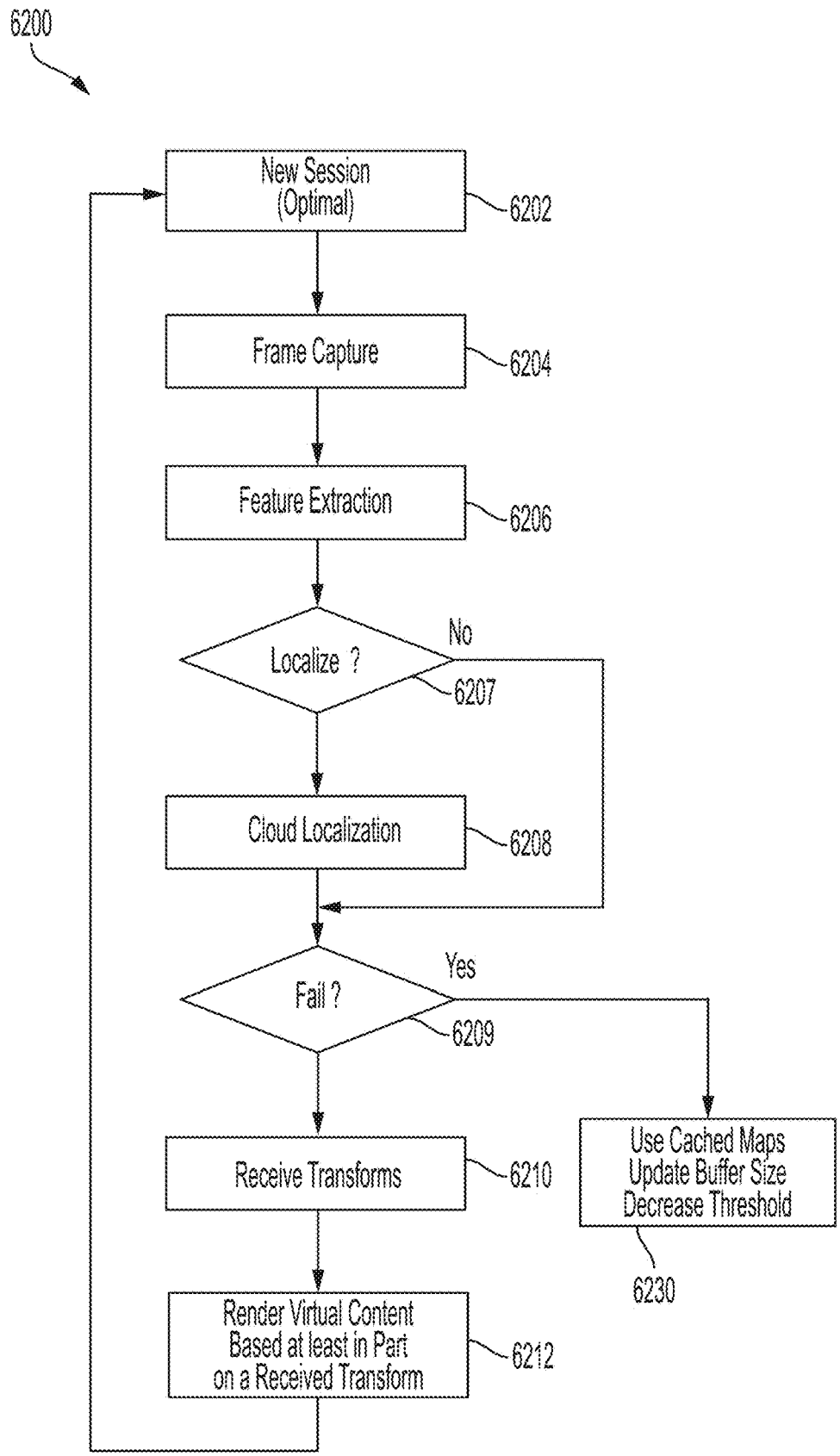
FIG. 62 is an example process flow for operation of a portable device as part of an XR system that provides cloud-based localization, according to some embodiments.

FIG. 62 is an example process flow that can be executed by devices to use a cloud-based service to localize the device's position with canonical map(s) and receive transform information specifying one or more transformations between the device local coordinate system and the coordinate system of a canonical map. Various embodiments and examples describe the transform as specifying a transformation from a first coordinate frame to a second. Other embodiments include transforms from the second to the first coordinate frame. Any in yet other embodiments, the transform enables transition from one coordinate frame to another, the resulting coordinate frames depend only on the desired coordinate frame output (including, for example, the coordinate frame in which to display content). In yet further embodiments, the coordinate system transform enables determination of a first coordinate frame from the second and the second coordinate from the first.

According to some embodiments, information reflecting a transform for each persistent pose defined with respect to the canonical map can be communicated to device.

According to one embodiment, process 6200 can begin at 6202 with a new session. Starting a new session on the device may initiate capture of image information to build a tracking map for the device. Additionally, the device may send a message, registering with a server of a localization service, prompting the server to create a session for that device.

In some embodiments, starting a new session on a device optionally may include sending adjustment data from the device to the localization service. The localization service returns to the device one or more transforms computed based on the set of features and associated poses. If the poses of the features are adjusted based on device-specific information before computation of the transformation and/or the transformations are adjusted based on device-specific information after computation of the transformation, rather than perform those computations on the device, the device specific information might be sent to the localization service, such that the localization service may apply the adjustments. As a specific example, sending device-specific adjustment information may include capturing calibration data for sensors and/or displays. The calibration data may be used, for example, to adjust the locations of feature points relative to a measured location. Alternatively or additionally, the calibration data may be used to adjust the locations at which the display is commanded to render virtual content so as to appear accurately positioned for that particular device. This calibration data may be derived, for example, from multiple images of the same scene taken with sensors on the device. The locations of features detected in those images may be expressed as a function of sensor location, such that multiple images yield a set of equations that may be solved for the sensor location. The computed sensor location may be compared to a nominal position, and the calibration data may be derived from any differences. In some embodiments, intrinsic information about the construction of the device may also enable calibration data to be computed for the display, in some embodiments.

In embodiments in which calibration data is generated for the sensors and/or display, the calibration data may be applied at any point in the measurement or display process. In some embodiments, the calibration data may be sent to the localization server, which may store the calibration data in a data structure established for each device that has registered with the localization server and is therefore in a session with the server. The localization server may apply the calibration data to any transformations computed as part of a localization process for the device supplying that calibration data. The computational burden of using the calibration data for greater accuracy of sensed and/or displayed information is thus borne by the calibration service, providing a further mechanism to reduce processing burden on the devices.

Once the new session is established, process 6200 may continue at 6204 with capture of new frames of the device's environment. Each frame can be processed to generate descriptors (including for example, DSF values discussed above) for the captured frame at 6206. These values may be computed using some or all of the techniques described above, including techniques as discussed above with respect to FIGS. 14, 22, and 23. As discussed, the descriptors may be computed as a mapping of the feature points or, in some embodiments a mapping of a patch of an image around a feature point, to a descriptor. The descriptor may have a value that enables efficient matching between newly acquired frames/images and stored maps. Moreover, the number of features extracted from an image may be limited to a maximum number of features points per image, such as 200 feature points per image. The feature points may be selected to represent interest points, as described above.

Accordingly, acts 6204 and 6206 may be performed as part of a device process of forming a tracking map or otherwise periodically collecting images of the physical world around the device, or may be, but need not be, separately performed for localization.

Feature extraction at 6206 may include appending pose information to the extracted features at 6206. The pose information may be a pose in the device's local coordinate system. In some embodiments, the pose may be relative to a reference point in the tracking map, such as a persistent pose, as discussed above. Alternatively or additionally, the pose may be relative to the origin of a tracking map of the device. Such an embodiment may enable the localization service as described herein to provide localization services for a wide range of devices, even if they do not utilize persistent poses. Regardless, pose information may be appended to each feature or each set of features, such that the localization service may use the pose information for computing a transformation that can be returned to the device upon matching the features to features in a stored map.

The process 6200 may continue to decision block 6207 where a decision is made whether to request a localization. One or more criteria may be applied to determine whether to request a localization. The criteria may include passage of time, such that a device may request localization after some threshold amount of time. For example, if a localization has not been attempted within a threshold amount of time, the process may continue from decision block 6207 to act 6208 where localization is requested from the cloud. That threshold amount of time may be between 10 and 30 seconds, such as 25 seconds, for example. Alternatively or additionally, localization may be triggered by motion of a device. A device executing the process 6200 may track its motion using an IMU and its tracking map, and initiate localization upon detection of motion exceeding a threshold distance from the location where the device last requested localization. The threshold distance may be between 1 and 10 meters, such as between 3 and 5 meters, for example. As yet a further alternative, localization may be triggered in response to an event, such as when a device creates a new persistent pose or the current persistent pose for the device changes, as described above.

In some embodiments, decision block 6207 may be implemented such that the thresholds for triggering localization may be established dynamically. For example, in environments in which features are largely uniform such that there may be a low confidence in matching a set of extracted features to features of a stored map, localization may be requested more frequently to increase the chances that at least one attempt at localization will succeed. In such a scenario, the thresholds applied at decision block 6207 may be decreased. Similarly, in an environment in which there are relatively few features, the thresholds applied at decision block 6207 may be decreased so as to increase the frequency of localization attempts.

Regardless of how the localization is triggered, when triggered, the process 6200 may proceed to act 6208 where the device sends a request to the localization service, including data used by the localization service to perform localization. In some embodiments, data from multiple image frames may be provided for a localization attempt. The localization service, for example, may not deem localization successful unless features in multiple image frames yield consistent localization results. In some embodiments, process 6200 may include saving feature descriptors and appended pose information into a buffer. The buffer may, for example, be a circular buffer, storing sets of features extracted from the most recently captured frames. Accordingly, the localization request may be sent with a number of sets of features accumulated in the buffer. In some settings, a buffer size is implemented to accumulate a number of sets of data that will be more likely to yield successful localization. In some embodiments, a buffer size may be set to accumulate features from two, three, four, five, six, seven, eight, nine, or ten frames, for example). Optionally, the buffer size can have a baseline setting which can be increased responsive to localization failures. In some examples, increasing the buffer size and corresponding number of sets of features transmitted reduces the likelihood that subsequent localization functions fail to return a result.

Regardless of how the buffer size is set, the device may transfer the contents of the buffer to the localization service as part of a localization request. Other information may be transmitted in conjunction with the feature points and appended pose information. For example, in some embodiments, geographic information may be transmitted. The geographic information may include, for example, GPS coordinates or a wireless signature associated with the devices tracking map or current persistent pose.

In response to the request sent at 6208, a cloud localization service may analyze the feature descriptors to localize the device into a canonical map or other persistent map maintained by the service. For example, the descriptors are matched to a set of features in a map to which the device is localized. The cloud based localization service may perform localization as described above with respect to device based localization (e.g., can rely on any of the functions discussed above for localization (including, map ranking, map filtering, location estimation, filtered map selection, examples in FIGS. 44-46, and/or discussed with respect to a localization module, PCF and/or PP identification and matching etc.). However, instead of communicating identified canonical maps to a device (e.g., in device localization), the cloud-based localization service may proceed to generate transforms based on the relative orientation of feature sets sent from the device and the matching features of the canonical maps. The localization service may return these transforms to the device, which may be received at block 6210.

In some embodiments, the canonical maps maintained by the localization service may employ PCF's, as described above. In such an embodiment, the feature points of the canonical maps that match the feature points sent from the device may have positions specified with respect to one or more PCF's. Accordingly, the localization service may identify one or more canonical maps and may compute a transformation between the coordinate frame represented in the poses sent with the request for localization and the one or more PCF's. In some embodiments, identification of the one or more canonical maps is assisted by filtering potential maps based on geographic data for a respective device. For example, once filtered to a candidate set (e.g., by GPS coordinate, among other options) the candidate set of canonical maps can be analyzed in detail to determine matching feature points or PCFs as described above.

The data returned to the requesting device at act 6210 may be formatted as a table of persistent pose transforms. The table can be accompanied by one or more canonical map identifiers, indicating the canonical maps to which the device was localized by the localization service. However, it should be appreciated that the localization information may be formatted in other ways, including as a list of transforms, with associated PCF and/or canonical map identifiers.

Regardless of how the transforms are formatted, at act 6212 the device may use these transforms to compute the location at which to render virtual content for which a location has been specified by an application or other component of the XR system relative to any of the PCF's. This information may alternatively or additionally be used on the device to perform any location based operation in which a location is specified based on the PCF's.

In some scenarios, the localization service may be unable to match features sent from a device to any stored canonical map or may not be able to match a sufficient number of the sets of features communicated with the request for the localization service to deem a successful localization occurred. In such a scenario, rather than returning transformations to the device as described above in connection with act 6210, the localization service may indicate to the device that localization failed. In such a scenario, the process 6200 may branch at decision block 6209 to act 6230, where the device may take one or more actions for failure processing. These actions may include increasing the size of the buffer holding feature sets sent for localization. For example, if the localization service does not deem a successful localization unless three sets of features match, the buffer size may be increased from five to six, increasing the chances that three of the transmitted sets of features can be matched to a canonical map maintained by the localization service.

Alternatively or additionally, failure processing may include adjusting an operating parameter of the device to trigger more frequent localization attempts. The threshold time between localization attempts and/or the threshold distance may be decreased, for example. As another example, the number of feature points in each set of features may be increased. A match between a set of features and features stored within a canonical map may be deemed to occur when a sufficient number of features in the set sent from the device match features of the map. Increasing the number of features sent may increase the chances of a match. As a specific example, the initial feature set size may be 50, which may be increased to 100, 150, and then 200, on each successive localization failure. Upon successful match, the set size may then be returned to its initial value.

Failure processing may also include obtaining localization information other than from the localization service. According to some embodiments, the user device can be configured to cache canonical maps. Cached maps permit devices to access and display content where the cloud is unavailable. For example, cached canonical maps permit device based localization in the event of communication failure or other unavailability.

According to various embodiments, FIG. 62 describes a high level flow for a device initiating cloud based localization. In other embodiments, various ones or more of the illustrated steps can be combined, omitted, or invoke other processes to accomplish localization and ultimately visualization of virtual content in a view of a respective device.

Further, it should be appreciated that, though the process 6200 shows the device determining whether to initiate localization at decision block 6207, the trigger for initiating localization may come from outside the device, including from the localization service. The localization service, for example, may maintain information about each of the devices that is in a session with it. That information, for example, may include an identifier of a canonical map to which each device most recently localized. The localization service, or other components of the XR system, may update canonical maps, including using techniques as described above in connection with FIG. 26. When a canonical map is updated, the localization service may send a notification to each device that most recently localized to that map. That notification may serve as a trigger for the device to request localization and/or may include updated transformations, recomputed using the most recently sent sets of features from the device.

Figure 63A:
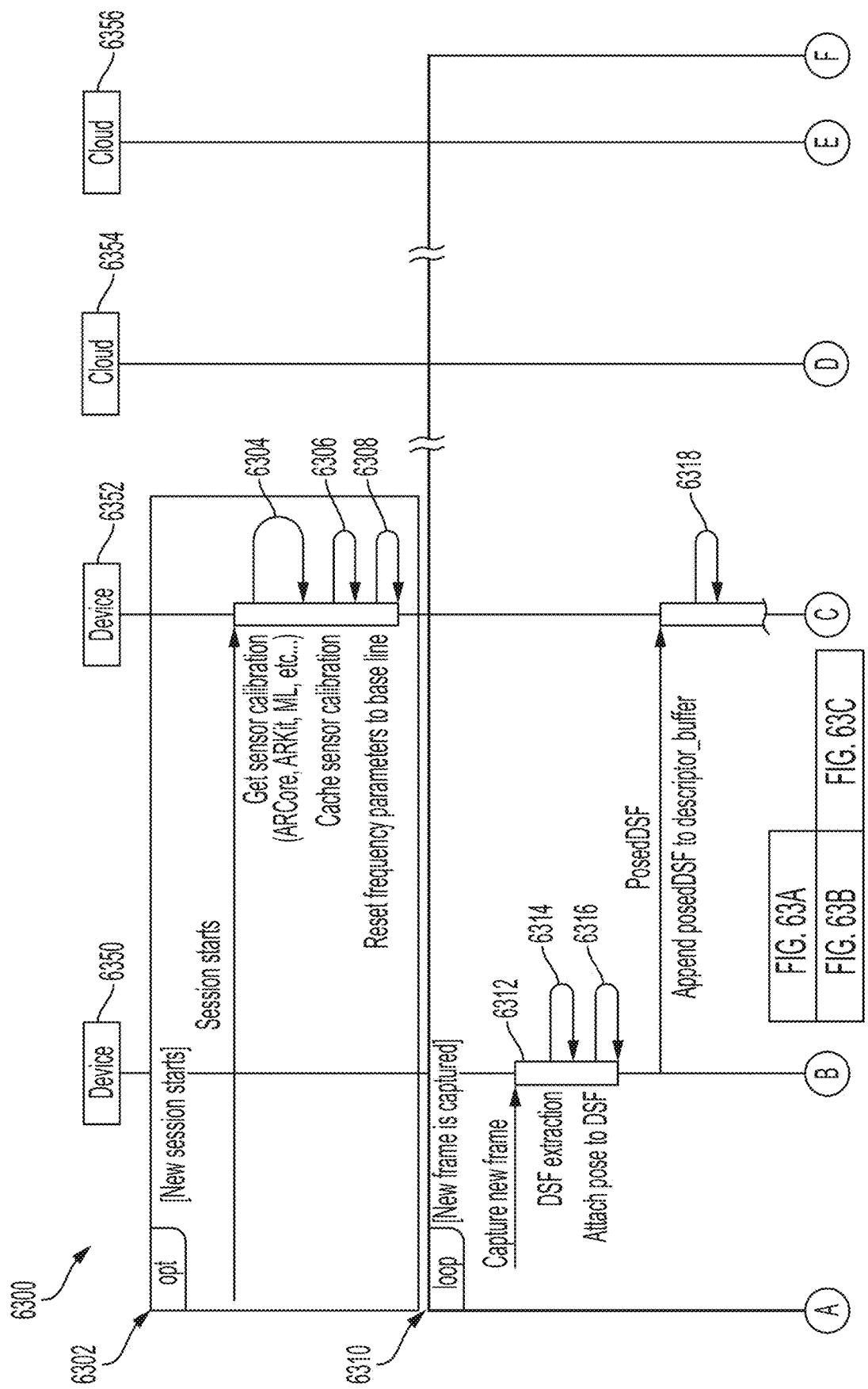
FIGS. 63A, B, and C are an example process flow for cloud-based localization, according to some embodiments.

FIGS. 63A, B, and C are an example process flow showing operations and communication between a device and cloud services. Shown at blocks 6350, 6352, 6354, and 6456 are example architecture and separation between components participating in the cloud based localization process. For example, the modules, components, and/or software that are configured to handle perception on the user device are shown at 6350 (e.g., 660, FIG. 6A). Device functionality for persisted world operations are shown at 6352 (including, for example, as described above and with respect to persisted world module (e.g., 662, FIG. 6A)). In other embodiments, the separation between 6350 and 6352 is not needed and the communication shown can be between processes executing on the device.

Similarly, shown at block 6354 is a cloud process configured to handle functionality associated with passable world/passable world modeling (e.g., 802, 812, FIG. 26). Shown at block 6356 is a cloud process configured to handle functionality associated with localizing a device, based on information sent from a device, to one or more maps of a repository of stored canonical maps.

In the illustrated embodiment, process 6300 begins at 6302 when a new session starts. At 6304 sensor calibration data is obtained. The calibration data obtained can be dependent on the device represented at 6350 (e.g., number of cameras, sensors, positioning devices, etc.). Once the sensor calibration is obtained for the device, the calibrations can be cached at 6306. If device operation resulted in a change in frequency parameters (e.g., collection frequency, sampling frequency, matching frequency, among other options) the frequency parameters are reset to baseline at 6308.

Once the new session functions are complete (e.g., calibration, steps 6302-6306) process 6300 can continue with capture of a new frame 6312. Features and their corresponding descriptors are extracted from the frame at 6314. In some examples, descriptors can comprise DSF's, as discussed above. According to some embodiments, the descriptors can have spatial information attached to them to facilitate subsequent processing (e.g., transform generation). Pose information (e.g., information, specified relative to the device's tracking map for locating the features in the physical world as discussed above) generated on the device can be appended to the extracted descriptors at 6316.

At 6318, the descriptor and pose information is added to a buffer. New frame capture and addition to the buffer shown in steps 6312-6318 is executed in a loop until a buffer size threshold is exceeded at 6319. Responsive to a determination that the buffer size has been met, a localization request is communicated from the device to the cloud at 6320. According to some embodiments, the request can be handled by a passable world service instantiated in the cloud (e.g. 6354). In further embodiments, functional operations for identifying candidate canonical maps can be segregated from operations for actual matching (e.g., shown as blocks 6354 and 6356). In one embodiment, a cloud service for map filtering and/or map ranking can be executed at 6354 and process the received localization request from 6320. According to one embodiment, the map ranking operations are configured to determine a set of candidate maps at 6322 that are likely to include a device's location.

In one example, the map ranking function includes operations to identify candidate canonical maps based on geographic attributes or other location data (e.g., observed or inferred location information). For example, other location data can include Wi-Fi signatures or GPS information.

According to other embodiments, location data can be captured during a cross reality session with the device and user. Process 6300 can include additional operations to populate a location for a given device and/or session (not shown). For example, the location data may be stored as device area attribute values and the attribute values used to select candidate canonical maps proximate to the device's location.

Any one or more of the location options can be used to filter sets of canonical maps to those likely to represent an area including the location of a user device. In some embodiments, the canonical maps may cover relatively large regions of the physical world. The canonical maps may be segmented into areas such that selection of a map may entail selection of a map area. A map area, for example may be on the order of tens of meters squared. Thus, the filtered set of canonical maps may be a set of areas of the maps.

According to some embodiments, a localization snapshot can be built from the candidate canonical maps, posed features, and sensor calibration data. For example, an array of candidate canonical maps, posed features, and sensor calibration information can be sent with a request to determine specific matching canonical maps. Matching to a canonical map can be executed based on descriptors received from a device and stored PCF data associated with the canonical maps.

In some embodiments, a set of features from the device is compared to sets of features stored as part of the canonical map. The comparison may be based on the feature descriptors and/or pose. For example, a candidate set of features of a canonical map may be selected based on the number of features in the candidate set that have descriptors similar enough to the descriptors of the feature set from the device that they could be the same feature. The candidate set, for example, may be features derived from an image frame used in forming the canonical map.

In some embodiments, if the number of similar features exceeds a threshold, further processing may be performed on the candidate set of features. Further processing may determine the degree to which the set of posed features from the device can be aligned with the features of the candidate set. The set of features from the canonical map, like the features from the device, may be posed.

In some embodiments, features are formatted as a highly dimensional embedding (e.g., DSF, etc.) and may be compared using a nearest neighbor search. In one example, the system is configured (e.g., by executing process 6200 and/or 6300) to find the top two nearest neighbors using Euclidean distance, and may execute a ratio test. If the closest neighbor is much closer than the second closest neighbor, the system considers the closest neighbor to be a match. "Much closer" in this context may be determined, for example, by the ratio of Euclidean distance relative to the second nearest neighbor is more than a threshold times the Euclidean distance relative to the nearest neighbor. Once a feature from the device is considered to be a "match" to a feature in canonical map, the system may be configured to use the pose of the matching features to compute a relative transformation. The transformation developed from the pose information may be used to indicate the transformation required to localize the device to the canonical map.

The number of inliers may serve as an indication of the quality of the match. For example, in the case of DSF matching, the number of inliers reflects the number of features that were matched between received descriptor information and stored/canonical maps. In further embodiments, inliers may be determined in this embodiment by counting the number of features in each set that "match".

An indication of the quality of a match may alternatively or additionally be determined in other ways. In some embodiments, for example, when a transformation is computed to localize a map from a device, which may contain multiple features, to a canonical map, based on relative pose of matching features, statistics of the transformation computed for each of multiple matching features may serve as quality indication. A large variance, for example, may indicate a poor quality of match. Alternatively or additionally, the system may compute, for a determined transformation, a mean error between features with matching descriptors. The mean error may be computed for the transformation, reflecting the degree of positional mismatch. A mean squared error is a specific example of an error metric. Regardless of the specific error metric, if the error is below a threshold, the transformation may be determined to be usable for the features received from the device, and the computed transformation is used for localizing the device. Alternatively or additionally, the number of inliers may also be used in determining whether there is a map that matches a device's positional information and/or descriptors received from a device.

As noted above, in some embodiments, a device may send multiple sets of features for localization. Localization may be deemed successful when at least a threshold number of sets of features match, with an error below a threshold and a number of inliers above a threshold, a set of features from the canonical map. That threshold number, for example, may be three sets of features. However, it should be appreciated that the threshold used for determining whether a sufficient number of sets of feature have suitable values may be determined empirically or in other suitable ways. Likewise, other thresholds or parameters of the matching process, such as degree of similarity between feature descriptors to be deemed matching, the number of inliers for selection of a candidate set of features, and/or the magnitude of the mismatch error, may similarly be determined empirically or in other suitable ways.

Figure 63B:
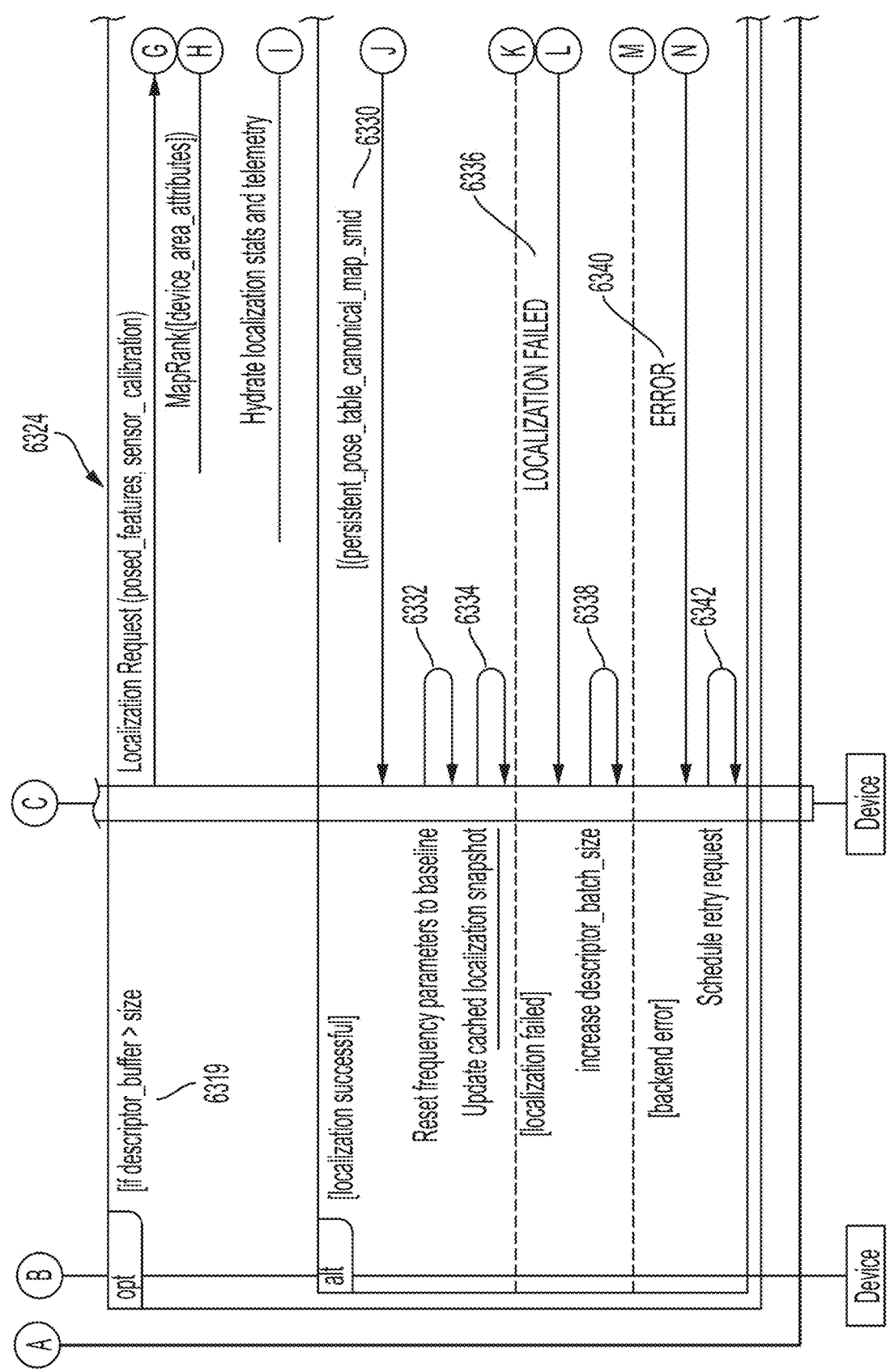
Figure 63C:
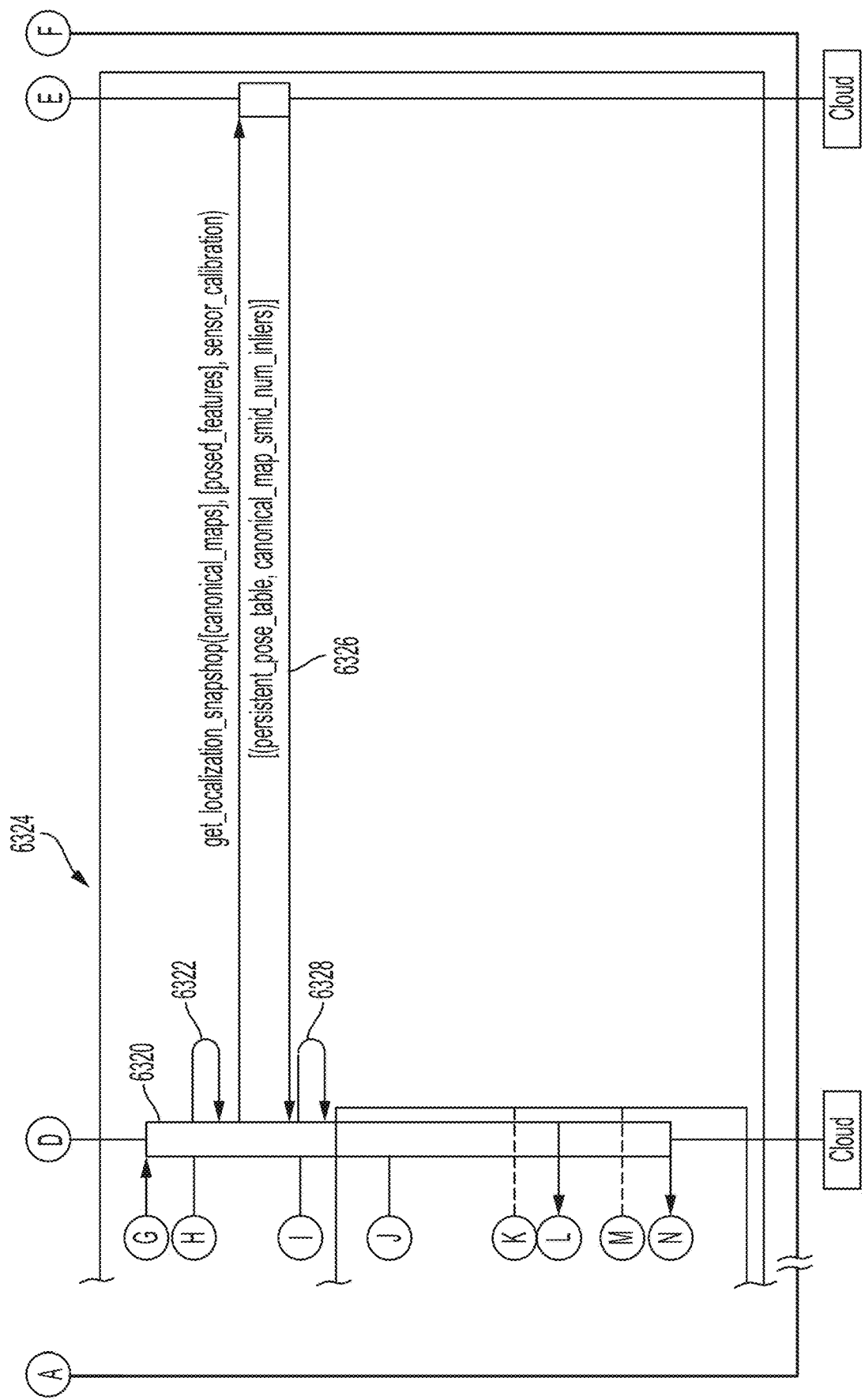

Once a match is determined, a set of persistent map features associated with the matched canonical map or maps is identified. In embodiments in which the matching is based on areas of maps, the persistent map features may be the map features in the matching areas. The persistent map features may be persistent poses or PCF's as described above. In the example of FIG. 63, the persistent map features are persistent poses.

Regardless of the format of the persistent map features, each persistent map feature may have a predetermined orientation relative to the canonical map in which it is a part. This relative orientation may be applied to the transformation computed to align the set of features from the device with the set of features from the canonical map to determine a transformation between the set of features from the device and the persistent map feature. Any adjustments, such as might be derived from calibration data, may then be applied to this computed transformation. The resulting transformation may be the transformation between the local coordinate frame of the device and the persistent map feature. This computation may be performed for each persistent map feature of a matching map area, and the results may be stored in a table, denoted as the persistent_pose_table in 6326.

In one example, block 6326 returns a table of persistent pose transforms, canonical map identifiers, and number of inliers. According to some embodiments, the canonical map ID is an identifier for uniquely identifying a canonical map and a version of the canonical map (or area of a map, in embodiments in which localization is based on map areas).

In various embodiments, the computed localization data can be used to populate localization statistics and telemetry maintained by the localization service at 6328. This information may be stored for each device, and may be updated for each localization attempt, and may be cleared when the device's session ends. For example, which maps were matched by a device can be used to refine map ranking operations. For example, maps covering the same area to which the device previously matched may be prioritized in the ranking. Likewise, maps covering adjacent areas may be give higher priority over more remote areas. Further, the adjacent maps might be prioritized based on a detected trajectory of the device over time, with map areas in the direction of motion being given higher priority over other map areas. The localization service may use this information, for example, upon a subsequent localization request from the device to limit the maps or map areas searched for candidate sets of features in the stored canonical maps. If a match, with low error metrics and/or a large number or percentage of inliers, is identified in this limited area, processing of maps outside the area may be avoided.

Process 6300 can continue with communication of information from the cloud (e.g., 6354) to the user device (e.g., 6352). According to one embodiment, a persistent pose table and canonical map identifiers are communicated to the user device at 6330. In one example, the persistent pose table can be constructed of elements including at least a string identifying a persistent pose ID and a transform linking the device's tracking map and the persistent pose. In embodiments in which the persistent map features are PCF's, the table may, instead, indicate transformations to the PCF's of the matching maps.

If localization fails at 6336, process 6300 continues by adjusting parameters that may increase the amount of data sent from a device to the localization service to increases the chances that localization will succeed. Failure, for example, may be indicated when no sets of features in the canonical map can be found with more than a threshold number of similar descriptors or when the error metric associated with all transformed sets of candidate features is above a threshold. As an example of a parameter that may be adjusted, the size constraint for the descriptor buffer may be increased (of 6319). For example, where the descriptor buffer size is five, localization failure can trigger an increase to at least six sets of features, extracted from at least six image frames. In some embodiments, process 6300 can include a descriptor buffer increment value. In one example, the increment value can be used to control the rate of increase in the buffer size, for example, responsive to localization failures. Other parameters, such as parameters controlling the rate of localization requests, may be changed upon a failure to find matching canonical maps.

In some embodiments, execution of 6300 can generate an error condition at 6340, which includes execution where the localization request fails to work, rather than return a no match result. An error, for example, may occur as a result of a network error making the storage holding a database of canonical maps unavailable to a server executing the localization service or a received request for localization services containing incorrectly formatted information. In the event of an error condition, in this example, the process 6300 schedules a retry of the request at 6342.

When a localization request is successful, any parameters adjusted in response to a failure may be reset. At 6332, process 6300 can continue with an operation to reset frequency parameters to any default or baseline. In some embodiments, 6332 is executed regardless of any changes thus ensuring baseline frequency is always established.

The received information can be used by the device at 6334 to update a cache localization snapshot. According to various embodiments, the respective transforms, canonical maps identifiers, and other localization data can be stored by the device and used to relate locations specified with respect to the canonical maps, or persistent map features of them such as persistent poses or PCF's to locations determined by the device with respect to its local coordinate frame, such as might be determined from its tracking map.

Various embodiments of processes for localization in the cloud can implement any one or more of the preceding steps and be based on the preceding architecture. Other embodiments may combine various ones or more of the preceding steps, execute steps simultaneously, in parallel, or in another order.

According to some embodiments, localization services in the cloud in the context of cross reality experiences can include additional functionality. For example, canonical map caching may be executed to resolve issues with connectivity. In some embodiments, the device may periodically download and cache canonical maps to which it has localized. If the localization services in the cloud are unavailable, the device may run localizations itself (e.g., as discussed above—including with respect to FIG. 26). In other embodiments, the transformations returned from localization requests can be chained together and applied in subsequent sessions. For example, a device may cache a train of transformations and use the sequence of transformations to establish localization.

Various embodiments of the system can use the results of localization operations to update transformation information. For example, the localization service and/or a device can be configured to maintain state information on a tracking map to canonical map transformations. The received transformations can be averaged over time. According to one embodiment, the averaging operations can be limited to occur after a threshold number of localizations are successful (e.g., three, four, five, or more times). In further embodiments, other state information can be tracked in the cloud, for example, by a passable world module. In one example, state information can include a device identifier, tracking map ID, canonical map reference (e.g., version and ID), and the canonical map to tracking map transform. In some examples, the state information can be used by the system to continuously update and get more accurate canonical map to tracking map transforms with every execution of the cloud-based localization functions.

Additional enhancements to cloud-based localization can include communicating to devices outliers in the sets of features that did not match features in the canonical maps. The device may use this information, for example, to improve its tracking map, such as by removing the outliers from the sets of features used to build its tracking map. Alternatively or additionally, the information from the localization service may enable the device to limit bundle adjustments for its tracking map to computing adjustments based on inlier features or to otherwise impose constraints on the bundle adjustment process.

According to another embodiment, various sub-processes or additional operations can be used in conjunction and/or as alternatives to the processes and/or steps discussed for cloud based localization. For example, candidate map identification may include accessing canonical maps based on area identifiers and/or area attributes stored with respective maps.

Wireless Fingerprint Assisted Localization

Regardless of whether localization is performed in a localization service (e.g. which may store sets of canonical maps), or on a device (e.g. which may receive a set of canonical maps for localization), the localization process may be more efficient by efficiently filtering a universe of canonical maps against which localization may be attempted. In some embodiments, location metadata, such as wireless fingerprints, descriptive of relatively small regions of the physical world may be associated with information about the physical world acquired by a portable device and may be stored in connection with canonical maps against which localization may be attempted. Selecting maps, or portions of maps, based on similarity of wireless fingerprint to the information captured by the portable device may simplify the localization process.

A wireless fingerprint may be constructed from characteristics of wireless signals received in a relatively small region of the physical world. In the exemplary embodiment described herein, WiFi signals are used as an example of wireless signals. Specifically, BSSID and RSSI are examples of characteristics of wireless signals received. Though, in other embodiments, other characteristics of signals from wireless network access points, or other wireless communications, alternatively or additionally may be used to form a signature. In some embodiments, GPS and/or Bluetooth beacons may be used to form a wireless fingerprint, alone or in combination with WiFi signals.

Further, in some exemplary embodiments described herein, wireless fingerprints are associated with persistent poses, which are an example of persistent information about the physical world captured by a portable device. Persistent poses are recognized by processing image information captured on the portable device to detect a cluster of features indicative of what is likely to be persistent content in the physical world. The persistent pose is then integrated into a tracking map. The persistent poses are distributed throughout the tracking map, spaced by distances corresponding to 2 to 4 meters in the physical world, for example. The tracking map may be segmented into tiles, with each tile encompassing a persistent pose.

Persistent coordinate frames (PCFs) in canonical maps are an example of persistent information against which a device may localize. The PCFs may have wireless signatures attached to them. As described above, canonical maps may be formed from tracking maps, such as using a map merge process as described above. In promoting or merging tracking maps into canonical maps, PCFs may be created from one or more persistent poses of the tracking maps.

FIGS. 64 through 68 illustrate an example of a portable device generating a tracking map containing WiFi fingerprints for use in WiFi assisted localization or other functions, according to some embodiments.

Figure 64:
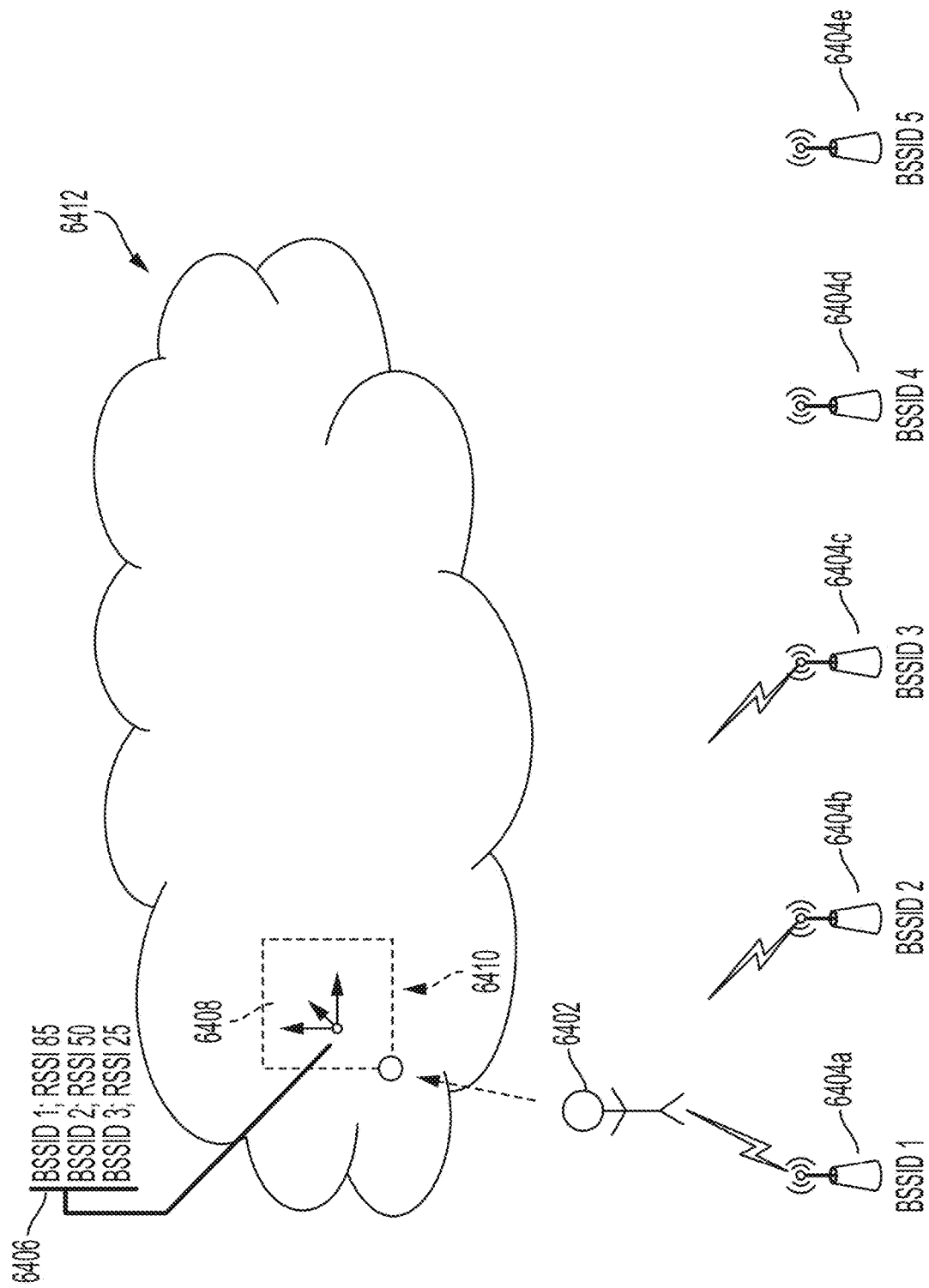
FIGS. 64, 65, 66, 67, and 68 are a sequence of schematic illustrations of a portable XR device constructing a tracking map, with multiple tiles having wireless fingerprints, as a user wearing the XR device, traverses the 3D environment.

In FIG. 64, a user 6402 with a portable device is shown in a three-dimensional (3D) environment containing wireless network access points 6404a through 6404e. In some embodiments, the portable device of user 6402 may receive signals from nearby network access points, for example network access point 6404a, 6404b, and 6404c as indicated in FIG. 64. Wireless hardware on the portable device may determine a network access point identifier and signal strength indicator value for each network access point for which a signal is detected. Wireless chipsets, for example, may be configured to perform a scan for available wireless network. That scan function may be initiated to obtain wireless information as described herein.

In some embodiments, the network access point identifier may be a basic service set identifier (BSSID) and the signal strength indicator value may be a received signal strength indicator (RSSI) value. In some embodiments, other information about the network access points may be collected in addition to or instead of network access point identifiers and signal strength indicators. In some embodiments, the network access point information may be used to form a WiFi fingerprint.

The network access point information 6406 may be stored in association with persistent location information 6408 in a tile 6410 of a map 6412. For example, the persistent poses may be stored as data structures in non-volatile memory within or connected over a network to the portable device. The wireless information may be stored as a list of BSSID, RSSI tuples in this data structure, for example. In some embodiments, the persistent location information 6408 may comprise a persistent coordinate frame or persistent pose, as described above. In the example of FIG. 64, persistent location information 6408 is a persistent pose, and is selected as the closest persistent pose to user 6402, at the time the wireless signals are captured. In this context, the closest persistent pose is the pose determined based on the distance between the user and the location in the 3D environment of features associated with the persistent pose, although other methods may be used.

In some embodiments, the persistent location information 6408 may include other information about the location, position, or orientation of the portable device in the 3D environment. In some embodiments, multiple pieces of location information and associated network access point information may be stored within a single tile. The wireless information, for example, may be captured as the portable device is building a tracking map, such that wireless information may be captured and stored as new persistent poses are created.

Figure 65:
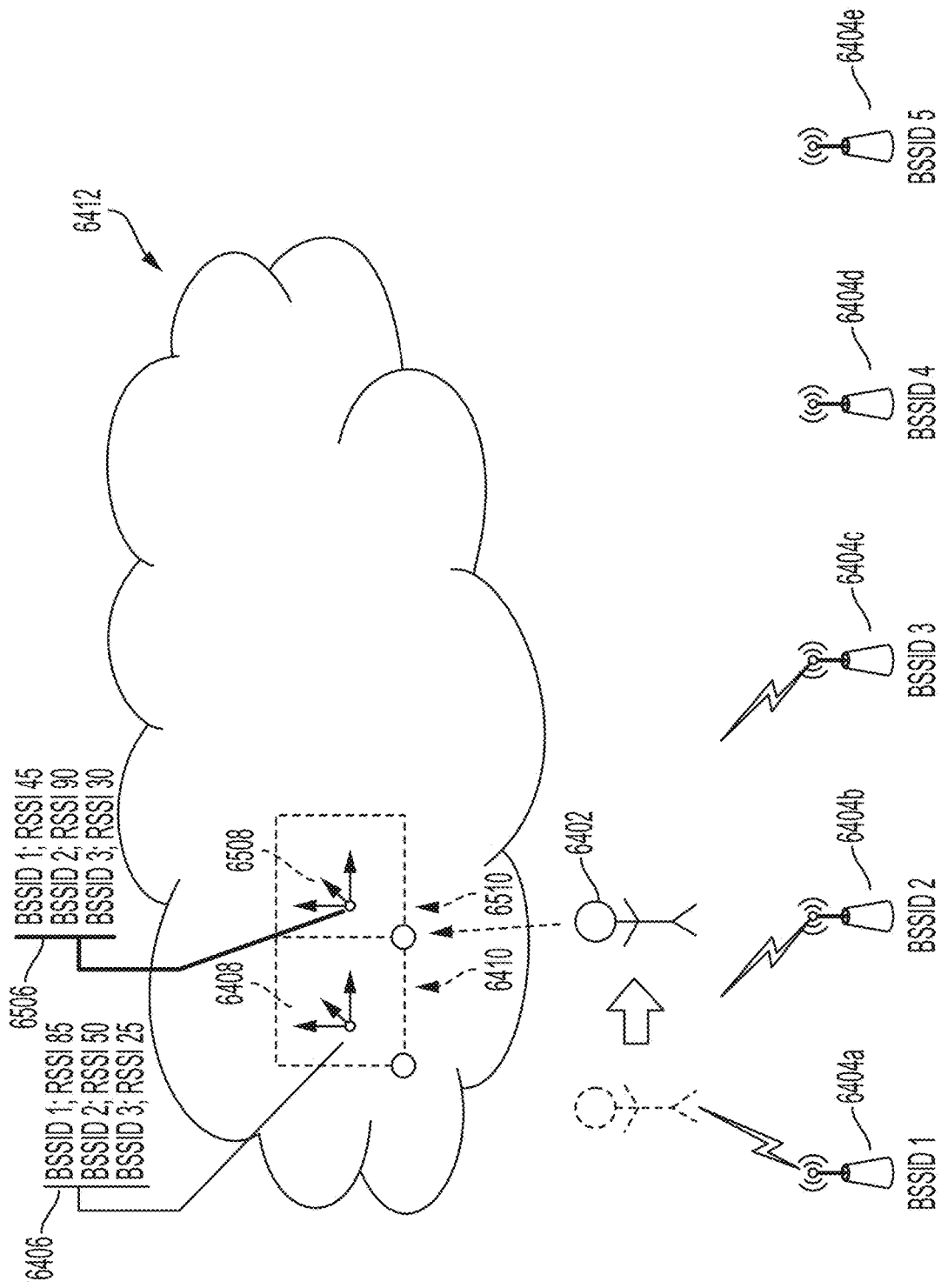

FIG. 65 illustrates user 6402 moving within the 3D environment. In the illustrated example, the portable device of user 6402 receives signals from the same wireless network access points 6404a, 6404b, and 6404c, but obtains new signal strength values associated with these wireless network access points because of the change in proximity between the portable device and the wireless network access points 6404a-6404e. In this example, location of the user has caused the user to enter a space that is not yet mapped in the tracking map such that a new persistent pose is created. In some embodiments, the new persistent pose may define a new tile for the tracking map. In some embodiments, a grid of tiles may be predefined (e.g. fixed size and shape relative to other tiles) but may not contain data (e.g. if the area has not been mapped previously until the user enters that tile, and in some embodiments, a persistent pose and/or PCF is created. The new network access point information 6506 may be stored with the new persistent location information 6508 in a new tile 6510 of map 6412 as illustrated. In some embodiments the new tile 6510 may be created, for example, because the distance the portable device has moved since a prior tile was created exceeds a threshold.

Figure 66:
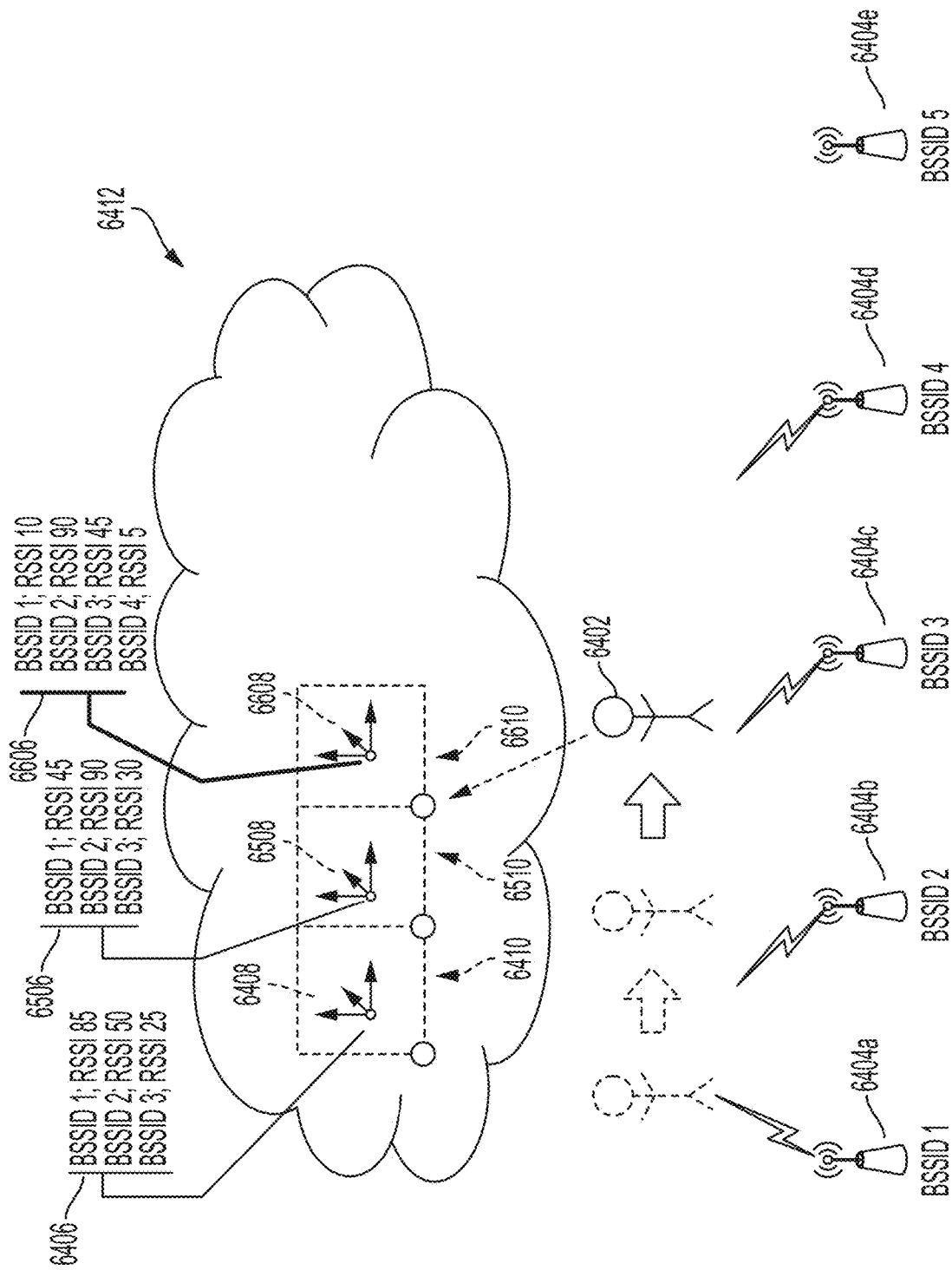

FIG. 66 illustrates user 6402 moving further within the 3D environment. In this example, the portable device of user 6402 receives signals from wireless network access points 6404a, 6404b, 6404c, and 6404d. As discussed in connection with FIGS. 64 and 65, the network access point information 6606 and persistent location information 6608 may be stored in a tile 6610 of the map 6412.

The wireless information associated with the persistent pose, as is illustrated in FIGS. 64, 65 and 66 may be the initial wireless signature for that tile. In some embodiments, the wireless signature for a tile may be refined as a user device continues to operate and collect more wireless information.

Figure 67:
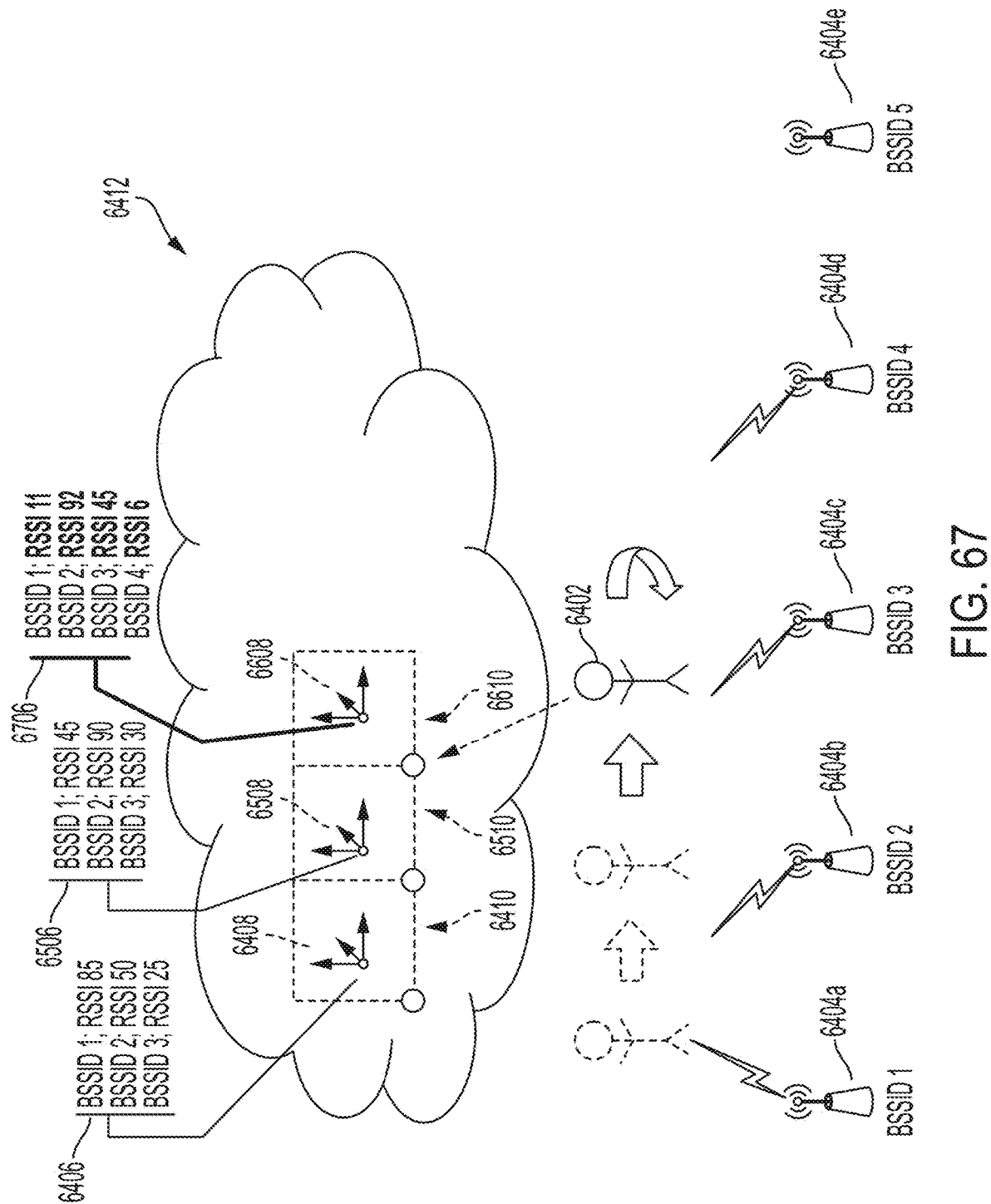

In FIG. 67, user 6402 is shown at the same location within the 3D environment 6102 as in FIG. 66. In some embodiments, this may occur when the user remains in the same location for a duration of time. A tile, for example, may correspond to an area between 2 and 4 square meters and a wireless scan may be performed approximately every 20 to 60 seconds. As a result, a user often may not move far enough to move from one tile to another in the time between scans. Alternatively or additionally, this may occur when the user returns to the same location after having moved elsewhere. In the illustrated example, the portable device of user 6402 receives signals from the same wireless network access points 6404a-6404d and obtains new network access point information.

However, though the user is in the same tile, the new network access point information may differ from the network access point information previously stored in tile 6610 (e.g. 6606 in FIG. 66). Changes may result from the user being at different locations with a tile when different wireless scans are performed. Alternatively or additionally, changes may result from changes in propagation conditions for wireless signals, changes in the wireless access points or other causes. By merging new wireless information with previously collected information, the wireless information may be more stable and therefore more effective as a wireless signature for comparison with other wireless signatures.

In the illustrated example, the new network access point information is merged with the previously stored network access point information to produce merged network access point information 6706, which may be stored in the same tile 6610 with the same persistent location information 6608. In the illustrated embodiment, the previously stored information is replaced with the merged information, such that the wireless information stored in association with each persistent pose reflects the most recent wireless scan.

Producing the merged network access point information may, in some embodiments, comprise taking an average of previously stored signal strength indicators and new signal strength indicators associated with the access point identifiers. The averaging may be computed as a rolling average, for example. Producing the merged network access point information may alternatively or additionally comprise replacing some stored network access point information with some, all, or none of the new network access point information. In the illustrated example, the RSSI values indicated in boldface in the merged network access point information 6706 represent an average of the RSSI values in the previously stored network access point information 6606, and new RSSI values obtained from the network access points.

Figure 68:
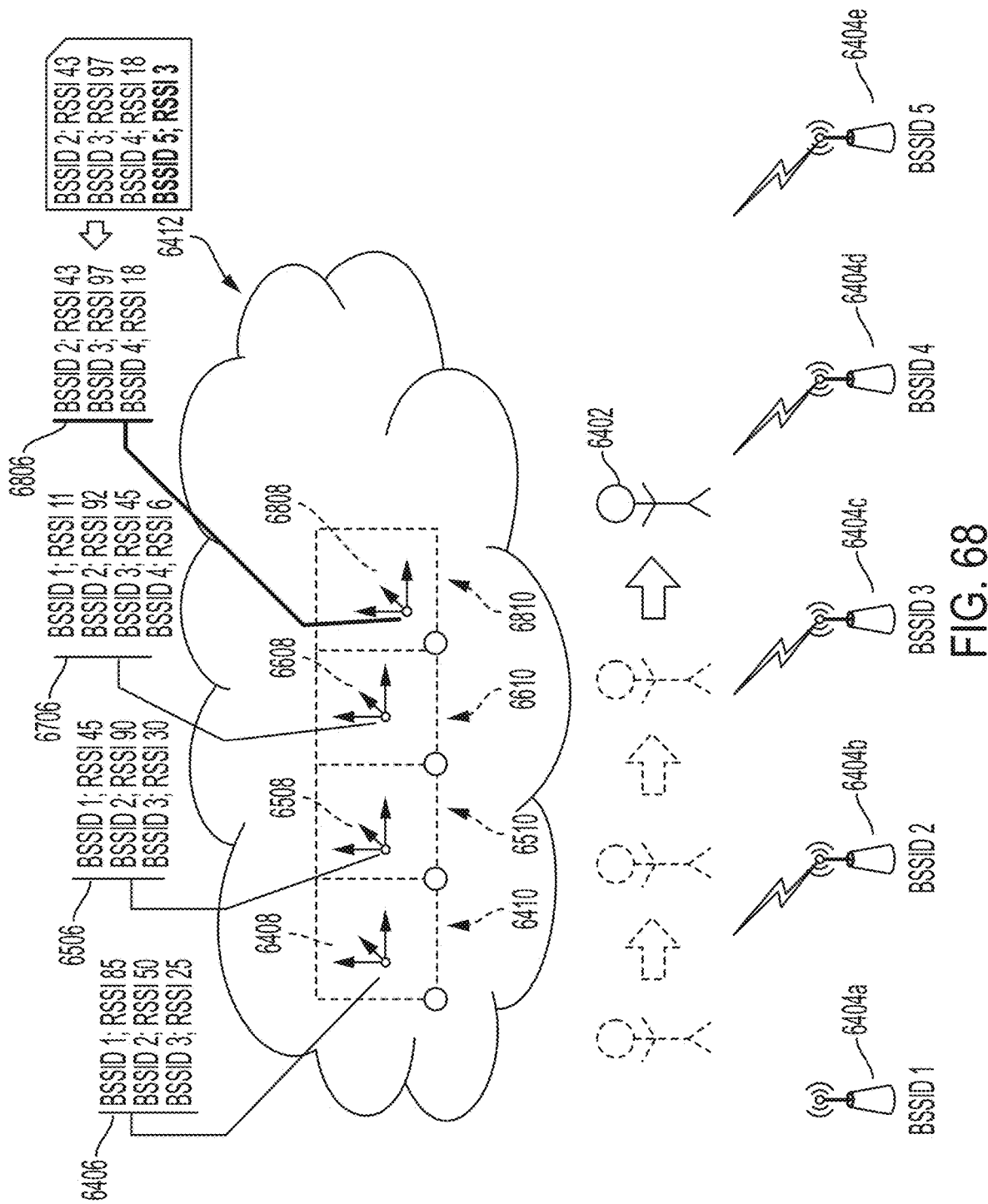

Other processing may alternatively or additionally be used to improve the stability of wireless signatures or to otherwise format the information for efficiently comparing wireless signatures. FIG. 68 illustrates the user 6402 moving further within the 3D environment. In the illustrated example, the portable device is no longer in range of the wireless network access point 6404a, but receives signals from network access points 6404b, 6404c, 6404d, and 6404e. In some embodiments, the network access point information collected by the portable device may be filtered before being stored.

In the example of FIG. 68, the network access point information 6806 collected from the wireless network access points 6404b-e while the portable device is within tile 6810 is shown as new network access point information 6807. The information 6807 may be filtered before being stored. The new network access point information may be filtered based on signal strength, for example. In some embodiments, the type of network access point or other pieces of information comprising the network access point information may be criteria for filtering. In FIG. 68, an example of an access point identifier to be filtered due to a low signal strength value is shown in boldface in network access point information 6807. In this example, the RSSI value of 3 associated with the wireless network access point 6404e in new network access point information 6807 is below a threshold and is filtered out. Accordingly, the BSSID of wireless network access point 6404e does not appear in network access point information 6806.

Figure 69:
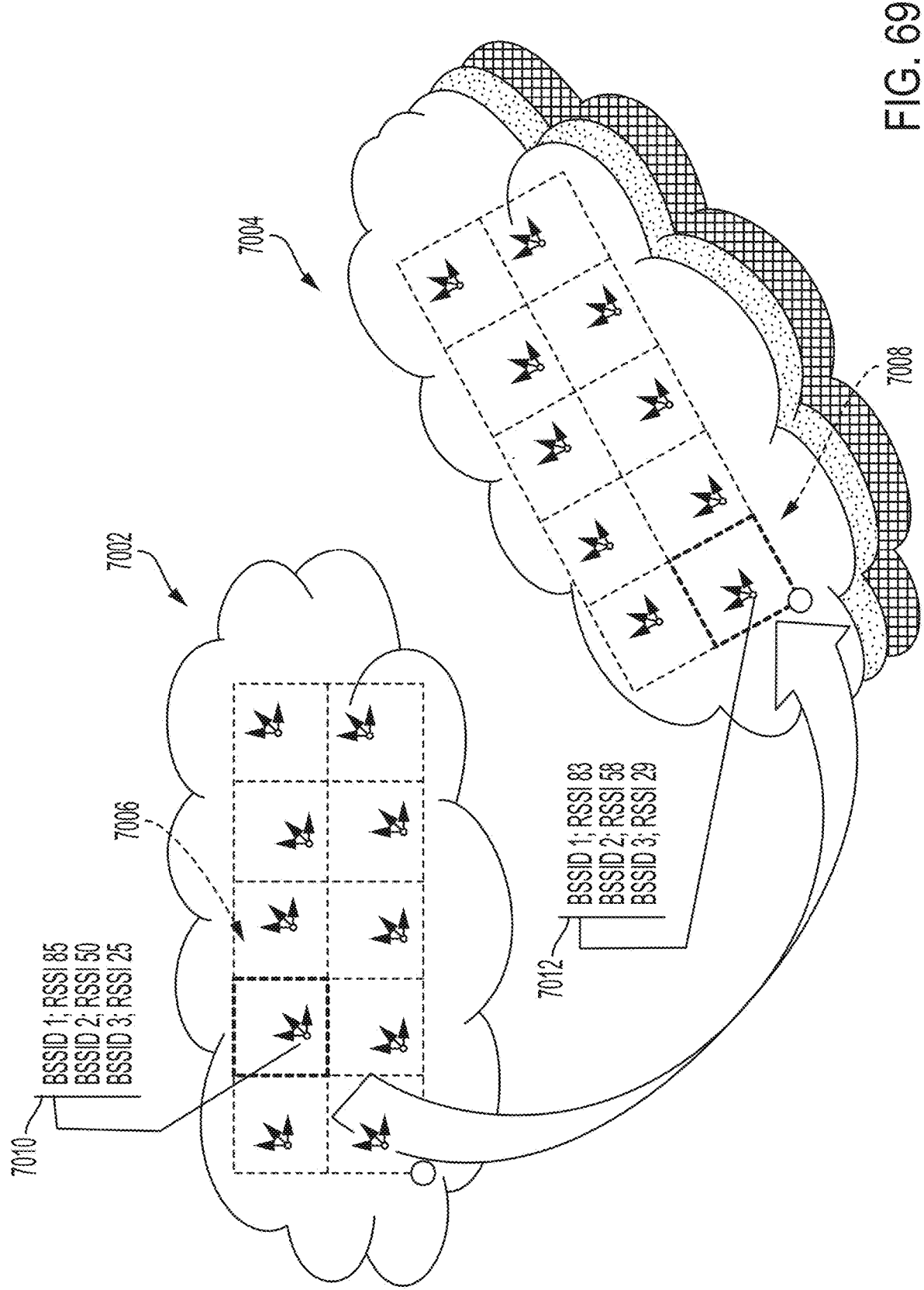
FIG. 69 is a schematic illustration of using wireless fingerprints for selecting a tile in a stored map in a set of stored maps as a candidate tile for use in localizing the portable XR device constructing the tracking map of FIGS. 64, 65, 66, 67, and 68.

FIG. 69 illustrates an example of localizing a map from a portable device within another map based on the network access point information, according to some embodiments. In FIG. 69, portable device map 7002 is to be localized against a stored map 7004 of a plurality of maps which may be stored, for example, on a remote computing device. In some embodiments, the portable device map may be a tracking map created by the portable device. In some embodiments, the plurality of stored maps may be canonical maps representing previously mapped environments, such as are stored by a localization service as described above. The portable device map and stored maps may have multiple tiles, as described in connection with FIGS. 64 through 68, with associated location information and network access point information, serving as wireless signatures.

The localization of a portable device map with respect to the stored maps may begin by selecting a subset of candidate maps and a subset of tiles within each map for comparison as part of a localization attempt. One or more filter criteria may be applied to select a subset of the stored maps as candidate maps. Similarity of wireless signatures may be used as one such filter criteria.

In the illustrated example of FIG. 69, the network access point information of tile 7006 in portable device map 7002 is similar to the network access point information stored in tile 7008 of stored map 7004. Based on this similarity, the map 7004 may be selected as a candidate map. Moreover, tiles 7006 and 7008 may be selected as candidate tiles. A localization attempt may initially be limited to attempting to localize these tiles with respect to each other. If these tiles cannot be localized, localization may be attempted between other pairs of tiles. The pairs of tiles may be selected in decreasing order of similarity. Alternatively or additionally, even if tiles 7006 and 7008 can be aligned with a sufficiently low error that that they may be deemed to be localized, localization may be attempted with respect to other pairs of tiles, which may be selected in decreasing order of similarity between the tiles of the pairs. Additional data from localizing other pairs may improve the accuracy of location of the maps with respect to each other. Alternatively or additionally, localization of other pairs of tiles may be performed to identify additional maps covering all or a portion of the same area as map 7002.

In some embodiments, similarity of wireless signatures may be based on Jaccard similarity. Network access point information of the selected portable device map tile and the stored map tiles may be compared by computing a Jaccard similarity between the list of BSSIDs and respective RSSI values stored with the portable device map tile and the corresponding information of the stored map tiles. Other algorithms and heuristics for comparing network access point information may additionally or alternatively be employed in order to compare the network access point information of the selected portable device map tile to the network access point information of the stored map tiles.

In the illustrated example of FIG. 69, candidate tile 7008 of stored map 7004 is selected to be the most similar compared to the selected tile 7006 of the portable device map 7002. In this example, the selection may be based on the similarity between the network access point information 7010 associated with portable device map tile 7006, and the network access point information 7012 of candidate tile 7008 of stored map 7004. In some embodiments, multiple candidate tiles may be selected in the canonical map.

Identifying maps with similar tiles may be done as a preliminary step to additional processing, such as to merge maps and/or to localize a portable device with respect to shared coordinate frame. According to some embodiments, a portable device map may be localized within a stored map starting with the candidate tile or tiles selected based on the comparison of network access point information. The localization process is described in detail at least in connection with FIGS. 23, 34, 44, 45, 46A and 46B above. It should be appreciated that the localization techniques described in this subsection may be used in conjunction with any of the other methods for localization described herein.

In some embodiments, when localizing a device with respect to one or more stored maps, it may not be required to compare the entire tracking map with respect to the stored maps. The current tile, in which the device is currently located, for example, may be localized with respect to tiles of the stored map. The tiles of the stored map to select as candidates with which to attempt localization may be selected based on similarity of wireless signatures. Alternatively or additionally, a map may have multiple hierarchical divisions, and wireless fingerprints may be associated with any level of the hierarchy, such that a selection of a map based on a wireless fingerprint may result in a selection at any level of the hierarchy.

A map, for example, may be subdivided into areas, which in turn may be divided into tiles. The wireless fingerprint of any tile within an area may be used in selecting the area as a candidate map. Alternatively or additionally, the wireless fingerprints for multiple tiles within the area may be aggregated into a combined fingerprint for the area. Aggregation may be performed, for example, by forming a list of BSSIDs that appear in any tile and averaging the RSSI values for the BSSIDs that are in the fingerprints of more than one tile.

Alternatively or additionally, each tile may contain multiple persistent points, such as multiple PCFs. Each such persistent point may have its own wireless signature. One or more PCFs may be selected as part of the candidate map selection based on their wireless signatures.

Moreover, it is not a requirement that the selection of tiles in stored maps lead to a localization attempt with respect to any portion of the tracking map. In some embodiments, for example, position information for localization with a shared map may be derived from current image data rather than from the tracking map. Nonetheless, the wireless signature associated with the tile in which the portable device is currently located may be used to select tiles of the stored map as candidates for localization.

In some embodiments, localization based on the network access point information comparison may comprise computing a transformation between a selected coordinate frame of the portable device map and a coordinate frame of the stored map being localized into. In some embodiments the coordinate frames may be persistent coordinate frames (PCFs) and/or persistent poses and/or an origin for a tracking map and canonical map. The selected coordinate frame of the portable device map may be the coordinate frame associated with the tile selected for comparison of network access point information. The coordinate frame of the stored map being localized into may be the coordinate frame associated with the candidate tile selected as a result of the network access point comparison. In some embodiments, transformations for other coordinate frames may alternatively or additionally be computed based on the comparison of network access point information.

Figure 70:
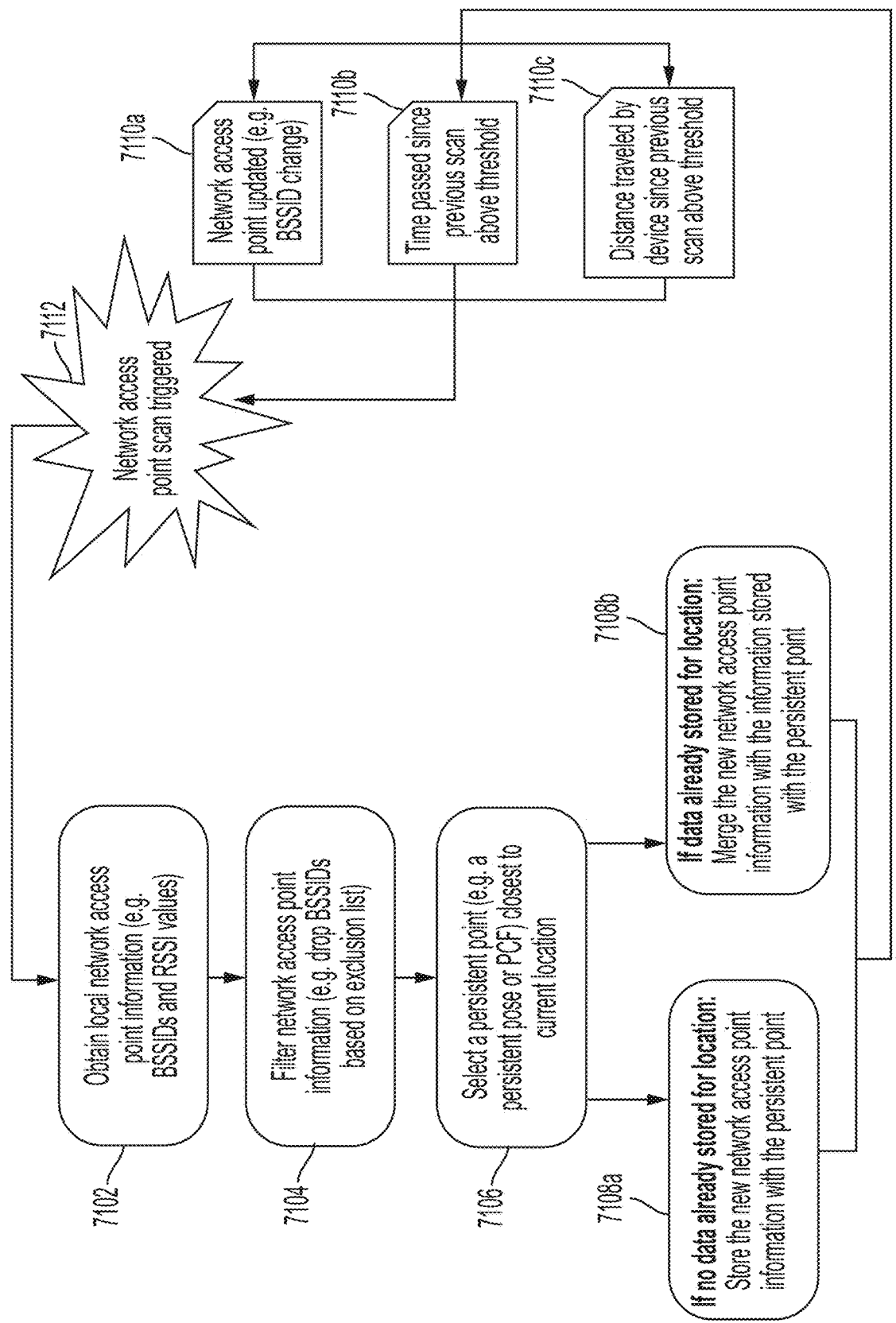
FIG. 70 is flow chart illustrating a method of operation of a portable XR device to generate wireless fingerprints according to some embodiments.

Regardless of how the wireless signatures are used, techniques as described herein may result in efficient generation of wireless signatures which may be available with low latency. FIG. 70 is a flow chart illustrating such a process according to some embodiments. The processing described in connection with FIG. 70 may be performed on a portable device, in some embodiments, but may alternatively or additionally be performed on one or more processors connected to the portable device over a network or other processors of the system. The acts 7102 through 7108 are carried out by the portable device creating the map, while the other illustrated acts may be carried out, for example, by a remote computing device, such as a server or a computing device comprising multiple computing devices in a cloud configuration.

In act 7102, the portable device obtains network access point information at its location within the 3D environment. This act may comprise obtaining BSSIDs and corresponding RSSI values for network access points from which the portable device receives signals. In some embodiments, other network access point information may be collected, such as the names or types of network access points. This information may be acquired on a portable device equipped for WiFi by a scan performed by the WiFi chip on the device. A scan may be triggered by any one or more conditions, discussed in greater detail below in connection with element 7112.

In act 7104, the portable device may optionally filter and process the network access point information collected in act 7102. The filtering or processing act may comprise dropping network access point information. For example, BSSIDs may be filtered based on the corresponding signal strength values, or based on exclusion criteria of BSSIDs. Exclusion criteria may be based, for example, on the BSSID name. Names containing the term "phone" or other terms that suggest a portable access point may be excluded. Similarly, access points that are not discoverable may be excluded, as may access points with any other characteristics that may indicate an access point that may not be detected by another device operating in the same space. In some embodiments, filter step 7104 may filter out all but a predetermined quantity of access point information. For example, all but the three BSSIDs with the highest signal strength values may be filtered out of the network access point information.

Other methods of processing the network access point information, such as normalizing the network access point information or expressing the network access point information in a different format for further processing or transmission, may additionally or alternatively be employed.

In act 7106, a persistent point is selected to represent the location of the portable device. In some embodiments, the selected persistent point may be a persistent pose or PCF that is closest relative to the portable device in a map to which the portable device is localized. Alternatively or additionally, a selected persistent point may be other information representing the location of the portable device.

However, in the example of FIG. 70, the persistent point may be a persistent pose in a tracking map of the device. In act 7108*a*, in some embodiments, a new tile may be added to the tracking map if no data has already been stored for the current location of the portable device. In other embodiments, an empty tile may be created and the new persistent point and corresponding data may be added to the empty tile. The new tile may include a persistent point of act 7106, and the network access point information of acts 7104 and 7102.

Alternatively, in act 7108*b*, the network access point information of acts 7104 and 7102 may be merged with network access point information already associated with a tile in the tracking map. In some embodiments, this may comprise averaging the RSSI values associated with corresponding BSSIDs in the network access point information. In some embodiments, this may alternatively or additionally comprise replacing the stored network access point information with the new network access point information or, conversely, retaining the stored network access point information and discarding the new network access point information. The new network access point information might be discarded rather than merged, for example, if it fails certain quality criteria, such as it deviates by a wide margin from previously collected information or has very low RSSI values for all network access points, indicating the possibility of a reception problem.

After the data has been stored in act 7108*a* or 7108*b*, the portable device may take no further action with respect to forming wireless fingerprints until a new network access point scan is triggered. Example criteria for a new scan being triggered are shown in acts 7110*a* through 7110*c*. As illustrated, a new scan may be triggered based on a distance traveled by the portable device since the previous scan exceeding a threshold (7110*c*). Distance traveled may be determined by hardware and/or software components of the device. The device, for example, may include an IMU or GPS hardware that provide an indication of location or position that may be used to determine when a threshold distance has been traveled. Alternatively or additionally, a device forming a tracking map from a sequence of captured images may determine, based on relative position of the device within the map, distance traveled.

In other examples, a new scan may be triggered by an amount of time passing since a previous scan (7110*b*). For example, a scan may be triggered if a scan has not been performed in more than a threshold amount of time, which might be 20 seconds or 60 seconds or any value in the range be 20 and 60 seconds, for example.

In other examples, an update in the network access points, such as a BSSID change, may trigger a new scan (7110*a*) and/or may trigger the wireless hardware to send results of a scan.

Although these acts need not occur on the portable device, it should be appreciated that in some embodiments the portable device itself may trigger a new scan according to acts 7110*a*, 7110*b*, or 7110*c*. A scan may also be triggered automatically for other reasons than those illustrated in FIG. 70. For example, other components executing on the device may command the wireless chipset to perform a scan for reasons unrelated to maintaining wireless signatures. In some embodiments, whenever a scan is performed, the wireless components may output an indication that scan data is available, which may then be used for updating wireless signatures such that information on wireless network access points may be pushed from the hardware without an express request from components of the device constructing the wireless fingerprint.

Regardless of the specific mechanism that triggers the scan, in act 7112, a new network scan is triggered. The process then proceeds to act 7102, as described above.

It should be appreciated that the techniques described in this subsection may be used in conjunction with the other techniques described herein. For example, the maps involved in the localization process described in this subsection may undergo a filtering process as described in conjunction with FIGS. 28 through 34. As shown in FIG. 28, the filtering process may include a Neighboring Area Filter, a WiFi Fingerprint Filter, a Key Frame Filter, or any of the other filters described in this application. As further shown in FIG. 28, a localization process may follow the filtering process. In some embodiments, this localization process may utilize the network access point comparison technique for localization described in this subsection.

Further, it should be appreciated that wireless fingerprints may be used for comparison of maps or selection of maps representing a particular location in the physical world, regardless of use of the selected maps. Techniques as described in this section are not limited to use in a localization process. Wireless fingerprints, for example, may be used as part of map rank process as described above. Alternatively or additionally, wireless fingerprints may be used to select maps representing the same or overlapping regions for a map merge, also as described above.

Geo-Location Enhanced Map Ranking and Localization

As discussed herein, localization is a process to determine a transformation between one map and another map. A local map of a cross reality device may be localized to a canonical map, for example, so that information on the location of virtual content in the canonical map coordinate frame can be related to, and rendered by, the cross reality device. Localization may be performed on a device (e.g. which may receive a set of canonical maps for localization), or by a remote localization service (e.g. which may store sets of canonical maps). In either implementation, localization may entail searching for matches between sets of features in local and canonical maps, which may be computationally intensive.

The localization process may be made more efficient by filtering, based on location metadata, a universe of canonical maps against which localization may be attempted. Location metadata may be collected and stored with the canonical maps and may also be associated with the location information sent from the portable device. In various embodiments, location metadata may include geo-location data derived from a component of a portable device (e.g., GPS coordinates), WiFi fingerprints, and/or information on prior localization results. In some embodiments, the location metadata that is available will vary from device to device and may also vary based on connectivity, interference, current location, among other options. In some embodiments, a component that selects a subset of maps for localization attempts may determine which filtering criteria to apply based on available location metadata.

A similar approach for selecting a set of candidate maps for comparison may also be employed in connection with map ranking or other preprocessing to select a set of canonical maps prior to a merge process. Map merge similarly entails comparison of location information from a device against a set of maps in an attempt to identify corresponding sections. In this case, the location information from the portable device may be in the form of a tracking map. Nonetheless, the comparison of the location information in the tracking map to a set of maps may similarly be more efficient by using location metadata to reduce the number of candidate maps used in such a comparison.

Various embodiments utilize available location metadata to filter stored canonical maps so that a filtered set of maps can be analyzed to match one or more canonical maps to location information from a local device. For example, various embodiments may employ geo-location data to filter canonical maps and limit the computational burden of matching during localization and/or improve the accuracy of a resulting match. Other embodiments may prioritize types of location metadata and apply a hierarchy to available location metadata to improve localization. For example, location metadata may include information on prior localization, geo-location, and/or WiFi fingerprints, and the system may prioritize operations with prior localization information over other types of location metadata. In other embodiments, prioritization may include exclusion or different weighting of non-prioritized location metadata types.

Figure 74:
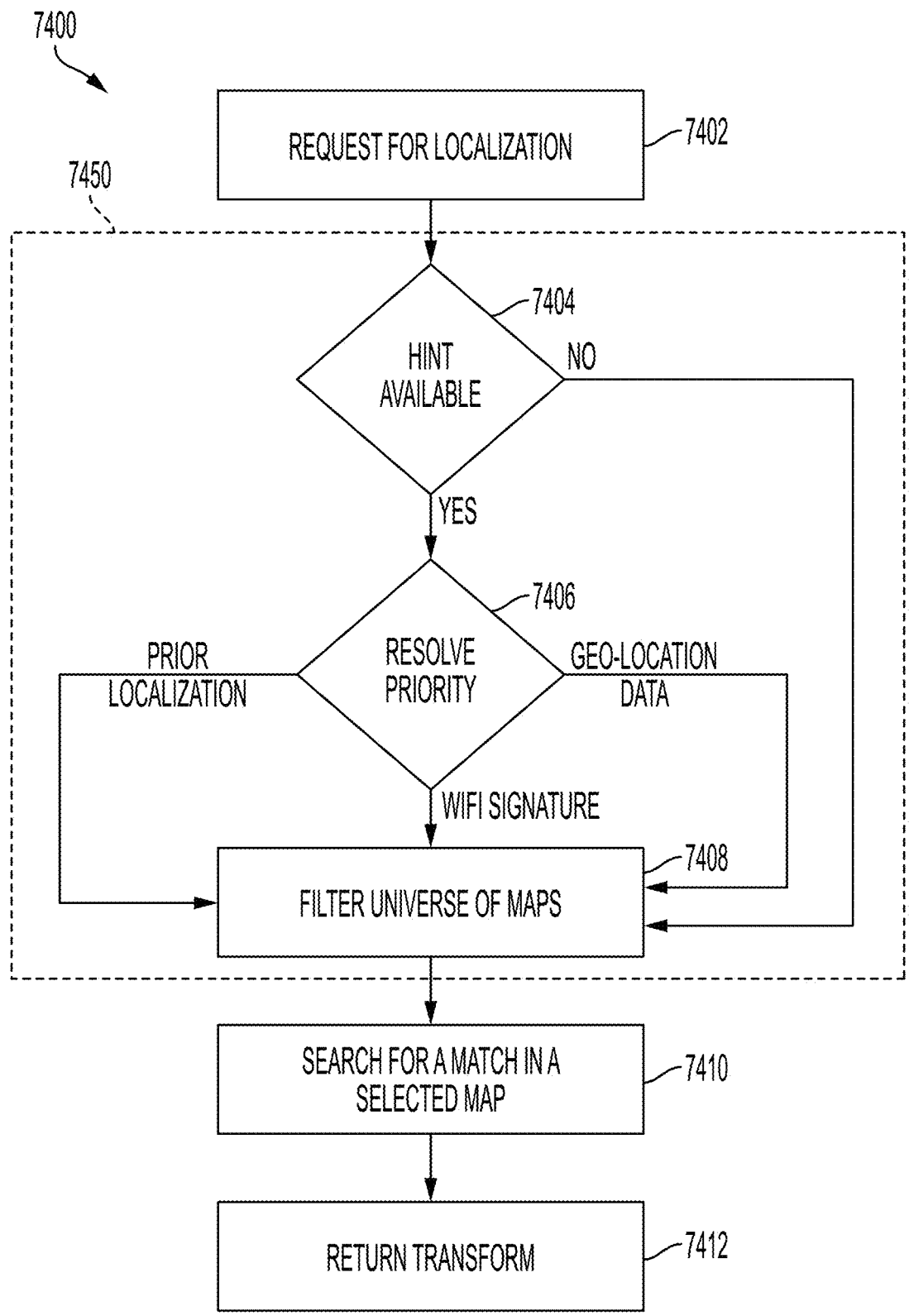
FIG. 74 is a flow chart of an exemplary process that may be executed as part of local or remote localization that utilizes location metadata, according to some embodiments.

FIG. 74 is an example process 7400 that may be executed as part of local or remote localization that utilizes location metadata. Events that trigger localization are not illustrated in FIG. 74, but the process may be performed in response to events that trigger localization as describe elsewhere, herein. Further, though not expressly illustrated in FIG. 74, other processing may precede or follow the acts illustrated in FIG. 74. For example, similar to the approach discussed with respect to process 6200, process 7400 may optionally be preceded by new session operations for a device (e.g., 6202-6206 of FIG. 62).

Process 7400 may be performed after location metadata has been associated with some or all of the canonical maps in a universe of maps used for localization. In some embodiments, location metadata may be added to canonical maps as devices interact with an XR platform, such that maps and associated location metadata are developed, updated and/or created as part of localization, map merge operations, and/or map select operations as discussed herein.

Process 7400 may begin at 7402 with the receipt of a request to localize a device to a stored map, which may be a map in a set of canonical maps. In the illustrated example, process 7400 may be performed on a localization service in the cloud and the localization request may be received over a wide area network from a portable device. However, the localization service may be executing in whole or in part on the portable device or in whole or in part on other computing devices.

The localization request may be based on location information in a local coordinate frame for the portable electronic device to be localized. According to some embodiments, localization requests also may identify location metadata generated, stored, or captured by or for the portable device. The device may execute any of the map building and/or environment information collection functions discussed herein to acquire that metadata. The location metadata may be included with the localization request. Alternatively or additionally, the location metadata may be maintained by or accessible to the localization service and the localization service may access the location metadata based on information in the request. For example the localization service may store information on each active device, including its position based on a prior localization, and may access this information based on a device identifier in the localization request.

By making the location metadata available for use in connection with processing a localization request, a cross reality platform may incorporate location metadata into localization optimizations. Further, the platform may build location metadata into canonical maps based on location metadata communicated with localization requests. According to various embodiments, a cross reality platform may also create, maintain, and/or update a geo-location database linking canonical maps to certain location metadata, such as geo-location information. Such a database may make the selection of candidate maps highly efficient, as the geo-location database may be referenced to quickly identify candidate stored maps to use in processing a request that incorporates location metadata.

In various embodiments, the request may include one or more copies of a specialized data structure that aggregates location information (e.g., persistent location information, persistent pose, and/or feature descriptors, etc.) captured in a device's 3D environment and that combines the location information with location metadata. In some examples, a posed feature rig ("PFR") is employed as the specialized data structure that is used to aggregate location information and location metadata from the device's 3D environment. The PFR may include posed feature descriptors, such as those that are described above in connection with FIG. 63, which provide location information. One or more pieces of location metadata, associated with the physical world location of the posed features may be stored associated with the posed feature descriptors. The location metadata may include, for example, wireless fingerprints, geo-location information which may be expressed as GPS coordinates or geo-hash values, or information on prior successful localizations. The metadata may be derived for the location in which the images that gave rise to the features represented by the location information were captured. For example, the posed features may be associated with a persistent pose in a tracking map for the portable device and the wireless fingerprint may be one stored with the persistent pose of the tracking map. As another example, the location metadata may be geo-location information obtained by calling an API of the operating system of the device, and the value may be a value read at the time the image frame from which the features were extracted was processed. The PFR may alternatively or additionally include any of the information described herein as transmitted with a localization request and/or used for localization.

As described herein, a portable device may buffer multiple such data structures, collected at periodic intervals or in response to events, so that they may be processed together as part of a localization request. Doing so, for example, increases the likelihood that at least one such data structure will be matched to a canonical map and/or increases the accuracy with which the device location can be computed. Such buffering may be similarly applied in connection with location information for which location metadata has been associated and the request at act 7402 may include multiple PFRs, in some embodiments.

Regardless of the exact structure of a request for localization, a set of candidate maps may be selected. In this example, process 7400 includes a subprocess 7450 for selecting from a universe of maps, a smaller set of maps that are candidate maps for attempting localization. Subprocess 7450, though described in connection with localization, may also be used as part of a map rank process or a map merge process. If used for other processes, the received location information may be formatted differently. For example, rather than a PFR, location information for a map merge may be formatted as a tracking map.

At act 7404, it is determined whether a localization hint is available for use. The hint may be based on the location metadata associated with the request, and may be generated by finding from among the universe of canonical maps canonical maps with the same or sufficiently similar location metadata to expect that the selected candidate maps represent an area overlapping with a location defined by the location information in the localization request. In some embodiments, a localization hint may be, or may be derived from, prior successful localization information, WiFi fingerprint data, geo-location data, and/or GPS data. In various examples, any location metadata might be used as a localization hint if it can be compared to available location metadata associated with stored maps.

According to various embodiments, if a localization hint is not available, 7404 NO, subprocess 7450 may continue at 7408 with filtering of available canonical maps based on content of the maps as discussed above. If localization hints are not available, 7404 NO, localization processing may continue in a similar manner as discussed with respect to FIG. 62 and process 6200.

If a localization hint may be used, 7404 YES, subprocess 7450 continues with resolving localization hint priority at 7406. In scenarios in which more than one type of location metadata is available, resolving priority may determine which type is likely to be the most effective at identifying candidate maps that represent the location of the portable device. In some embodiments, information associated with prior successful localizations may be given the highest priority. In various implementations, selecting candidate maps in the location determined by a recent, prior successful localization may provide the highest likelihood, relative to other location metadata, of identifying candidate maps that will contain the current location of the portable device. In further examples, prior successful localizations may be ignored or given a low priority relative to other types of location metadata if too much time has passed between a current request and a prior successful localization. In addition, or in the alternative, prior successful localization may be ignored or discounted if the requesting device is determined to have moved too great a distance from a prior location. According to some embodiments, information on prior successful localization is captured by a device and included in a request for localization (e.g., as part of any specialized data structure (e.g., PFR)) and/or communicated separately from the data structure. In some examples, the requesting device may manage invalidation of prior successful localization information, and if invalidated such information may not be communicated as part of a localization request.

According to some embodiments, a device may be configured to suppress sending of prior localization information in some scenarios, such as if the device has moved a threshold distance after successful localization and/or if a threshold amount of time has passed. If prior localization information is not available, resolving priority at act 7404 may result in selection of another type of hint or proceeding without a hint. In this example, the process may select between a hint based on a wireless fingerprint or geo-location data. For example, a wireless fingerprint may be collected by a portable device in which an application executing on the device can access device hardware, such as a Wi-Fi chipset. Alternatively or additionally, geo-location data may be obtained by an application executing on the device via an API provided by an operating system on the device. In that scenario, an operating system utility may access device hardware, including for example a GPS chipset on the device, to generate the geo-location information.

Though not illustrated in the example of FIG. 74, different or additional sources of location metadata may be considered in the prioritization process. For example, if an application executing on a device has access to a GPS chipset directly, GPS data from the chipset may be used directly to obtain a hint for the process of selecting candidate maps. Also, though not illustrated, the selection may be based on information in addition to the type of metadata. For example, where GPS data is available, its priority may be based on location information. GPS data may be given priority over a Wi-Fi signature, even if both are available, when other data indicates that the portable device is operating out of doors, while a Wi-Fi signature may be given priority when other data indicates that the portable device is operating indoors. Further, though process 7400 is illustrated as selecting only one type of hint, in some embodiments, when multiple types of metadata are available to generate a hint in the map selection process, the types of metadata may be used conjunctively or disjunctively to select a set of candidate maps.

Regardless of the type of hint selected at act 7406, subprocess 7450 may continue to act 7408 to filter the universe of maps based on the selected location metadata. The universe of maps, for example, may be a database of canonical maps maintained by a localization service. In other embodiments, filtering at 7408 may be executed against a set of already filtered maps. In that sense, the universe of maps in process 7400 represents the collection of maps that is the starting point for processing as shown in FIG. 74.

If prior successful localization information is selected for generating a hint in the map selection process, subprocess 7450 may use the location prior to filter available canonical maps to those that are likely to match a device's local map at 7408. The filtering operation(s) at 7408 may limit a universe of canonical maps to likely candidates based on proximity to the location identified in a prior successful localization. For example, a prior localization may have resulted a transformation between a persistent coordinate frame in a canonical map. That canonical map may be selected as a candidate map. Where the canonical maps in the database have location information associated with them, other maps that depict locations that can be determined to represent regions of the physical world near the location in the map where a prior localization succeeded, may also be included in the set of candidate maps.

Similarly, if localization is performed based on a segment of a canonical map, such as one or more tiles, the hint provided by a prior successful localization may guide the selection of one or more such segments.

If prior localization information is not available, discounted, and/or ignored, hint priority may result in selecting a WiFi fingerprint as the location metadata with the next highest priority. For example, a request for localization may include WiFi fingerprint information, and the WiFi fingerprint information may be employed to filter the universe of canonical maps at 7408 and/or further filter a set of canonical maps.

Selection of candidate maps based on such wireless fingerprint metadata may be as described elsewhere herein. Alternatively or additionally, the map selection techniques as described herein may be modified based on the location hints applied. As an example of such a modification, each type of location metadata may have an accuracy associated with it. A location prior has uncertainty associated with the possibility that the portable device has moved since the prior location was determined. GPS, which may be the genesis of geo-location data from an operating system, may have an accuracy, for example 10 feet for a device operated outdoor or 50 feet when the device is operated indoors. Regardless of the source of uncertainty, candidate maps (or segments of maps) may be selected based on their proximity to a location within the zone of uncertainty around the location indicated by the hint. As a result, in some embodiments, the number of maps, or map segments, in the set of selected candidate maps may vary on accuracy of the location metadata used for a hint.

In scenarios in which location prior and WiFi fingerprint information is unavailable or not used, geo-location information from a device operating system may be used to provide a localization hint. For example, process 7400 may proceed at 7406 based on determining only geo-location data is available for a given request, and filtering the sets of canonical maps is executed based on the geo-location information received with the request for localization at 7408.

The illustrative embodiment is based on a relative priority for location metadata which prioritized valid prior location information over WiFi signatures, which in turn are prioritized over geo-location data obtained from the device operating system. Such a prioritization scheme may be determined empirically based on impact on efficiency for localization and/or map merge. In other embodiments, other prioritization schemes may be applied, such as because other location metadata is available and/or available location metadata has different accuracy, for example.

According to some embodiments, location metadata associated with canonical maps may be maintained for filtering the canonical maps for likely candidate maps based on location metadata associate with a localization request. The metadata may be stored in a way that facilitates rapid selection of canonical maps. For example, one or more types of location metadata may be converted to geo-hash values and stored for respective locations associated with canonical maps. In various embodiments, the geo-hash values may provide a quickly searchable index into the universe of candidate maps for location metadata that can similarly be converted to a geo-hash value. For a prior determined location, the location may be represented as a geo-hash value or world coordinates, such as latitude and longitude, that can be readily hashed to create a geo-hash. Geo-location information may also be provided in such a format that can be readily hashed. Other metadata, such as a wireless signature may be converted to a geo-hash, such as using a look up in a database of wireless access point identifiers and associated geographic location.

In embodiments in which such an index is available and location metadata associated with a localization request may be converted to a geo-hash, a search of the index of geo-hash values may be performed. The search results from the geo-hash query provide a set of candidate canonical maps. That set of canonical maps may be further filtered (e.g., at 7408) and/or analyzed before further processing. In some embodiments, a set of maps may also be filtered on different criteria prior or subsequent to executing a geo-hash query. For example, map id, area id, etc., may also be used to further filter or pre-filter sets of maps, and, for example, pre-filtered sets of maps may then be queried based on geo-hash values.

In another example, a geo-hash query may be used to identify locations within respective maps, and may also provide candidate areas within canonical maps. In one example, candidate areas can be specified by tiles within a map. In some embodiments, a map may be segmented into tiles, as discussed above, and each tile may encompass persistent location information (e.g., persistent pose and/or persistent coordinate frame, etc.).

For location metadata that cannot be readily converted to a geo-hash, other comparison techniques may be employed to select, from the universe of canonical maps, those that have values of location metadata similar to that provided with the localization request. Selection based on Jaccard similarity, for example, was described above. In various embodiments, any combination of filter steps and any order of filtering may be executed to facilitate identification of a filtered set of maps and/or areas within one or more maps on which to localize.

Regardless of the specific technique applied to select the set of candidate maps, processing may proceed to act 7410 where attempts are made to match the location information provided with the localization request to a location within a map of the filtered set of canonical maps. In an embodiment as described in FIG. 74 in which location information is formatted as a PFR, localization processing may entail computing transformations that relate a set of feature points in the PFR to clusters of feature points in the set of candidate maps. Localization may be considered successful upon identification of a transformation that results in a match between the set of features in the PFR and in a candidate map with an acceptable level of error. Techniques, such as deep keyframe descriptors as described herein, may be used to facilitate finding a match between feature sets. Various embodiments of localization processing are described herein, such as in connection with FIGS. 23, 34, 44, 45, 46A-B, 62, and 69 above, and may be used in process 7400.

If no suitably matching set of feature points is found for one of the PFRs sent with the localization request, localization may be attempted with features in another of the PFRs. Other actions also may be taken if no suitably matching set of features are identified, such as expanding the set of candidate maps.

If the search for a matching set of features results in identification of a matching set of features, the transformation that led to that matching set of features may be returned as the localization result at act 7412. That transformation may indicate a correspondence between a selected coordinate frame of the device's map and a coordinate frame of the stored map containing the matching set of features. In some embodiments the coordinate frames may be persistent coordinate frames (PCFs) and/or persistent poses and/or an origin of a tracking map or of a canonical map. The selected coordinate frame of the device, for example, may be the coordinate frame associated with the tracking map of the device. The coordinate frame of the stored map being localized into may be a persistent coordinate frame within a candidate tile selected as a result of the search in 7410. Such transforms enable the requesting device to position and/or display virtual content in its own coordinate frame even though information on the virtual content has been stored in association with a canonical coordinate frame. Once computed, a transform or, if more than one matching set of features is identified resulting in generation of multiple transformations, a table of transforms may be communicated at 7412, for example, to a device requesting localization.

In further embodiments, the steps of process 7400 may be combined, executed in different order, and/or some steps may be omitted. Discussion of the execution of process 7400 is described with respect to example location metadata type and priority. In other embodiments, additional location metadata may be employed to use in filtering maps, selecting tiles, etc., and different priorities may be assigned to various location metadata or developed over time.

According to some embodiments, a cross reality platform may be configured to capture location metadata from respective devices that are connected to it. That location metadata may be captured as part of a map merge process. A portable device may acquire location metadata for its current location as it builds a tracking map. Accordingly, when the tracking map is provided as an input for a map merge process, the location metadata may be incorporated into a merged map. Alternatively or additionally, successful localization in response to a localization request that includes location metadata may provide an alternative or additional source of location metadata for inclusion in a canonical map.

Figure 75:
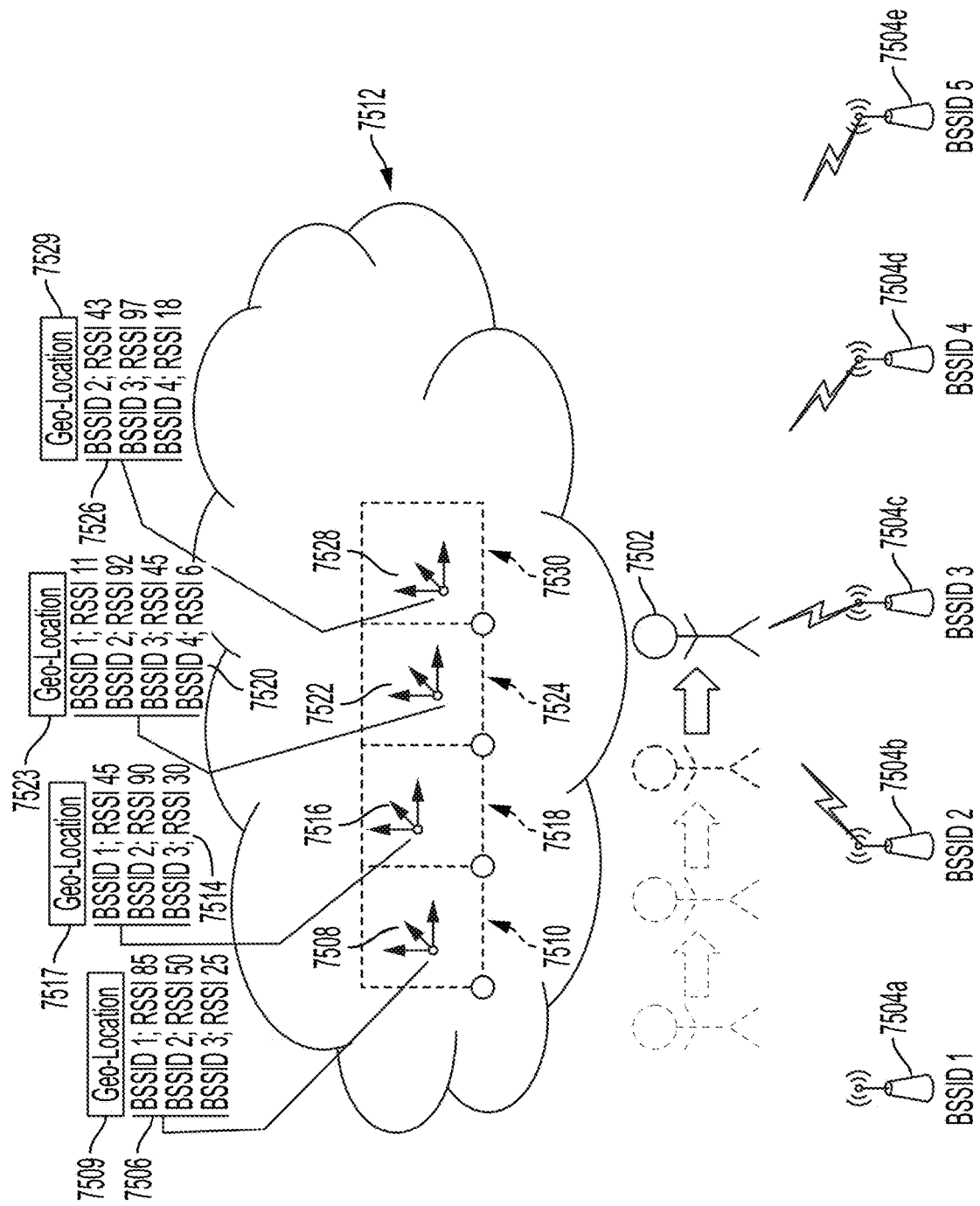
FIG. 75 is conceptual diagram of an example of a portable device generating a tracking map containing location metadata, according to some embodiments.

FIG. 75 illustrates an example of a portable device generating a tracking map containing location metadata (e.g., WiFi fingerprints, geo-location, GPS data, etc.) for use in localization hints or other functions, according to some embodiments. In this example, a WiFi fingerprint, as described above, is shown in conjunction with geo-location metadata. Some devices may collect both of these types of metadata, in addition to possibly other types of location metadata. For example, devices can capture location metadata from additional sensors or systems in the devices 3D environment. In some embodiments devices can connect to and capture additional location metadata smart devices around present around a user location (e.g., home, shopping area, venue, etc.). However, in some embodiments, a single device may collect either WiFi finger prints or other geo-location data.

In FIG. 75, a user 7502 with a portable device is shown in a three-dimensional (3D) environment containing wireless network access points 7504a through 7504e. Wireless hardware on the portable device may be used to establish location metadata, and for example, to determine a network access point identifier and signal strength indicator value for each network access point for which a signal is detected. According to some embodiments, wireless access data may also be used to determine geo-location for the device, which may be expressed in latitude and longitude as for GPS coordinates, for example. The known GOOGLE geo-location API may be accessed to obtain the geo-location information from wireless signals accessible by a device. In various embodiments, generated or captured geo-location information may be used to augment device generated maps of their environment.

As shown in FIG. 75, the network access point identifier may be a basic service set identifier (BSSID) and the signal strength indicator value may be a received signal strength indicator (RSSI) value. In some embodiments, the network access point information may be used to form a WiFi fingerprint, such as was described above in connection with FIGS. 64-68, for example. In some embodiments, other information about the network access points may be collected in addition to or instead of network access point identifiers and signal strength indicators.

Location metadata may be stored in connection with locations of the tracking map. For example, location metadata may be stored in association with a tile 7510 of a map 7512 when the user device is in a location corresponding to that tile. A respective user device may capture and include network access point information and may also capture and include geo-location data 7509. The geo-location data may be generated by GPS hardware on the device, through an operating system API, or from another source, such as a GOOGLE geo-location API. In some embodiments, geo-location data may be stored as a separate geo-location data structure or may be integrated into the same data structure as other location metadata. For example, wireless information serving as a wireless fingerprint 7506 may be stored in association with tile 7510 of a map 7512 when the user is in a location in the physical world represented by tile 7510.

Location metadata may alternatively or additionally be stored in connection with other components of a tracking map. Persistent location information may also be stored for tile 7510. Persistent location information 7508, defining a persistent location, may be stored as a data structure in non-volatile memory within or connected over a network to the portable device. In some examples, location metadata may be stored in or associated with this data structure. In some embodiments, the persistent location information 7508 may comprise a persistent coordinate frame or persistent pose, as described above. In this example, location metadata in the form of wireless fingerprint 7506 and geo-location information 7509 may be stored in a data structure that stores persistent location information 7508 or that is linked to such a data structure.

In the illustrated embodiment, there is one persistent location per tile, such that metadata may be associated with either the persistent location or the tile. In embodiments in which there is not a one-to-one relationship between tiles and persistent locations, the location metadata may be stored in connection with the tile and/or the persistent location. Different types of location metadata may be stored in the same or different data structures. Wireless signatures may be stored in conjunction with persistent poses, for example, while geo-location information may be stored in connection with tiles. Regardless of the map component for which the metadata is stored, as the user 7502 traverses a space in the real world, collecting data that expands the tracking map 7512, the device may collect data about the user's location as map components are added to the tracking map and/or updated in the tracking map. The location metadata may be captured as the portable device is building a tracking map, such that wireless information and/or geo-location data may be captured and stored as new persistent poses are created. Tile 7518 may be added to the tracking map 7512 as the user 7502 moves such that the user's device gathers information about an additional location in the physical world. Tile 7518 illustrates new signal strength values associated with movement of the user device and resulting change in proximity between the portable device and the wireless network access points 7504a-7504e. For tile 7518, the change in location of the user has caused the user to enter a space that was not yet mapped in the tracking map such that a new persistent pose is created and new persistent pose information 7516 is stored. Any new location metadata, for example new network access point information 7514 and/or geo-location data 7517 may be stored with the new persistent location information 7516 in a new tile 7518 of map 7512 as illustrated.

Tile 7524 illustrates a result of the user 7502 moving further within the 3D environment. In this example, the portable device of user 7502 receives signals from wireless network access points 7504a, 7504b, 7504c, and 7504d, and captures geo-location information. New network access point information 7520 and/or geo-location data 7523 may be stored with persistent location information 7522 or may be stored in connection with tile 7524 of the map 7512.

Likewise, further movement may result in a further tile 7530 being added to the tracking map, with additional persistent pose information 7528 and location metadata, here network access point information 7526 and geo-location information 7529.

According to some embodiments, location metadata may be captured at various times during development of a user device tracking map. Location metadata may be captured at different times for the same component of the tracking map. Additional location metadata for a map component, such as a persistent pose or a tile, may be collected when a user remains in position or within a certain distance of a position or returns to that location at a later time. New location metadata may be aggregated with previously stored location metadata for a component. In some embodiments, for example, data values for respective data fields in a geo-location data structure may be averaged, expressed in ranges, or merged, among other options. By merging new location metadata with previously collected information, the location metadata may be more stable and therefore more effective for comparison with other location metadata.

New network access point information may be merged with the previously stored network access point information to produce merged network access point information, as described above. Similarly, geo-location data may be merged over time, replaced with newest data, and/or averaged and stored in association with persistent location information responsive to subsequent data captures.

Producing the merged location metadata may, in some embodiments, comprise taking an average of captured information. The averaging may be computed as a rolling average, for example. Producing the merged location metadata may alternatively or additionally comprise replacing some stored location metadata with some, all, or none of the new location metadata.

Other processing may alternatively or additionally be used to improve the stability of location metadata or to otherwise format the information for improving localization operations. Filtering for example, was described above for wireless network information. Similarly, other location metadata may be filtered. For example, geo-location data 7529 may also be filtered. In some embodiments, horizontal and vertical accuracy values provide information on the confidence associated with a GPS reading and/or its associated accuracy. Where the accuracy values are too low, the information may be discarded without storing or averaging into previously stored values. Alternatively or additionally, in some embodiments, the average of metadata values for the same location may be weighted based on respective accuracy.

Once map data is captured by a portable device, the collected information may be used to localize the portable device to a stored or canonical map. In the illustrated example of FIG. 76, a localization request occurs while a user device is within tile 7606. A device may use techniques as described above, such as processing images or other information about the environment, to determine its location with respect to a location in a tracking map. For generating a localization request, the device may select as metadata to associate with the request metadata associated with a persistent location that the device has determined is near its current location. The metadata may be the metadata stored with the persistent location or the metadata stored with the tile containing that persistent location, for example.

In this example, the location metadata 7610 of tile 7606 in portable device map 7602 is similar to the location metadata 7612 stored in tile 7608 of stored map 7604. Based on this similarity, applying subprocess 7450 of process 7400 (FIG. 74), map 7604 may be selected as a candidate map. Moreover, tile 7608 may be selected as a candidate tile. A localization attempt may initially be limited to attempting to localize tiles 7606 and 7608 with respect to each other. If these tiles cannot be localized, localization may be attempted between tile 7606 and other tiles, such as those surrounding tiles 7608. The pairs of tiles may be selected in decreasing order of similarity.

In some embodiments, similarity of location metadata may be based on Jaccard similarity, as was described above for wireless network information forming a WiFi signature. Similarly, similarity of geo-location metadata may be determined based on Jaccard similarity. Other algorithms and heuristics may be employed for comparing the location metadata associated with a portable device and location metadata of stored maps. For example, the location metadata may be mapped to a one-dimensional identifier, such as a geo-hash, that enables determination of relative separation between two locations based on the difference in value of this one-dimensional identifier.

In some embodiments, an XR platform may be configured to identify candidate maps based on similarity between location metadata for multiple locations in the tracking map and a canonical map. Maps may then be ranked based on a number of locations with matching location metadata information. For purposes of such a comparison, the locations may be deemed to match if the metadata values differ by less than a threshold amount. Such an approach may be used, for example, when identifying candidate maps into which to merge a tracking map.

According to some embodiments, identifying candidate maps with location metadata similar to a portion of a tracking map may be done as a preliminary step to additional processing, such as to merge maps and/or to localize a portable device with respect to a shared coordinate frame. According to some embodiments, a portable device map may be localized within a stored map starting with the candidate tile or tiles selected by location metadata analysis. The localization process is described in detail at least in connection with FIGS. 23, 34, 44, 45, 46A and 46B above. It should be appreciated that the localization techniques described in this subsection may be used in conjunction with any of the other methods for localization described herein.

Figure 77:
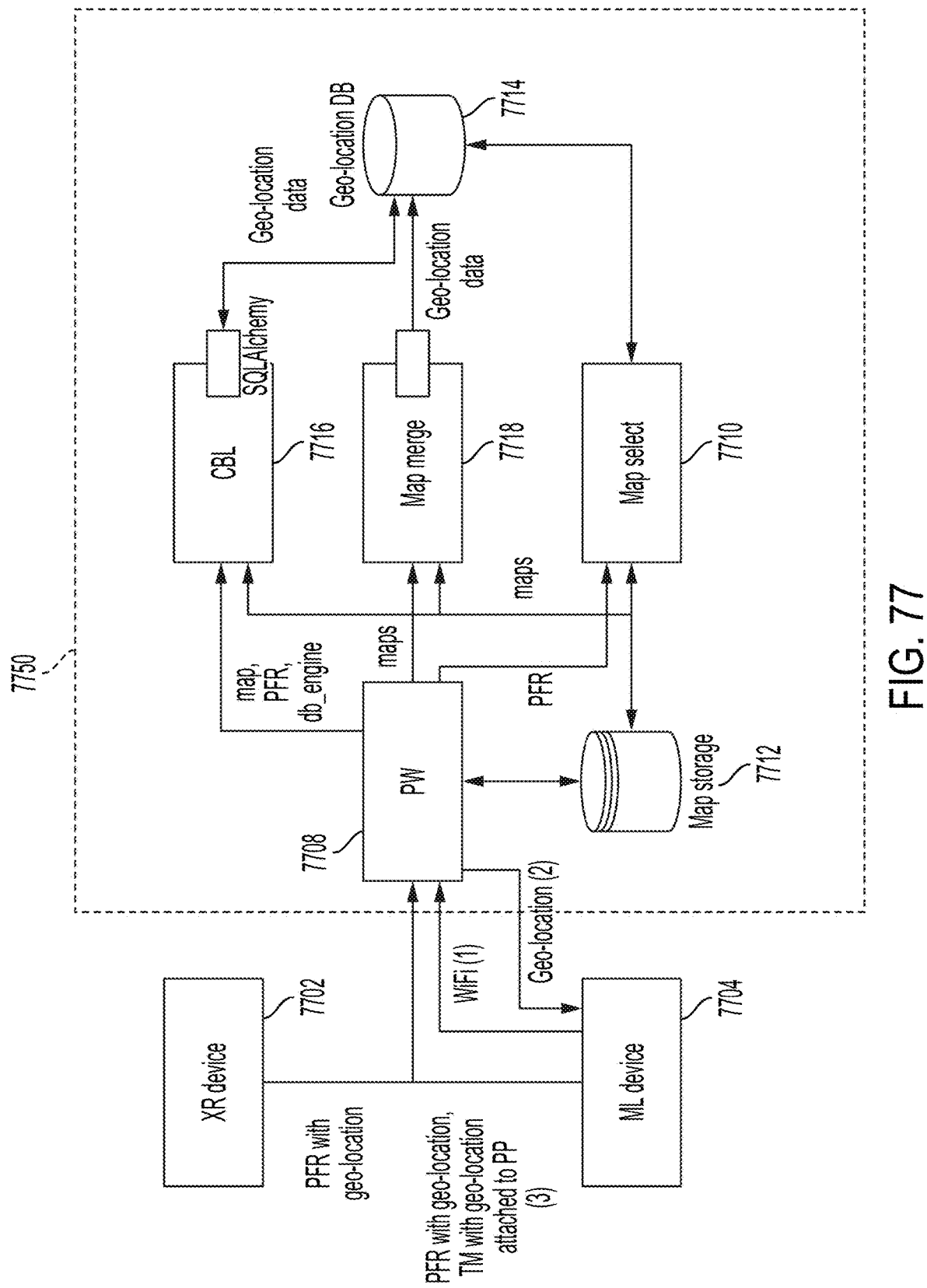
FIG. 77 is a block diagram of an example architecture for a cross reality platform, according to some embodiments.

FIG. 77 shows an example architecture 7700 of a cross reality system that may provide immersive experiences to a variety of cross reality devices and/or device types while preserving consistent visualization and experiences regardless of the device being used.

As shown, various cross reality devices (e.g., 7702 and 7704) may access a platform 7750. In this example, platform 7750 may be a cloud platform performing functions as described herein, including cloud based localization and map merge.

One or more portable devices may communicate with platform 7750. Those devices may provide information on their environment to enable localization and/or to enable the platform 7750 to build and/or maintain a database 7712 of canonical maps. Although only two devices are shown, any number of cross reality, AR or other portable devices may connect with the cross reality platform and participate in the immersive experiences generated.

According to some embodiments, different devices may interact with the platform 7750 differently based on different capabilities. Different devices may have access to different types of location metadata. For example, devices native to the cross reality platform, which may include MAGIC LEAP brand devices (e.g., device 7704), may be configured such that software on the device controlling augmented reality functionality can access a WiFi chipset on the device. Such a device may have access to WiFi information to generate a WiFi fingerprint. However, such a device may not have a GPS chipset. A smartphone, such as an iOS device 7702, conversely, may block software executing on the device from accessing its WiFi chipset, but may make information from a GPS chipset available through a geo-location API. Such a device when programmed to interact with platform 7750, therefore, may have access to that geo-location information.

In some embodiments, devices that interact with a platform 7750 may register to access the platform, and part of that registration may include identifying a device type or device capability and establishing what functions are to be used for the respective device. In some embodiments, the platform may determine if a device is or meets threshold requirements (e.g., similar capability of a MAGIC LEAP brand device) or is classified as a "ML" device 7704 or is classified as an "XR" device 7702. Alternatively or additionally, platform 7750 may determine which functions are performed for a device based on the type of metadata provided by it. For example, if a device provides GPS coordinates of its location, platform 7750 may perform map selection for that device based on geo-location, while map selection for a device that provides a WiFi signature may be based on that metadata.

Some functions may be performed for all devices accessing platform 7750. For example, both types of devices may collect and communicate information on their local environment. In some embodiments, the devices may construct tracking maps and may communicate information on their local environment based on the tracking maps. For example, the devices may be configured to communicate as part of a request to localize the device location information about the device, which may be in the form of one or more PFRs, with location metadata as described above. Some or all of the devices may be configured to transmit the tracking map to platform 7750 to support map merge functions on the platform. In the example of FIG. 77, ML devices 7704 may transmit a tracking map for use in map merge processing, but XR devices 7702 do not.

The device tracking map may include embedded location metadata. In this example, location metadata includes geo-location information. In some examples, a device's local map or tracking map may include geo-location information associated with persistent locations of the local map, such as a persistent poses in the local map. Other location metadata may be communicated separately and/or as part of a data structure holding the geo-location information. For example, ML devices 7704 may track and transmit WiFi signatures as part of the location metadata communicated in connection with a request for localization and/or a tracking map for merging.

In some embodiments, platform 7750 may include a passable world module 7708, which may perform some or all of the functions of a cloud-based component of a passable world model as described above. In the example of FIG. 77, passable world module 7708 may be configured to interact with multiple devices and manage execution of associated functions. Some example functions, which may be performed at least in part based on location metadata received from the devices, include curation of existing maps to include the received location metadata, maintenance of a geo-location database (e.g., 7714) associating location metadata to canonical maps and/or tiles within the canonical maps, and map selection and/or filtering, among other options.

Table I illustrates an example of a record in geo-location database 7714 with example field names and example data types. Other embodiments can use different field names and/or data types, and may omit or consolidate various fields of the example data structure.

TABLE I

| field name | data type |
| --- | --- |
| Id | Integer |
| Latitude | Numeric |
| longitude | Numeric |
| Altitude | Numeric |
| heading_deg | Numeric |
| horizontal_accuracy | Numeric |
| vertical_accuracy | Numeric |
| Geohash | String |
| map_id | Uuid |
| map_version | Integer |
| pp_id | Uuid |
| Provider | String |
| Timestamp | Timestamp |

According to some embodiments, PW module 7708 may manage interactions with portable devices for localization and for map merging. In each case, information received from the portable device may be used to select a set of candidate canonical maps. The selection of a set of canonical maps may be performed by map select module 7710. Map select module 7710 may perform a filtering process, such as subprocess 7450 (FIG. 74), which is based on location metadata. For localization, the metadata may be associated with a current location of the device. For map merge, the metadata may be associated with a tracking map or with multiple components of the tracking map.

Accordingly, PW module 7708 may communicate the received location and location metadata to a map select module 7710. According to various embodiments, the map select module 7710 may be configured to filter the universe of canonical maps to produce a set of candidate maps likely to represent a portion of the physical world described by the location metadata. The universe of canonical maps may be stored in any suitable medium, for example, in storage 7712.

As described above, in some scenarios, map select module 7710 may identify candidate maps based on similarity of WiFi signatures received from the portable device to WiFi signatures associated with maps in storage 7712. In some scenarios, the selection may be based on similarity of geo-location data. Platform 7750 may be configured for efficient selection of maps from map store 7712 based on geo-location information. For example, platform 7750 may include a geo-location database 7714 for this purpose.

Geo-location database 7714 may be indexed on geo-hash values to speed processing.

In this example, a record may be stored for each geo-hash value computed from geo-location metadata associated with each canonical map in map store 7712. In embodiments in which the geo-location metadata is associated with multiple persistent locations in a map, there may be multiple geo-hash values for the map. Table I illustrates a field named pp_id, which may be used to identify a specific persistent location within an identified map identified by a geo-hash value.

To select candidate maps based on geo-location information, map select module 7710 may compute a geo-hash of geo-location metadata accompanying a localization request or a request to merge a tracking map. Map select module 7710 may then query geo-location database 7714 for records with similar geo-hash values. The query, for example, may request records with geo-hash values within a predefined range of that geo-hash value, or within a predetermined percent of that geo-hash value. As another example, geo-hash prefixes may be used to return matching values. Alternatively or additionally, the query may request a fixed number of records with values closest to the geo-hash value.

As shown in Table I, a record from geo-location database 7714 may identify a map and/or a persistent location within a map. In embodiments in which selection of candidate maps entails selecting a segment of a map, the identified persistent location may be used to select the appropriate segment. For example, a tile containing the identified persistent location and surrounding tiles of the map may be identified. The identified maps may be used as a set of candidate maps, with or without further processing.

As an example of further processing that might be performed, additional fields from the record may be used to impact the selection of map. As another example of other processing, the latitude, longitude, and altitude fields may be used to confirm that the selected record accurately matches the geo-location metadata that was hashed to query geo-location database 7714. Alternatively or additionally, the timestamp field may be used to remove from the set of candidate maps canonical maps that are old and may be out of date. As another example, altitude and heading information may be included in a geo-location data structure, which may also be used for confirming matches. Alternatively or additionally, accuracy information may be used to compute a size of a segment of a matching map included in the set of candidate maps. Where the accuracy is lower, a larger segment of a map may be selected as a candidate. In embodiments in which canonical maps are partitioned into tiles, a number of tiles to at least encompass an area of uncertainty around the specified location may be included in the set of candidate maps. Accuracy, for example, may specify as a radius around a location required to achieve a specified probability (such as 98%) that the actual location falls within that radius. Accordingly, tiles that represent a location within that radius of the specified location may be included in the candidate set of maps.

If a geo-hash index is not available, other searching techniques may be used to identify candidate maps. Brute force searching may be executed, for example, with geo-location data to determine distances from a device location to stored maps and/or tiles within stored maps. In addition and/or in the alternative, geometry libraries may be used to provide efficient indexes and query operations for latitude/longitude data.

The selected set of maps may be communicated to other modules for further processing. When the selection of maps was made in response to a request for localization, the set may be provided to localization module 7716. Localization module 7716 may attempt to localize a device against a map in the set of selected maps. Localization module 7716 may perform processing as described above in connection with acts 7410 and 7412 (FIG. 74) or other localization processing as described herein. As described in connection with act 7412, the result of a successful localization may be a transformation between a local coordinate frame of the device and that of a canonical map. That transformation may be sent to the local device.

Figure 76:
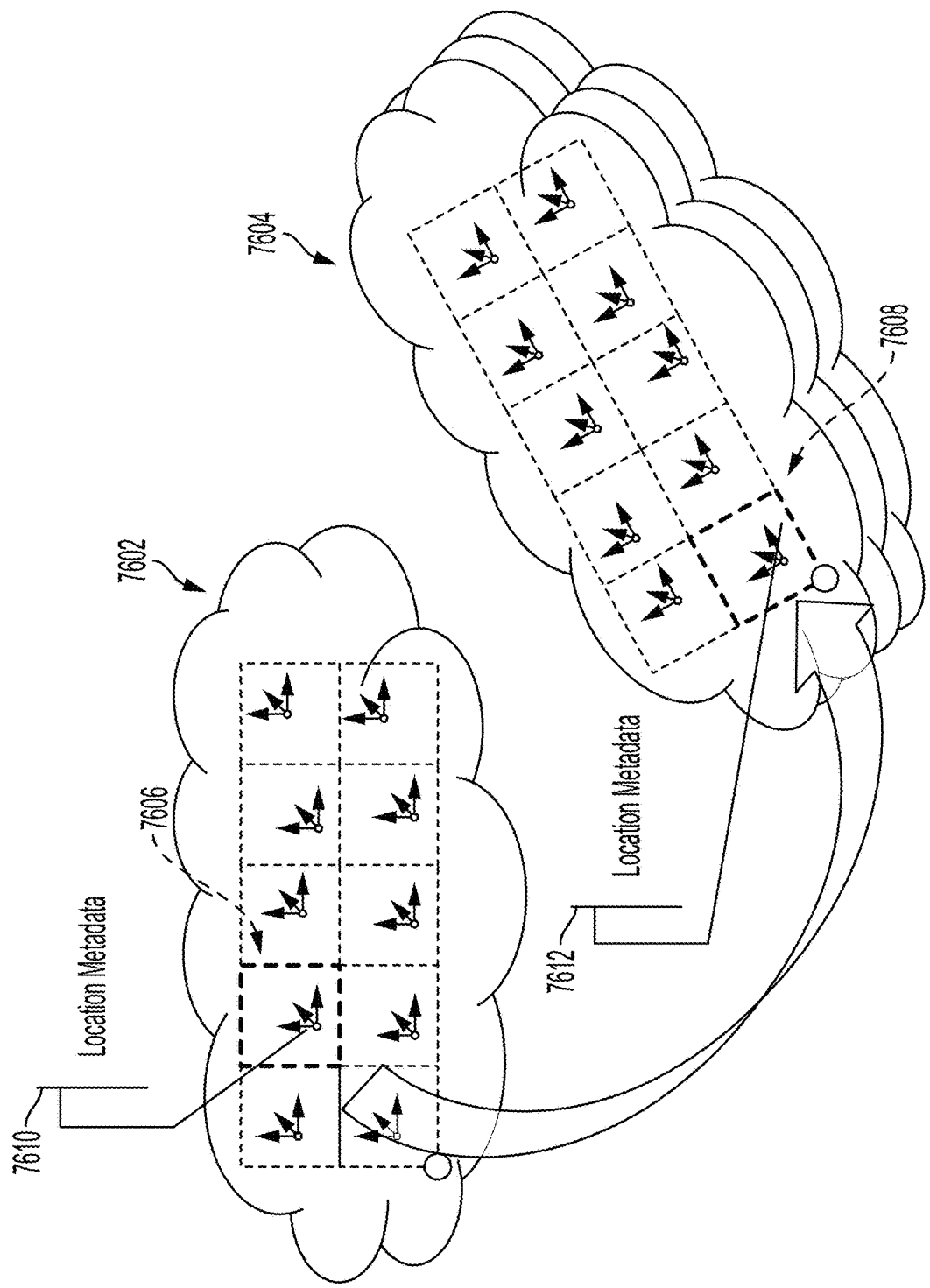
FIG. 76 is a schematic illustration of using location metadata for localizing a portable device, according to some embodiments.

In some embodiments, geo-location metadata may be sent to some devices following a successful localization. In the embodiment illustrated in FIG. 77, ML devices 7704 do not generate geo-location metadata themselves, for example, from GPS chipsets, but maintain geo-location data in their respective maps, based on, for example, geo-location data obtain and/or derived from other processes (e.g., GOOGLE geolocation API, etc.). However, platform 7750 maintains, in connection with canonical maps, geo-location metadata. Successful localization establishes a correspondence between a persistent location in a device tracking map and a component of a canonical map. If that component of the canonical map has geo-location information associated with it, platform 7750 may return the geo-location information and the device may store it in connection with the persistent location that was the basis of the successful localization. In the example of FIG. 76, upon successful localization of tile 7606 to tile 7608, geo-location information stored in the location metadata 7612 may be transferred to the device and stored as part of location metadata 7610. In this way, devices that do not generate geo-location information may obtain such information.

In some embodiments, localization module 7716 may also be configured to update geo-location database 7714 and/or map storage 7712. For example, a successful localization to a location within a canonical map based on a request containing geo-location metadata indicates that the location within the canonical map is identified by that geo-location metadata. Accordingly, the geo-location database 7714 may be updated with a record indicating that the canonical map, or more specifically a location within that map, is identified by that geo-location metadata. Similarly, metadata stored in connection with the matching location in the canonical map may also be updated based on the location metadata received with the localization requisition. Such an update may be made by updating map storage 7712.

Alternatively or additionally, the PW module 7708 may manage updating stored maps with location metadata and in particular geo-location information based on map merge functionality discussed herein. In some examples, the platform may include a map merge component 7718 configured to execute various map merge functions discussed herein. The map merge operations may include any of the functions discussed above with respect to map merge, and may include operations to aggregate various location metadata.

In the embodiment illustrated in FIG. 77, platform 7750 receives tracking maps for map merge only from ML devices 7704. Accordingly, canonical maps are initially created only with WiFi signatures as location metadata. Over time, however, as geo-location information is obtained and shared, it may also be incorporated into the set of canonical maps in map store 7712. For example, as XR devices 7702, which supply geo-location metadata with localization requests, perform localization, geo-location metadata may be added to map store 7712. Geo-location information further may be propagated through the system upon successful localization of an ML device 7704 to a map for which geo-location metadata is available and returned to the ML device 7704 as described above. Alternatively or additionally, geo-location information may be incorporated into the system by converting other location metadata, such as a WiFi signature, to geo-location information, such by utilizing a commercially available look-up between WiFi access point information and geo-location.

Figure 78:
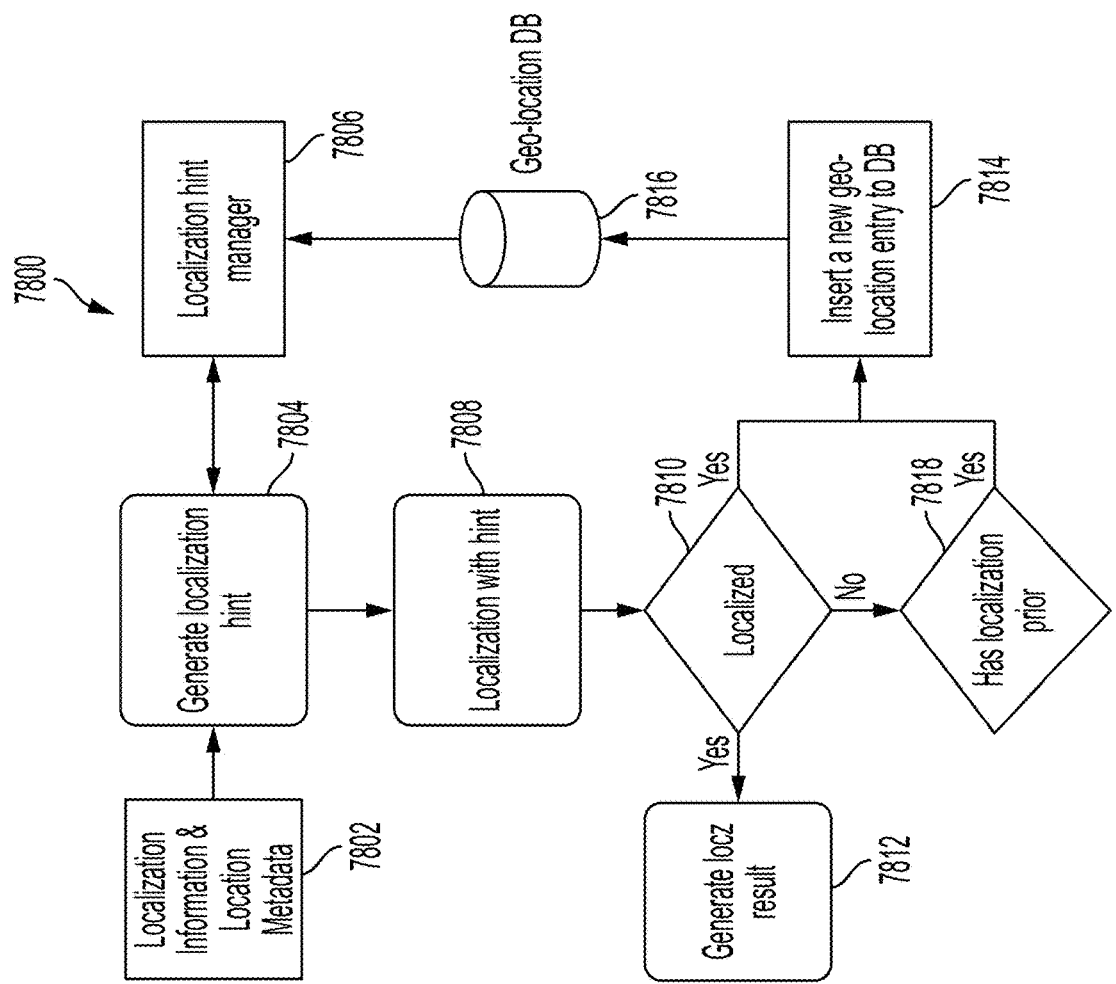
FIG. 78 is a flowchart of an exemplary process for incorporating geo-location data captured from devices into a geo-location database, according to some embodiments.

FIG. 78 illustrates an example process flow 7800 for incorporating geo-location data captured from devices into a geo-location database. Process 7800 may be executed by platform 7750, for example. In other embodiments, process 7800 may be performed in whole or in part on a device active on a cross reality platform. In yet other embodiments, the process may be performed in part on a device and in part on the platform.

A device may capture information on its environment and send localization requests based on image data captured or derived from its 3D environment. As discussed above, a portable device may generate feature descriptors that provide information on the location of the portable and communicate those descriptors in a request to localize the portable device to a stored map. In some embodiments, the portable device may also capture or accumulate location metadata to communicate with a localization request. For XR devices 7702, that metadata may include geo-location information acquired from the device operating system. For ML devices 7704, that request may include geo-location information, if that information has already been propagated to it from platform 7750.

According to some embodiments, process 7800 may begin at block 7802 with receipt of a localization request from the device. That request may include or identify location information and location metadata. In some examples, the location information may be formatted as a PFR containing feature descriptors. That PFR may also contain location metadata, which may be of any one or more of the types described herein.

At 7804, a localization hint may be generated to facilitate localization. As shown, in FIG. 78, a localization hint manager 7806 may be configured to generate a localization hint based on available location metadata. In some embodiments, the localization hint manager 7806 is configured to determine a priority of available location metadata and employ the information with the highest priority. That process may operate as described in connection with act 7406 (FIG. 74). Alternatively or additionally, priority may be defined and/or assigned based on analysis of localization accuracy.

Depending on the location metadata available, the localization hint is generated at 7804 by the hint manager 7806. In this example, the hint may be generated by selecting a set of candidate maps based on the available location metadata with the highest priority. That processing may be performed in accordance with the processing described in connection with act 7408 (FIG. 74) or as otherwise described herein.

Once a hint is generated, localization may be performed at act 7808 based on that hint, by attempting to localize against the selected set of candidate maps. Various operations to determine if a device may be localized to a stored map are discussed above and any one or more of those operations may be performed at block 7808.

At decision block 7810, a determination is made as to whether the localization was successful. Successful localization may be determined based on correlation, above a threshold, between the location information received with the localization request and a stored map. Alternatively or additionally, any other operations described herein for assessing success of localization may be applied.

Upon successful localization, process 7800 may return a localization result at 7812, which may include one or more transforms between a device coordinate frame and the coordinated frame of the matched canonical map. If the portion of the canonical map against which localization succeeded includes get-location information as location metadata, that geo-location information may be returned to the device.

Additionally, once a successful localization is achieved, a new entry, reflecting geo-location information for the matched canonical map, may be inserted into geo-location database 7816 at act 7814. That entry may include geo-location metadata, which may be copied from the location metadata received with the localization request. Alternatively or additionally, the geo-location metadata may be derived from information provided with the localization request. For example, geo-location information may be looked up for a WiFi signature sent with the localization request.

According to some embodiments, if a localization operation fails 7810, the geo-location database may still be updated at block 7814. Such processing may be used, for example, in a platform in which the set of canonical maps are initially formed without associated geo-location information, but geo-location information is propagated from devices interacting with the platform. Such processing may accelerate the propagation of geo-location information, which may in turn increase the efficiency of the platform.

For example, the geo-location database may still be updated at 7814, if prior localization information is available for the device requesting localization. Upon a failure to localize, process 7800 may proceed to block 7818 where a determination is made whether valid prior localization information is available for the device. The prior localization information may be stored by the platform as part of a record for the device. Alternatively or additionally, the prior localization information may be sent from the device as part of the location metadata for a localization request. Validity of the prior localization information may be determined based on one or more criteria, such as passage of time since the last localization and/or distance traveled by the device since last localization. In some embodiments, processing at block 7818 may be performed on the device, which may determine whether its prior localization result is valid and may suppress sending it with a localization request if invalid.

If, as determined at block 7818 the prior localization is valid and there is geo-location information associated with the prior localization, that geo-location information, along with the map identified in the prior localization may be used to add a record at block 7814. Otherwise the geo-location database is not updated when localization fails and no valid prior localization information is available.

Geo-location database entries may include the information described in Table I, among other options.

Enhanced XR Device Compatibility with Remote Localization

As noted above, a cloud-based or other remote localization service may offer a number of advantages in an XR system, including conservation of network bandwidth and computational resources, while enabling multiple devices to present an immersive XR experience to multiple users. Techniques as described in this section may provide access by a wide variety of XR device types to remote localization functionality so as to enable shared experiences to users of multiple types of devices.

It should be appreciated that enabling a variety of XR device types access to remote localization functionality is a challenging task. The different devices may have cameras with a wide variety of camera intrinsics, including cameras having varying image resolution, focal length, angular field of view, and/or other characteristics. The devices may also employ widely varying hardware and/or software. In this respect, some XR devices may have head mounted displays and multiple cameras, as described above, while other may be handheld mobile devices (e.g., smartphones, tablet computing devices, e-reader devices, gaming devices, etc.) or other type of portable computing device comprising a camera and/or a display. These devices may therefore operate differently when performing functions needed to provide a shared user experience in an XR environment, for example, due to hardware and/or software differences between the various XR devices. Nonetheless, these multiple types of devices may be configured to operate to provide a shared experience to their users by configuring each device to interact with a localization service that provides localization to each device based on a set of maps.

An efficient implementation of an XR system that supports multiple device types may leverage native AR components of the devices. Smart phones, for example, may have an augmented reality framework. Examples of such a framework are ARKit, which is available for devices executing the iOS operating system, and ARCore, which is available for devices operating the Android, Android NDK, Unity, Unreal and iOS environments. These frameworks, for example, may provide the software components to enable the device to present a live view of a 3D environment, captured with a camera on the device, on a display of the device. These software components may also control the rendering of virtual content to overlay it on the display, in a defined position with respect to objects in the 3D environment. These components may also control the capture of images from device cameras, build tracking maps from the images, and identify persistent points that serve as anchors for virtual content. They may also provide interfaces through which applications may specify the virtual content, and its location with respect to the anchors. These devices, however, may not enable applications to access the WiFi chipset to obtain a WiFi signature, but may provide an API through which geo-location information may be provided.

An efficient implementation of a multi device type XR system may enable a subset of the native AR components to work with other XR systems, such as those described above. In some embodiments, that implementation may entail interface components, which may execute on the device, to obtain from the native AR components image information and/or other information from which a request for localization services may be generated. The interface components may process the information from the native AR components in a way that enables the localization service to provide an accurate result and send the localization request. The interface components may format the response from the localization service such that it may be used by the native AR components to position virtual content on the device, positioned in a specified location with respect to the 3D environment. As any of multiple types of devices may be efficiently configured in this way, such an XR system may support operation of multiple device types providing a share user experience.

Figure 71:
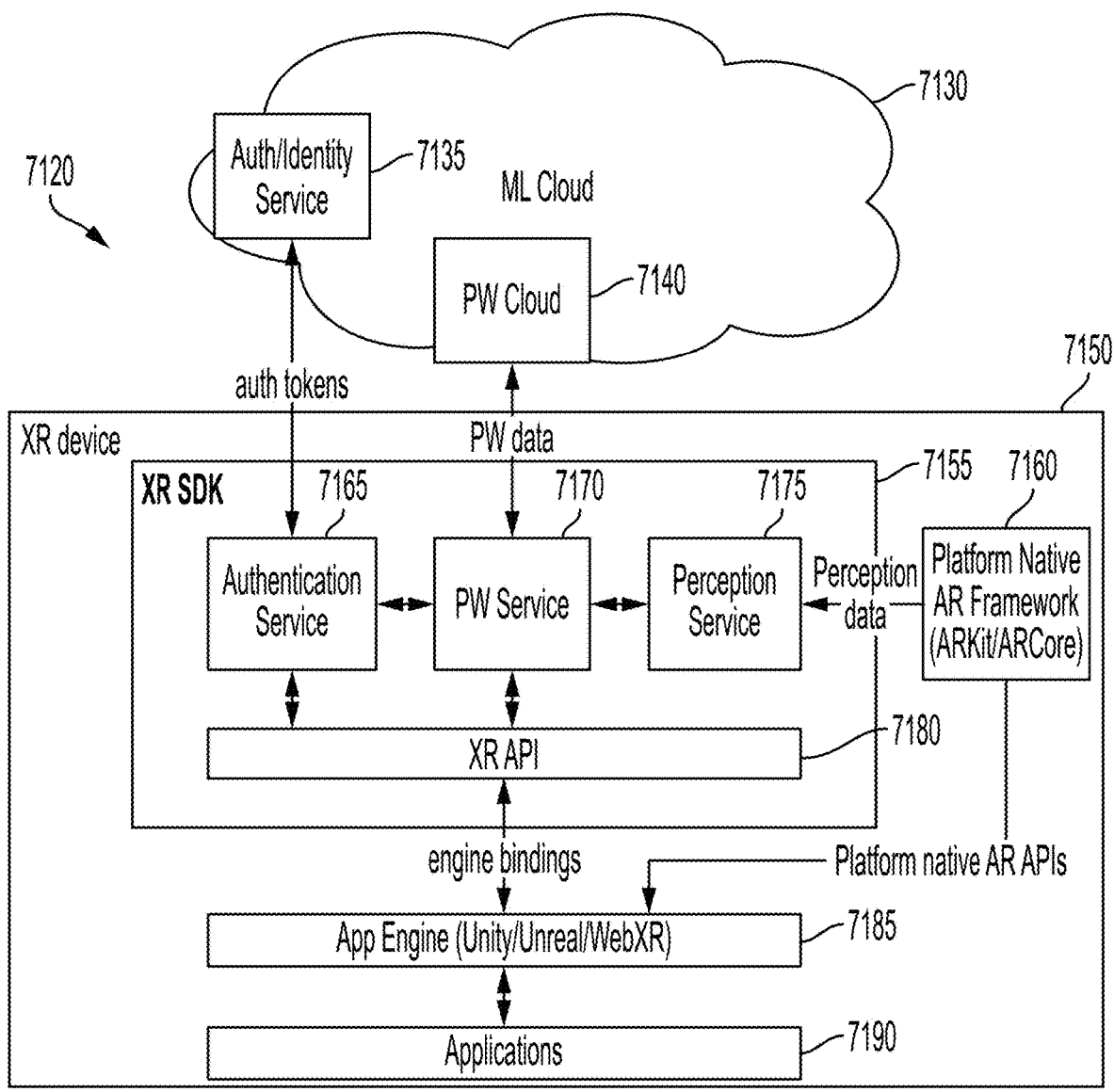
FIG. 71 is a block diagram depicting a representative system comprising a portable device, configured for operation in a first XR system and adapted to operate in a second XR system, in accordance with some embodiments.

FIG. 71 depicts a representative system 7120 for providing an XR device access to remote functionality, here shown as a cloud-based, remote service. Representative system 7120 includes XR device 7150 and remote services 7130. In this example, the XR device 7150 may be a smartphone, tablet or other portable or non-portable electronic device that is programmed for XR functions, but might also perform other functions. For example, XR device 7150 may be any electronic device which is portable or non-portable (e.g., is intentionally not movable, such as to prevent theft of the device, and/or restricted in one or more degrees of freedom, such as to have less than six degrees of freedom) and which is configured to execute the iOS or Android operating system, or may be an AR, VR and/or MR device (e.g., a Vive device). It may include a camera, display and other components found in a portable or non-portable electronic device, such as an IMU, GPS or wireless chipset.

XR device 7150 includes a native AR framework 7160, which in this example is not configured to operate with remote services 7130. Other components, as described below, nonetheless enable device 7150 to be part of an XR system providing cross reality experiences to multiple users. Though FIG. 71 shows a single device configured for XR functionality, it should be understood that the any number and any type of devices may be configured as illustrated in FIG. 71 to interface with remote services 7130, enabling multiple users, with multiple types of devices to share in an XR experience coordinated by XR system 7120.

In this example, remote services 7130 includes authentication/identity service 7135, which authenticates and identifies XR device 7150, via communication with a corresponding authentication service 7165 on XR device 7150. Based on device authentication, remote services 7130 may respond to or refuse requests for services from one or more devices. Authentication may be based on an account status of a user of the device. Alternatively or additionally, authentication may be based on type of service requested and type of device making the request. For example, remote services 7130 may include a service that builds canonical maps based on tracking maps supplied by one or more devices, as described above. Devices that contain cameras and processing capability that yield tracking maps above a quality threshold may be authorized to supply tracking maps for this purpose, while other devices, regardless of account status of their users, may be denied access for this service.

Remote service 7130 also includes passable world (PW) cloud service 7140, which communicates passable world information to XR device 7150 via PW service 7170. This passable world information may include maps, persistent points such as PCFs or persistent poses, meshes, objects, planes representing the physical world, including, in some embodiments, some or all of the information maintained about a passable world as elsewhere described herein. PW service 7170 may also provide localization services, also as described herein.

Components to communicate with any of the services contained within remote service 7130 may execute on device 7150. Such components may be acquired from a developer of the XR system including remote services 7130. In this example, authentication service 7165 and PW service 7170 are components of an XR software development kit (SDK) 7155, which may be provided to software developers preparing software to execute on devices of the same type as device 7150. In this example, SDK 7155 is illustrated as resident in device 7150. One skilled in the art will understand, however, that such notation indicates that components derived from SDK 7155 are installed on device 7150, but that the entirety of the SDK may execute on a computer elsewhere than on device 7150.

In this example, SDK 7155 also supplies components that interface with other components executing on device 7150. Those components include perception service 7175 and XR API 7180. Perception service 7175 is coupled to the XR device's native AR framework 7160, which may provide information relating to the device's interaction with the physical world, including camera images, its position, movement and/or orientation. The information provided through this interface may include data acquired in the 3D environment of the device, including for example, GPS (or other geographical location) information and data on detected network access points, such as which may be used for GPS- and/or WiFi-based localization.

Perception service 7175 may process this information and supply it to PW service 7170, where it may be further processed and supplied to PW cloud service 7140. This perception information may be processed, for example as described in greater detail below, to place it in a form that it will yield an accurate localization result for the device 7150. It should be appreciated that, though a representative embodiment is illustrated in which perception service 7175 and PW service 7170 are shown as separate components, the functionality of these components may be performed in one component or more than two components. Accordingly, processing as described herein on perception data performed on device 7150 may be performed in either component or distributed over both components or otherwise architected.

PW service 7170 may also process results of localization services received from PW cloud service 7140. That processing may include providing the localization results in a format that they can be used by native AR framework 7160 to render virtual content in a shared experience. As described above, localization services may provide a transformation between a local coordinate frame used by a device and a shared coordinate frame, reflected for example, in a canonical map stored in the cloud. Applications providing a shared experience for devices using the system may specify the location of virtual content in the coordinates of the canonical map, and the transformation may be used to enable a device to determine a location, with respect to its local coordinate system in which this virtual content is to be displayed. The transformation, in this example, relates one or more canonical coordinate frames to the local coordinate frame of the native AR framework 7160.

In this example, the transformation may be provided, in any suitable format, to an application engine 7185 and/or an application 7190 supplying virtual content for rendering on a display controlled by device 7150. For example, the transformation may provide a transformation between a PCF, in a format used by cloud services 7130 to represent locations in the 3D environment, into an anchor in a format used by native AR framework 7160. Such a transformation may be applied, for example, in app engine 7185, to transform information specifying the location of virtual content generated by application 7190 into a format that may be supplied to native AR framework 7160 through its native APIs. The transformation may be applied in reverse, for position information from native AR framework 7160 being supplied to other components implementing the XR system.

Applications 7190 may be configured to create or obtain virtual content that may be shared with other users. For example, multiple users may play a game in which the virtual objects, such as coins or other prizes, are specified to appear to all the users at locations distributed around a 3D environment. Each user may have a game application on their device that receives specifications of the virtual objects, and their locations, which may be specified relative to PCFs or in other formats supported by the XR system. These game applications may communicate with each other or a common server to share a common description of all of the virtual objects, such that each application can receive the specification for the virtual objects and provide commands to render those objects. Those communications may be in a format used by XR system 7120.

In the example of FIG. 71, these commands may be provided to native AR framework 7160, after being transformed to express positions in the format of anchors of the native AR framework 7160. Conversely, the application may receive information from native AR framework 7160, such as information indicating user interaction with the virtual content. App engine 7185 may transform any position information contained with those indications from the format of native AR framework 7160 to a format used by XR system 7120. Thus, users of multiple devices, even if those devices have native AR frameworks incompatible with XR system 7120, may share in the game experience.

Figure 72:
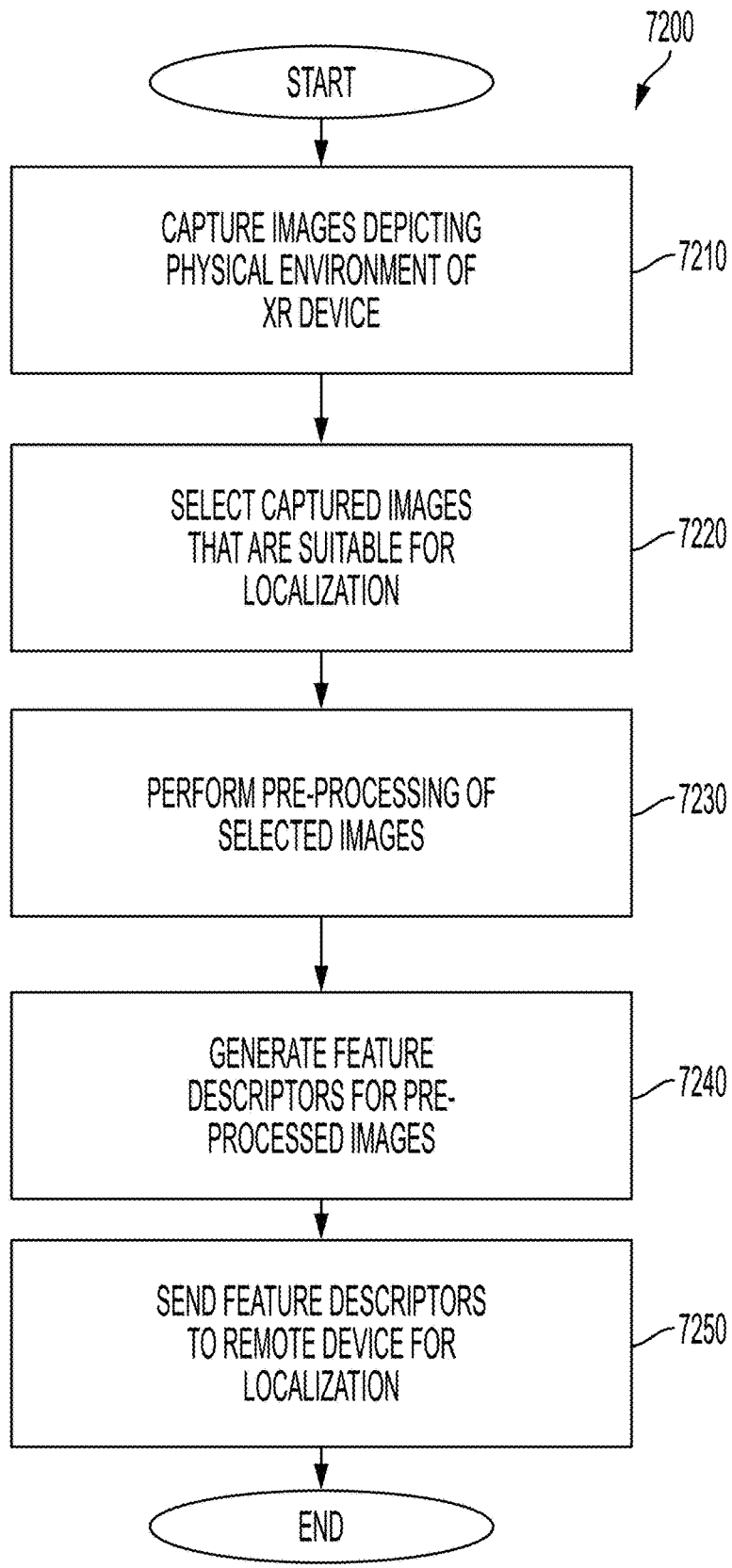
FIG. 72 is a flowchart depicting a representative process in which a portable device, configured to operate in a first XR system may share spatial information with other portable devices operating in a second XR system through a cloud-based localization service, in accordance with some embodiments.

FIG. 72 depicts a representative process 7200 whereby an XR device may access remote localization functionality, in accordance with some embodiments. Process 7200 may be implemented within device 7230, using some or all of the components described above.

At the start of representative process 7200, in act 7210, images are captured by a camera of a device which depict the physical surroundings of the device. Image capture may be performed in any of numerous ways, such as in the manner described above in relation to act 6204 of the process shown in FIG. 62. In some embodiments, the images captured in act 7210 may be two-dimensional, but depict a three-dimensional environment of the XR device at the time of image capture.

Image capture for providing perception information to support an XR experience may be controlled, in this example, by native AR framework 7160. The processing of those images for compatibility with other XR devices may be performed in whole or in part within perception service 7175 and/or PW service 7170. Accordingly, the captured images may be supplied to such components alone, or with other perception data.

The process then proceeds to act 7220, where a subset of the images captured by the device in the act 7210 are selected as being suitable for localization. An image may be selected as being suitable for localization based on any of one or more criteria. For example, in some embodiments, a captured image may be selected based upon an absence of excessive brightness and/or motion blurring in the image.

The presence or absence of these and/or other qualities in an image may be determined in any suitable way. For example, excessive brightness may be determined by an average pixel value for the pixels making up the image above a threshold. The presence of motion blurring in an image may be detected by (as examples) sensing motion of the device capturing the image, such as with an inertial measurement unit; detecting, in an image, patterns which are characteristic of blur; and/or comparing successive images in a sequence to determine a change of position of features from one image to the next, as an indication that the device moved too fast between successive image frames. Other techniques that may be alternatively or additionally used include computing a variance of an image Laplacian and/or computing gradient derivatives or wavelet transforms, and detecting a range of values outside a range corresponding to images previously identified as suitable. In some embodiments, it may be determined that an image is unsuitable for localization if motion blurring in the image exceeds a predefined threshold amount of motion blurring. As a specific example, images with a Laplacian variance above 200 may be excluded.

Alternatively or additionally, other criteria which may be used to select, or conversely exclude, images may include the number of corners detected in the image. For example, at least 30 corners might be required in selected images, or images for which native AR framework 7160 indicates that tracking has been lost may be excluded.

Process 7200 then proceeds to act 7230, wherein pre-processing is performed on the images selected in act 7220. Image pre-processing may entail any suitable number and type of operations. For example, image pre-processing may include sigma de-noise operations, lens shading correction, gamma correction to address image brightness, and/or other operations. Operations may be performed in any suitable order and sequence.

In some embodiments, the goal of pre-processing may be to normalize values for one or more parameters of interest represented in pixels of an image captured by the XR device with expected values for the same parameter(s) for pixels of images captured by a benchmark device (e.g., the wearable device 580, described above with reference to FIG. 4). The reference device, for example, may be a typical device used in connection with the XR system 7120. Maps and other information about the physical world maintained by PW cloud service 7140 may have been captured by devices of the same type as the reference device. Alternatively or additionally, images used to generate maps or other information maintained by PW cloud service 7140 may have similarly been normalized to the same reference device.

Via normalization, some embodiments may account for the wide variety of camera intrinsics potentially used by XR devices attempting remote or cloud-based localization. Some embodiments may account for the fact that many XR devices may be configured to capture two-dimensional images, whereas a benchmark device may be configured to capture three-dimensional images.

In some embodiments, normalization may be achieved by changing values for a parameter of interest for pixels in an image, to equal or approximate the values expected if the image were captured by the benchmark device. For example, gamma correction may be performed to modify brightness values for one or more pixels of an image, to equal or approximate the brightness values expected if the image were captured by the benchmark device. In some embodiments, normalization may be achieved by mapping values for a parameter of interest for pixels in an image of one size captured by the XR device to pixels in of another size captured by the benchmark device. For example, if the XR device captures images having half the number of pixels as are included in images captured by the benchmark device, then the values for the pixels captured by the XR device may be interpolated to create an image having the values expected if the image were captured by the benchmark device.

As an example of another normalization technique, multiple images might be combined to form a single normalized image. In a scenario in which the images provided a portable device have a smaller angular field of view than a reference image, data from multiple images may be fused to produce an image with a larger angular field of view. Conversely, rather than performing normalization on device 7150, information about the intrinsics of the device capturing the images might be collected and passed to PW cloud service 7140 for normalization processing. With processing in the cloud, characteristics of the images to which the images captured by device 7150 is to be compared alternatively or additionally may be modified, such as to reduce pixel density or decrease angular field of view, so as to enable a more reliable comparison of the images for which information stored in PW cloud service 7140 was generated and the images captured by device 7150.

Other suitable technique(s) may be used to normalize values from one image type to another, and the same technique need not be used to normalize the values for all parameters, or for all pixels.

At the completion of act 7230, representative process 7200 proceeds to act 7240, wherein feature descriptors for the image are generated. Feature descriptors may be generated in any of numerous ways, such as in the manner described above in relation to act 6206 of the process shown in FIG. 62.

In some embodiments, as described above, feature descriptors may be generated using one or more artificial neural networks trained with a labeled data set of images of features that represent persistent locations in the physical world that can be reliably detected each time a device images that region of the physical world. In some embodiments, a similar training process may be used to create an artificial neural network for generating feature descriptors in an XR system that supports multiple device types, but the training set of images may include images captured with a device of the same type as 7150, or otherwise with the same camera intrinsics. For example, a portion of the images in the training set may be captured with a camera having characteristics of the reference camera and another portion having characteristics of the camera of the device for which the neural network will be used to process images.

In some embodiments, the number of feature descriptors generated for a given image may depend, at least in part, upon the camera intrinsics of the XR device that captured the image. For example, the image resolution, focal length, angular field of view and/or other camera intrinsics of an XR device may influence the number of feature descriptors generated for a given image captured by the XR device. Localization is, on some level at least, a probabilistic procedure, and with certain cameras it may be necessary to increase the number of feature descriptors generated from images it captures to accomplish successful localization. Of course, the number of feature descriptors generated for the images captured by any specific XR devices may be determined in any suitable fashion, as the invention is not limited in this respect.

Regardless of the number of feature descriptors generated, each feature may be posed, as described above, so as to indicate the location of the feature in a local coordinate system. The pose may be based on perception data provided by native AR platform 7160.

Representative process 7200 then proceeds to act 7250, wherein the feature descriptors generated in the act 7240 are transmitted to a remote localization service. Transmission may be accomplished in any of numerous ways. The feature descriptors may be transmitted in a protocol and in conjunction with information as described above for a remote localization process. For example, the feature descriptors may be sent in connection with geographic data, such as GPS data or a wireless fingerprint, enabling the localization process to be performed as described above. As described above in relation to the process depicted in FIG. 62, in some embodiments, feature descriptors may be stored in a buffer prior to being transmitted to a localization service, and the frequency at which buffer contents are transmitted, and/or the amount of information (e.g., number of feature descriptors) may be determined dynamically in response to whether localization is successful. Representative process 7200 then completes.

Figure 73:
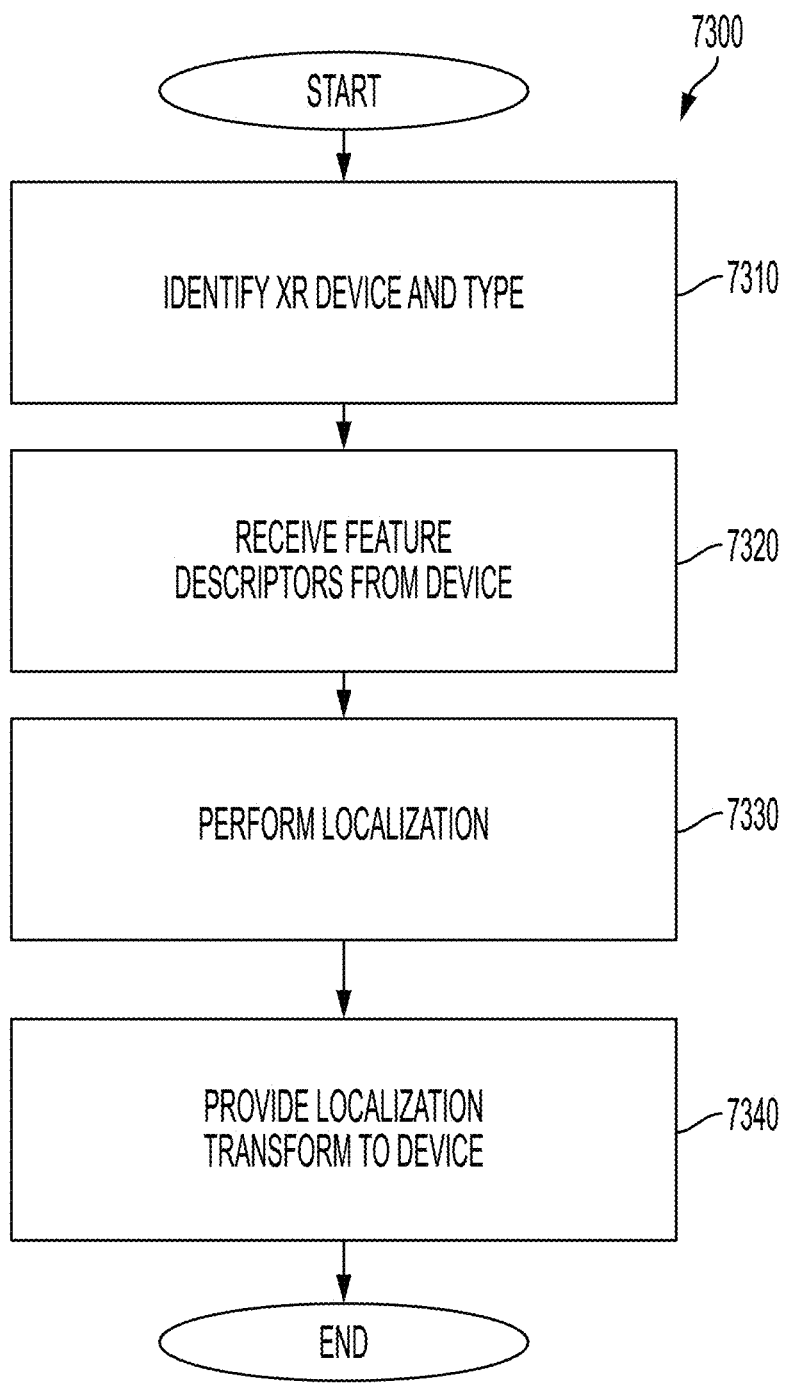
FIG. 73 is a flowchart depicting a representative process in which a remote localization service may provide localization information to an XR device, in accordance with some embodiments.

FIG. 73 depicts a representative process 7300 whereby a remote localization service (e.g., cloud-based localization service 7130, FIG. 71) may provide location information to an XR device (e.g., XR device 7150). At the start of representative process 7300, an XR device and its type are identified in act 7310. This may be performed in any of numerous ways. For example, in some embodiments, authentication/identity service 7135 (FIG. 71) of a remote localization service may identify the XR device and its type based on information provided by the XR device. This information may be used at the remote localization service for authorizing actions or other purposes, such as to tailor localization processing based on the type of device requesting localization services.

The process then proceeds to act 7320, wherein feature descriptors are received from the XR device. For example, feature descriptors may be transmitted by the XR device in the manner described above in relation to representative process 7200 (FIG. 72).

In act 7330, the remote or cloud-based localization service performs localization. This may be performed, for example, using the techniques described above in relation to FIG. 62. Any of the functions described in connection with localization may be performed. For example, information, such as session information or localization history for the device, may be stored, for example.

In some embodiments, the localization process may be varied based on the type of device. For example, wearable devices having stereoscopic cameras may generate 3D pose information in connection with the set of features sent for localization. For such devices, localization may entail matching a point cloud of features in 3D. To support this operation, canonical maps may represent persistent points with 3D clusters of features. However, in some embodiments, accuracy of matching features extracted from images taken with a monocular camera to a 3D set of features may be poor. Accuracy may be improved, for example, by projecting the 3D cluster of features, such as might be stored in a canonical map, into a plane and performing a 2D mapping within that plane.

Representative process 7300 then proceeds to act 7340, where the results of the localization are provided to the device. The results may be provided as described above, as a transform from a coordinate frame describing the locations of the features sent for localization to one or more coordinate frames associated with a canonical map or other shared map maintained by the localization service.

Representative process 7300 then completes.

Once the process ends with the device 7150 having a transformation between its local coordinate frame and a coordinate frame used by the XR system 7120 to specify the position of virtual content, device 7150 may render content in the specified locations. This rendering may be done by the native AR framework 7160. In embodiments in which native AR framework 7160 uses a format for specifying virtual content different than other components of system 7120, one or more content translators may be provided. Such content translators may be within remote services 7130, and an appropriate translator may be selected based on device information provided to remote services 7130 in connection with a localization request.

Figure 60:
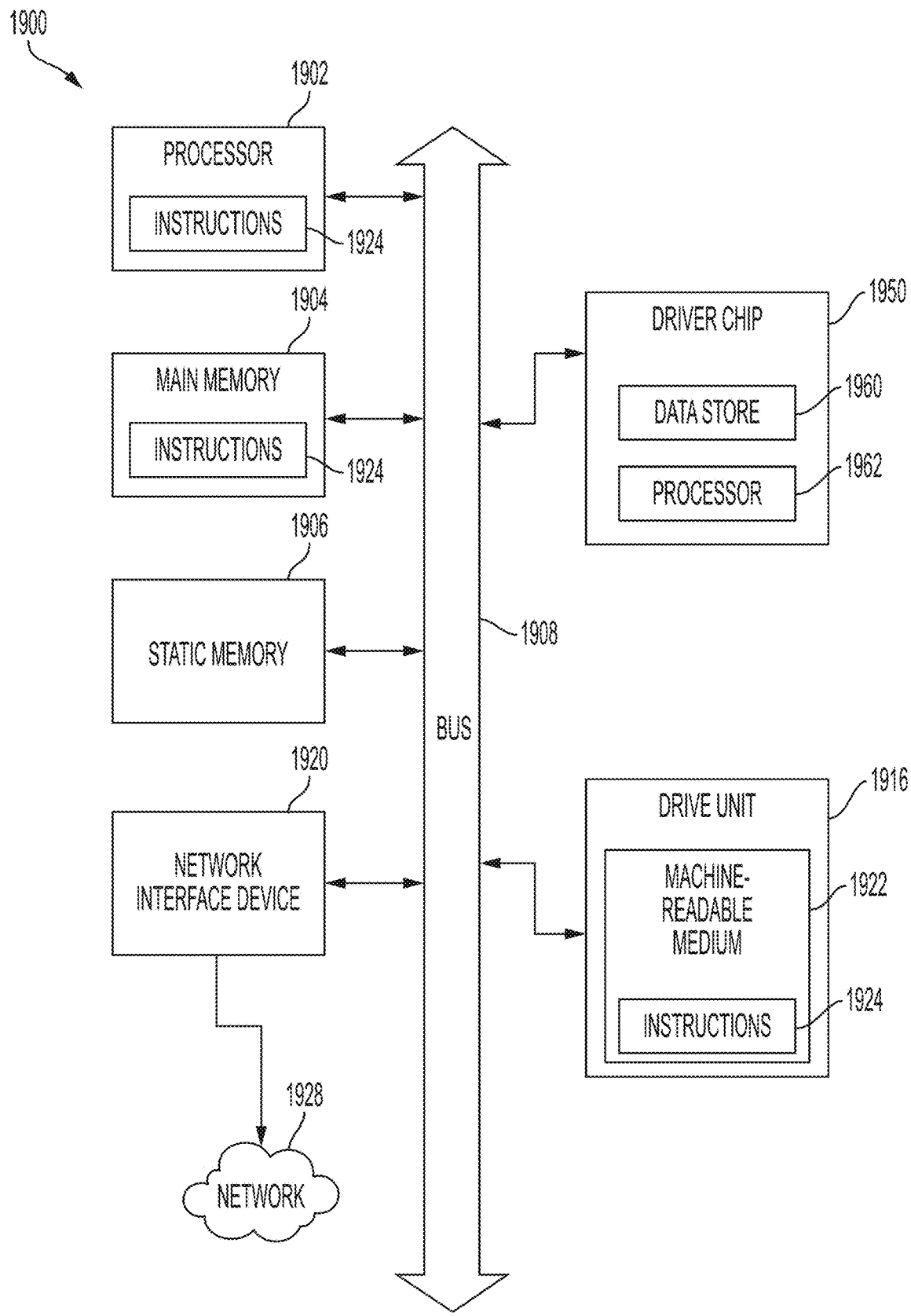
FIG. 60 is a block diagram of a machine in the form of a computer that can find application in the present invention system, according to some embodiments.

In this way, a device, such as a smartphone, not designed to work with XR system 7120 may work with that system. It should be appreciated that, in addition to rendering virtual content as described above, such a device may be programmed or otherwise configured to perform any of the functions described herein of a portable device as described herein Further Considerations FIG. 60 shows a diagrammatic representation of a machine in the exemplary form of a computer system 1900 within which a set of instructions, for causing the machine to perform any one or more of the methodologies discussed herein, may be executed, according to some embodiments. In alternative embodiments, the machine operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The exemplary computer system 1900 includes a processor 1902 (e.g., a central processing unit (CPU), a graphics processing unit (GPU) or both), a main memory 1904 (e.g., read only memory (ROM), flash memory, dynamic random access memory (DRAM) such as synchronous DRAM (SDRAM) or Rambus DRAM (RDRAM), etc.), and a static memory 1906 (e.g., flash memory, static random access memory (SRAM), etc.), which communicate with each other via a bus 1908.

The computer system 1900 may further include a disk drive unit 1916, and a network interface device 1920.

The disk drive unit 1916 includes a machine-readable medium 1922 on which is stored one or more sets of instructions 1924 (e.g., software) embodying any one or more of the methodologies or functions described herein. The software may also reside, completely or at least partially, within the main memory 1904 and/or within the processor 1902 during execution thereof by the computer system 1900, the main memory 1904 and the processor 1902 also constituting machine-readable media.

The software may further be transmitted or received over a network 18 via the network interface device 1920.

The computer system 1900 includes a driver chip 1950 that is used to drive projectors to generate light. The driver chip 1950 includes its own data store 1960 and its own processor 1962.

While the machine-readable medium 1922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

Further, FIG. 29 provides examples of criteria that may be used to filter candidate maps to yield a set of high ranking maps. Other criteria may be used instead of or in addition to the described criteria. For example, if multiple candidate maps have similar values of a metric used for filtering out less desirable maps, characteristics of the candidate maps may be used to determine which maps are retained as candidate maps or filtered out. For example, larger or more dense candidate maps may be prioritized over smaller candidate maps.

Such alterations, modifications, and improvements are intended to be part of this disclosure, and are intended to be within the spirit and scope of the disclosure. Further, though advantages of the present disclosure are indicated, it should be appreciated that not every embodiment of the disclosure will include every described advantage. Some embodiments may not implement any features described as advantageous herein and in some instances. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. In some embodiments, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. In some embodiments, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosure may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a computer-readable medium that can be considered to be a manufacture (i.e., article of manufacture) or a machine. In some embodiments, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A portable electronic device configured to operate within a cross reality system, the portable electronic device comprising:
   one or more sensors configured to capture information about a three-dimensional (3D) environment, the captured information comprising a plurality of images; and
   at least one processor configured to execute computer executable instructions, wherein the computer executable instructions comprise instructions for:
      extracting a plurality of features from the plurality of images of the 3D environment associated with the portable electronic device;
      generating location metadata indicative of a physical location of the portable electronic device when the one or more sensors captured the plurality of images;
      associating the location metadata with the plurality of features;
      communicating over a network, to a localization service:
         information about the plurality of features,
         position information for the plurality of features expressed in a local coordinate frame of the portable electronic device, and
         the location metadata associated with the plurality of features;
      receiving, from the localization service, at least one transform relating the local coordinate frame to a second coordinate frame; and
      rendering virtual content with a position and/or orientation determined based on the received at least one transform.

2. The portable electronic device of claim 1, wherein the location metadata includes prior localization information.

3. The portable electronic device of claim 1, wherein:
   the portable electronic device comprises an operating system with a geo-location application programming interface (API);
   the computer executable instructions further comprise instructions for obtaining the location metadata by calling the geo-location API.

4. The portable electronic device of claim 1, wherein:
   the computer executable instructions further comprise instructions for receiving a description of virtual content in a location based on the second coordinate frame and rendering the virtual content based on the at least one transform.

5. The portable electronic device of claim 1, wherein:
   the portable electronic device comprises a buffer configured to store a plurality of data structures; and
   associating the location metadata with the plurality of features comprises storing in a data structure of the plurality of data structures in the buffer the location metadata, the information about the plurality of features, and the position information for the plurality of features.

6. The portable electronic device of claim 5, wherein:
   communicating over the network to the localization service comprises transmitting the plurality of data structures from the buffer as a localization request.

7. The portable electronic device of claim 1, wherein:
   the computer executable instructions further comprise instructions for:
      constructing a local device map from the plurality of images,
      defining persistent locations in the local device map, and
      associating geo-location information with the persistent locations; and
   associating the location metadata with the plurality of features comprises accessing, from the local device map, geo-location information associated with a persistent location of the persistent locations proximate to the portable electronic device coincident in time with capture of the plurality of images from which the plurality of features were extracted.

8. The portable electronic device of claim 1, wherein:
   the computer executable instructions further comprise instructions for obtaining the location metadata by filtering, clustering, and/or normalizing location information.

9. The portable electronic device of claim 1, wherein the computer executable instructions comprise generating or receiving geolocation information on a current location of the portable electronic device in the 3D environment.

10. A cross reality system that supports specification of a position of virtual content relative to a plurality of stored maps previously created to describe one or more three-dimensional (3D) environments, the plurality of stored maps being associated with features, the system comprising:
   one or more computing devices configured for network communication with one or more portable electronic devices, the one or more computing devices comprising:
      a communication component configured to receive, from a portable electronic device, information about a set of features in a 3D environment of the portable electronic device, position information for the set of features expressed in a first coordinate frame, and location metadata descriptive of one or more physical world locations;

a localization component, connected to the communication component, the localization component configured to:
- select a set of stored maps from among the plurality of stored maps based on the received location metadata and based on location metadata associated with the plurality of stored maps;
- identify a stored map from the set of stored maps based on matching the received set of features to features of the identified stored map, wherein the identified stored map comprises a second coordinate frame;
- generate a transform between the first coordinate frame and the second coordinate frame based on a computed alignment between the received set of features and the matching set of features in the identified stored map; and
- send the transform to the portable electronic device.

11. The system of claim 10, wherein:
the localization component is configured to select a type of location metadata for the selecting the set of stored maps based on a priority associated with types of location metadata.

12. The system of claim 11, wherein:
the priority associated with the types of location metadata prioritizes prior localization information over a WiFi fingerprint.

13. The system of claim 12, wherein:
the priority associated with the types of location metadata prioritizes the WiFi fingerprint over geo-location information obtained from an operating system of the portable electronic device.

14. The system of claim 10, wherein:
the one or more computing devices further comprise a geo-location database identifying the stored maps by geo-location.

15. The system of claim 14, wherein the localization component is further configured to select the set of stored maps by querying the geo-location database based on the received location metadata.

16. The system of claim 15, wherein the localization component is further configured to update the geo-location database based on the received location metadata and the identifying the stored map.

17. The system of claim 15, wherein the localization component is further configured to send geo-location information to the portable electronic device based on location metadata associated with the identified stored map.

18. The system of claim 10, wherein the localization component is further configured to update the location metadata associated with the stored maps based on the received location metadata and the identifying the stored map.

19. The system of claim 18, wherein the localization component is further configured to:
- identify a localization failure; and
- update the location metadata associated with the stored maps responsive to a localization failure based on prior successful localization information for the portable electronic device.

20. The system of claim 10, wherein:
the stored maps comprise a plurality of segments; and
selecting a set of stored maps comprises selecting tiles of the stored maps.

* * * * *